United States Patent [19]

Sweet et al.

[11] Patent Number: 5,179,627

[45] Date of Patent: Jan. 12, 1993

[54] DIGITAL DICTATION SYSTEM

[75] Inventors: Alan F. Sweet, Stratford; Albert J. Gobel, Jr., West Haven; Mark N. Vogel, Trumbull; Judith M. Eckert, Stratford, all of Conn.

[73] Assignee: Dictaphone Corporation, Stratford, Conn.

[21] Appl. No.: 905,131

[22] Filed: Jun. 23, 1992

Related U.S. Application Data

[63] Continuation of Ser. No. 726,147, Jun. 28, 1991, which is a continuation of Ser. No. 13,304, Feb. 10, 1987.

[51] Int. Cl.⁵ .................. G10L 5/00; H04M 11/10
[52] U.S. Cl. .................................. 395/2; 379/75; 379/89
[58] Field of Search ............... 395/2; 379/75, 89

[56] References Cited

U.S. PATENT DOCUMENTS

| | | | |
|---|---|---|---|
| 3,403,383 | 9/1968 | Kienzle et al. | 340/172.5 |
| 3,728,486 | 4/1973 | Kraus | 179/2 R |
| 3,816,664 | 6/1974 | Koch | 179/15.55 T |
| 3,936,805 | 2/1976 | Bringol et al. | 340/172.5 |
| 4,041,249 | 2/1977 | Matz et al. | 179/100.10 R |
| 4,130,739 | 12/1978 | Patten | 179/100.1 VC |
| 4,221,933 | 9/1980 | Cornell et al. | 179/CC |
| 4,247,910 | 1/1981 | Cornell et al. | 364/900 |
| 4,260,854 | 4/1981 | Kolodny et al. | 179/6.09 |
| 4,319,337 | 3/1982 | Sander et al. | 364/900 |
| 4,371,752 | 2/1983 | Mathews et al. | 179/7.1 TD |
| 4,375,083 | 2/1983 | Makemchuk | 364/900 |
| 4,392,218 | 11/1983 | Plunkett, Jr. | |
| 4,468,751 | 7/1984 | Plunkett, Jr. | 364/900 |
| 4,488,274 | 12/1984 | Plunkett, Jr. | 364/24 |
| 4,523,055 | 6/1985 | Hohl et al. | 179/2 DP |
| 4,549,047 | 10/1985 | Brian et al. | 179/18 B |
| 4,573,140 | 2/1986 | Szeto | 364/900 |
| 4,580,012 | 4/1986 | Mathews et al. | 179/18 B |
| 4,580,016 | 4/1986 | Williamson | 179/175.3 R |
| 4,581,486 | 4/1986 | Mathews et al. | 179/18 B |
| 4,582,959 | 4/1986 | Myslinski et al. | 179/27 FH |
| 4,585,906 | 4/1986 | Mathews et al. | 179/18 B |
| 4,602,129 | 7/1986 | Mathews et al. | 179/18 B |
| 4,621,350 | 11/1986 | Sevitsky et al. | 369/29 |
| 4,623,988 | 11/1986 | Paulson et al. | 364/900 |
| 4,627,001 | 12/1986 | Stapleford et al. | 364/513.5 |

FOREIGN PATENT DOCUMENTS 2140251 11/1984 United Kingdom.

Primary Examiner—Emanual S. Kemeny
Attorney, Agent, or Firm—Peter Vrahotes; Melvin J. Scolnick

[57] ABSTRACT

A digitally implemented central dictation system wherein users designated as dictators may input Voice Files for later retrieval and transcription by a second group of users designated as transcriptionists. A system Supervisor has the capability to monitor operation of the system and allocate system resources. The system further includes an optional Voice Mail capability.

20 Claims, 58 Drawing Sheets

FIG. 3

| | | | |
|---|---|---|---|
| 1 | 1 | PERFORMANCE MONITORING | 3-1 |
| 2 | 1 | HEADINGS | 3-2 |
| 3 | 2 | | |
| 4 | 1 | | |
| 5 | 2 | DATA | 3-3 |
| 6 | 3 | | |
| 7 | 4 | | |
| 8 | 5 | | |
| 9 | 6 | | |
| 10 | 7 | | |
| 11 | 8 | | |
| 12 | 9 | | |
| 13 | 10 | | |
| 14 | 11 | | |
| 15 | 12 | | |
| 16 | 13 | | |
| 17 | 14 | | |
| 18 | 15 | | |
| 19 | 16 | | |
| 20 | 17 | | |
| 21 | 1 | PROMPT | 3-4 |
| 22 | 1 | | |
| 23 | 2 | MENU | 3-5 |
| 24 | 3 | | |
| 25 | 1 | NOTIFICATION | 3-6 |

DATA FLOW DIAGRAMS:

PROCEDURE

PROCESS

PROCESS WITH MULTIPLE ACTIVATIONS

DATA TERMINATOR

TELEPHONE-LIKE TERMINAL

DATA STORE

DATA BASE ACCESS ROUTINES

READ ACCESS

WRITE ACCESS OR READ FOR UPDATE

READ ACCESS AND WRITE ACCESS

- - - - - - - - - - - - - - - - - →

CONTROL FLOW FOR TRANSACTION CENTERS

INTERSESSION COMMUNICATION:

PRODUCER			CONSUMER
PROCESS				PROCESS

ASYNCHRONOUS COMMUNICATION — NO RESPONSE EXPECTED

PRODUCER			CONSUMER
PROCESS				PROCESS

SYNCHRONOUS COMMUNICATION — RESPONSE EXPECTED

COMMUNICATION INTERFACE

DIGITAL DICTATION SYSTEM

This application is a continuation of application Ser. No. 07/726,147, filed Jun. 28, 1991, which is a continuation of application Ser. No. 013,304, filed Feb. 10, 1987.

BACKGROUND OF THE INVENTION

The subject invention relates to a system for storage and retrieval of Voice Files. More particularly, it relates to a system having a class of users which includes dictators and transcriptionists, and wherein system resource allocation, including transcription capability, is controlled by a Supervisor.

Storage and retrieval of voice messages is well known. "Desktop" analog dictation units have been marketed by the Dictaphone Corp. of Rye, N.Y. for more than half a century. More recently, larger, "central" dictation systems for use by groups of dictators have been available. Such "central" systems typically include a plurality of telephone-like input/output stations for use by dictators, a central, analog storage medium for storage and retrieval of voice messages, a plurality of transcription stations for use by transcriptionists who are more or less permanently assigned to the system, and a Supervisor's station through which a Supervisor may monitor and, to some extent, control the operation of the system. However, because the storage medium in such system is analog, the flexibility of control in such flexibility in controlling the priorities for transcription of the voice messages, and in assigning voice messages to selected transcriptionists.

One such "central" dictation system presently available is the Nucleus system marketed by the Dictaphone Corporation. ("Nucleus" is a registered trademark of the Dictaphone Corporation.)

Digital storage and retrieval of voice messages, or of almost any analog signal, is also well known. Typically such systems have been used for Voice Mail applications as is taught in U.S. Pat. No. 4,371,752 for: Electronic Audio Communication System to: Matthews et al. issued: Feb. 1, 1983. In such systems voice messages are input by a user for later retrieval and output to other users identified on an associated address list. When such other users access the system, messages addressed to them may be retrieved and output.

Other systems for digital storage and retrieval of voice messages have also been developed and marketed. These systems are intended for the original equipment manufacture (OEM) market and provide the basic digital voice storage and retrieval functionalities, such as: analog to digital conversion, speech compression, storage and retrieval of voice message files, digital to analog conversion, and control of voice ports. Typical of such commercially available OEM digital voice storage and retrieval systems is the DSC 2000 "Voiceserver" marketed by the Digital Sound Corp. of Santa Barbara, Calif. (DSC 2000 and Voiceserver are trademarks of the Digital Sound Corporation.) This system, shown in FIG. 1, together with the operating system and voice message file handling software, also provided by DSC, provides capabilities for multi-channel, real time storage, retrieval and playback of voice messages. The DSC 2000 is intended for use by OEM suppliers in developing their own specialized systems, and has been used by DSC to develop a Voice Mail application.

Accordingly, it is an object of the subject invention to provide a system for digital storage and retrieval of Voice Files.

It is still another object of the subject invention to provide a system combining central dictation capabilities and Voice Mail capabilities.

It is another object of the subject invention to create a new dimension of Voice Mail capability which will allow the originator of a Voice Mail Message to follow up or confirm the message with hardcopy text.

It is another object of the subject invention to create a further new Voice Mail capability which will allow the recipient of a Voice Mail Message to redistribute the message to selected other recipients in hardcopy form.

It is still another object of the subject invention to provide a system for the digital storage and retrieval of Voice Files which has increased capabilities, and flexibility and ease of use in the creation, access, editing and retrieval of Voice Files.

It is a further object of the subject invention to provide a central dictation system which incorporates existing OEM digital voice storage and retrieval systems.

It is still a further object of the subject invention to provide a central dictation system with increased flexibility of control.

More particularly, it is an object of the subject invention to provide a central dictation system having improved ability to assign priorities to Dictation Jobs awaiting transcription and to allocate transcription resources in accordance with changing requirements.

Still more particularly, it is an object of the subject invention to provide a central dictation system which allows a Supervisor increased flexibility in assigning priorities for transcription of Dictation Jobs, and in assigning Dictation Jobs to particular selected transcriptionists.

BRIEF SUMMARY OF THE INVENTION

The above objects are achieved and the disadvantages of the prior art are overcome in accordance with the subject invention by means of a system for storage and retrieval of Voice Files which includes input/output devices, which are preferably telephone-like devices, for input and output of the Voice Files, and input device for input of log-on signals and control signals, and storage and retrieval apparatus for storing the input Voice Files and for retrieving the stored Voice Files for output. The signal input device is preferably a dual tone multifrequency (DTMF) device in the telephone-like input/output devices, but it is also within the contemplation of the subject invention to use other apparatus for signal input; including, but not limited to, voice recognition apparatus. The system of the subject invention also includes a microprocessor based controller for; responding to the log-on signals to designate users of the system as dictators or as transcriptionists, controlling the storage and retrieval apparatus to store at least some of the Voice Files input by the dictators as Dictation Jobs, assigning the Dictation Jobs to selected transcriptionists in accordance with a predetermined scheduling algorithm, and responding to the log-on signals and control signals input by the transcriptionists to output the Dictation Jobs to the selected transcriptionists in accordance with the algorithm.

In another embodiment of the subject invention the system includes a microprocessor based controller for; responding to the log-on signals to designate users of the system as dictators or as transcriptionists, responding to control signals input by the dictators to designate at least some of the Voice Files as Dictation Jobs or as Voice Mail Messages, associating an address list designating others of said dictators as addressees for each of the Voice Mail Messages, controlling the storage and retrieval apparatus to store the Dictation Jobs for later retrieval and output to a selected transcriptionist, and responding to control signals input by the addressees to control the storage and retrieval apparatus to output the associated Voice Mail Messages to the addressees.

In a preferred embodiment of the subject invention the system further includes a Supervisory station through which a system Supervisor may access the system to control the allocation of resources within the system.

BRIEF DESCRIPTION OF THE DRAWINGS

FIG. 3 is a schematic illustration of windows used on the CRT screen of the Supervisory station of the subject invention.

DETAILED DESCRIPTION OF PREFERRED EMBODIMENTS

Figure 1:
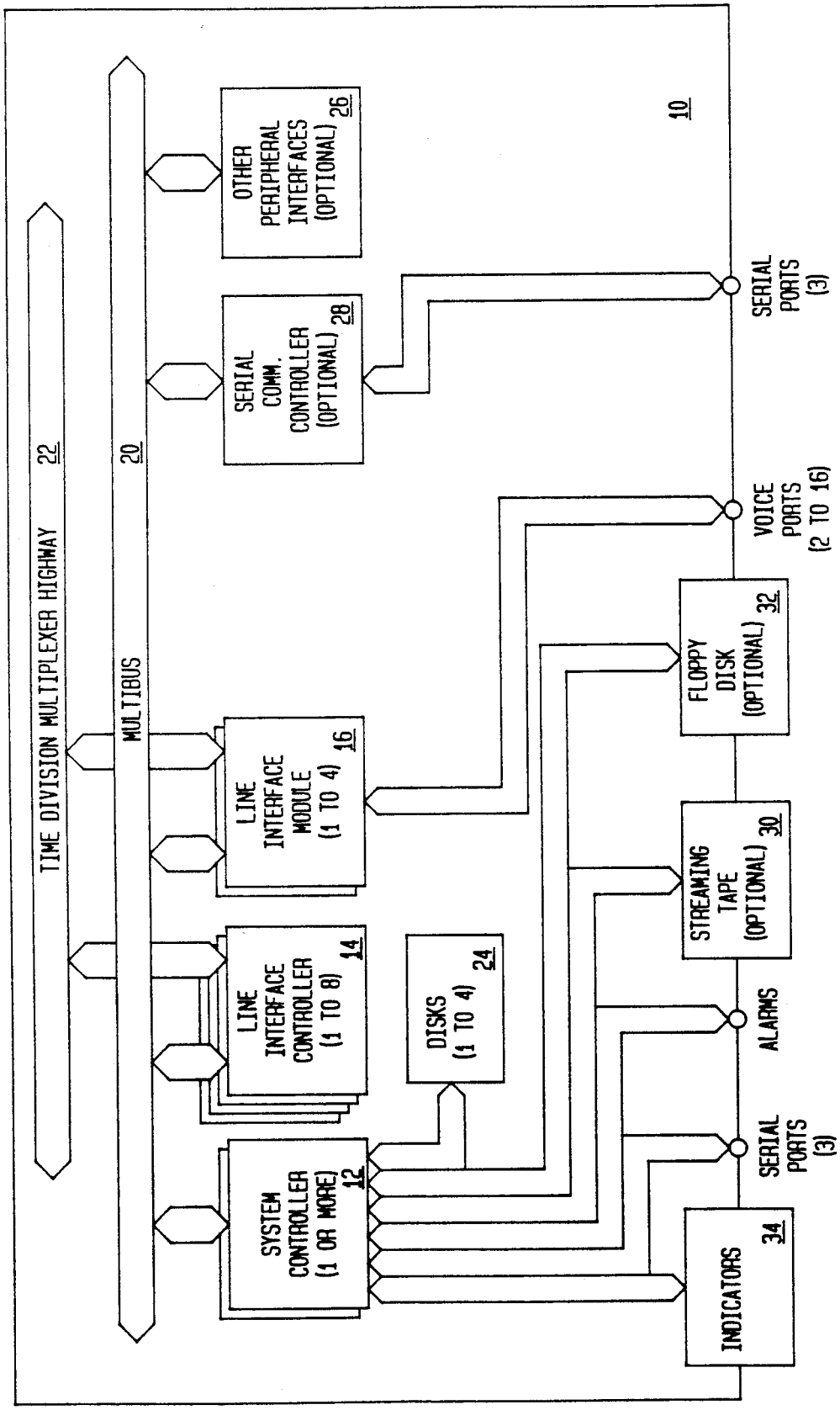
FIG. 1 is a schematic illustration of a known digital voice storage and retrieval system.

FIG. 1 shows a known, commercially available system 10 for digital storage and retrieval of Voice Files. In a preferred embodiment of the subject invention the system may comprise a DSC 2000 Voiceserver, as described above. System 10 includes a system controller 12, which is based on a 32 bit MC 68000 microprocessor including from 1 to 2 megabytes of RAM, 3 serial ports, interfaces for up to 4, 5¼ inch Winchester disc drives, indicators, and optional floppy disc and streaming tape drives. System controller 12 operates under real time enhanced UNIX System V and is capable of concurrent processing under UNIX. (MC 68000 is a trademark of the Motorola Corp. and UNIX is a trademark of ATT Corp.)

System 10 also includes from 1 to 8 line interface controllers 14 which compress incoming digitized voice signals, then reconstruct and playback digitized Voice Files. Controllers 14 also provide voice port management and data buffering. Line interface modules 14 interface external analog or digital voice signals to system 10 line interface controllers 14 through time division multiplex highway 22. Standard versions of line interface module 16 are available to interface with standard telephone lines and trunks. Each provides four voice ports.

System controller 12 interacts with line interface controllers 14 and line interface modules 16 through Multibus 20. (Multibus is a trademark of the Motorola Corporation and is the trade name for a well known parallel digital communications bus.) Multibus 20 also connects system controller 12 with other peripheral interfaces 26 and serial communications controller 28, which may be used to provide connection to printer 116 and Supervisory station 110, (shown in FIG. 2), in a conventional manner.

System controller 12 is interfaced to from one to four Winchester discs which comprise Voice File Storage 24. Controller 12 is further interconnected to a streaming tape which comprises Archive device 30. Optional floppy disc 32 is provided for easier uploading of software. Conventional indicators 34, such as power on, etc., are also interfaced to system controller 12.

System 10 is provided with a basic voice operating system, running under UNIX, which controls system 10 to provide the primative functions necessary for any digital voice storage and retrieval system: interface to trunk lines (or trunk-like input and output lines) analog to digital (A/D) conversion, signal processing (e.g., speech compression), storage of digitized Voice Files, retrieval of stored Voice Files, and digital to analog (D/A) conversion for output. These primitive functions allow a user of system 10 to input Voice Files and digitally store and retrieve them. Additional functionalities are provided in accordance with the subject invention to provide additional capabilities relating to such features as: addressing of Voice Mail Messages, editing, control of access to various system features, assignment of priorities for output, and Supervisory control, by means of two concurrently executing software modules hereinafter referred to as the Voice Session (VS) and the Supervisory Session (SS).

Since the basic voice operating system is in turn based on the well known UNIX operating system, the Voice Session and Supervisor Session are preferably written in an UNIX compatible language such as "C".

Figure 2:
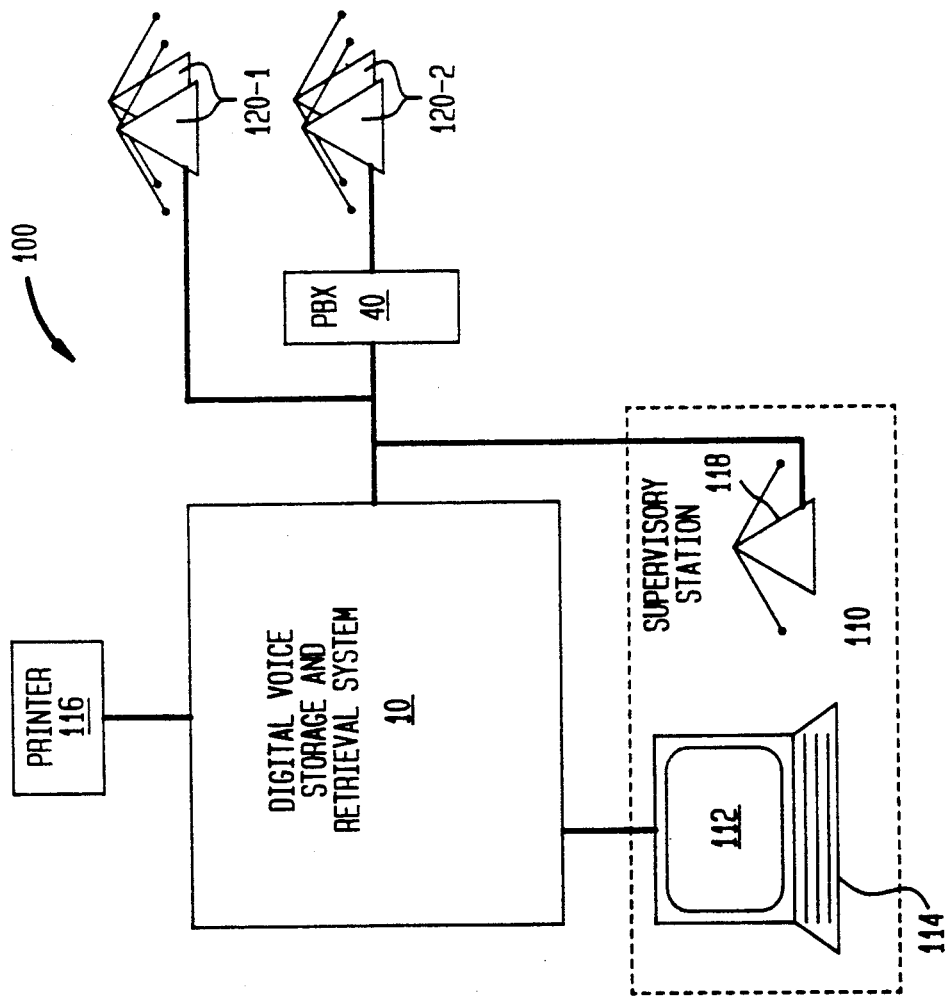
FIG. 2 is a schematic illustration of the digital dictation and Voice Mail system of the subject invention.

FIG. 2 shows a digital dictation system (DDS) 100 comprising system 10 connected to various input/output devices. The system Supervisor accesses DDS 100 through Supervisory station 110 which includes CRT 112 keyboard 114, and a telephone-like voice input/output device 118. Supervisor access is generally controlled by the SS. A conventional printer 116 is provided for generation of hardcopy reports.

System users access DDS 100 through telephone-like voice input out devices 120 which include conventional dual tone multi-frequency (DTMF) tone generators (not shown) for input of control signals. Devices 120 may include telephone-like devices 120-1 directly connected to dedicated ports of system 10 or conventional telephones 120-2 which access system 10 through a conventional PBX 40. As noted above voice signal inputs to system 10 may be either analog or digital.

Users access DDS 100 through the Voice Session, which recognizes two classes of users, dictators and transcriptionists. As will be more fully described below, dictators input Voice Files, classified as Dictation Jobs, (DJ's) which are then routed to transcriptionists for typing. Selected dictators also have the ability to input other Voice Files classified as Voice Mail Messages (VMM's) which may be retrieved by other dictators identified on an associated Address List. In a preferred embodiment a user may include a command when inputting a VMM which will cause the VMM also to be handled as a DJ.

Typically transcriptionists and the Supervisor will access DDS 100 through dedicated ports and for convenience will use devices 120 of the headset type.

Through Supervisory station 110, the system Supervisor provides control over the scheduling and routing of dictation for transcription; reporting and accounting functions; adding, modifying and deleting user's; and configuring and monitoring the system. DJ's and VMM's may be tracked using inquiries and hardcopy reports. Various selection, sorting and formatting alternatives may be used to tailor the inquiries and reports as needed. Cost allocation reports are available which provide chargeback information. Commands such as Prioritize, Finish, and Cancel may be used to alter the characteristics or progress of DJ's or VMM's. Editing functions can be used to correct data entry errors made by dictators in creating new dictation. A particularly important feature of the DDS allows the Supervisor to redefine scheduling rules to reflect current priorities and workloads.

The Supervisor may add users to the system and provide such users with various options, including the option of Voice Mail. These options may be modified by the Supervisor and users may be removed from the system. Inquiries and reports on users are available to Supervisor.

The Supervisor also has the capability to configure the system to meet local requirements. For example, voice ports may be configured to accept proprietary devices or PBX connections. The system parameters such as reserve voice capacity, cost factors, and alarm conditions may be set as needed. The Supervisor may also monitor the system performance of the DDS. Statistics including date and time, Voice File utilization, estimated turn around time, and other performance measures are available to the Supervisor.

Supervisor Session

These capabilities are provided to the Supervisor through the Supervisor Session software which implements various functions to provide the above described capabilities. These functions are classified into eight subgroups as follows:

1) Job Record Functions—Functions which allow the Supervisor to inquire for various job records, and edit and manipulate these job records.

2) Pool Functions—Pool functions provide the facilities to control job scheduling.

3) Report Processing Functions—Functions controlling reports on status and costing information.

4) Screen Processing Functions—Functions controlling screen generation at Supervisor station 110.

5) User Functions—Functions for defining each user (and the Supervisor) who has access to the DDS.

6) System Operations Functions—Functions for setting system parameters, configuring the system, and monitoring system status.

7) Miscellaneous Functions

8) Supervisory Voice Session Functions—Functions allowing the Supervisor to access a group of Voice Session functions.

When the Supervisor logs on a top level menu is presented. From this top level menu the Supervisor may select one of the sub-groups. Upon selection of a sub-group a menu displaying the functions available within that group will be displayed. (Note that preferably the Miscellaneous Functions are directly accessible from the top level menu.) In systems where Voice Mail is available, functions relating to this option will be added to the Job Record Functions, Report Processing, and the User Functions.

JOB RECORD FUNCTIONS

The Job Record Functions display and manipulate job record information. The Job Record Functions consist of:

Job Record Inquiry;
Job Record Edit; and,
Job Manipulation Functions.

Job Record Inquiry—enables the Supervisor to request display of the Job Records for DJ's or VMM's, or both. The Supervisor will have the ability to select job records for display in accordance with any attribute, or attributes, contained in the records, based on the equality or inequality of the attribute to a value, or the occurrence of the attribute within a range of values. (Note ranges are not applicable to alpha field types, e.g., dictator name).

The displayed Job Records will be displayed in accordance with sorting criteria based on a primary attribute and a secondary attribute and a sort order for each. For example, the Supervisor may request display of Job Records for department 10 having a typing length within a given range and sorted primarily by author identifier in ascending order and secondarily by subject identifier in descending order. Note that the Supervisor also specifies DJ's or VMM's or both, the default being the display of DJ Job Records. Also the Ready Job Pool Inquiry, which will be described below, is available both from Job Record Functions and Pool Functions.

Once a Job Record is displayed in response to a Job Record Inquiry all other Job Record functions are implemented by manipulation of the Job Records.

Job Record Edit—enables the Supervisor to modify selected attributes in Job Records which have been displayed in response to a Job Record Inquiry. The Supervisor may modify a single Job Record, or may use global editing commands to modify a group of Job Records. Only DJ's having a Ready, Signed-off or Finished status may be edited. (Jobs in a Ready status are ready for transcription, those in a Signed-off status have been transcribed, and those in a Finished status may be deleted from the system). VMM's can not be edited.

A Job Record Edit menu is available after a Job Record Inquiry has been invoked. The Supervisor will edit Job Records by specifying Editing Commands from the menu. These Editing Commands relate to a "marked record". When the Job Record Edit function is invoked by the Supervisor, the first record retrieved by the Job Record Inquiry function will be the "marked record". The "marked record" may be regarded as a line cursor or record cursor which can be moved about in an inquiry display. The Supervisor will have the ability to edit the single current "marked record", using a Modify Command described below. All single record modifications will affect only the "marked record" and to modify another record a new record must be marked. If the "marked record" incurs a data update in response to an event in the Voice Session, described below, while being edited the edit will not proceed and the Supervisor will be notified.

The Supervisor may also perform Job Record Edits on a group of records that are designated by the Job Record Inquiry. The group may be as small as a single record or as large as the entire group of Job Records retrieved by the inquiry. If a group edit is cancelled during a global edit command, the command will stop midway (i.e. records edited will stay edited and records not yet edited will not be edited). All global edit functions will result in a visual verification by automatic paging of the display through the Job Records retrieved by the Job Record Inquiry.

Database contention may occur while a global edit is being performed. In this event no two tasks will be allowed concurrent access to the same Job Record. If contention occurs between an update in response to an event in the Voice Session and the edit function, the update will have precedence. As updates occur some Job Records may no longer satisfy the Job Record Inquiry and will be removed from the display while others may be modified in response to Voice Session events to satisfy the Job Record Inquiry and be added to the display. If the "marked record" is updated so that it no longer satisfies the Job Record Inquiry, that record will be removed from the display if it is not currently being edited and the next record will become the "marked record". The Edit Commands available to the Supervisor include:

Mark Up—Moves the "marked record" to the previous Job Record.

Mark Down—Moves the "marked record" to the next Job Record.

Modify—Causes the DDS to display as a form the attributes of the "marked record" which may be edited. The Supervisor may modify as many attributes as desired. When the Supervisor enters a terminating key the Job Record will be updated and the original display will be restored with updated data.

Change All For Screen—Changes all occurrences of a specified value of a selected attribute to a specified new value for all records from and including the "marked record" to the last record displayed. The last record modified becomes the new "marked record", and all records will be updated on the display.

Change All For Inquiry—Changes all occurrences of a specified value of a selected attribute to a new value for all Job Records retrieved by the Job Record Inquiry. The last record modified will be the new "marked record".

Change Next—Changes the next occurence of a specified attribute value to a new value. The system will search for the specified value from the current "marked record" to the end of the Job Records retrieved by the Job Record Inquiry. The modified Job Record, if any, will be the new marked record.

Find Next—Finds the next occurrence of a specified value for a specified attribute. The command will search from the current "marked record" to the end of the Job Records retrieved by the Job Record Inquiry. The Job Record where a match is found, if any, becomes the new "marked record".

Repeat—Repeats the last global Edit Command used. (All commands except Modify).

Job Manipulation—allows the Supervisor to manipulate Voice Files through their associated Job Records.

The Job Manipulation functions include:

External Job Entry—Enables the Supervisor to enter and track a Job Record for a job recorded on an external media (e.g. cassette tapes). Once entered the Job Records for External Jobs may be edited as described above, except the job ID may not be Modified.

Sign-Off—DJ's are signed off by a transcriptionist after they have been transcribed. External Jobs are Signed-off by the Supervisor.

(Note that jobs which have been Signed-off are retained for other purposes such as review, but when Voice File capacity falls below a preset limit the oldest Signed-off DJ's will be Finished until sufficient capacity is restored. Preferably a log message will be printed for the Supervisor.)

Dictation Finish—DJ's are Finished when the Voice File is no longer needed. The Supervisor may indicate, by work type, that some DJ's are to be Finished automatically at Signed-off. Other DJ's will be Finished by the Supervisor when the Supervisor determines that the Voice File is no longer needed.

Job Cancel—A DJ which is ready or a VMM may be cancelled by the Supervisor.

Prioritization—The Supervisor may assign priority levels to a ready DJ. (Priority levels and their interaction with Pools will be described further below.)

Job Record Archive—Allows the Supervisor to change the status of Job Records with a Finished or Cancel status to an Archive status and move these jobs to an external medium. VMM's which have been discarded will also be Archived.

Special Assignment—Allows the Supervisor to access Pool functions to assign a particular DJ or DJ's to a particular transcriber by defining a Pool with appropriate characteristics and placing that Pool first in the particular transcriptionist's Pool Assignment List.

A Job Manipulation menu is available after a Job Record Inquiry has been invoked. A Job Manipulation function is performed by marking a selection from the menu. The job to be manipulated is the "marked record" and is selected using the same global search functions as described in the Job Record Edit functions. DJ's and VMM's, which are manipulated, will be displayed for verification by the Supervisor.

POOLS FUNCTIONS

The Supervisor controls the scheduling and assignment of DJ's through a mechanism referred to herein as Pools. When a dictator finishes dictating the Job Record for the Voice File containing the dictation is placed in a Ready Job Pool. DJ's are assigned to various Pools from the ready Job Pool in accordance with attributes specified by the Supervisor for each Pool. A DJ may be assigned to more than one Pool and the DJ remains in the Ready Job Pool until it is given Pending status in one of its assigned Pools by the Supervisor Session. There is a single job with Pending status for each Pool. When the Pending job in a given Pool is attached to a particular transcriptionist the Supervisor Session gives Pending status in that Pool to the next DJ in the Ready Job Pool which meets the specified attributes for that Pool. If more than one DJ meets the requirements, the DJ having the highest priority will be made the Pending job in that Pool. At a particular priority level, DJ's are assigned Pending status on a first-in first-out basis.

Transcriptionists are assigned to one or more Pools by the Supervisor. When a transcriptionist Signs-on the Supervisor Session checks the Pools to which the transcriptionists is assigned in assignment order, and attaches, through the Voice Session, the Pending DJ in the first non-empty Pool. When a transcriptionist Signs-off, i.e. completes transcribing a DJ, the Sign-on function will, in general, be invoked again automatically to attach the next DJ.

Note that since DJ's remain in the Ready Job Pool until given Pending status, if a Pool definition is changed by the Supervisor, all future assignments will be made in accordance with the new Pool definition.

Pending DJ's will remain Pending, though they may no longer fit the definition of their Pools.

The following Pool functions are available to the Supervisor:

Pool Definition—allows the Supervisor to specify criteria to be used to divide DJ's into categories for assignment for transcription. The Supervisor specifies criteria based on a single attribute of a job to define a Pool. The criteria may be based on the attribute being equal not equal to a selected value, or within a given range of values. Pool definitions may be added, modified or deleted.

The Pool Definition function is invoked from a Pool Inquiry by choosing Add, Modified, or Delete Commands. The Supervisor is then prompted for a Pool number. If Delete has been chosen, the Pool is eliminated. If Add was chosen, the Supervisor specifies a single attribute and relationship defining the Pool (e.g. Job length from 1 to 25 units). If Modify is chosen, the relationship on the selected attribute may be modified by the Supervisor (e.g. a range may be broadened or narrowed). To change the attribute for an existing Pool, the Pool must be deleted and then added.

Pool Inquiry—displays the Pool definitions. Note that Pool Inquiries do not effect Pool definitions, but that as described above, the Pool Definition functions are invoked from the Pool Inquiry.

Transcriber Assignment—allows the Supervisor to specify the Pools to which each transcriber is assigned. The current assignments are displayed and the Supervisor may update the assignments to reallocate resources to particular Pools (i.e. particular classes of DJ's). Assignments may be modified using the Add, Modified, or Delete functions.

Job Pool Inquiry—Displays the Job Records Ready for all DJ's in the Ready Job Pool. The displayed Job Records may be edited, prioritized, cancelled, or specially assigned as described above.

REPORT PROCESSING FUNCTIONS

The Report Processing functions allow the Supervisor to define the contents of a report, store the definition, and recall the definition for report generation. Definitions will include such information as: attributes to display, records to include, ordering of attributes, and sorting criteria to be used.

The Report Processing functions available to Supervisor are:

Report Index—Displays a listing of all currently stored reports and provides the Supervisor with access to the Report Definition and Report Generation functions.

Report Definition—Provides the Supervisor with the ability to define the information contained in a report. A Report Definition must exist before a report can be generated. The Report Definition function will include four commands. The Create command allows the Supervisor to define a new report and add it to the Report Index. The Save command—allows the Supervisor to store a Created or Modified Report Definition for later retrieval. The Delete command—allows the Supervisor to delete a previously stored Report Definition. The Modify command—allows the Supervisor to change an existing Report Definition. A Modified Report Definition must be Saved, or the previous, unmodified Report Definition will still be stored.

A report may be one of three types: a Job Record report, which reports the job records meeting the selected criteria; a user Profile Report, in which reports the user's meeting the selected criteria; and a Cost Allocation report, which reports the Job Records together with their allocated costs for the Job Records meeting the selected criteria.

Report Generation—produces and prints a report in accordance with a Report Definition selected by the Supervisor. An intermediate representation of the selected Report Definition will be created and that intermediate representation will be interpreted to produce the desired report. Note that reports are generated and printed in background, and that if archive records are to be included in a report, the Supervisor will be prompted for the appropriate archive information.

During Report Generation the Supervisor will be provided with three report control commands. The Start command activates the printer. Unless a Start command is issued no reports will be printed even though the printer may be physically enabled. The Stop command halts report printing; reports generated but not printed wait in a spool queue until a new Start command is issued. The Kill command deletes the report currently printing and the next report in the spool queue will start printing.

Cost Allocation—Cost Allocation functions are invoked by specifying a Cost Allocation Report Definition. Two types of Cost Allocation may be specified in a Cost Allocation Report Definition; PostDefined Cost and Unit Costing. Post-defined Cost Allocation allows the Supervisor to distribute a cost among DJ's occurring in a specific time period. The cost will be distributed over the DJ's in accordance with weighting factors for job length, priority, and work type. The DJ's over which the cost will be distributed and sub-totalling will be performed, will be selected in accordance with the Report Definition. Unit Cost Allocation is based on a defined unit cost specified by the Supervisor. For example, one unit of transcribed dictation might cost $0.5. The number of units for a DJ will be adjusted based on weighting factors for job length, priority and work type. The cost of a DJ will be the product of the adjusted number of units and the unit cost. For VMM, the unit cost will be defined per message. Job Record selection and subtotalling for the Cost Allocation Report will be performed according to the Report Definition. Note that unit costs will have their greatest applicability when the DDS is operated as a profit center.

SCREEN PROCESSING FUNCTIONS

The Screen Processing functions provide a standardized and flexible method by which displays for CRT 112 can be defined and generated. The Screen Processing Functions available to the Supervisor are:

Screen Definition—the screen of CRT 112 is preferably divided into six windows as shown in FIG. 3. The Screen Definition functions define the information which will be displayed in each window as described below.

Performance Monitoring window 3-1 displays performance monitoring information. Any attribute (e.g. percent of disc space available) of the Performance Monitoring function, described below, may be displayed in window 3-1 with selected text and in specified locations.

The Headings will display text headings for Data window 3—3. Headings are provided for three types of Data; column, form and matrix. Column headings are provided for each of a predefined number of columns;

form headings consist of two lines of specified text describing data window 3—3; and matrix headings are similar to column headings except that the left hand column is reserved for row headings.

Data for each screen will be displayed in Data window 3—3. As noted, data may be displayed in column, form, or matrix format. All data will be updated in real time. Note that data window 3—3 may only display a single record type. For example, data window 3—3 may contain Job Records or User Profile Records, but not both.

The Supervisor will have the capability to expand data window 3—3 to encompass records which exceed its width.

Prompt window 3-4 displays visual prompts, a command line, and menu and function key selection echos.

Menu window 3-5 displays menu selections, programmable key selections, and help information. The menu defines the functions currently available to the Supervisor and the corresponding key on keyboard 114 to invoke those functions. Programmable Function Key Selections are similar to menu selections except that the associated keys invoke a user defined programmable function. Help information is a brief description of a function selected by the Supervisor.

Notification window 3-6 will display notifications concerning system status, alarms, alerts, and errors.

(Note that the DDS of the subject invention may be implemented without allowing the Supervisor access to the Screen Definition functions. In such an embodiment the DDS will appear to the Supervisor to have fixed screen definitions.)

Screen Interpreter—interprets a Screen Definition and formats and displays all data values in the Screen Definition to produce the defined screen transparently to the Supervisor. As noted, the Screen Interpreter will also update all data values in real time. The Screen Interpreter will also provide the capabilities for moving from item to item and page to page as described above with respect to various types of inquiries.

USER FUNCTIONS

The User functions allow the Supervisor to add, delete, and edit User Profiles for users of the DDS. User Profiles define attributes for each user of the DDS, which profiles are used for various purposes such as determining data that is to be placed in Job Records, scheduling of DJ's and determining access rights to jobs. When the Supervisor selects the User Profile Inquiry the Add, Delete, Display, and Edit commands are available. In response to the Add command a data entry form with all User Profile attributes is displayed. In response to a Delete command, the Supervisor is prompted for a user ID; confirmation is requested of the entered ID; and the identified User Profile is deleted. The Display command provides an expanded display of a User Profile for a specified user. The edit commands are the same as described above for Job Record Edit.

User Profile Inquiry—Allows the Supervisor to display and manipulate the User Profile of one or more users of the DDS. User Profiles will be selected based on specified attributes in the manner described above in respect to Job Record Inquiry.

SYSTEM OPERATIONS FUNCTIONS

System Operations functions are outside the Supervisor's normal operating environment. Most define parameters which are used by the Supervisor Session or by the Voice Session. The System Operations functions are:

Installation Set Up—The Installation Set Up functions control the initial configuration of the DDS by vendor personnel in conjunction with the customer at the time of installation. A redundancy command may be specified causing the system to copy Voice Files to a back-up disc after recording of the original Voice File is completed. Database and other initializations are performed and system parameters are defined using the Installation Set Up features. Preferably the Initialization Set Up functions are removed from the DDS after completion of installation.

System Activity—the System Activity functions consist of System Activity Display and Forced Disconnect. The System Activity Display displays a record for each port in the DDS. If a user has Logged-on to a port, the record will include information identifying the user. If the Supervisor learns of an inactive port the Forced Disconnect function will allow the Supervisor to disconnect that port. The Forced Disconnect function will cause the Voice Session to perform a Hang-up function as described further below. The Supervisor may learn of an inactive port either through the System Activity Display showing an off-hook port without a user, or through the Monitor function, described further below.

System Set Ups—The System Set-ups functions allow the Supervisor to define and/or access various system parameters. These parameters are:

Date and Time

Audit Trail—When set a log of critical system events is printed.

Backlog—the total number of lines in the DDS awaiting transcription.

Center Transcription Rate—the current rate at which the DDS is transcribing DJ's.

Log-on Timeout—the time allowed a user to complete Log-on.

Log-on Attempts —the number of attempts allowed a user to complete Log-on.

Alarms—levels which, if exceeded may degrade performance. For example, the Supervisor may define a level of Voice File storage which, if exceeded, will trigger an alarm.

Auto Finish—defines a class of DJ in terms of work type which is automatically Finished on Sign-off.

Weighting Factors—factors used in determining Cost Allocation.

Unit Cost—unit cost for Cost Allocation.

Keyboard Lock Password—password to allow access when keyboard 112 is locked.

Skip Increment—see Voice Session commands.

Voice Capacity Safety Margin—a percentage level of Voice File capacity above which the Supervisor Session will control the Voice Session to delete old Voice Files. Voice Files are deleted in the following order: VMM's, which exceed the Voice Mail Retention Period, Signed-off DJ's, all other VMM's, and Ready DJ's. Within each category Voice Files are deleted in first-in, first-out order.

Voice Mail Retention Period—see above.

Variable Length Information Items—the maximum length allowed for various data items such as user identifier, work type, etc.

Voice Port Configuration and Allocation —specifies the minimum number of ports reserved for transcriptionists and the Supervisor, the connection for each port (i.e. PBX, hardwired, or none), and, for each port, whether the port should be disconnected after it exceeds the Inactivity Timeout.

Inactivity Timeout—see above.

Acessible Work Types—specifies work types through the Review Dictation function (see Voice Session).

Performance Monitoring—enables the Supervisor to display and monitor system performance information in real Performance Status—displays system performance attributes in Performance Monitoring window 7-1 (see Screen Definition above). These attributes include the percentage of available Voice File storage capacity used, total backlog, etc.

Performance Inquiry—allows the Supervisor to display detailed performance information. Alarm Notification functions cause a notification to be displayed in Notification window 3-6 (see Screen Definition above).

Function Key—enables sequences of commands to be executed by a single keystroke. Current definitions of Programmable Function Keys will be displayed on the menu (see Screen Definition above).

Working Hours Clock—captures turnaround time for DJ's in both clock time and working hours. Working hours are defined to be time during which the Supervisor is Logged-on to Supervisory station 110.

MISCELLANEOUS FUNCTIONS

Flash Report—prints an exact copy of CRT 114. The Flash Report will be printed in background.

Cancel—cancels some executing activities of the Supervisor Session. Effects of the Cancel function depend upon the current context. If a command has not been completely entered and the Cancelled function is invoked the current input is erased and the context remains the same. If an Add Modify, or Single Record Edit is cancelled before execution has started changes are erased from CRT 114 and no data is changed. If a command has completed and no new command has started, the Cancel function returns the system to the previous menu level. If a command which affects a single entity is executing when the Cancel function is invoked, the command will run to completion. If a command affecting multiple entities has not yet completed when the Cancel function is invoked, the command will be stopped when the current entity is completed. The effects of the executing command up until the time it stop will not be changed. No record will be partially affected by a command running when the Cancel function is invoked. Note that since report printing is done in background the Cancel function will have no effect and the Kill function must be used to stop a report from printing.

Help—provides a description of the commands available to the Supervisor in the current context. The help information is displayed in Menu window 3-5 (see Screen Definition above).

Keyboard Lock—allows the Supervisor to disable access to the DDS. When the Keyboard Lock function is invokved only the Supervisor's password is recognized by the DDS. Receipt of the Supervisor's password unlocks the keyboard (see System Set-up above). Note that the current screen will continue to be displayed, including real time updates, while the Keyboard Lock function is invoked.

SUPERVISOR VOICE SESSION FUNCTIONS

The Supervisor Voice Session Functions are Voice Session functions which are available only to the Supervisor. These functions are mentioned here for completeness; for full details see the description of the Voice Session below. The Supervisor Voice Session Functions are:

Emulate—Enables the Supervisor to initiate a user session which imitates another user.

Intercom—Allows the Supervisor to communicate with any other Logged-on user or vice versa. No connection is made until the user responds.

Monitor—Enables the Supervisor to unobtrusively listen to voice activity on any port.

VOICE SESSION

Users interact with the DDS through the Voice Session using telephone-like devices having keypads and handsets. Users will be able to subscribe to one of two services; Dictation and Voice Mail. Users of the Dictation service are further grouped into two classes: dictators and transcriptionists. A user is identified by his ID as either a dictator or transcriptionist, and to have both capabilities the user must have two ID's. The Supervisor will have access to all Voice Session functions through the Emulate function described further below.

Each user will have access to a subset of Voice Session Functions. The brakedown of access by service and user class is described below in conjunction with description of particular functions.

During a Voice Session the users will be prompted. These prompts will take the form of prerecorded voice messages describing the actions necessary at that point.

Tones will also be heard at various times during a Voice Session. Tones will be played to announce prompts, indicate erroneous keystrokes, and as feedback or confirmation for some functions.

If a user is creating a Voice File and is at the point where he is able to insert voice into the file a Talk-down tone will sound continuously.

Dictators will have the ability during a Voice Session to create Voice Files using the Create function. The dictator can access these files at any time until the Voice File is deleted. While a dictator is accessing a Voice File through the Create function all Movement and Play commands are available. The dictator can also use all of the Edit commands. The Edit commands allow the dictator to add or delete voice from a Voice File. Dictators who are also subscribers to the Voice Mail service may use the Hardcopy command, as will be described further below. Transcriptionists Sign-on to a Voice File for the purpose of transcribing that file. Once a transcriptionist has Signed-on the transcriptionist may use any Movement and Play function except for the Review-last-insertion and Move-to-last-cut commands. Transcriptionists will not have the capability to edit a Voice File. Once a transcriptionist has signed-on to a Voice File he may issue a Sign-off or Quit command. The Quit command leaves the transcriptionist in the Command mode, and the Sign-off function automatically invokes a Sign-on function so that the transcriptionist may transcribe the next Voice File.

A user may also subscribe to the Voice Mail service which allows the user to create and send VMM's to up to ten other Voice Mail subscribers. When creating a VMM the user will have all Movement, Play and Edit commands available. Before recording the VMM the user will be prompted for the addresses of the intended recipients. The user may add addressees to the address list up until the time the VMM is sent. A null address list will cause the VMM to be placed in the user's basket. A user will also be able to specify himself as a addressee.

A Voice Mail user who is also a dictator will be able to enter the Hardcopy command for a VMM; causing the Voice File to be treated as a DJ as well as a VMM. By treating a Voice File as both a DJ and VMM, the dictator/user is provided with the unique capability to confirm or follow-up a VMM with a hardcopy text of the message. Such hardcopy text is highly advantageous in that it provides the originator and recipients with permanent copies of the message, reduces the possibilities of error inherent in verbal messages, and provides an alternate delivery channel to the recipient which does not require positive action on the recipient's part. Recipient users who are also dictators may also create hardcopy text of VMM's they receive. Thus, recipients may also initiate further distribution of VMM's with all of the attendant advantages described above.

Users receive VMM's through the Review function. When the Review function is invoked the user will hear the number of messages he has in his basket. Then a sequence of "headers", one for each message, will be played. Each header identifies who the associated message is from, when it was sent, and its ID number. While the header is playing the user has any Movement or Play function available. When the header plays to the end or otherwise reaches the end, e.g. via a movement function, the system will automatically go to the next header. The user can go to the next header at any time by issuing a Quit or Discard command. A quit command will save the VMM in his basket and the Discard will delete the VMM from the user's basket.

At any time while a header is playing, the user may issue the Listen command and the VMM will begin playing. The user will have all of the Movement and Play functions available.

The user can leave off listening to a VMM at any time by issuing a Quit or Discard command. The Voice Session will then resume review of the headers for VMM's in the user's basket. The Quit command will leave the VMM in the user's basket and the Discard command will remove the VMM from his basket.

The functions for the Voice Session are divided into four major groups:

Session Control—functions which allow the user to Log-on, Log-off, and select a service (i.e. Dictation or Voice Mail).

Voice File Access—functions allowing the user to access a Voice File, change it, listen to it, and close it.

Supervisor—functions accessible only to the Supervisor or for a user to contact the Supervisor.

General—functions accessible by all users.

A user controls the operation of functions by issuing commands. The operation of some functions will vary according to parameters established by the Supervisor. Some parameters will be system-wide, affecting all users; others will be user-specific. Establishment of system-wide parameters has been described above. User-specific parameters are established by the Supervisor when a User Profile is created as described above.

Figure 4:
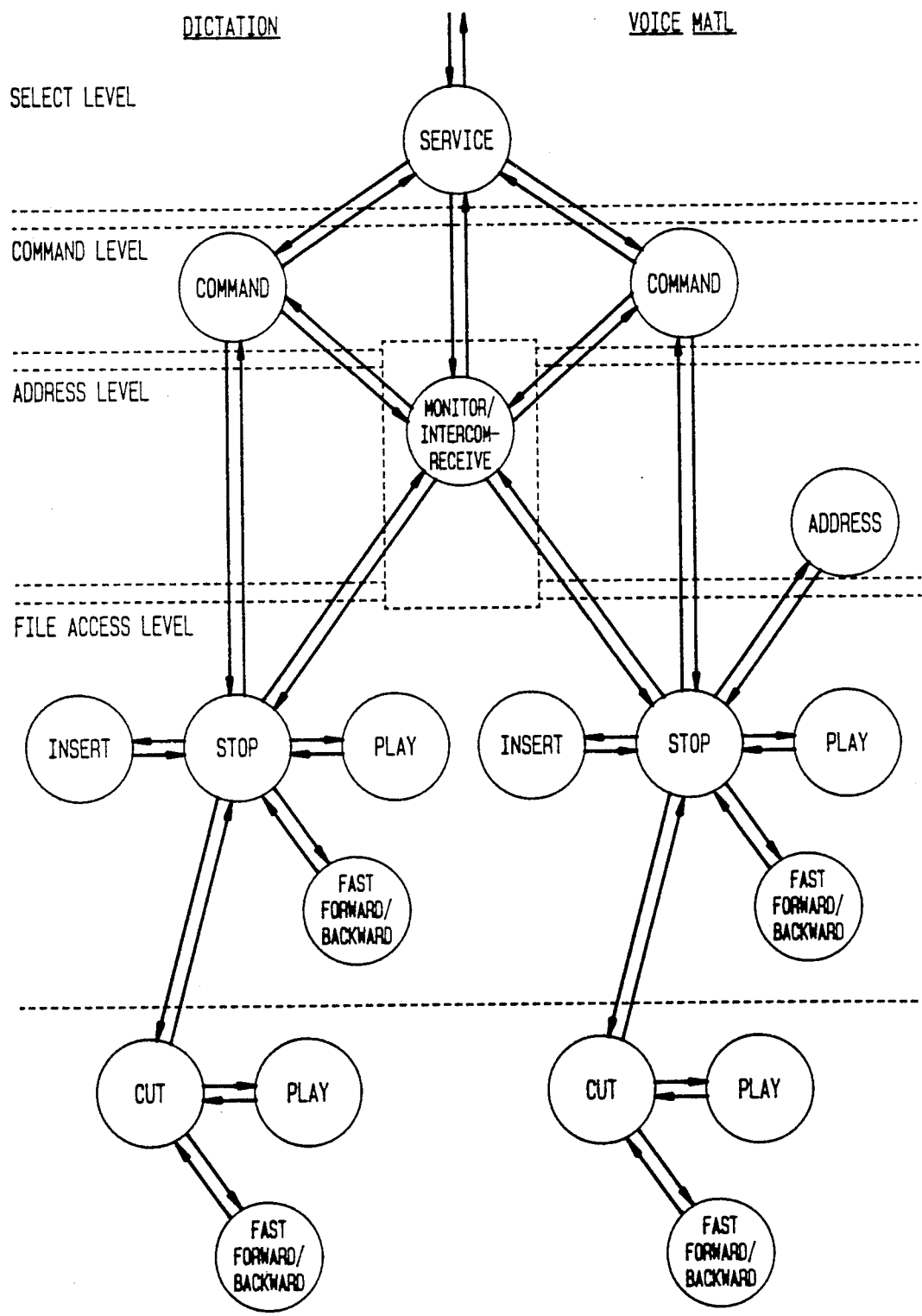
FIG. 4 is a state diagram of user modes for a Voice Session.

During a Voice Session the user will be in one of several modes. These modes are illustrated in FIG. 4. Closely related modes are grouped into levels. Each level has a homemode which is the mode originally entered when a new level is entered. It is also the mode to which a user returns as a result of the Cancel function. Note that the File Access level has a sublevel, whose homemode is Cut.

SESSION CONTROL FUNCTIONS

Log-on—allows a user to access the DDS. If a port is free a Voice Session will be initiated in response to the Log-on function. Once the user has access to a port he will be allowed a limited time and a limited number of attempts to enter the correct ID and password. The maximum time and number of attempts for a user to complete Log-on is a system-wide parameter set by the Supervisor, as described above. If the user fails to successfully Log-on within these limits he is disconnected from the DDS and the Supervisor is notified.

The first time a user Logs-on to the DDS he will be prompted to record his name and ID in his own voice. This Voice File may then be included in any headers attached to DJ's and VMM's created by that user. Users will also be prompted to establish their own password during their initial Voice Session.

After the initial Voice Session each time a user Logs-on he will be prompted to choose either Dictation or Voice Mail service. A default choice may be established for a user so that he will not need to enter a choice for each session, and users will be able to switch between the Dictation and Voice Mail services during the session. Of course, a user subscribing to only one service will automatically be connected to that service when he Logs-on.

Users who have the ability to create Voice Files will have an option of starting to dictate immediately upon selection of a service. The Supervisor will enable this option by setting an Auto-create parameter in the User Profile as described above. If the Auto-create option is not enabled the Voice Session will place the user in the Command mode when the Dictation command is issued.

When a transcriptionist completes Log-on the Sign-on function will automatically be invoked to Sign-on the transcriptionist to the next job to be transcribed in accordance with the pool algorithm described above.

After Log-on users who are subscribers to Voice Mail service will be prompted if they have any VMM's waiting. If the user has no VMM's waiting Log-on will continue as described above.

Log-off—disconnects the user from the DDS.

VOICE FILE ACCESS FUNCTIONS

The following functions provide for access to a Voice File:

Create—allows a user to create a new Voice File. This function may be invoked explicitly by the user; or may be invoked automatically when the user selects a service or completes creation of a previous Voice File, if the Auto-create parameter has been set in the User's Profile by the Supervisor. If the user has selected the Dictation service he will be able to create and complete more than one DJ without Logging-off. The User Profile will have initial default values for work type, subject, ID, and department number in their User Profiles. System-wide parameters established by the Supervisor will indicate whether DJ's require each of these items. User-specific parameters in the User profile indicate whether or not the dictator is to be prompted for each value. Default will cause the value for that item to be carried forward from the previous DJ, or for the first DJ in a session, the value in the User Profile will be selected. When a user has selected Voice Mail service he will be placed in the Address mode to create an address list for the VMM to be created.

Review—allows a user to hear a group of Voice Files. A user who has selected Dictation service may select a group of DJ's for review in accordance with one of the following attributes: Job ID (i.e. a specific job), Author ID, Subject ID, or Work type. All jobs that satisfy the specified criteria will be selected and Play will begin automatically. The user will have all movement and play functions available. The user may skip to the next Voice File by entering the Quit command.

If the user has selected Voice Mail service, the Review function will play the headers for the VMM's in the user's basket. The user will hear the number of VMM's in his basket; followed by the headers in first in - first out order. While a header is playing the user may invoke the Listen function to hear that message; he may invoke the Discard function to delete the header and corresponding message; or he may invoke the Quit function to skip to the next header. A user who is also a dictator may enter the Hardcopy command to send the Voice File for transcription as a DJ.

Sign-on—opens a DJ for transcription. The Sign-on function is invoked automatically for a transcriptionist at Log-on and Sign-off, unless the transcriptionist has the ability to self assign DJ's. While Signed-on to a DJ the transcriptionist has access to all Movement and Play functions but may not edit the DJ. If the Supervisor has assigned a specific DJ to the transcriptionist he will Sign-on to that DJ. If no specific job is assigned the transcriptionist will be assigned the Pending job from the first Pool in the transcriptionist's Pool list that has a Pending job.

Transcriptionists who have the ability to choose DJ's may select them in accordance with attributes in the manner described above with respect to the Review function. As each DJ is signed-off the next job satisfying the criterion will be automatically Signed-on. When the last self assigned job has been Signed-off the transcriptionist may transcribe from his regular Pool assignments or self assign another group of DJ's.

When a user who has accessed a Voice File through a Sign-on function is listening to the file a brief tone will be generated every six seconds during the last thirty seconds of play.

Listen—allows a user who has selected the Voice Mail service to hear a VMM. It may be entered from either the Command mode or from the Review function. All Movement and Play functions are available and Edit functions are not available during the Listen function.

The following functions allow a user to move around within a Voice File and to listen to it without changing the Voice File, once the file has been accessed. Each movement function is followed by an Auto-play function, unless the move is to the end of the file or the function is move-to-last-cut.

As described above, headers are Voice Files appended to, and containing information about other Voice Files. Headers are always played when a user accesses a VMM and are played when a transcriptionist Signs-on to a DJ, if the transcriptionist has a Play Header parameter turned on in his User Profile.

Move-to-beginning—moves the voice cursor (i.e. the point at which Play begins) to the beginning of the Voice File.

Move-to-end—moves the voice cursor to the end of the Voice File and puts the user in the Stop mode.

Move-half-forward and Move-half-backward—moves the voice cursor to the point half-way between the current location of the voice cursor and the end or beginning of the Voice File.

Review-last-insertion—moves the voice cursor to the beginning of the last segment inserted in the Voice File (i.e., the point at which the Insert command was last entered). Playback will continue to the end of the Voice File. The Move-to-last-cut function moves the voice cursor to the point at which the last Cut command was entered. There is no Auto-play following this function.

Move-to-cue—moves the voice cursor to the cue in the Voice File.

Fast-forward and Fast-backward—move the voice cursor forward or backward in the Voice File. When either of these functions is invoked a sequence of brief tones will be heard until a Stop command is issued. The voice cursor is then moved forward (or backward) ten seconds for each tone generated during the Fast-forward or Fast-backward function.

Play—plays back a Voice File. Play is continuous until a Stop command is issued or until the end of the file is reached, placing the user in the Stop mode.

Skip-forward and Skip-backward—move the voice cursor forward (or backward) by a set increment established as a system-wide parameter by the Supervisor. Skip-backward is automatically invoked when a user accessing a Voice File through the Sign-on function (i.e., a transcriptionist) enters a Stop command when playing a Voice File.

Compress-pauses and expand-pauses—decrease (increase) the percentage of a pause that is actually played. Each command will decrease (increase) the percentage of the recorded pause played by ten percent.

Slow-down and Speed-up—decrease (increase) the rate at which a Voice File is played back to a user. The rate will be decreased (increased) by ten percent of the original rate per command.

The following functions, which are available only during the creation of a Voice File, allow a user to edit the contents of a Voice File. A Voice File cannot be edited once it has been closed and these edit functions are not available to a transcriptionist. Editing functions always leave the user in the Stop mode and the user will hear a talk-down Insert—allows a user to add to a Voice File. Voice is recorded into the Voice File before the current position of the voice cursor. When the Stop command is issued the Insert function is ended and the user will be in the stop mode. The Review-last-insertion function can be used to listen to what was just inserted.

Cut—allows a user to remove a segment of voice from a Voice File. A user may mark the beginning of a segment to be cut by using the Cut command and then, using the Movement functions move forward or back from this mark. Issuing the Stop-cut command will mark that point and cut the segment between two marks.

Cut-to-end—cuts a segment from a Voice File between the current location of the voice cursor and the end of the file.

Cut-from-beginning—cuts a segment from a Voice File between the current location of the voice cursor and the beginning of the file.

Cue—places a non-audible cue in a Voice File. This allows a user to use the Move-to-cue command to locate the voice cursor at the cue position. Only one cue is allowed per Voice File. A second cue will automatically remove the first and the second cue will be placed in the Voice File. Editing of the Voice File will be allowed only past the cue. Any Edit function affecting the contents of the Voice File before the cue will automatically remove the cue from the file.

Delete-cue—removes the cue from a Voice File.

The following functions relate to editing an address list for VMM's. Here an address list is a list of the user ID's for each intended recipient. When Creating a VMM the user is initially placed in the Address mode and the following functions are available. Movement and Play functions are not available in the Address mode. The user may leave the address mode by issuing a Stop command, placing the user in the Stop mode at the File Access level.

Address—will return a user to the Address mode. The user will hear the current address list. When the end of the list is reached, the user will be prompted to issue an Add-to-list, Erase, Hardcopy, Address, or Stop command. The Address command will play the list again. The Stop command will place the user in the stop mode at the File Access level as described above.

Add-to-list—allows the user to add new ID's to the address list. Up to ten ID's may be included in the list.

Hardcopy—allows a Voice Mail user, who is also a dictator, to request a typed copy of a VMM. The Hardcopy command will cause the VMM to be treated as a DJ. The user may issue the Hardcopy command from the Address mode while Creating, and he may also issue it from the Stop mode while Reviewing or Listening to a VMM.

Erase—erases the address list associated with a VMM, including any Hardcopy function.

The following functions relate to termination of Voice File access.

Complete—closes a DJ and the status of the job is changed to ready and the DJ is placed in the Ready Job Pool for transcription.

Send—closes a VMM and its status is changed to Sent and it is routed to the addressees.

Sign-off—closes a Voice File to which a transcriptionist has Signed-on. The status of the file will become Sign-off and, generally, the Sign-on function will be automatically invoked.

Quit—closes a Voice File that has been accessed using the Listen, Sign-on, or Review functions. The Quit function leaves the user in the Command mode if the user Quits from Sign-on or Listen. If the Sign-on function was used the status of the Voice File is changed to Ready, even it was Pending when accessed. If the user enters the Quit command while Reviewing he skips to the next DJ or header. In the case of Voice Mail the Quit command leaves the VMM in the user's basket for future review.

Discard—removes a Voice File from the system. A user who is Creating a new DJ or VMM may Discard it and start over. The Discard function will leave the user in the Command mode. A user who is Reviewing the VMM's in his basket or Listening to a VMM may discard the VMM.

SUPERVISOR FUNCTIONS

The following functions relate to functions which are available to the Supervisor through the Voice Session.

Emulate—allows the Supervisor the imitate a specific user. The Supervisor enters an Emulate command and proceeds to enter further commands as if a particular user. To end Emulation the Supervisor Logs-off and is returned to the Supervisor Session.

Intercom—allows communication between any user and the Supervisor. Either party may initiate Intercom. Once connection is made the parties may talk or the initiator may play a Voice File for both parties. The Supervisor contacts a particular user by entering that user's ID. Users can only contact the Supervisor. The receiver must enter an Intercom-receive command before the communication link is completed. The link is broken either by Hang-up or by the Supervisor entering a Break command.

Monitor—allows the Supervisor to listen to the signal on a particular port. The Supervisor ends the Monitor function with the Break command.

Force Disconnect—allows the Supervisor to disconnect a user at any time. The Hang-up function for that user will be automatically invoked, as described further below.

GENERAL FUNCTIONS

The following functions can be invoked from any mode and are available to all users.

Cancel—terminates an executing function. The Cancel function restores the system to the state it was in before the Cancelled function was invoked and returns the user to the home made for that level.

Help—provides a prompt to the user which tells what mode the user is in and what commands are valid at that point.

Hang-up—ends a Voice Session. The effects of Hang-up depend on what the user was doing; basically an open Voice File will be closed and the user will be disconnected from the DDS.

If a user Hangs-up while Inserting voice into a Voice File the new segment will become part of the file. Any other function currently executing will be cancelled. One of two actions will then occur, depending upon the value of the Create Hang-up Option parameter in the User's Profile. Either the DJ will be completed and its status will become ready, or it will be Discarded. VMM's will either be sent to the addressees or will be Discarded. This also applies if the user Hangs-up while accessing the address list. The user will then be disconnected from the DDS.

If a user Hangs-up while listening to a file the Play function will be cancelled, the file will be closed and the user will be disconnected from the DDS. If a transcriptionist is Signed-on to a Voice File and Hangs-up the executing Play function will be cancelled, the file will be closed by the Quit function, and the job will be returned to the Ready status. The transcriptionist will be then disconnected from the DDS.

If a user Hangs-up while Reviewing VMM's the VMM currently being reviewed will remain in his basket. The user will be disconnected from the DDS. If either party hangs up while intercoming the connection is broken and a user who Hangs-up will be disconnected from the DDS.

If the Supervisor Hangs-up while Monitoring the connection to the port is broken and the Supervisor is disconnected from the DDS. If the user who is being Monitored Hangs-up the connection will be broken and the Supervisor will be able to continue with his session.

If the Supervisor Hangs-up while Emulating another user the Voice Session will be ended as if the Emulated user had Hung-up.

If a user Hangs-up before completing the Initial session the session will be erased and the next time that user Logs-on he will again be prompted for an Initial session.

SOFTWARE ARCHITECTURE

The subject invention is implemented on system 10 through software as will be described in detail below. The software architecture is described in terms of a hierarchical model comprising software modules and the data flows between modules. Modules are decomposed into submodules, which may in turn be further decomposed. Data flows may be described in terms of component data flows, which also may be further broken down into subcomponents. Transfer of control between modules is not shown explicitly except where necessary for the model to make sense.

The lowest level of submodules (i.e. modules which are not further decomposed) are described in detail in the MODULE SPECIFICATIONS for the Supervisor Session and MODULE SPECIFICATIONS for the Voice Session Sections set forth below. The MODULE SPECIFICATIONS provide descriptions of each lowest level submodule in sufficient detail that these modules may be readily implemented by a programmer of ordinary skill, and implicitly define the transfer of control and sequence of the system software.

Conventions used in the following descriptions and related drawings 5-88 are described in detail in Appendix A.

Conventions used in the MODULE SPECIFICATIONS are described in Appendix B.

Formal definitions of all data flows are given in the Supervisor Session Data Dictionary, Voice Session Data Dictionary (together comprising the System Data Dictionary) and, the Communications Interface Data Dictionary. (Note that the Supervisor Session module S0) and Voice Session module V0 are the highest level modules in the system and the Communications Interface Data Dictionary defines the data flows between these modules.

Figure 5:
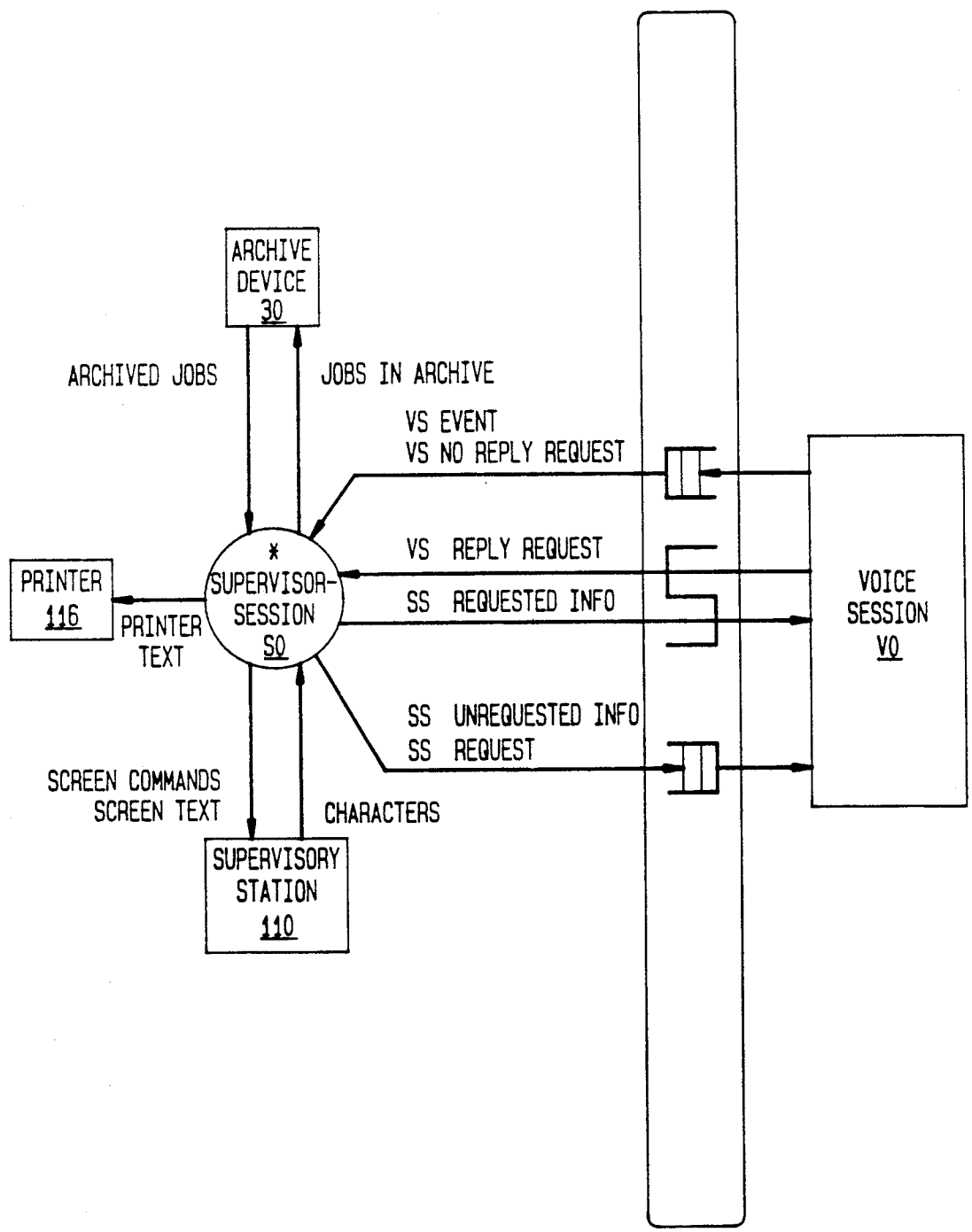
FIGS. 5-28 show a hierarchical model, including software modules and data flows, of the Supervisor Session software architecture.

As described above the software for the system of the subject invention comprises two primary software programs or systems referred to herein as the Supervisor Session (SS) and the Voice Session (VS). In FIG. 5 module S0 represents the Supervisor Session. SupervisorSession S0 performs all the non-real time functions, including data management and Supervisory functions.

Supervisory Station 110 outputs Characters to SupervisorSession module S0 and inputs Screen Commands and Screen Text from SupervisorSession S0. Printer 116 inputs Printer Text from SupervisorSession S0. Archive Device 80 outputs Archived Jobs and inputs Jobs To Archive. Inputs from the Voice Session are VS Event, VS No Reply Request, and VS Reply Request. Outputs from SupervisorSession S0 are SS Requested Info, SS Unrequested Info, and SS Request.

Figure 6:
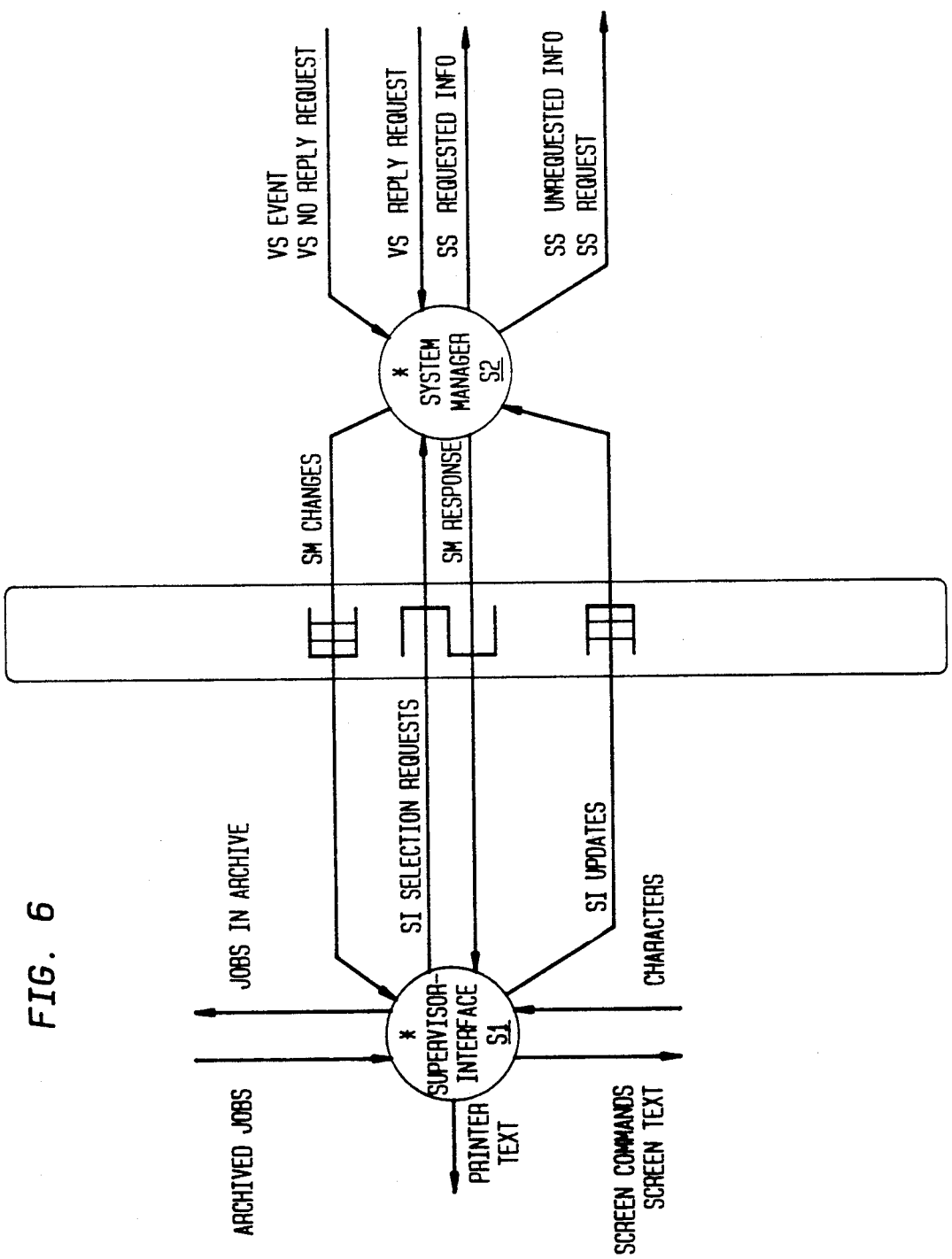

FIG. 6 shows SupervisorSession module S0 decomposed into SupervisorInterface module S1 and systemManager module S2. Module S1 handles inputs and outputs to Supervisory Station 110, including Printer 116 and Archive Device 30, while module S2 handles inputs and outputs to the Voice Session. More specifically, SupervisorInterface S1 manages the input/output interaction between the Supervisor and the system of the subject invention; including inquiries, reporting, and setting of system parameters. SystemManager module S2 manages databases and performs data management functions necessary for the Voice Session, and fulfills SupervisorSession S0 requests for databases reads and updates.

Inputs to SupervisorInterface module S1 from system-Manager S2 are SM Changes and SM Reponse. Inputs to system-Manager S2 from SupervisorInterface S1 are SI Selection Request and SI Updates.

Figure 7:
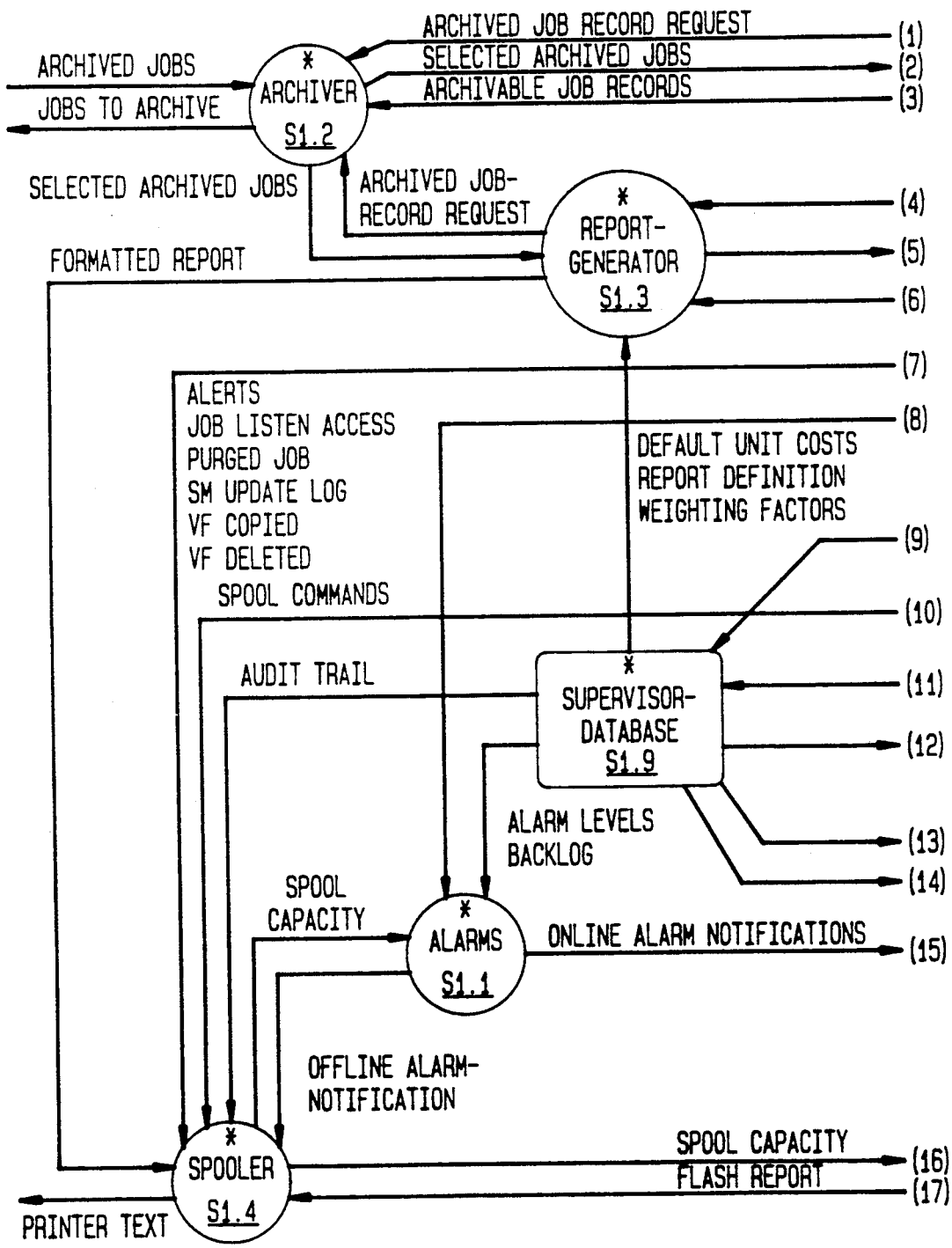
Figure 8:
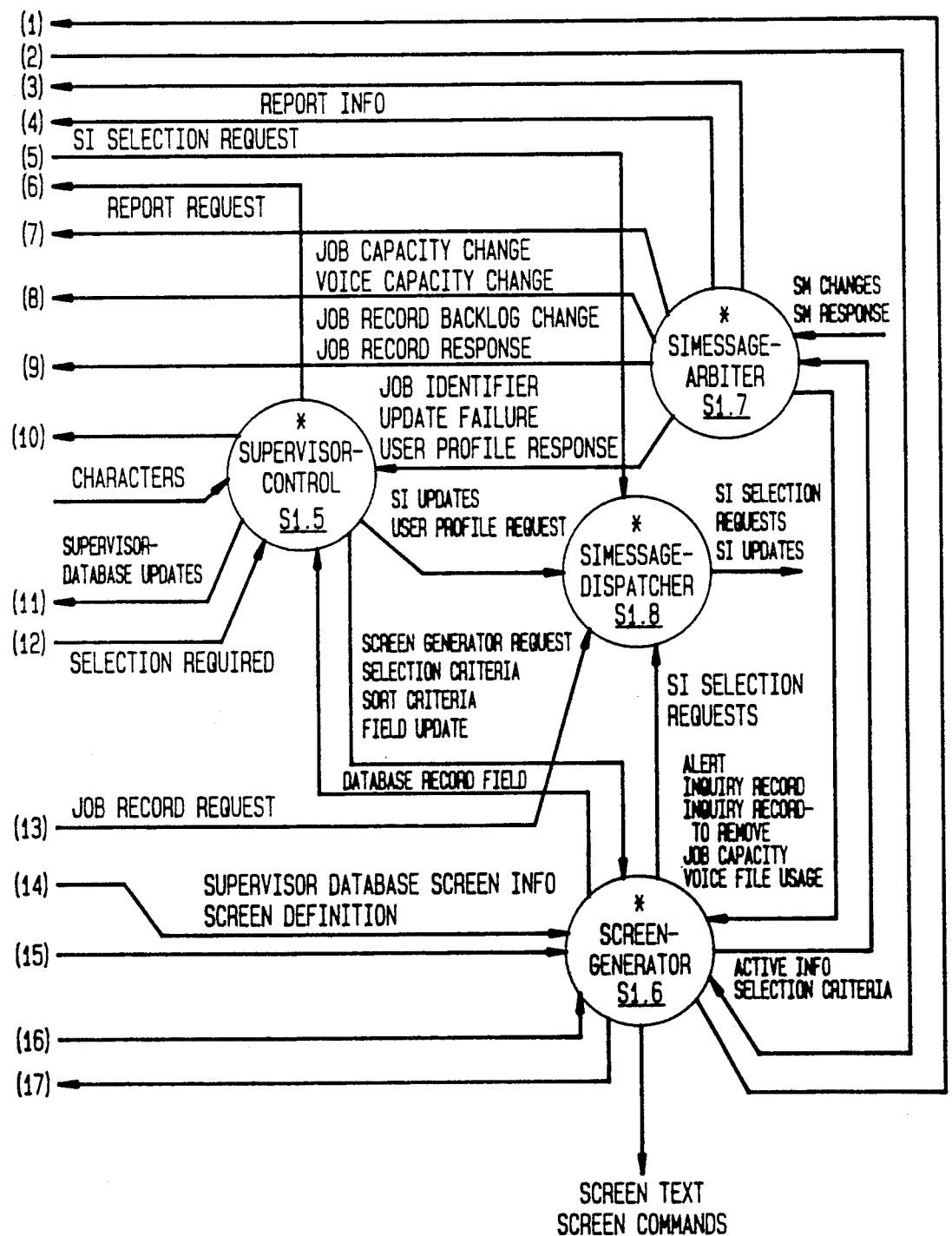

FIGS. 7 and 8 show a further decomposition of module S1 into alarms module S1.1, archiver module S1.2, report-GeneratorModule S1.3, spooler module S1.4, SupervisorControl module S1.5, screenGenerator module S1.6, siMessageArbiter module S1.7 siMessageDispatcher module S1.8 and Supervisor- Data-Base S1.9. Alarms module S1.1 tests conditions against allowable limits set by the Supervisor and when these conditions are met generates an appropriate message for each condition met and notifies the appropriate processes. Module 1.1 is described in MODULE SPECIFICATIONS set forth below.

Inputs to alarms module S1.1 are: Spool Capacity, Job Capacity Change, Voice Capacity Change, and Alarm Levels Backlog. Outputs from alarms module S1.1 are Offline Alarm Notification and Online Alarm Notification.

Archiver module S1.2 handles input and output to Archive Device 30. Other inputs to module S1.2 are Archived Job Record Request, Archivable Job Records, and Archived Job Record Request. Other outputs from module S1.2 are Selected Archived Jobs, which is output to reportGenerator module S1.3 and siMessageArbiter module S1.7.

ReportGenerator module S1.3 uses information defining reports to retrieve appropriate records from databases according to the report type and format a report to be printed.

Inputs to reportGenerator module S1.3 are: Selected Archived Jobs, Report Info, and Report Request. Outputs from module S1.3 are Archived Job Record Request, Formatted Report, and SI Selection Request.

Spooler module S1.4 monitors the spooling of reports and a log of the system events and outputs them to printer 116. Printing may be started, stopped, or a currently printing report may be cancelled under control of the Supervisor.

Inputs to spooler module S1.4 are: Formatted Report, Alerts, Job Listen Access, Purged Job SM Update Log, VF Copies, VF Deleted, Spool Commands, Audit Trail, Offline Alarm Notification, and Flash Report. Outputs of module S1.4 are: Printer Text, Spool Capacity, and Flash Report.

SupervisorControl module S1.5 manages the user interface, and the editing and manipulation functions (e.g. Job Record Edit). It receives the Characters input from Supervisory Station 110. Other inputs are Job Identifier, Update Failure, User Profile Response, Database Record Field and Selection Required. Outputs are Supervisor Database Updates, Report Request, SI Updates, User Profile Request, Screen Generator Request, Selection Criteria Sort Criteria, Field Update, and Spool Commands.

ScreenGenerator module S1.6 controls all output to Supervisory Station CRT 112 and interfaces to database routines for inquiry information. Inputs to module S1.6 are: Screen Generator Request, Selection Criteria, Sort Criteria, Field Update, Alert, Inquiry Record, Inquiry Record To Remove, Job Capacity, Voice File Usage, Selected Archived Jobs Spool Capacity, Online Alarm Notifications, Supervisor Database Screen Info, and Screen Definition. Screen Text and Screen Commands are output by screen- Generator S1.6 to CRT 112. Other outputs are: Flash Report, Database Record, Field, SI Selection Requests, Active Info, Selection Criteria, and Archived Job Record Request.

siMessageArbiter module S1.7 receives messages from systemManager module 2 and distributes them to the proper submodules of SupervisorInterface module 1. Module S1.7 is specified in MODULE SPECIFICATIONS set forth below.

Inputs to module S1.7 from system Manager S2 are SM Changes and SM Response. Other inputs are Active Info and Selection Criteria. Outputs from module S1.7 are: Alert, Inquiry Record, Inquiry Record To Remove, Job Capacity, Voice File Usage, Job Identifier, Update Failure, User Profile Response Job Record Backlog Change, Job Record Response, Job Capacity Change, Voice Capacity Change, Alerts, Job Listen Access, Purged Job, SM Update Log, VF Copied, VF Delected, Report Info, and Archivable Job Records.

siMessageDispatcher module S1.8 collects and outputs all messages to systemManager module S2. Module S1.8 is specified in MODULE SPECIFICATIONS set forth below.

Outputs to systemManager module S2 are SI Selection Request and SI Updates. Inputs to siMessageDispatcher module S1.8 are: SI Selection Requests, SI Updates, User Profile Request, Job Record Request, and SI Selection Requests.

SupervisorDataBase module S1.9 maintains data used only within SupervisorInterface module S1. Module S1.9 is specified in MODULE SPECIFICATIONS set forth below.

Outputs from SupervisorDataBase S1.9 are: Alarm Levels, Backlog, Supervisor Database Screen Info, Screen Definition, Job Record Request, Selection Required, Default Unit Costs, Report Definition, Weighting Factors, and Audit Trail. Inputs to module S1.9 are Supervisor Database Updates, Job Record Backlog Change, and Job Record Response.

Figure 9:
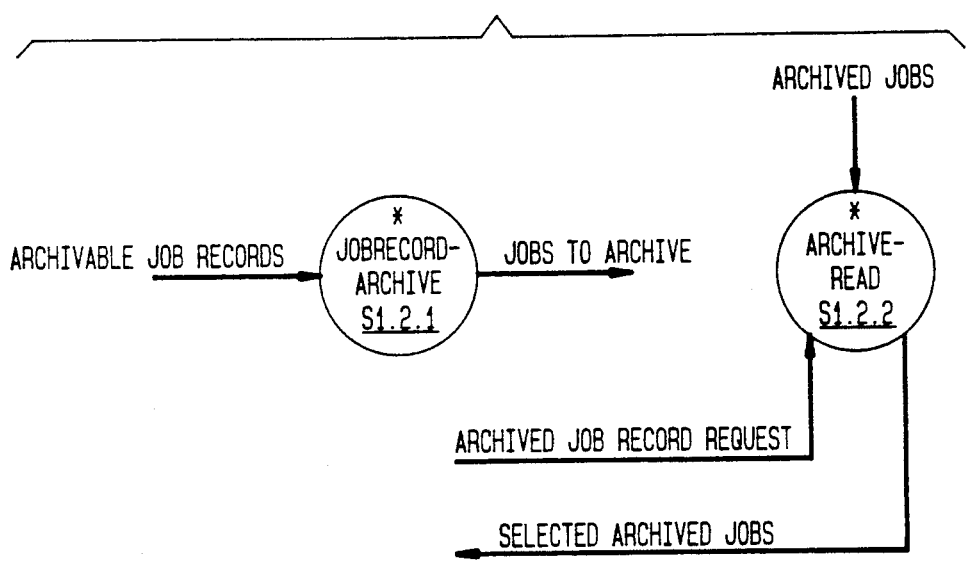

FIG. 9 further decomposes archiver module S1.2.

JobRecordArchive module S1.2.1 receives archivable job records and formats them for storage on Archive Device 30. Module S1.2.1 is specified in MODULE SPECIFICATIONS set forth below.

Outputs from module S1.2.1 are Jobs to Archive and inputs are Archivable Job Records.

ArchiveRead module S1.2.2 receives requests for archived job records and extracts them from Archive Device 30, then reformats them for inquiries or reports. Module S1.2.2 is specified in MODULE SPECIFICATIONS set forth below.

Output from module S1.2.2 is Selected Archived Jobs and inputs are Archived Jobs and Archived Job Record Request.

Figure 10:
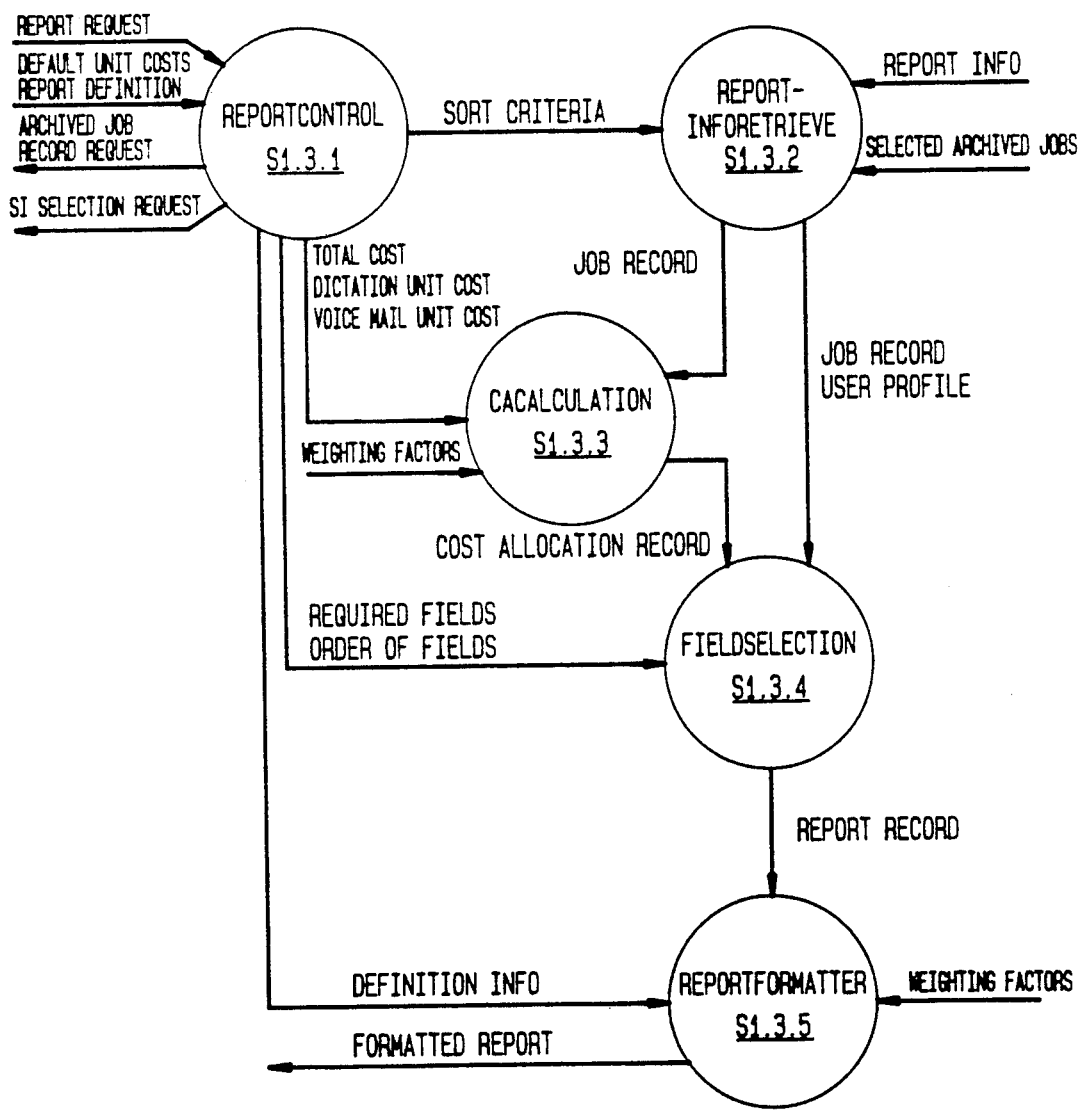

FIG. 10 further decomposes reportGenerator modules 1.3 into reportControl module 1.3.1, reportInfoRetrieve module S1.3.2, caCalculation module S1.3.3, fieldSelection module S1.3.4, and report Formatter module S1.3.5.

ReportControl module S1.3.1 retrieves the report definition and requests User Profile, Job Record, or Archived Jobs based on the report type and selection criteria. Module S1.3.1 is specified in MODULE SPECIFICATIONS set forth below.

Outputs from reportControl module S1.3.1 are Archived Job Record Request, SI Selection Request, Definition Info, Required Fields, Order of Fields, Total Cost, Dictation Unit Cost, Voice Mail Unit Cost, and Sort Criteria. Inputs to module 1.3.1 are Report Request, Default Unit Cost, and Report Definition.

ReportInfoRetrieve module S1.3.2 receives Report Info or Selected Archived Jobs and sorts the received records according to sorting criteria. Module S1.3.2 is specified in MODULE SPECIFICATIONS set forth below.

Outputs from reportInfoRetrieve module S1.3.2 are Job Record and User Profile. Inputs to module S1.3.2 are Sort Criteria, Report Info, and Selected Archived Jobs.

caCalculation module S1.3.3 performs necessary calculations for cost allocation reports for VMM's and DJ's. Module S1.3.3 is specified in MODULE SPECIFICATIONS set forth below.

The output of caCalculation module S1.3.3 is Cost Allocation Record. Inputs to module S1.3.3 are: Total Cost, Dictation Unit Cost, Voice Mail Unit Cost, and Weighting Factors.

FieldSelection module S1.3.4 receives records and selects and orders the required fields for output. Module 1.3.4 is specified in MODULE SPECIFICATIONS set forth below.

Inputs to fieldSelection module S1.3.4 are: Required Fields, Order of Fields, Cost Allocation Record, Job Record, and User Profile. The output of fieldSelection module S1.3.4 is Report Record.

ReportFormatter module S1.3.5 formats Report Records into report pages and outputs the formatted reports to spooler S1.4. Module S1.3.5 is specified in MODULE SPECIFICATIONS set forth below.

Figure 11:
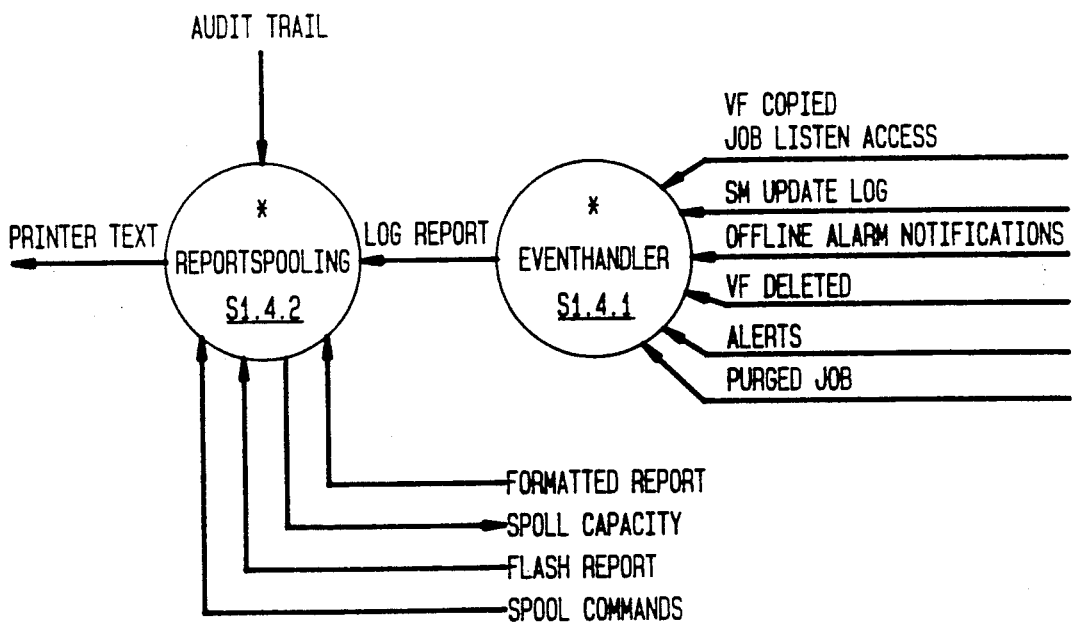

FIG. 11 further decomposes spooler module S1.4 into eventHandler module S1.4.1 and reportSpooling module S1.4.2.

EventHandler module S1.4.1 receives system events to be logged and formats them into a log report. Module S1.4.1 is specified in MODULE SPECIFICATIONS set forth below.

The output of eventHandler S1.4.1 is Log Report. The inputs to eventHandler module S1.4.1 are: VF Copied, Job Listen Access, SM Update Log, Offline Alarm Notifications, VF Deleted, Alerts, and Purged Job.

ReportSpooling module S1.4.2 receives various reports, and prioritizes and spools them to printer 116. Module S1.4.2 is responsive to Audit Trail to determine if an audit trail should be printed and to commands from the Supervisor to control printing. Module S1.4.2 is specified in MODULE SPECIFICATIONS set forth below.

The outputs of reportSpooling module S1.4.2 are Printer Text to Printer 116 and Spool Capacity. Inputs are: Audit Trail, Log Report, Formatted Report, Flash Report, and Spool Command.

Figure 12:
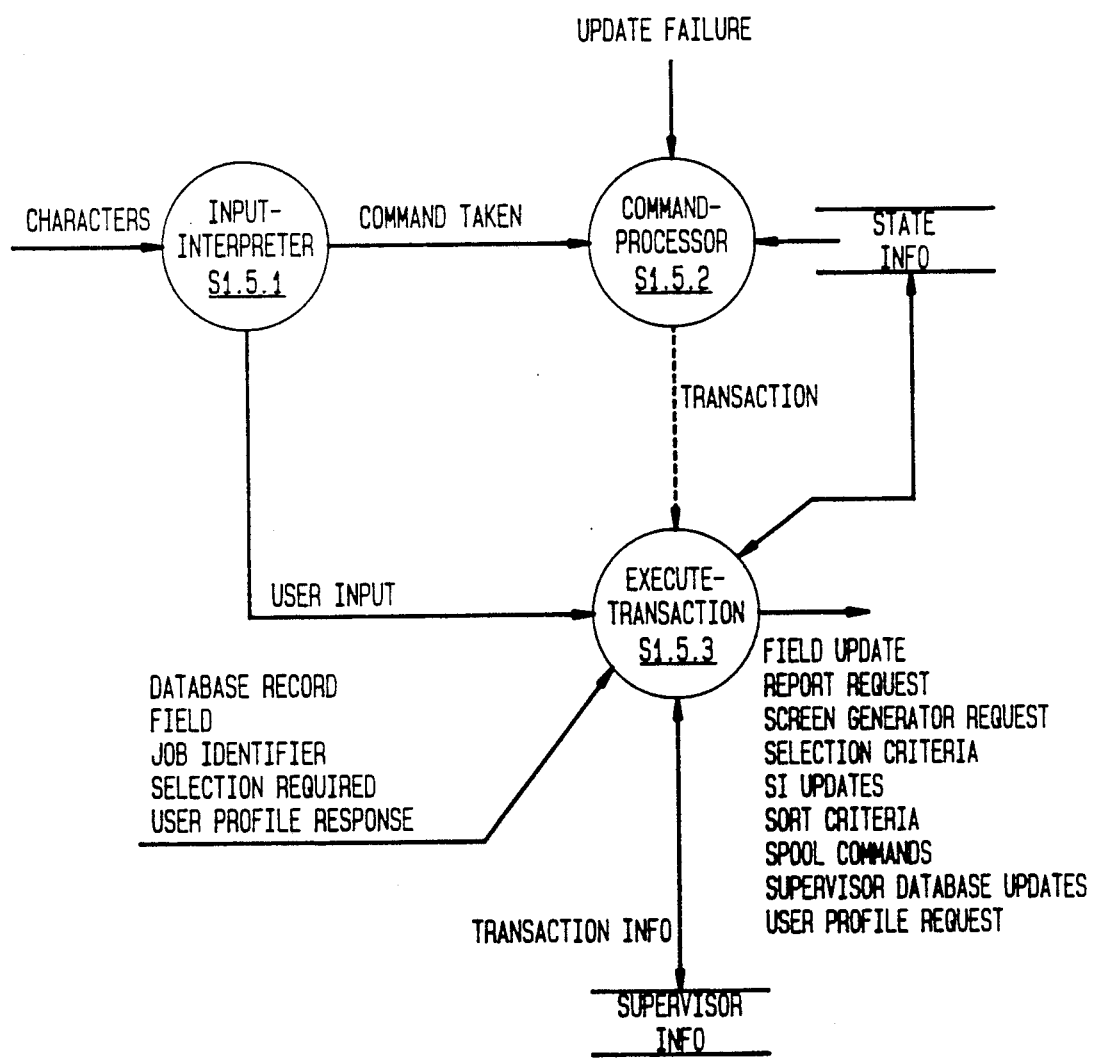

FIG. 12 further decomposes SupervisorController module 1.5 into inputInterpreter module S1.5.1, commandProcessor module S1.5.2 and executeTranscation module S1.5.3.

InputInterpreter module S1.5.1 collects Characters from Supervisory Station 110 and determines proper data values and command input tokens. Module S1.5.1 is specified in MODULE SPECIFICATIONS set forth below.

Outputs of input Interpreter S1.5.1 are Command Token and User Input and the input is Characters.

CommandProcessor module 1.5.2 interprets the Supervisor input (i.e. Command Token) and determines which function to perform, and invokes module S1.5.3 to execute the identified transaction. Module S1.5.2 is specified in MODULE SPECIFICATIONS set forth below.

The output of commandProcessor module S1.5.2 is Transaction, which identifies the transaction to be executed. The inputs are Command Token, Update Failure, and State Info (from the State Info data bank).

ExecuteTransaction module S1.5.3 executes transactions identified by module S1.5.2 and updates the state information with the current transaction status and function state. Outputs of executeTransaction module S1.5.3 are: Transaction Info (to Supervisor Info data bank), State Info (to State Info data bank), Field Update, Report Request, Screen Genertor Request, Selection Criteria, SI Updates, Sort Criteria, Spool Commands, Supervisor Database Updates, and User Profile Request. Inputs are: Transaction Info and State Info (from their respective data banks) and User Input, Database Record, Field, Job Identifier, Selection Required, User Profile Response, and Transaction. As noted Transaction transfers control to module S1.5.3 to execute the identified transaction.

FIGS. 13-20 further decompose module 1.5.3 into executeJobRecordTransaction module S1.5.3.1, executePoolTransaction S1.5.3.2, executeReportTransaction S1.5.3.3 executeUserProfileTransaction S1.5.3.4 executeSystemOpsTransaction S1.5.3.5, executeSupportTransaction module S1.5.3.6, executeInterruptTransaction S1.5.3.7, and executeEditTransaction module S1.5.3.8.

Figure 13:
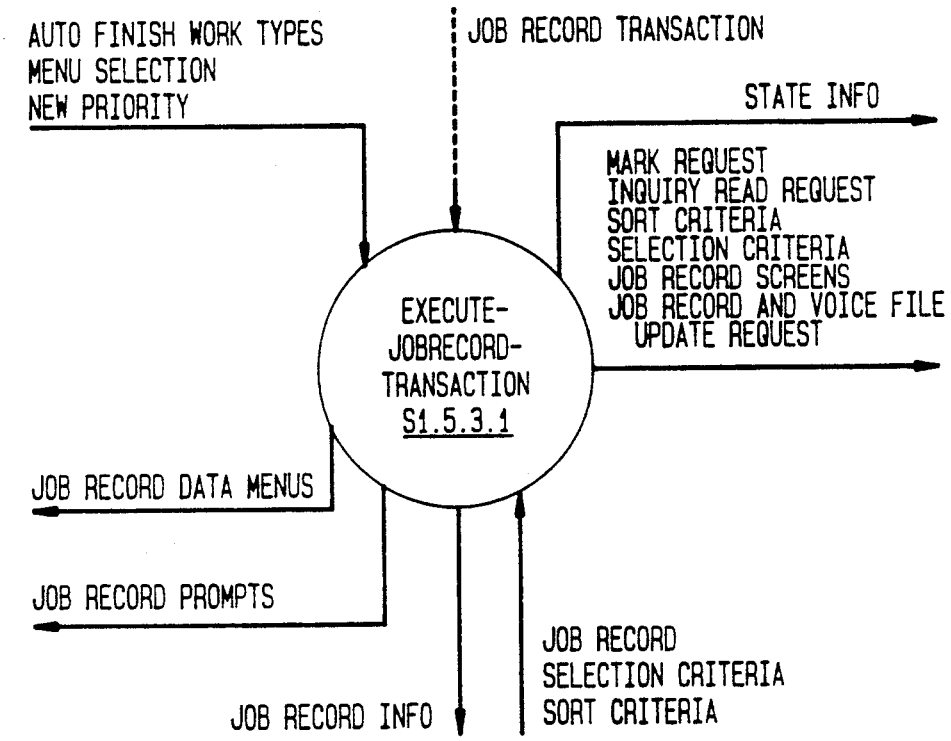

FIG. 13 shows executeJobRecordTransaction module S1.5.3.1, which executes a Job Record Transaction. Module S1.5.3.1 is specified in MODULE SPECIFICATIONS set forth below.

Outputs from modules 1.5.3.1 are: State Info, Mark Request, Inquiry Read Request, Sort Criteria, Selection Criteria, Job Record Screens, Job Record Request, Voice File Update Request, Job Record Prompts, and Job Record Data Menus. A Job Record Transaction input transfers control to modules 1.5.3.1. Other inputs are: Auto Finish Work Types, Menu Selection, New Priority, Job Record, Selection Criteria, and Sort Criteria.

Figure 14:
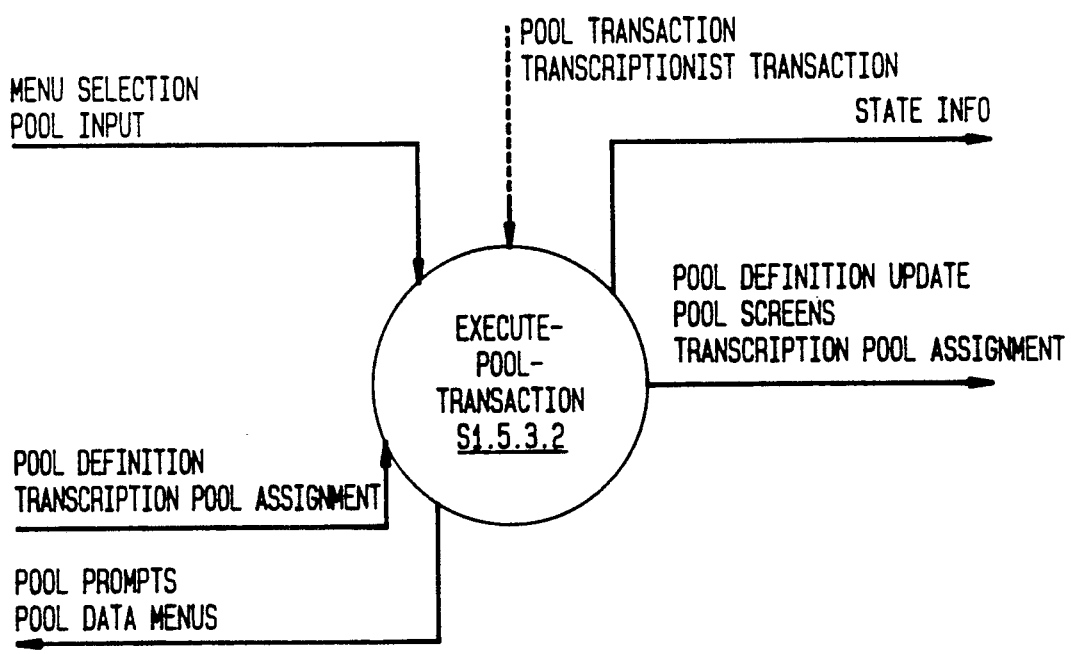

FIG. 14 shows executePoolTransaction module S1.5.3.2, which executes a Pool Transaction. Module S1.5.3.2 is specified in MODULE SPECIFICATIONS set forth below.

Outputs of module S1.5.3.2 are: State Info, Pool Definition Update, Pool Screens, Transcription Pool Assignment, Pool Prompts, and Pool Data Menus. A Pool Transaction or a Transcriptionist Transaction transfers control to modules 1.5.3.2. Other inputs are: Menu Selection, Pool Input, Pool Definition, and Transcription Pool Assignment.

Figure 15:
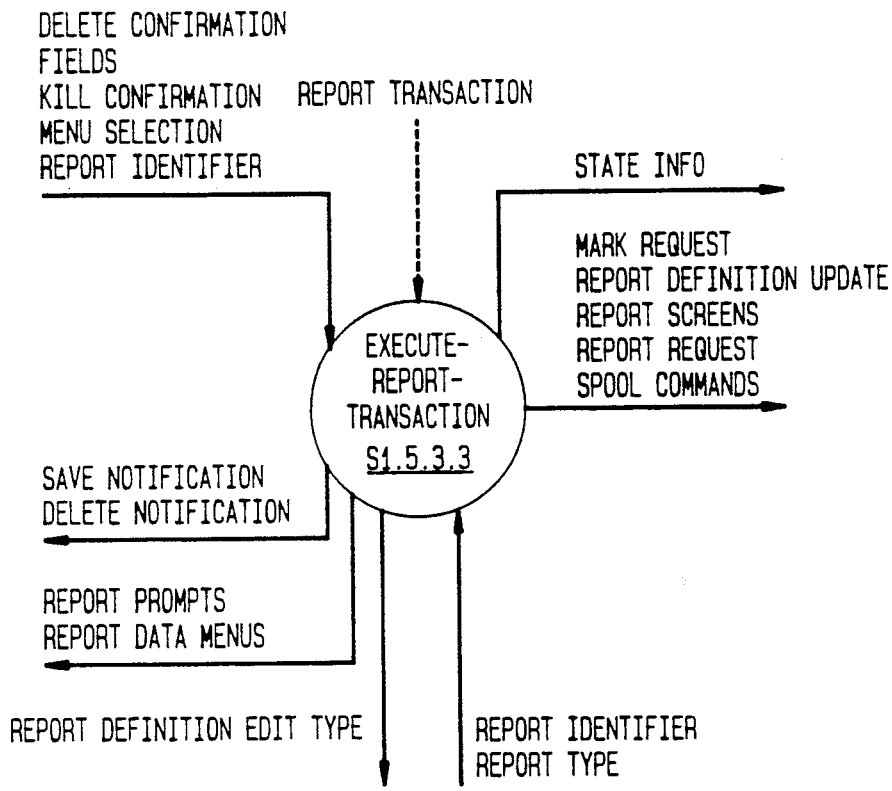

FIG. 15 shows executeReportTransaction module S1.5.3.3, which executes a Report Transaction. Module S1.5.3.3 is specified in MODULE SPECIFICATIONS set forth below.

Outputs from module S1.5.3.3 are: State Info, Mark Request Report Definition Update Report Screens, Report Request, Spool Commands, Report Definition Edit type, Report Prompts, Report Data Menus, Save Notification, and Delete Notification. A Report Transaction transfers control to execute Report Transaction S1.5.3.3. Other inputs are: Report Identifier, Report Type, Delete Confirmation, Fields, Kill Confirmation, Menu Selection, and Report Identifier.

Figure 16:
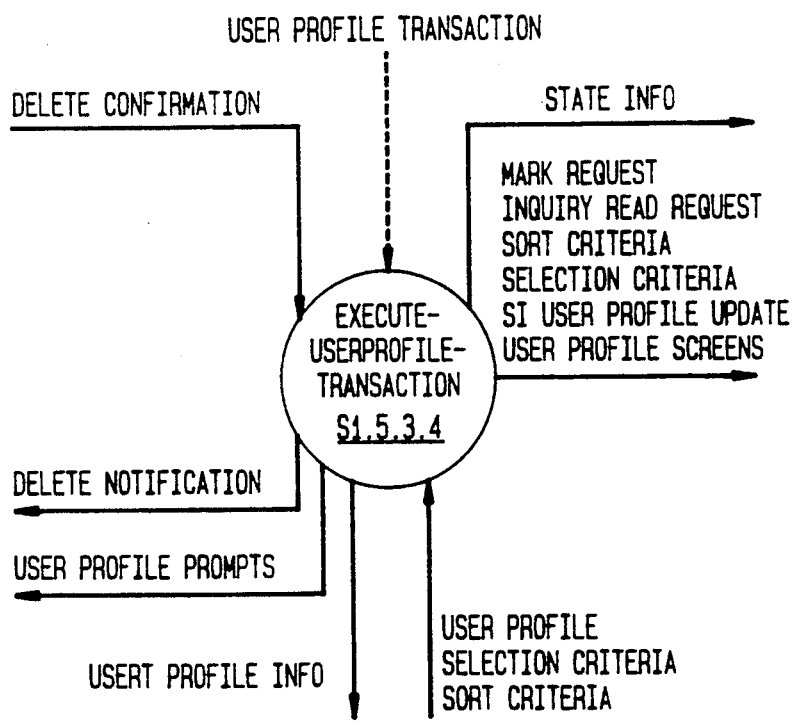

FIG. 16 shows executeUserProfileTransaction module S1.5.3.4, which executes a User Profile Transaction. Module S1.5.3.4 is specified in MODULE SPECIFICATIONS set forth below.

Outputs of executeUserProfileTransaction module S1.5.3.4 are: State Info, Mark Request, Inquiry Read Request, Sort Criteria, Selection Criteria, SI User Profile Update, User Profile Screens, User Profile Info, User Profile Prompts, and Delete Notification. A User Profile Transaction transfers control to module S1.5.3.4. Other inputs are: User Profile, Selection Criteria, Sort Criteria, and Delete Confirmation.

Figure 17:
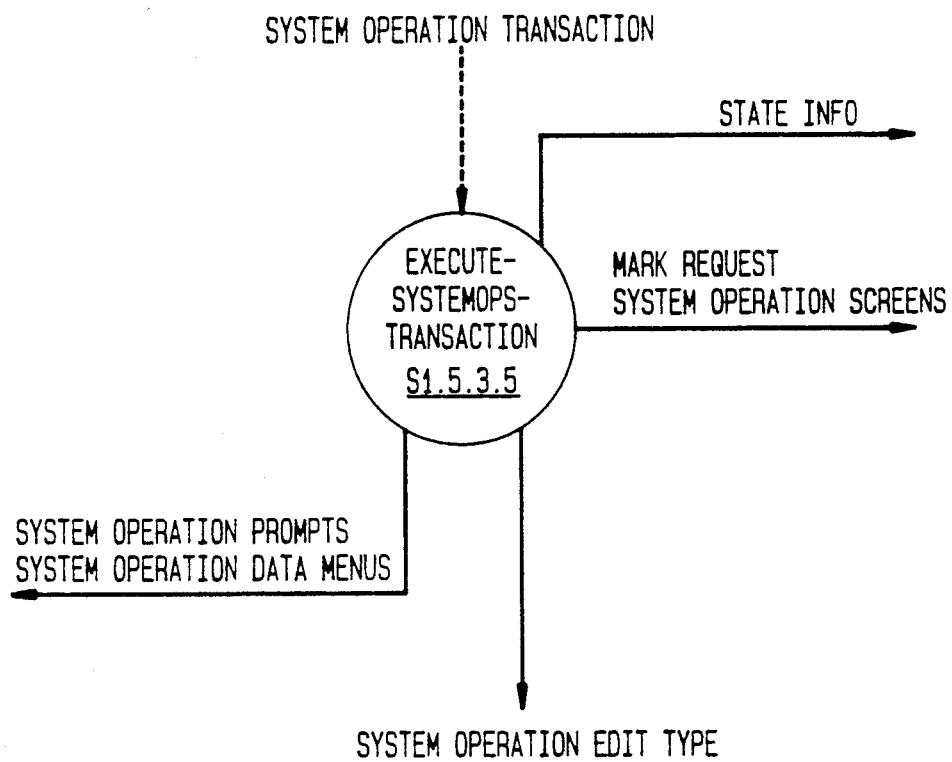

FIG. 17 shows executeSystemOpsTransaction module S1.5.3.5, which executes a System Ops Transaction. Module S1.5.3.5 is specified in MODULE SPECIFICATIONS set forth below.

Outputs of module S1.5.3.5 are: State Info, Mark Request, System Operation Screens, System Operation Edit Type, System Operation Prompts, System Operation Data Menus. A System Operation Transaction transfers control to module S1.5.3.5.

Figure 18:
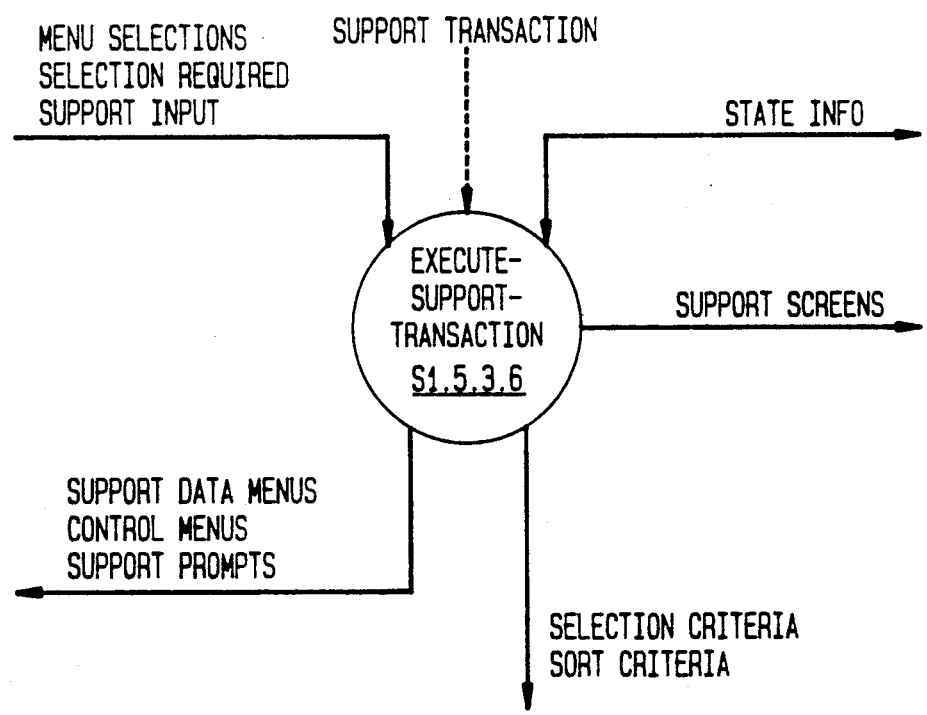

FIG. 18 shows executeSupportTransaction module S1.5.3.6 which executes a Support Transaction. Module S1.5.3.6 is specified in MODULE SPECIFICATIONS set forth below.

Outputs of executeSupportTransaction module S1.5.3.6 are: State Info, Support Screens, Selection Criteria, Sort Criteria, Support Data Menus, Control Menus, and Support Prompts. A Support Transaction transfers control to module 1.5.3.6. State Info is also an input to module 1.5.3.6.

Figure 19:
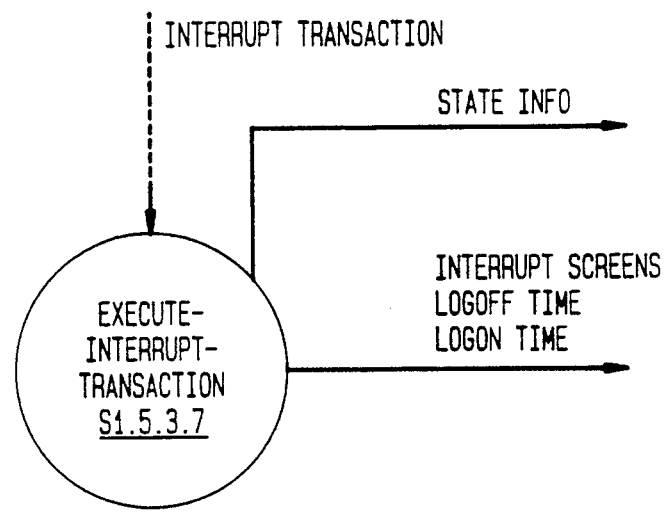

FIG. 19 shows executeInterruptTransaction module S1.5.3.7, which executes an Interrupt Transaction. Module S1.5.3.7 is specified in MODULE SPECIFICATIONS set forth below.

Outputs of executeInterruptTransaction module S1.5.3.7 are: State Info, Interrupt Screens, log-off Time, and Log-on Time. An Interrupt Transaction transfers control to module S1.5.3.7.

Figure 20:
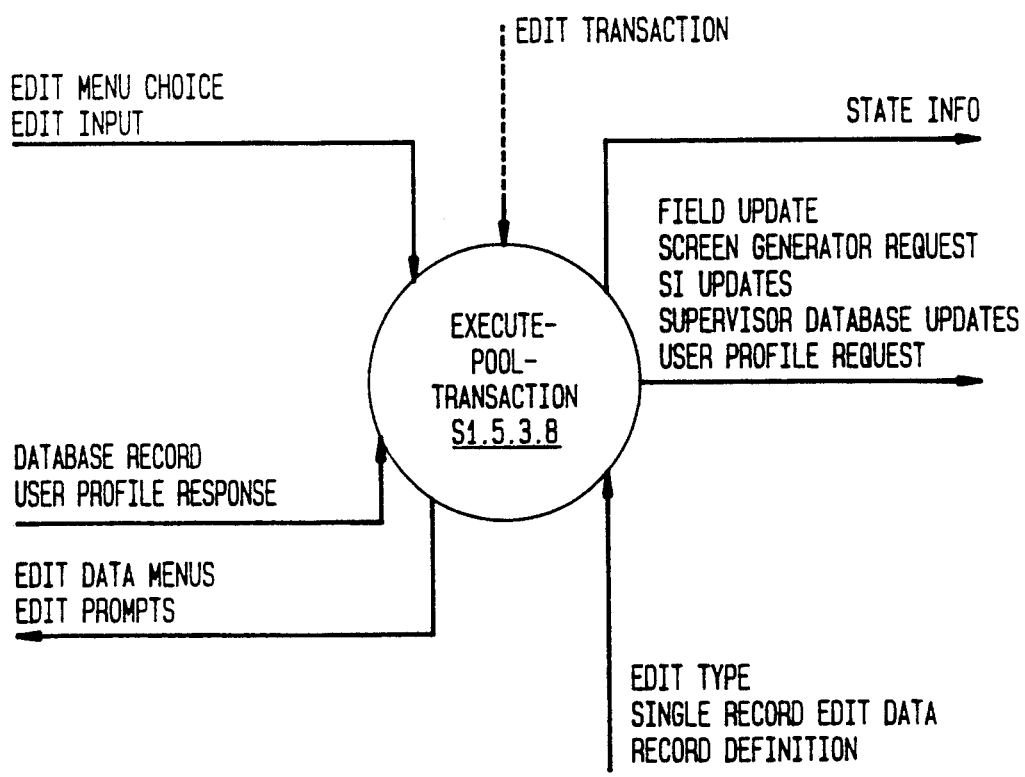

FIG. 20 shows executeEditTransaction module S1.5.3.8, which executes an Edit Transaction. Outputs of executeEditTransaction module S1.5.3.8 are: State Info, Field Update, Screen Generator Reqeust, SI Updates, Supervisor Database Updates, User Profile Request, Edit Data Menus, and Edit Prompts. Control is transferred to module S1.5.3.8 by an Edit Transaction. Other inputs are: Edit Type, Single Record Edit Data, Record Definition, Database Record, User Profile Response, Edit Menu Choice, and Edit Input.

Figure 21:
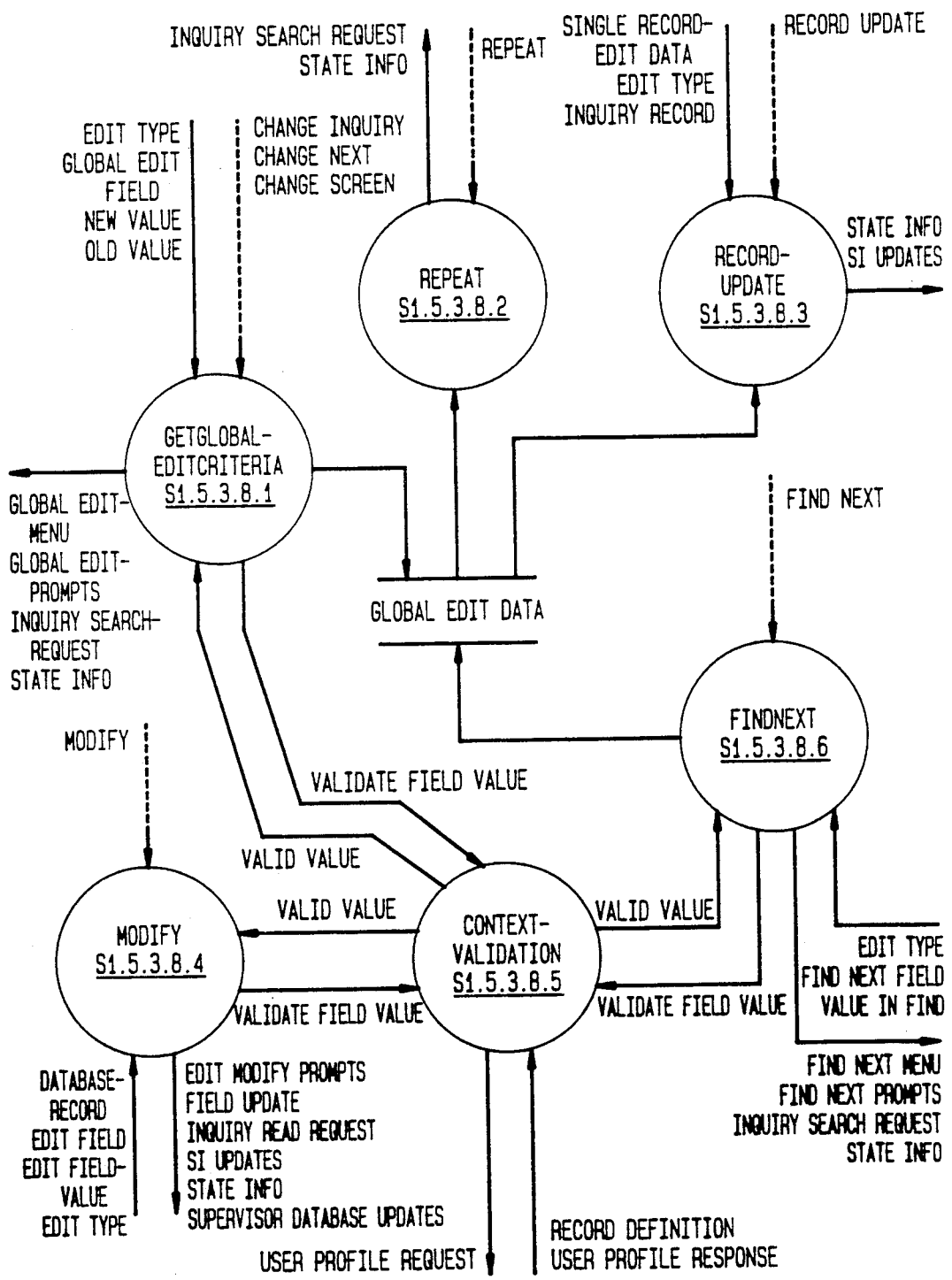

FIG. 21 further decomposes executeEditTransaction module S1.5.3.8 into getGlobalEditCriterial module S1.5.3.8.1, repeat module S1.5.3.8.2, recordUpdate module S1.5.3.8.3, modify module S1.5.3.8.4, contextValidation module S1.5.3.8.5, and findNext module S1.5.3.8.6.

GetGlobalEditCriteria module S1.5.3.8.1 requests the Supervisor to enter data necessary to perform a global update. Module S1.5.3.8.1 is specified in MODULE SPECIFICATIONS set forth below.

Outputs from module S1.5.3.8.1 are: Global Edit Data (to Global Edit Data data store), Validate Field Value, Global Edit Menu, Global Edit Prompts, Inquiry Search Reqeust, and State Info. Control is transferred to module S1.5.3.8.1 by a CHANGE INQUIRY, CHANGE NEXT, or CHANGE SCREEN command. Other inputs are: Valid Value, Edit Type, Global Edit Field, New Value and Old Value.

Repeat module S1.5.3.8.2 sends the last global edit command data that was entered by the Supervisor. Module S1.5.3.8.2 is specified in MODULE SPECIFICATIONS set forth below.

Outputs of repeat module S1.5.3.8.2 are Inquiry Search Reqeust and State Info. Control is transferred to module S1.5.3.8.2 by a REPEAT command. Global Edit Data from a data store is also an input to module S1.5.3.8.2.

RecordUpdate module S1.5.3.8.3 performs updates on Inquiry Records and sends update messages to the appropriate database in systemManager module 2. Module 1.5.3.8.3 is specified in MODULE SPECIFICATIONS set forth below.

Outputs of module S 1.5.3.8.3 are State Info and SI Updates. Control is passed to module S 1.5.3.8.3 by a RECORD UPDATE command. Other inputs are Global Edit Data (from a data store), Single Record Edit Data, Edit Type, and Inquiry Record.

Modify module S1.5.3.8.4 handles modifications of fields displayed on the screen of CRT 112 and sends an update message to the appropriate database after the Supervisor finishes updating the screen. Module S1.5.3.8.4 is specified in MODULE SPECIFICATIONS set forth below.

Outputs of modify module S1.5.3.8.4 are: Validate Field Value, Edit Modify Prompts, Field Update, Inquiry Read Request, SI Updates, State Info, and Supervisor Database Updates. Control is transferred to modify module S1.5.3.8.4 by a MODIFY command. Other inputs are: Database Record, Edit Field, Edit Field Value, Valid Value and Edit Type.

ContextValidation module S1.5.3.8.5 verifies that the Field Value entered by the Supervisor is within legal bounds. Module S1.5.3.8.5 is specified in MODULE SPECICATIONS set forth below.

Outputs of context Validation module S1.5.3.8.5 are Valid Value and User Profile Request. Inputs are Validate Field Value, Record Definiton, and User Profile Response.

FindNext module S1.5.3.8.6 requests that the Supervisor enter the data necessary to perform a FIND NEXT command. Module S1.5.3.8.6 is specified in MODULE SPECIFICATIONS set forth below.

Outputs of module S1.5.3.8.6 are: Global Edit Data to a data store, Validate Field Value, Find Next Menu, Find Next Prompts, Inquiry Search Request, and State Info. Module S1.5.3.8.6 is invoked by a FIND NEXT command. Other inputs are Valid Value Edit Type, Find Next Field, and Value To Find.

Figure 22:
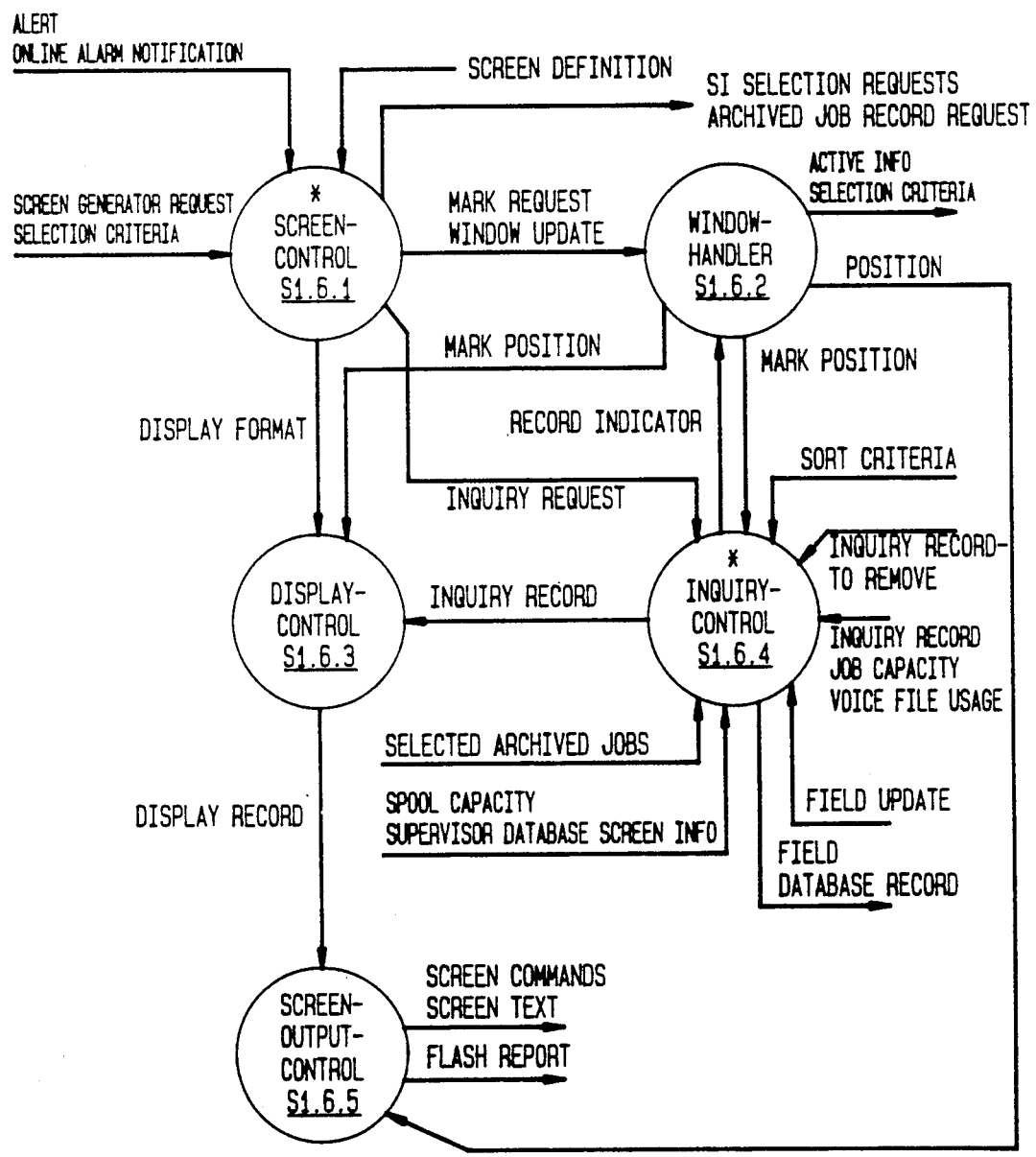

FIG. 22 further decomposes screenGenerator module S1.6 into screenControl module S1.6.1, windowHandler module S1.6.2, displayControl module S1.6.3, inquiryControl module S1.6.4, and screenOutputControl module S1.6.5.

ScreenControl module S1.6.1 controls execution of Screen Generator Request, Requests inquiry data and coordinates the screen generator components. Module S1.6.1 is specified in MODULE SPECIFICATIONS set forth below.

Outputs of screenControl module S1.6.1 are: SI Selection Requests, Archived Job Record Request, Mark Request, Window Update, Inquiry Request, and Display Format. Inputs to module S1.6.1 are: Alert, Online Alarm Notification, Screen Definition, Screen Generator Request, and Selection Criteria.

WindowHandler module S1.6.2 maintains the current window definitions for each of the screen windows, which includes informing other modules of what is currently displayed on the screen and servicing Mark Request. Module S1.6.2 is specified in MODULE SPECIFICATIONS set forth below.

Outputs of module S1.6.2 are: Active Info, Selection Criteria, Position, and Mark Position. Inputs are Mark Request, Window Update, and Record Indicator.

DisplayControl module S1.6.3 converts an Inquiry Record to the format required for display. Module S1.6.3 is specified in MODULE SPECIFICATIONS set forth below.

The output of displayControl module S1.6.3 is Display Record. Inputs are Display Format, Mark Position, and Inquiry Record.

InquiryControl module S1.6.4 receives Inquiry Records and maintains a display inquiry buffer. Records are output as requested by display Control S1.6.3 and Supervisor Control S 1.5. Module S1.6.4 is specified in MODULE SPECIFICATIONS set forth below.

Outputs of module S1.6.4 are: Record Indicator, Field, Database Record, and Inquiry Record. Inputs are: Inquiry Request, Mark Position, Sort Criteria, Inquiry Record To Remove, Inquiry Record, Job Capacity, Voice File Usage, Field Update, Spool Capacity, Supervisory Database Screen Info, and Selected Archived Jobs.

ScreenOutputControl module S1.6.5 directs the display output to the proper location on CRT 112 and generates Flash Reports. Module S1.6.5 is specified in MODULE SPECIFICATIONS set forth below.

Outputs of module S1.6.5 are Screen Commands and Screen Text to CRT 112, and Flash Report. Inputs are Display Record and Position.

Figure 23:
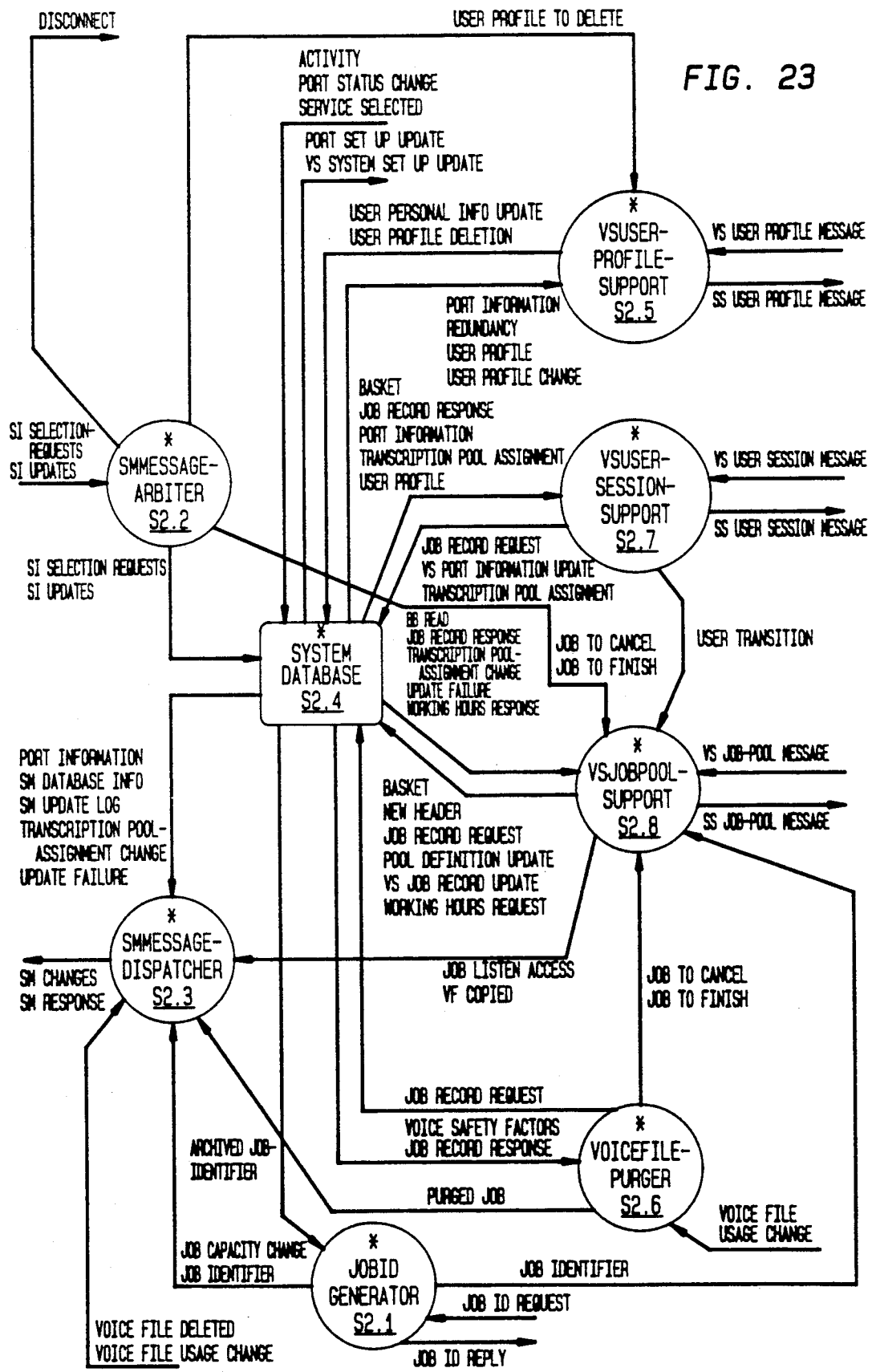

FIG. 23 further decomposes systemManager module S2 into jobIDGenerator module S2.1, smMessageArbiter module S2.2, SM smMessageDispatcher module, S2.3 systemDataBase module 2.4, vsUserProfileSupport module S2.5, voiceFilePurger module S2.6, vsUserSessionSupport module S2.7, and vsJob PoolSupport module S2.8.

JobIDGenerator module S2.1 distributes available job identifiers. Module S2.1 is specified in MODULE SPECIFICATIONS set forth below.

The outputs of module S2.1 are: Job Capacity Change, Job Identifier, and Job ID Reply. Inputs are Job ID Request and Archived Job Identifier.

smMessageArbiter module S2.2 receives messages from SupervisorInterface module S1 and distributes them to appropriate system Manager S2 submodules and voiceSession V0 submodules. Module S2.2 is specified in MODUL SPECIFICATIONS set forth below.

Outputs from module S2.2 are: Disconnect, User Profile To Delete, Job To Cancel, Job To Finish, SI Selection Request, and SI Updates.

smMessage Dispatcher module S2.3 collects messages from system Manager S2 and voice Session V0 and conveys them to SupervisorInterface S1. Module S2.3 is specified in MODULE SPECIFICATIONS set forth below.

Outputs of module S2.3 are SM Changes and SM Response. Inputs are: Port Information SM Database Info, SM Update Log, Transcription Pool Assignment Change, Update Failure, Job Listen Access, VF Copied, Purged Job Job Capacity Change, Job Identifier, Voice File Deleted, and Voice File Usage Change.

SystemDataBase module S 2.4 performs database management functions supporting Voice Session V0 and Supervisor Session S0.

Outputs of systemDataBase module S2.4 are: Port Information, SM Database Info, SM Update Log, Transcription Pool Assignment Change, Update Failure, Archieved Job Identifier, Voice Safety Factors, Job Record Response, DB Read, Job Record Response, Transcription Pool Assignment Change, Update Failure, Working Hours Response Basket, Job Record Response, Port Information, Transcription Pool Assignment, User Profile, Port Set Up Update, Redundancy, User Profile User Profile Change, and VS System Set Up Update. Inputs are: SI Selection Request, SI Updates, J Record Request, Basket, New Header Pool Definition Update, VS Job Record Update, Working Hours Request, VS Port Information Update, Transcription Pool Assignment, User Personal Info Update, User Profile Deletion, Activity Port Status Change and Service Selected.

vsUserProfileSupport module S2.5 handles changes to the User Profile involving Voice Session V0. Module S2.5 is specified in MODULE SPECIFICATIONS set forth below.

Outputs of module S2.5 are SS User Profile Message, User Personal Info Update, and User Profile Deletion. Inputs are: Port Information, Redundancy, User Profile, User Profile Change, User Profile To Delete, and DS User Profile Message.

VoiceFilePurger module S2.6 compares the currently available amount of voice storage to a limit set by the Supervisor and request deletion of Voice Files when necessary. Module S2.6 is specified in MODULE SPECIFICATIONS set forth below.

Outputs of module S2.6 are: Job To Cancel, Job To Finish, Job Record Request, and Purged Job. Inputs are: Voice Safety Factors, Job Record Response, and Voice File Usage Change.

vsUserSessionSupport module S2.7 handles changes to a user's connection to Voice Session V0. Module S2.7 is specified in MODULE SPECIFICATIONS set forth below.

Outputs of module S2.7 are: Job Record Request, VS Port Information Update, Transcription Pool Assignment, and SS User Session Message. Inputs are: Basket, Job Record Response, Port Information, Transcription Pool Assignment, User Profile, and VS User Session Message.

vsJobPoolSupport module S2.8 handles changes to jobs and pools involving Voice Session V0.

Outputs of module S2.8 are: SS Job-pool Message, Basket, New Header, Job Record Request, Pool Definition Update, VS Job Record Update, Working Hours Request, Job Listen Access, and VF Copied. Inputs are: DB Read, Job Record Response, Transcription Pool Assignment Change, Update Failure, Working Hours Response, Job To Cancel, Job To Finish, Job Indentifier, User Transistion, and VS Job-pool Message.

Figure 24:
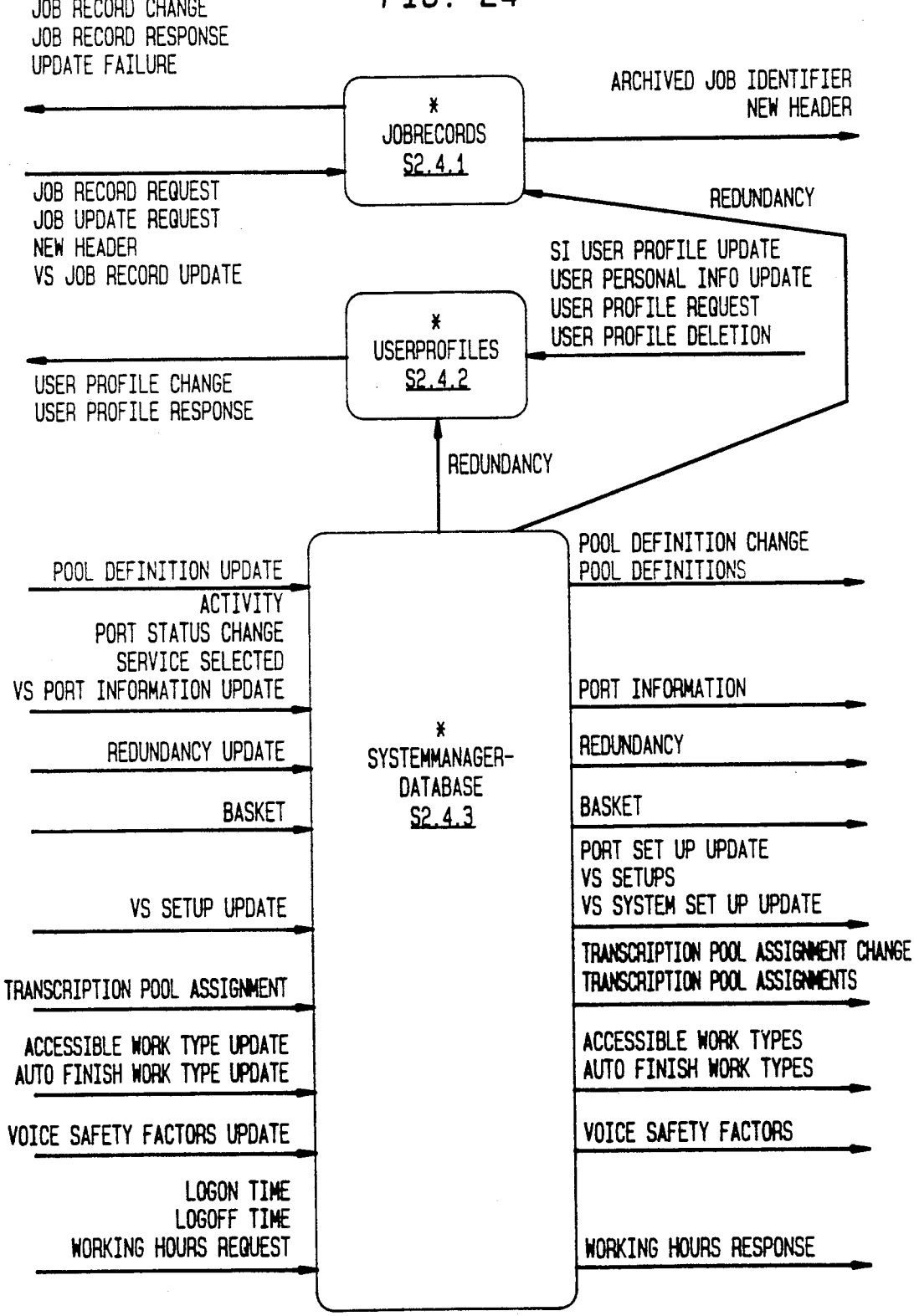

FIG. 24 further decomposes systemDataBase module S2.4 into jobRecords module S2.4.1, userProfiles module S2.4.2, and systemManagerDataBase S2.4.3.

JobRecords module S2.4.1 performs all job record database functions.

Outputs of module S2.4.1 are: Job Record Change, Job Record Reponse, Update Failure, Archived Job Identifier, and New Header. Inputs are: Job Record Request, Job Update Request, New Header, VS Job Record Update, and Redundancy.

UserProfiles module S2.4.2 performs all user profile database functions.

The outputs of module S2.4.2 are User Profile Change and User Profile Response. Inputs are: SI User Profile Update, User Personal Info Update, User Profile Request, User Profile Deletion, and Redundancy.

SystemManagerDataBase module S2.4.3 performs database functions for: Accessible Work Types, Auto Finish Work Types, Baskets, Pool Definitions, Port Information, Redundancy, Transcription Pool Assignments, Voice Safety Factors, VS Set Ups, and Working Hours. Module 2.4.3 is specified in MODULE SPECIFICATIONS set forth below.

Outputs of module S2.4.3 are: Redundancy, Pool Definition Change, Pool Definitions, Port Information, Basket, Port Set Up Update, VS Set Ups, VS System Set Up Update, Transcription Pool Assignment Change, Transcription Pool Assignments, Accessible Work Types, Auto Finish Work Types, Voice Safety Factors, and Working Hours Response. Inputs are: Pool Definition Update, Activity, Port Status Change, Service Selected, VS Port Information Update, Redundancy Update, Basket, VS Set Up Update, Transcription Pool Assignment, Accessible Work Type Update, Auto Finish Work Type Update, Voice Safety Factors Update, Log-on Time, log-off Time, and Working Hours Request.

Figure 25:
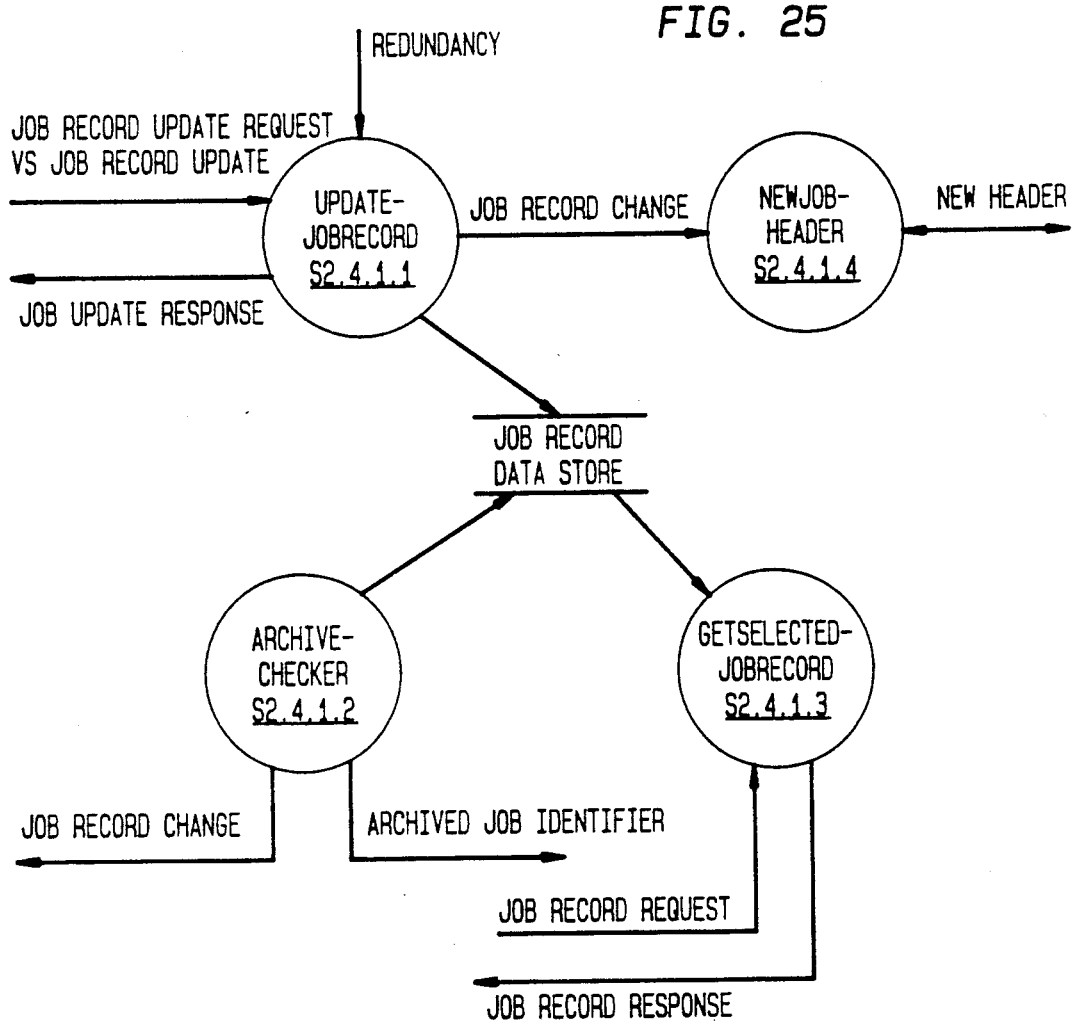

FIG. 25 further decomposes jobRecords module S2.4.1 into updateJobRecord module S2.4.1.1, archiveChecker module S2.4.1.2, getSelectedJobRecord module S2.4.1.3, and new jobHeader module S2.4.1.4.

UpdateJobRecord module S2.4.1.1 performs updates for job records. Module S2.4.1.1 is specified in MODULE SPECIFICATIONS set forth below.

Outputs of module S2.4.1.1 are Job Update Response and Job Record Change. Module S2.4.1.1 also outputs updated Job Records To Job Records S2.4.1 data store.

Inputs to module S2.4.1 are: Redundancy, Job Record Update Request, and VS Job Record Update.

ArchiveChecker module S2.4.1.2 deletes all archivable Job Records from the database and sends them to archiver module S1.2. The archived Job ID will be sent to jobIDGenerator module S2.1. Module S2.4.1.2 is specified in MODULE SPECIFICATIONS set forth below.

Outputs from module S2.4.1.2 are Job Record Change and Archived Job Identifier. Module S2.4.1.2 continuously monitors the data store of the Job Record Data Base to identify archived Job Records and has "read for update" access to the data store.

GetSelectedJob Record module S2.4.1.3 selects all Job Records that meet the selected criteria. Module S2.4.1.3 is described in MODULE SPECIFICATIONS set forth below.

The output of module S2.4.1.3 is Job Record Reponse. The input is Job Record Request and the module has read access to the data store of the Job Record Data Base.

NewJobHeader module S2.4.1.4 tracks changes made to Ready Jobs and creates new job headers if necessary. Module S2.4.1.4 is specified in MODULE SPECIFICATIONS set forth below.

The output of module S2.4.1.4 is New Header. Inputs are Job Record Change and New Header.

Figure 26:
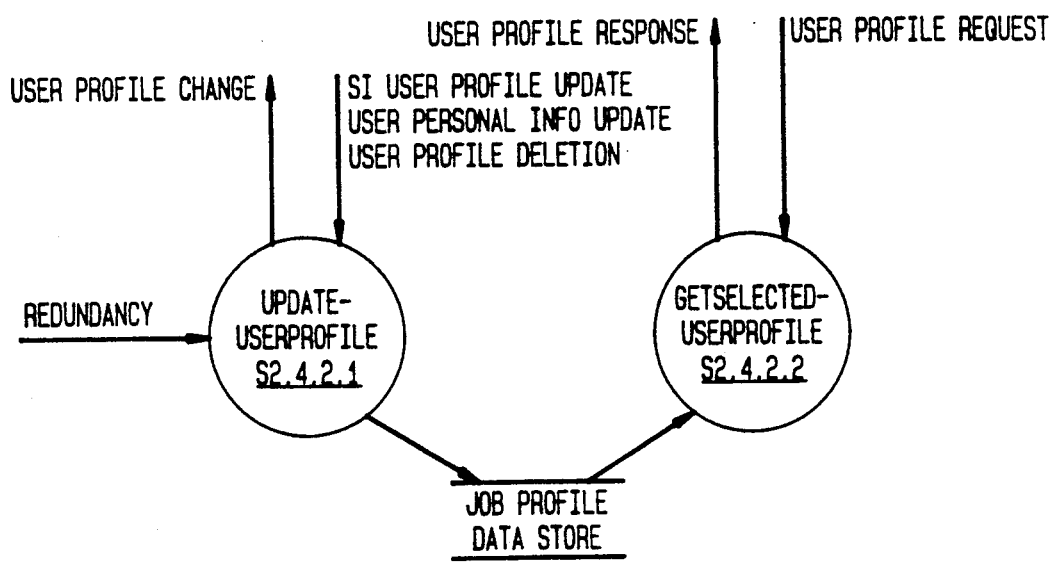

FIG. 26 shows the further decomposition of userProfileDataBase module S2.4.2 into updateUserProfile module S2.4.2.1 and get SelectedUserProfile module S2.4.2.2.

UpdateUserProfile module S2.4.2.1 updates User Profiles. Module S2.4.2.1 is specified in MODULE SPECIFICATIONS set forth below.

The output of module S2.4.2.1 is User Profile Change. The module also has write access to the data store of userProfileDataBase module S 2.4.2. Inputs are: SI User Profile Update, User Personal Info Update, and User Profile Deletion.

GetSelectedUserProfile module S2.4.2.2 selects all user profile records that meet the selected criteria. Module S2.4.2.2 is specified in MODULE SPECIFICATIONS set forth below.

The output of module S2.4.2.2 is User Profile Response. The Input is User Profile Request. The module also has read access to the data store of userProfileDataBase S2.4.2.

Figure 27:
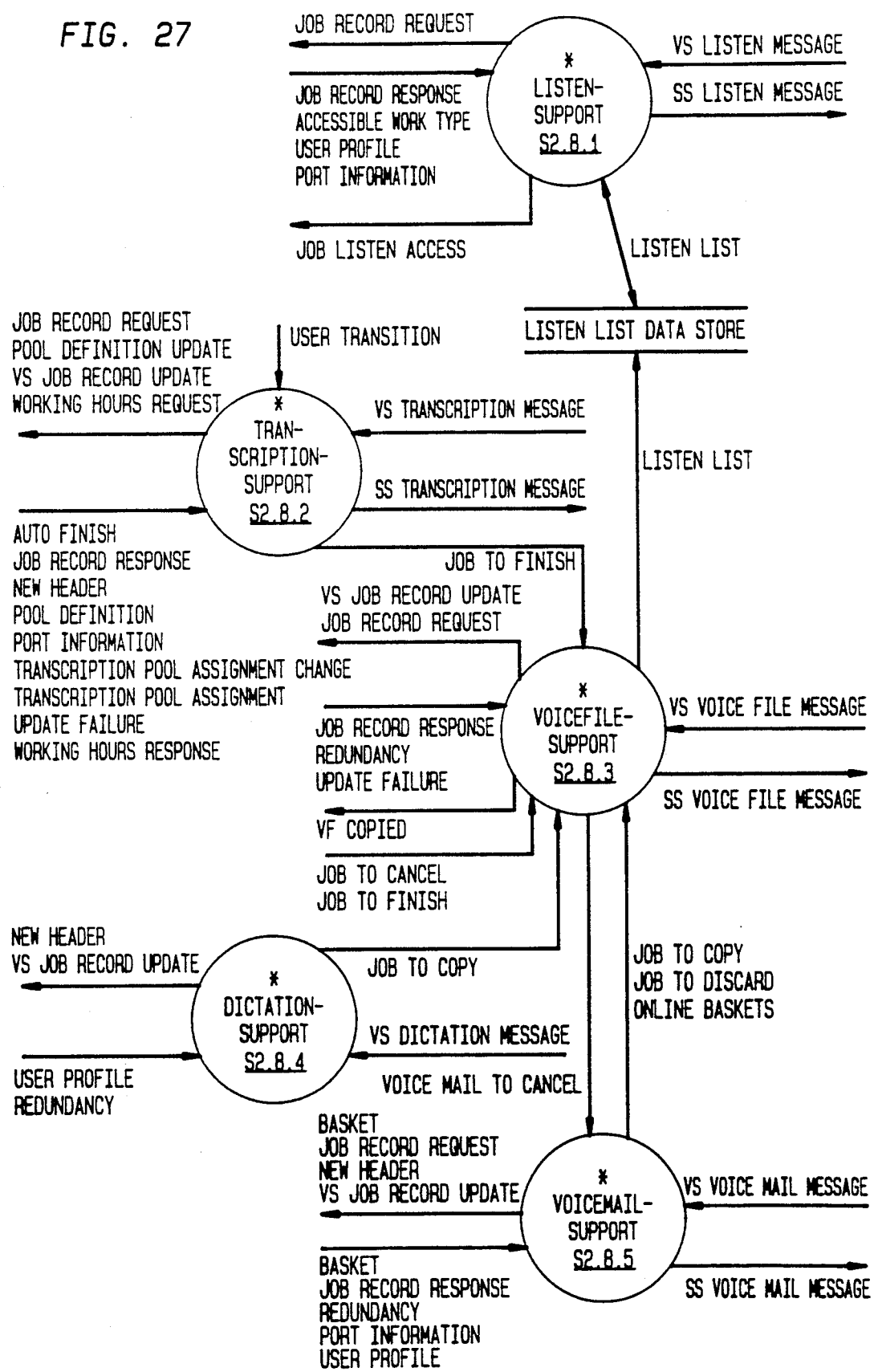

FIG. 27 shows the further decomposition of vsJobPoolSupport module S2.8 into listenSupport module S2.8.1 transcriptionSupport module S2.8.2 voiceFileSupport S2.8.3, dictationSupport module S2.8.4 and voiceMailSupport module S2.8.5.

ListenSupport module S2.8.1 supports the dictation service Review function of Voice Session V0. Module S2.8.1 is specified in MODULE SPECIFICATIONS set forth below.

Outputs of module S2.8.1 are: Job Record Request, Job Listen Access, Listen List, and SS Listen Message. Inputs are: Job Record Response, Accessible Work Type, User Profile, Port Information, VS Listen Message. The module also has read and write access to the Listen List Data Store.

TranscriptionSupport module S2.8.2 supports the transcription functions of Voice Session V0.

Outputs of module S2.8.2 are: Job Record Request, Pool Definition Update, VS Job Record Update, Working Hours Request, Job To Finish, and SS Transcription Message. Inputs are: User Transistion, Auto Finish, Job Record Response, New Header, Pool Definition, Port Information, Transcription Pool Assignment Change, Transcription Pool Assignment, User Profile, Working Hours Response, and VS Transcription Message.

VoiceFileSupport module S2.8.3 handles Voice File changes involving voiceSession V0. Module S2.8.3 is specified in MODULE SPECIFICATIONS set forth below.

The outputs of module S2.8.3 are: VS Job Record Update, Job Record Request, VF Copied, Voice Mail To Cancel, and SS Voice File Message. The module also has Write access to the Listen List Data Store. The inputs are: Job To Finish, Job Record Response, Redundancy, Update Failure, Job To Cancel, Job To Copy, Job To Discard, Online, Baskets, and VS Voice File Message.

DictationSupport module S2.8.4 supports the dictation functions of voiceSession V0. Module S2.8.4 is specified in MODULE SPECIFICATIONS set forth below.

The outputs of module S2.8.4 are: Job To Copy, New Header, and VS Job Record Update. The inputs are: User Profile Redundancy, VS Dictation Message.

VoiceMailSupport module S2.8.5 supports the Voice Mail functions of voiceSession module V0. Module S2.8.5 is specified in MODULE SPECIFICATIONS set forth below.

The outputs of module S2.8.5 are Job To Copy, Job To Discard, Online, Baskets, Basket, Job Record Request, New Header, VS Job Record Update, SS Voice Mail Message. The inputs are: Voice Mail To Cancel, Basket, Job Record Response, Redundancy, Port Information, User Profile, VS Mail Message.

Figure 28:
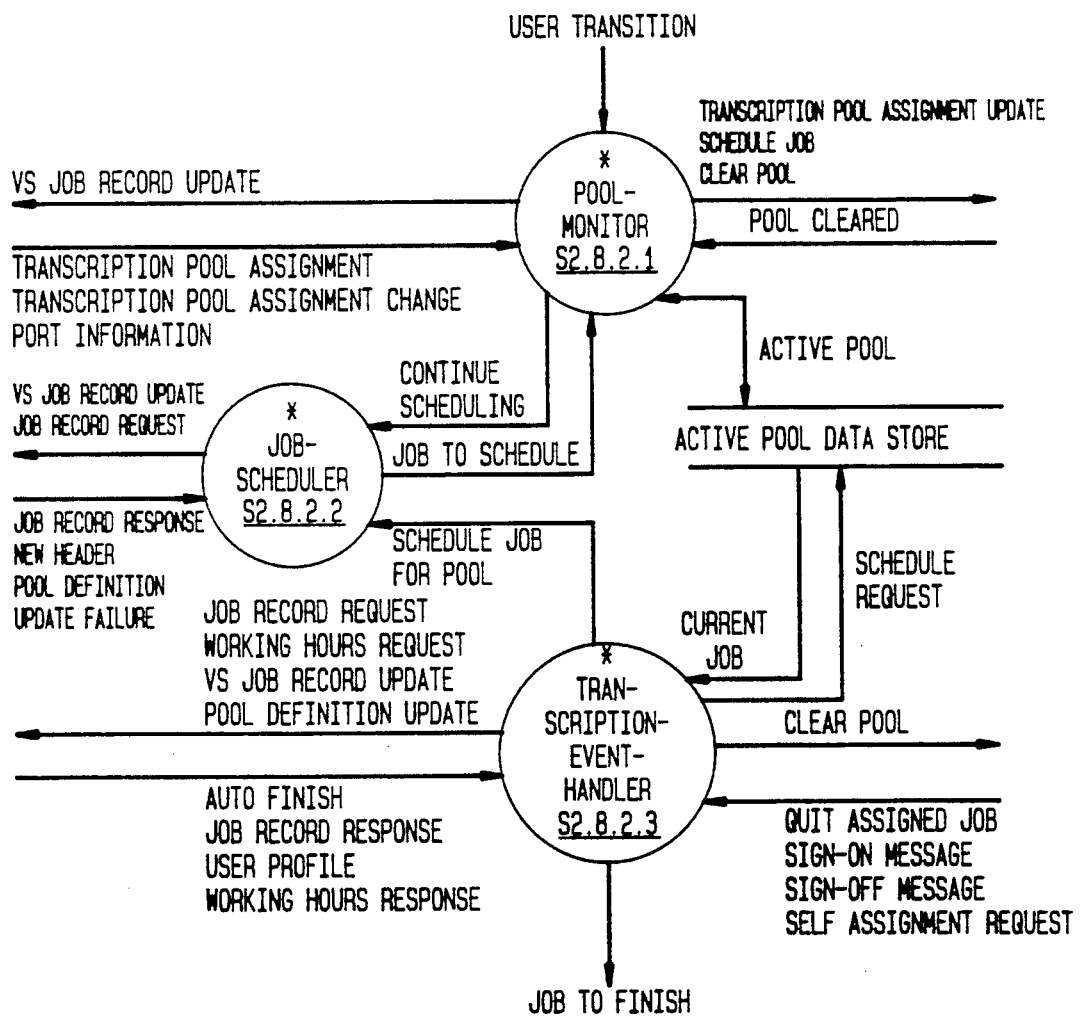

FIG. 28 shows the further decomposition of transcriptionSupport module S2.8.2 into poolMonitor module S2.8.2.1, jobScheduler module S2.8.2.2, and transcription Event Handler module S2.8.3.

PoolMonitor module 2.8.2.1 supports functions involving pools for voiceSession VO. Module 2.8.2.1 is specified in MODULE SPECIFICATIONS set forth below.

Outputs of module S2.8.2.1 are: Transcription Pool Assignment Update, Schedule Job, Clear Pool, Continue Scheduling, and VS Job Record Update. Inputs are: Transcription Pool Assignment, Transcription Pool Assignment Change, Port Information, Job To Schedule, Pool Cleared, and User Transisition. The module also has read and write access to the Active Pool data in the Active Pool Data Store.

JobScheduler module S2.8.2.2 schedules DJ's for pools according to their pool definitions. Module S2.8.2.2 is specified in MODULE SPECIFICATIONS set forth below.

Outputs of module S2.8.2.2 are: Job To Schedule, VS Job Record Update, and Job Record Request. Inputs are: Job Record Response, New Header, Pool Definition, Update Failure, Schedule Job For Pool, and Continue Scheduling.

TranscriptionEventHandler module 2.8.2.3 supports transcription events for Voice Session V0. Module S2.8.2.3 is specified in MODULE SPECIFICATIONS set forth below.

Outputs of module S2.8.2.3 are: Job To Finish, Clear Pool, Schedule Job For Pool, Job Record Request, Working Hours Request, VS Job Record Update, and Pool Definition Update. Inputs are: Auto Finish, Job Record Response, User Profile, Working Hours Response, Quit Assigned Job, Sign-On Message, Sign-Off Message, and Self Assignment Request. The module also has read access to the Current Job data in the Active Pool Data Store and write access to the Schedule Request data in that data store.

Figure 29:
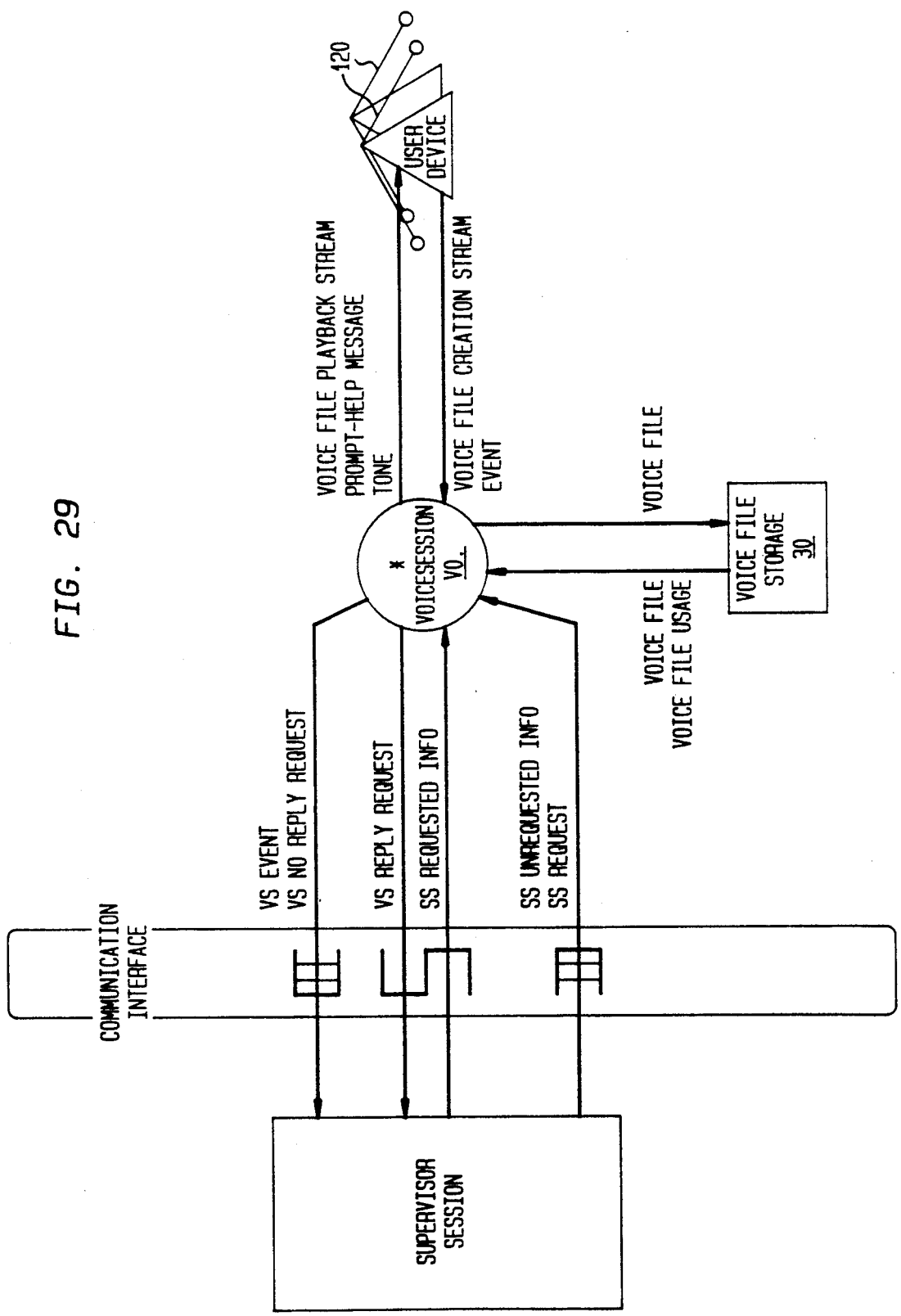
FIGS. 29-88 show a hierarchical model, including software modules and data flows, of the Voice Session software architecture.
Figure 88:
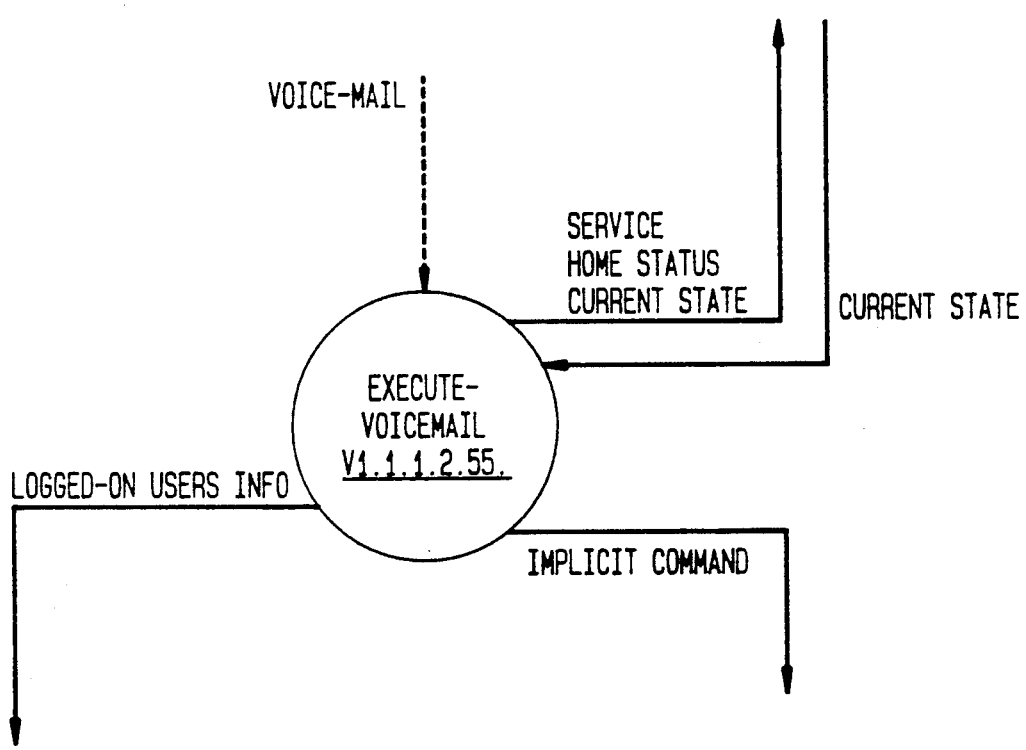

FIGS. 29-88 show the architecture for the Voice Session.

FIG. 29 shows voiceSession module V0 which performs all of the Voice Session functions.

VoiceSession V0 interfaces to SupervisorSession S0, which interface is complimentary to that described with respect to FIG. 5. Other outputs of module V0 are: Voice File Playback Stream, Prompt-Help Message, and Tone To Telephone-like User Devices 120, and Voice File to Voice File Storage 20. Other inputs are: Voice File Creation Stream and Event From User Devices 120, and Voice File and Voice File Usage From Voice File Storage 20.

Figure 30:
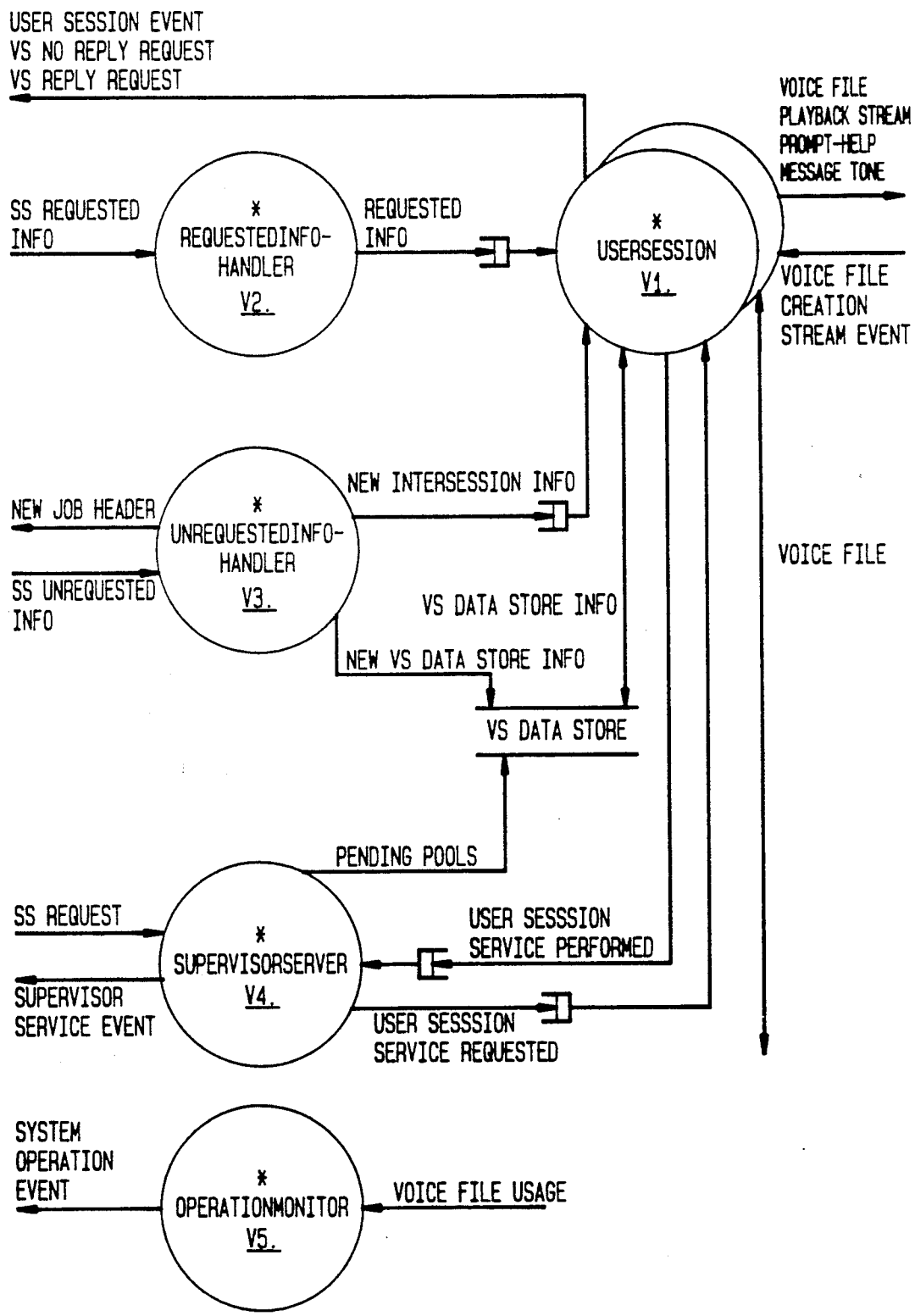

FIG. 30 shows VoiceSession module V0 decomposed to userSession module V1, requestedInfoHandler module V2, unrequestedInfoHandler module V3, SupervisorServer module V4, and operationMonitor module V5.

UserSession module V1 manages the interface presented to a user who is logged on to one of the Voice ports; there is one userSession process for each Voice port.

Outputs from userSession module V1 are: Voice File Playback Stream, Prompt-Help Message, and Tone (to User Device 120), and User Session Service Performed, User Session Event, VS No Reply Request, VS Replied Request. Inputs are: Voice File Creation Stream and Event (from User Devices 120), and User Session Service Performed, User Session Service Event, VS No Reply Request, and VS Reply Request. Module V1 also has read and write access for Voice File data to Voice File Storage 20 and to the VS Data Store.

RequestedInfoHandler module V2 receives messages sent by SupervisorSession module S0 in response to a request from voiceSession module V0, and routes the information to the appropriate userSession V1 process. (Note again that module V1 represents a process which may be multiply activated, once for each active Voice port.) Module V2 is specified in MODULE SPECIFICATIONS set forth below.

The output of module V2 is Requested Info, and the input is SS Requested Info.

UnrequestedInfoHandler module V3 receives messages sent by SupervisorSession S0 that are not in response to a voiceSession V0 request and routes this information to the VS Data Store or to the appropriate userSession V1 process. Module V3 is specified in MODULE SPECIFICATIONS set forth below.

Outputs of module V3 are: New Intersession Info, New Job Header, and New VS Data Store Info (to the VS Data Store). Its input is SS Unrequested Info.

SupervisorServer module V4 receives requests for service (e.g., copy a Voice File) from SupervisorSession S0 and carries out the requested service. Module V4 is specified in MODULE SPECIFICATIONS set forth below. Outputs of module V4 are Pending Pools (to the VS Data Store), Supervisor Service Event, and User Session Service Request. Inputs are User Session Service Performed and SS Request.

OperationMonitor module V5 checks the percentage of Voice File Storage 20 used and reports changes to SupervisorSession S0. Module V5 is specified in MODULE SPECIFICATIONS set forth below.

The output of module V5 is System Operation Event and the input is Voice File Usage.

Figure 31:
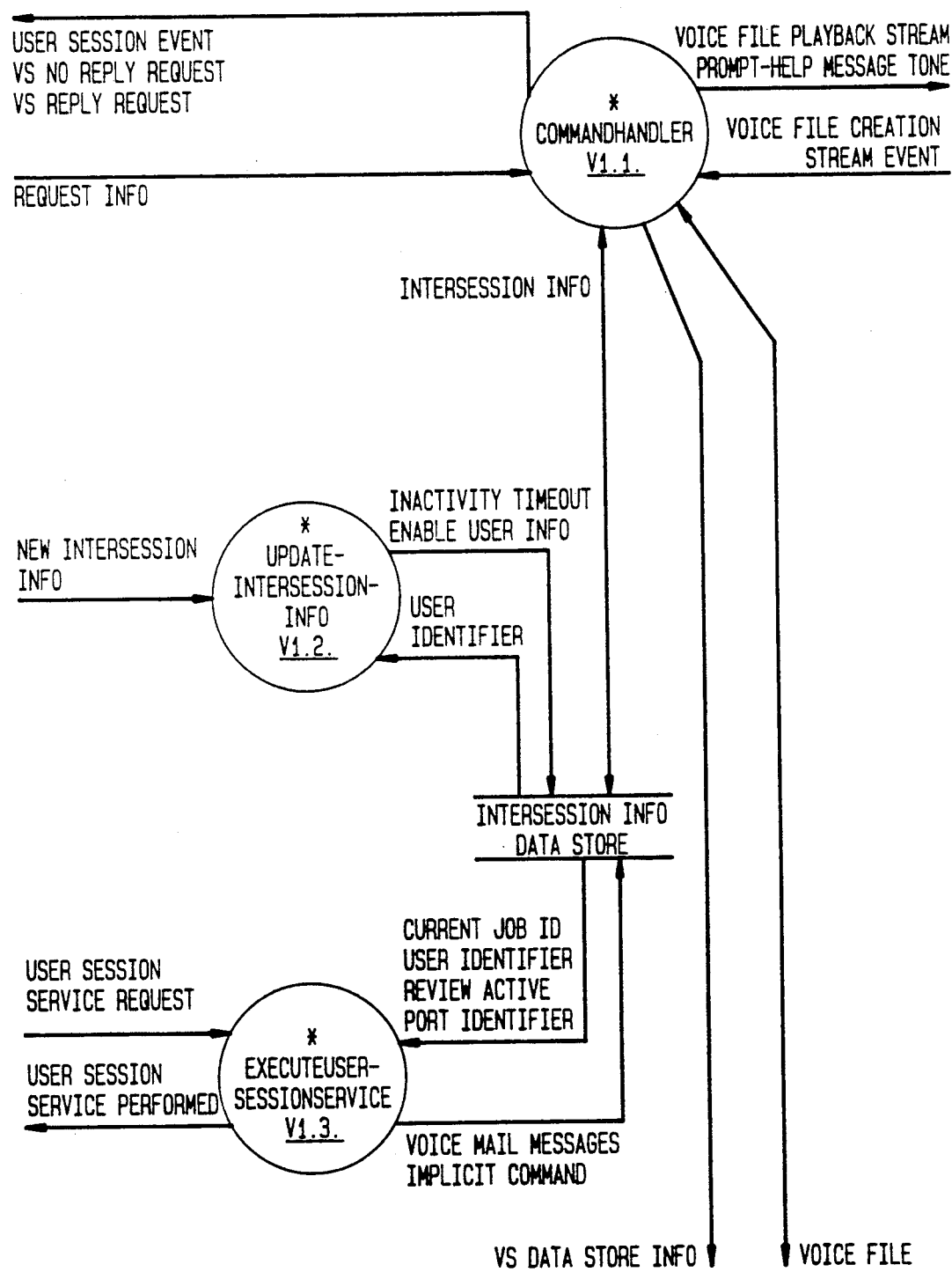

FIG. 31 further decomposes userSession module V1 in to commandHandler module V1.1, updateIntersessionInfo module V1.2, and executeUserSessionService module V1.3.

CommandHandler module V1.1 manages the functions provided to a user via VoiceSession V0. These functions may be invoked by commands from a user or may be automatically generated by the system.

Outputs of commandHandler module V1.1 are: Voice FilePlaybackStream, Prompt-Help Message, and Tone (to User Device 120), and User Session Event, VS No Reply Request, and VS Reply Request. Inputs are Voice File Creation Stream and Event (from User Device 120), and Requested Info. The module also has read and write access to the Intersession Info Data Store for Intersession Info data, VS Data store for VS Data Store Info data, and to Voice File Storage 20 for Voice File data.

UpdateIntersessionInfo module V1.2 receives and carries out updates for items in the Intersession Info Data Store which have been changed by SupervisorSession S0. Module V1.2 is specified in MODULE SPECIFICATIONS set forth below. The output of module V1.2 is Inactivity Timeout Enable. Inputs are User Identifier and New Intersession Info.

ExecuteUserSessionService module V1.3 executes parts of a SupervisorSession S0 request that affect a user session. Module V1.3 is specified in MODULE SPECIFICATIONS set forth below.

Outputs of module V1.3 are Voice Mail Messages, Implicit Command, and User Session Service Perform. Inputs are: Current Job ID, User Identifier, Review Active, Port Identifier, and User Session Service Request.

Figure 32:
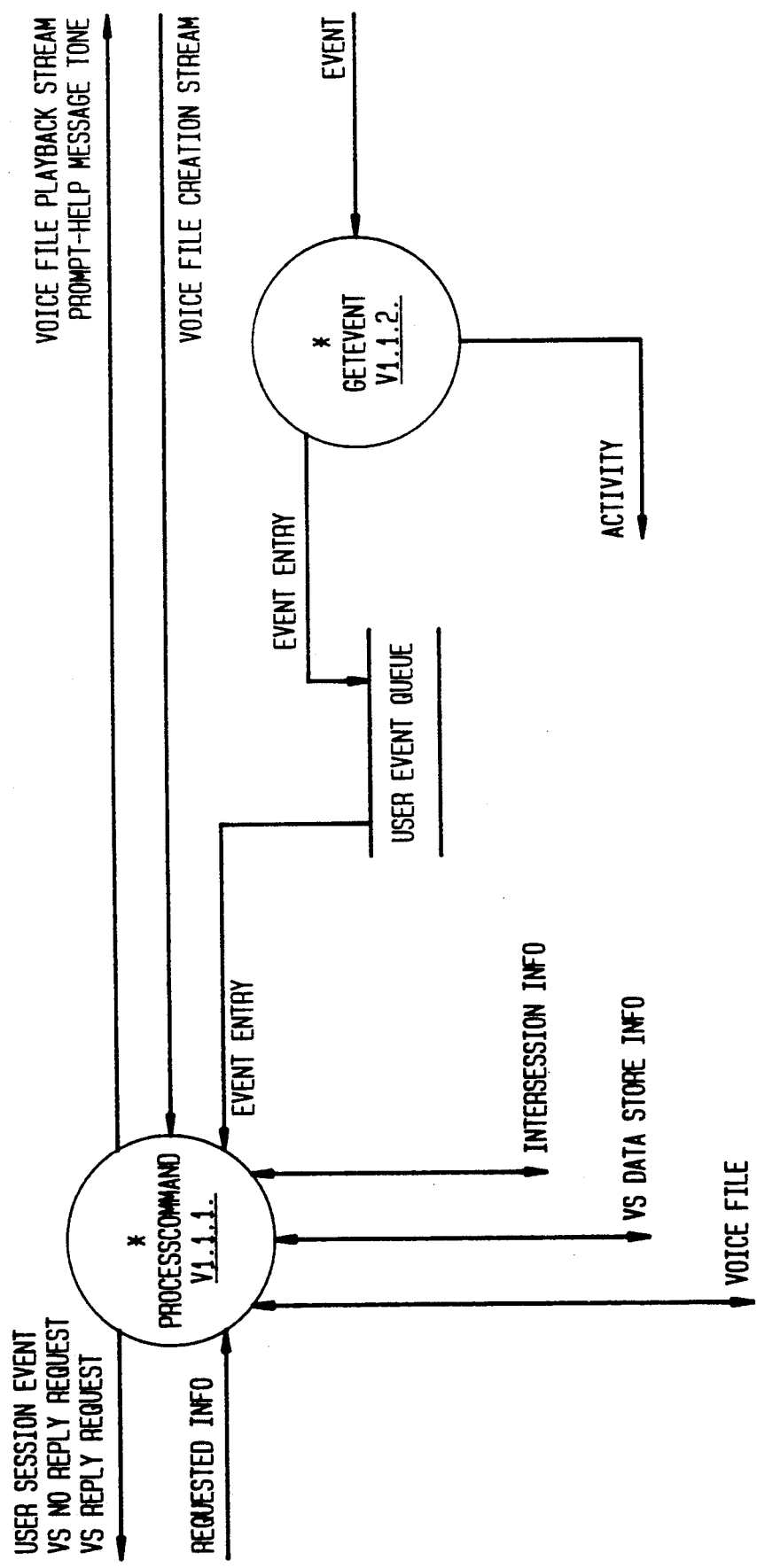

FIG. 32 further decomposes commandHandler module V1.1 into processCommand module V1.1.1 and getEvent module V1.1.2.

ProcessCommand module V1.1.1 processes a command.

Outputs of module V1.1.1 are: Voice File Playback Stream, Prompt-Help Message, and Tone (to User Device 120), and User Session Event, VS No Reply Request, and VS Reply Request. Inputs are: Requested Info, Event Entry (from User Event Queue data store) and Voice File Creation Stream. The module also has read and write access to Intersession Info, VS Data Store Info and Voice File.

GetEvent module V1.1.2 receives a telephony event from the associated Voice port and places it in the User Event Queue data store. Module V1.1.2 is specified in MODULE SPECIFICATIONS set forth below.

Outputs of module V1.1.2 are Event Entry and Activity, and the input is Event.

Figure 33:
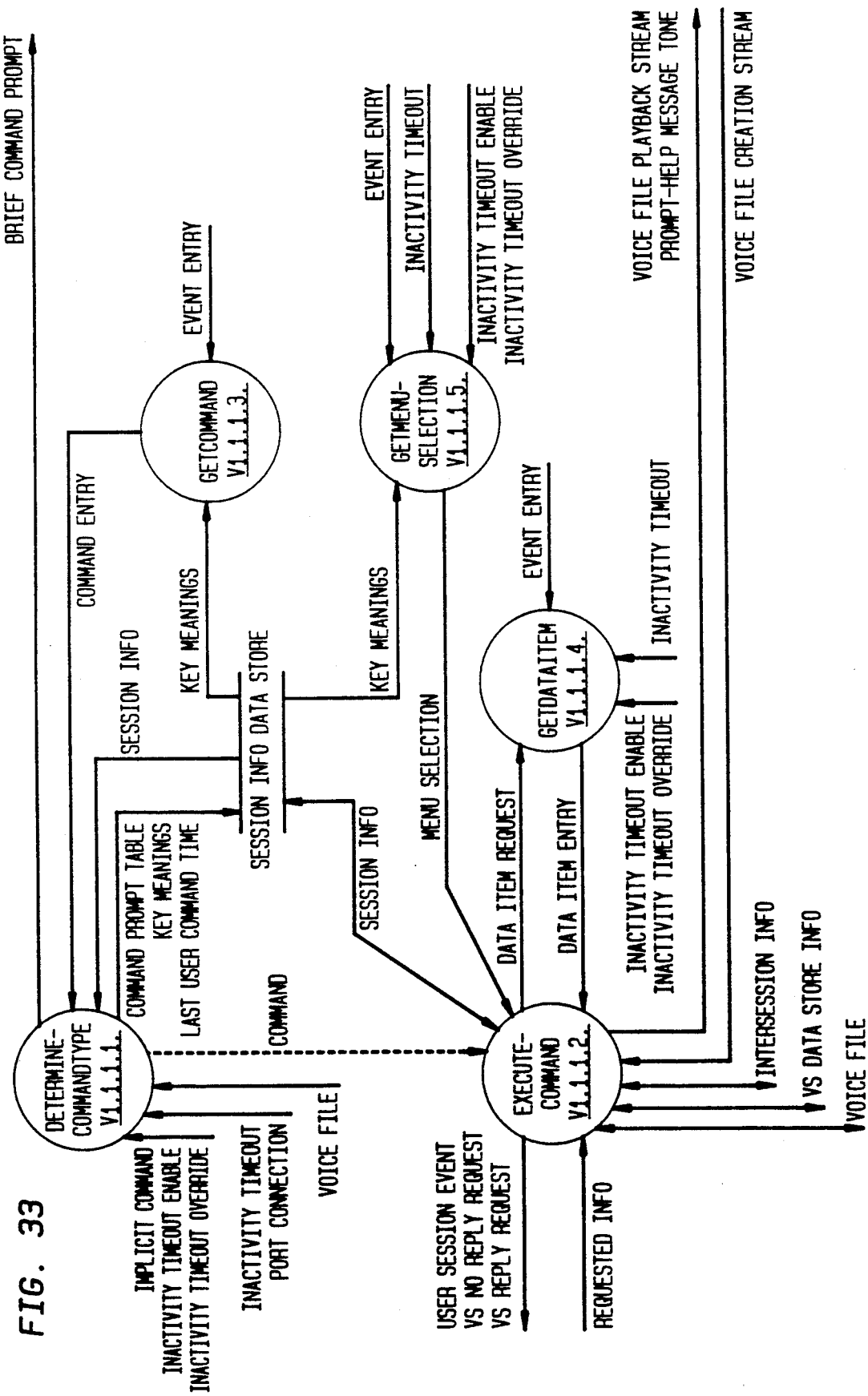

FIG. 33 shows process command module V1.1.1 further decomposed into determineCommandType module V1.1.1.1, executeCommand module V1.1.1.2, getCommand module V1.1.1.3, getDataItem module V1.1.1.4, and getMenuSelection module V1.1.1.5.

DetermineCommandType module V1.1.1.1 receives a command and invokes the appropriate command execution module. Module V1.1.1.1 is specified in MODULE SPECIFICATIONS set forth below.

Outputs of module V1.1.1.1 are: Brief Command Prompt, and Command Prompt Table, Key Meanings, and Last User Command Time (to the Session Info Data Store), and Command. Inputs are: Implicit Command, Inactivity Timeout Enable, Inactivity Timeout Override, Inactivity Timeout, Port Connection, Voice File, Session Info (from Session Info Data Store), and Command Entry.

ExecuteCommand module V1.1.1.2 executes a command.

Outputs of module V1.1.1.2 are: User Session Event, VS No Reply Request, VS Reply Request, Data Item Request, and Voice File Playback Stream, Prompt-Help Message, and Tone (to User Device 120). Inputs are: Requested Info, Voice File Creation Stream (from user device 120), Data Item Entry, Menu Selection, and Command. The module also has read and write access for VS Data Store Info, Intersession, Info Session Info, and Voice File.

GetCommand module V1.1.1.3 receives commands from the user. Module V1.1.1.3 is specified in MODULE SPECIFICATIONS set forth below.

The output of module V1.1.1.3 is Command Entry and the inputs are Event Entry, and Key Meanings (from Session Info Data Store).

GetDataItem module V1.1.1.4 receives a data item from the user. Module V1.1.1.4 is specified in MODULE SPECIFICATIONS set forth below.

The output of V1.1.1.4 is Data Item Entry. The inputs are: Data Item Request, Inactivity Timeout Enable, Inactivity Timeout Override, Inactivity Timeout, and Event Entry.

GetMenuSelection module V1.1.1.5 receives menu selections from the user. Module V1.1.1.5 is specified in MODULE SPECIFICATIONS set forth below.

The output of module V1.1.1.5 is Menu Selection. Inputs are: Key Meanings (from the Session Info Data Store), Inactivity Timeout Enable, Inactivity Timeout Override, Inactivity Timeout, and Event Entry.

ExecuteCommand module V1.1.1.2 is further decomposed in

Figure 34:
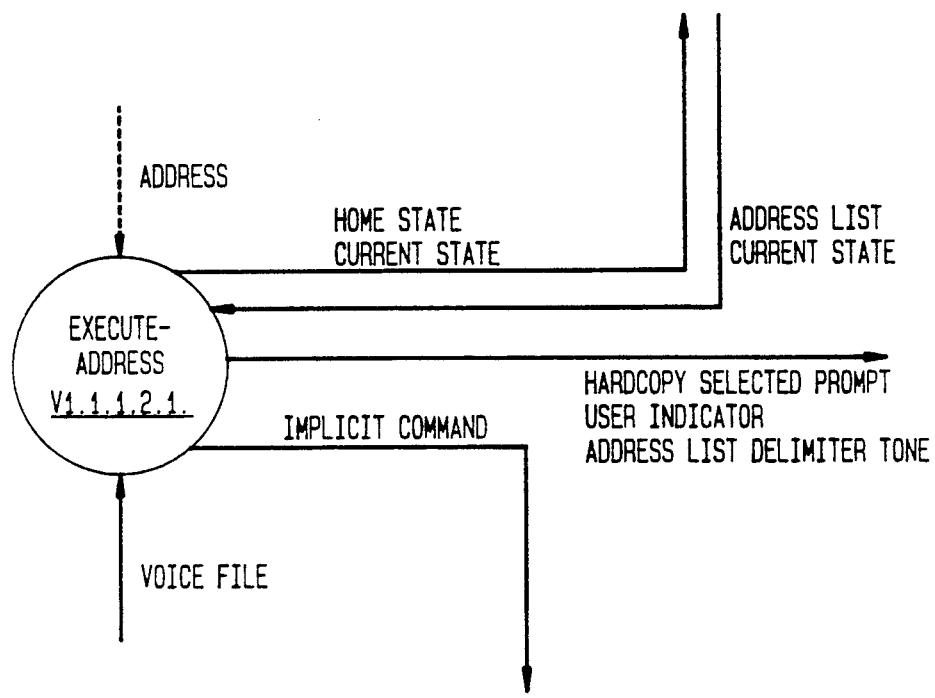

FIGS. 34-88. Each module executes the corresponding command and is specified in MODULE SPECIFICATIONS set forth below.

FIG. 34 shows executeAddress module V1.1.1.2.1 which is invoked by ADDRESS. Its outputs are: Home State, Current State, Implicit Command, Hardcopy Selected Prompt, User Indicator and ADDRESS LIST DELIMITER TONE. Inputs are Address List, Current State, and Voice File.

Figure 35:
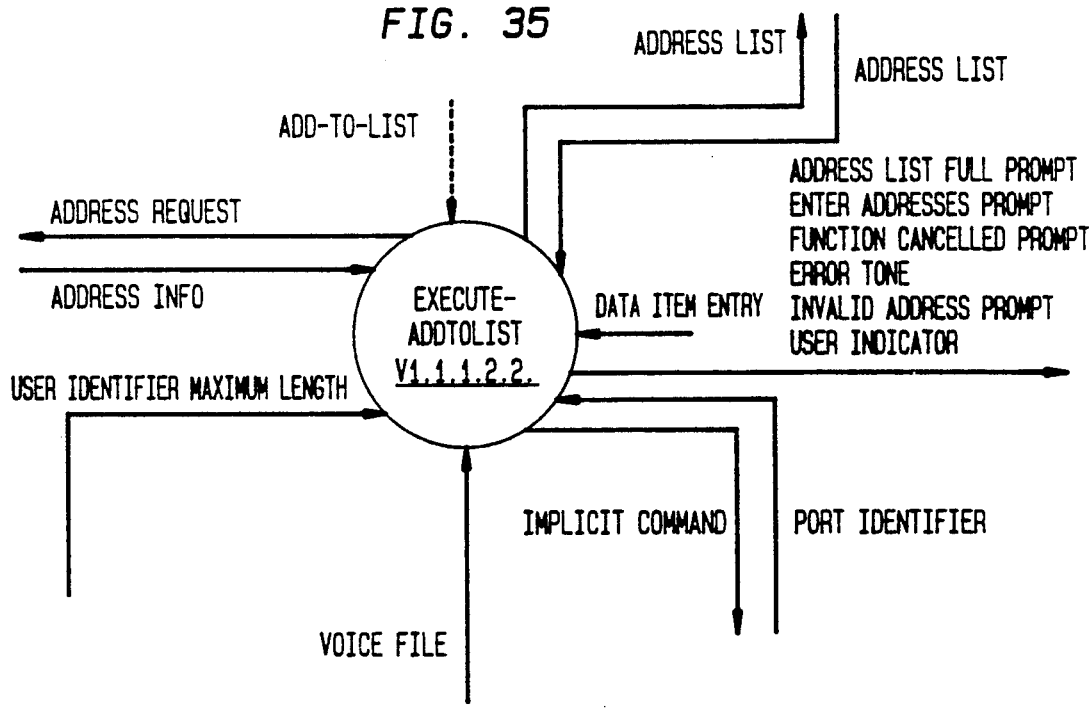

FIG. 35 shows executeAddToList module V1.1.1.2.2 which is invoked by ADD-TO-LIST. Its outputs are: Address List, Address Request, Implicit Command and Address List Full Prompt, Enter Address Prompt, Function Cancel Prompt, ERROR TONE, Invalid Address Prompt, and User Indicator. Inputs are: Address Info, User Identifier Maximum Length, Voice File, Port Identifier, Data Item Entry, and Address List.

Figure 36:
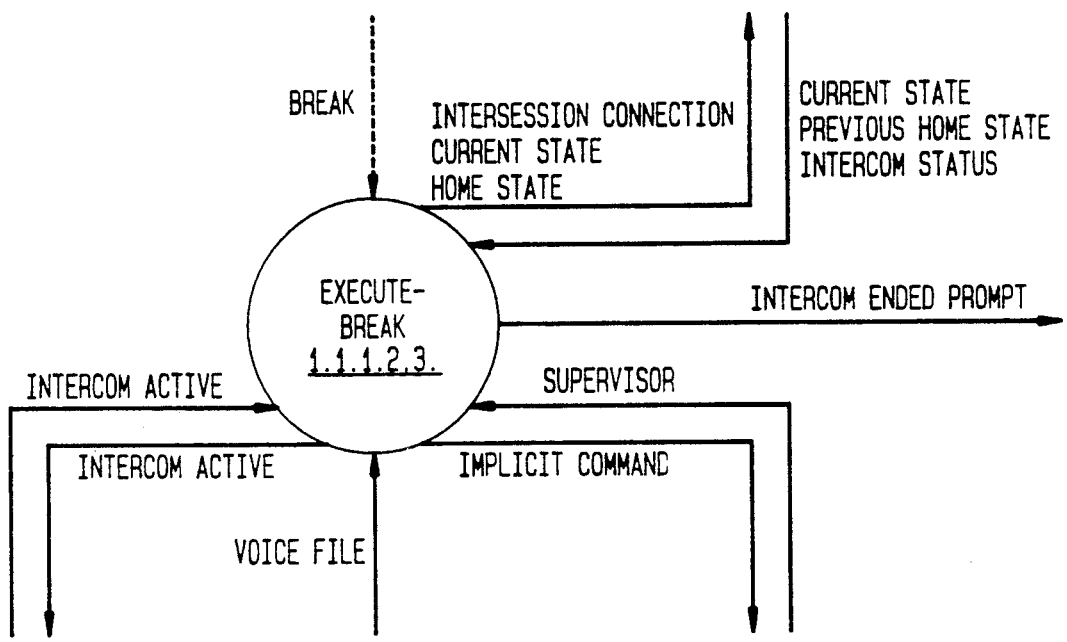

FIG. 36 shows executeBreak module V1.1.1.2.3 which is invoked by BREAK. Its outputs are: Intersession Connection, Current State, Home State, Intercom Active, Implicit Command and Intercom Ended Prompt. Inputs are: Intercom Active, Voice File, Supervisor, Current State, Previous Home State, and Intercome Status.

Figure 37:
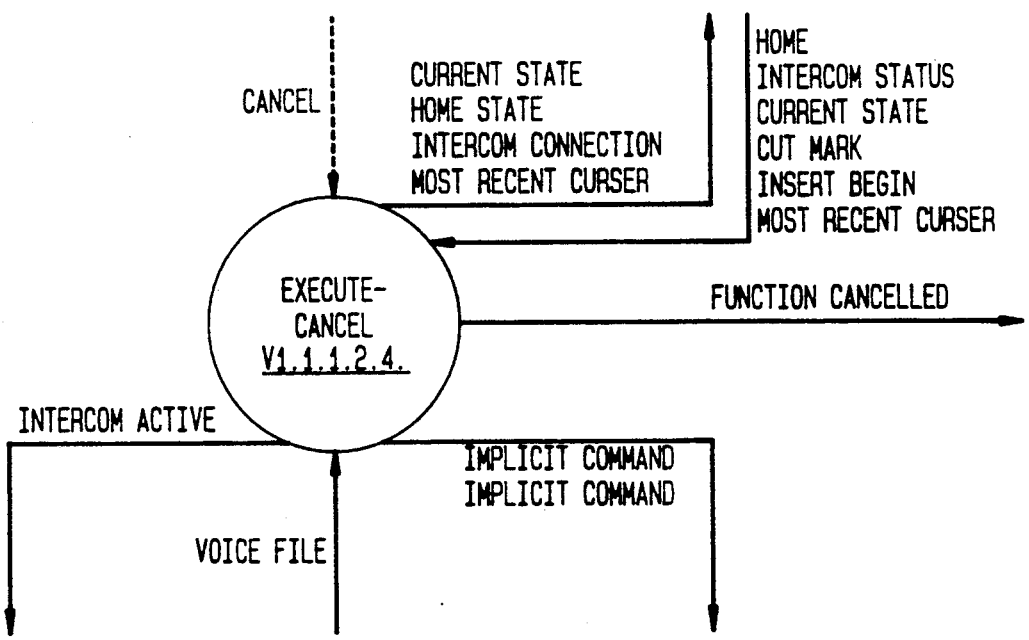

FIG. 37 shows executeCancel module V1.1.1.2.4 which is invoked by CANCEL. Its outputs are: Current State, Home State, Intercome Connection, Most Recent Cursor, Intercom Active, Implicit Command, Implicit Commands, and Function Cancelled Prompt. Inputs are: Voice File, Home State, Intercom Status, Current State, Cut Mark, Insert Begin, and Most Recent Cursor.

Figure 38:
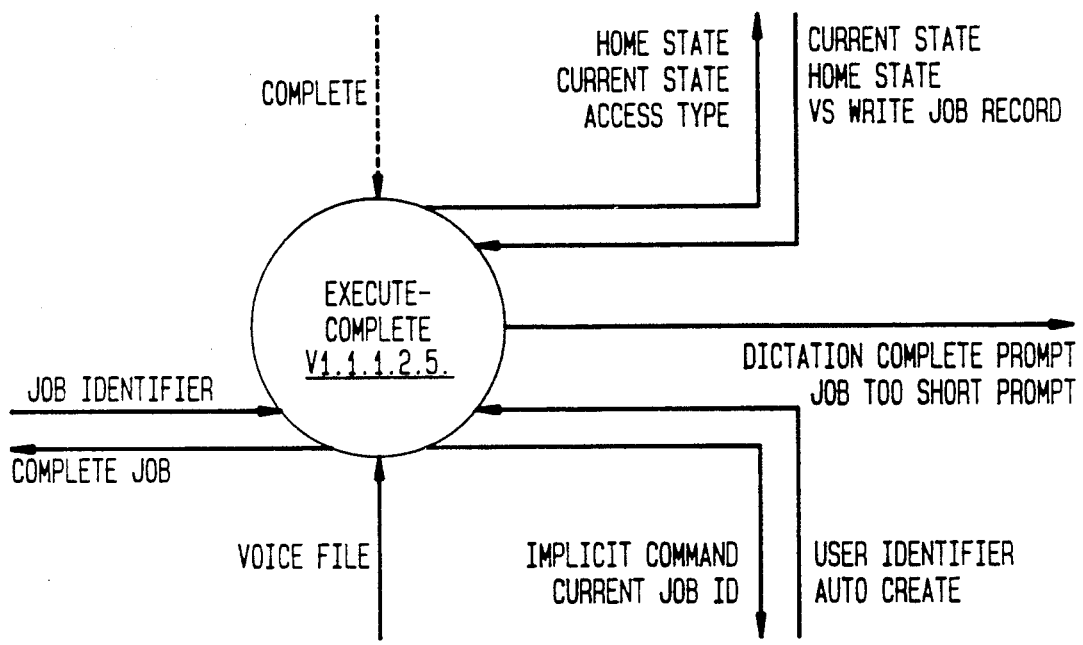

FIG. 38 shows executeComplete module V1.1.1.2.5 which is invoked by COMPLETE. Its outputs are: Home State, Current State, Access Type, Complete Job, Implicit Command, Current Job ID, Dictation Complete Prompt, and Job Too Short Prompt. Inputs are: Job Identifier, Voice File, User Identifier, Auto Create, Current State, Home State, and VS Write Job Record.

Figure 39:
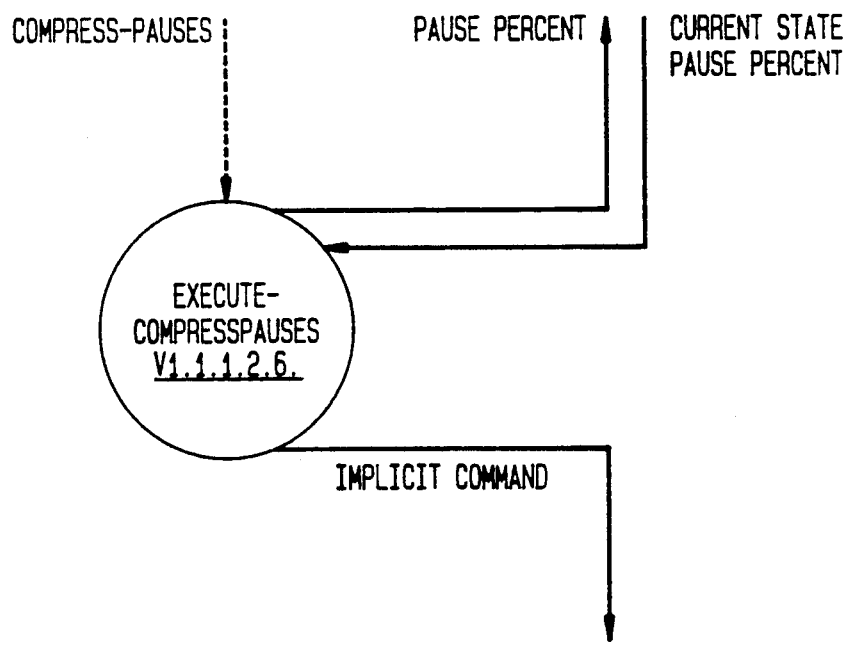

FIG. 39 Shows executeCompressPauses module V1.1.1.2.6 which is invoked by COMPRESS-PAUSES. Its outputs are Pause Percent and Implicit Command. Its inputs are Current State and Pause Percent.

Figure 40:
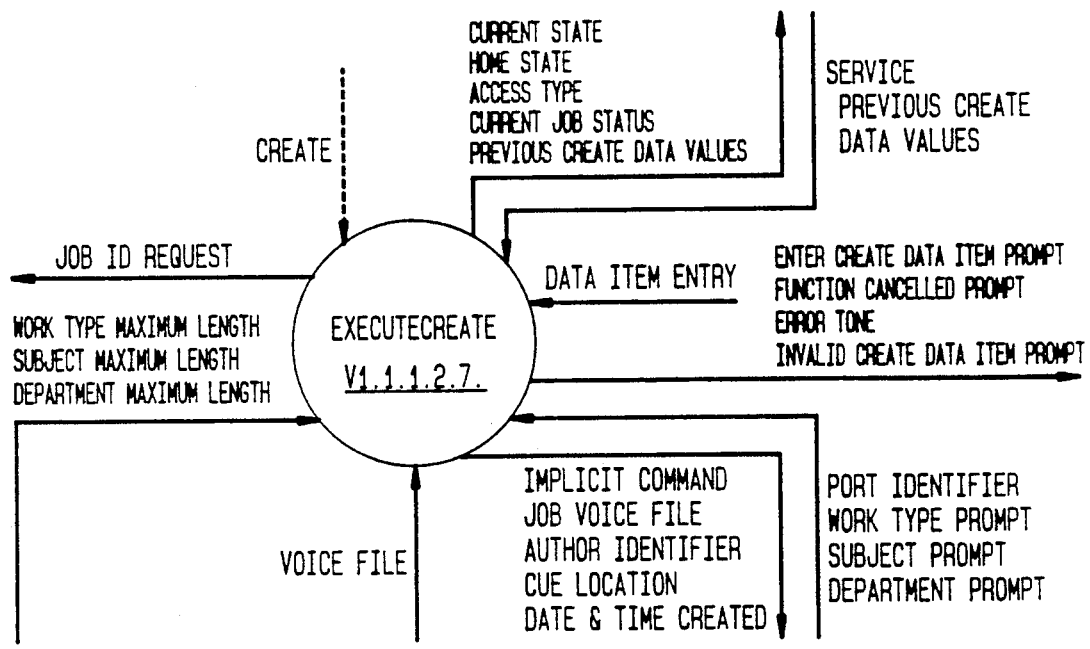

FIG. 40 shows executeCreate module V1.1.1.2.7 which is invoked by CREATE. Its outputs are: Current State, Home State, Access Type, Current Job Status, Previous Create Data Values, Job ID Request, Implicit Command, Job Voice File, Author Identifier, Que Location, Date and Time Created, Enter Create Data Item Prompt, Function Cancelled Prompt, ERROR TONE, and Invalid Create Data Item Prompt. Inputs are: Work Type Maximum Length, Subject Maximum Length, Department Maximum Length, Voice File, Port Identifier, Work Type Prompt, Subject Prompt, Department Prompt, Data Item Entry, Service, and Previous Create Data Values.

Figure 41:
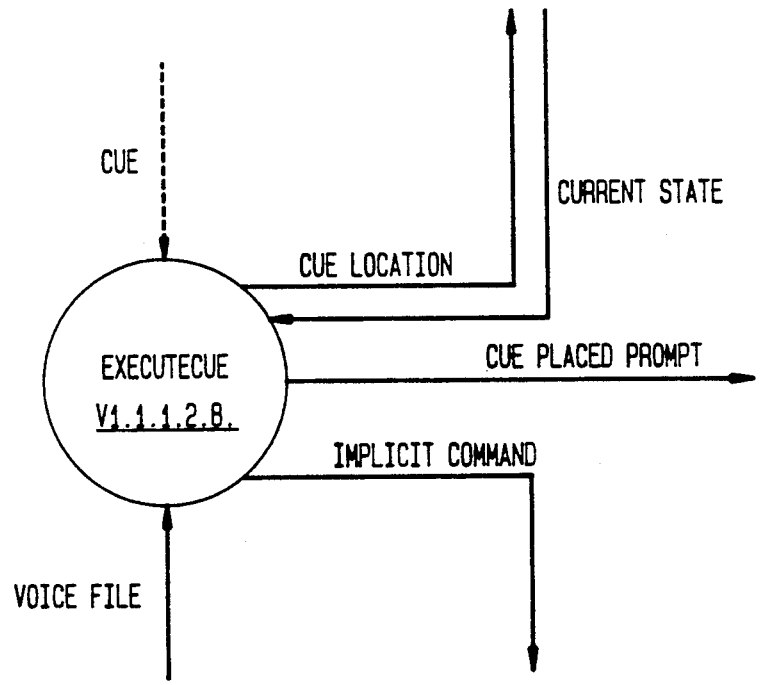

FIG. 41 shows executeCue module V1.1.1.2.8 which is invoked by CUE. Its outputs are: Cue Location, Implicit Command, and Cue Placed Prompt. Inputs are Voice File and Current State.

Figure 42:
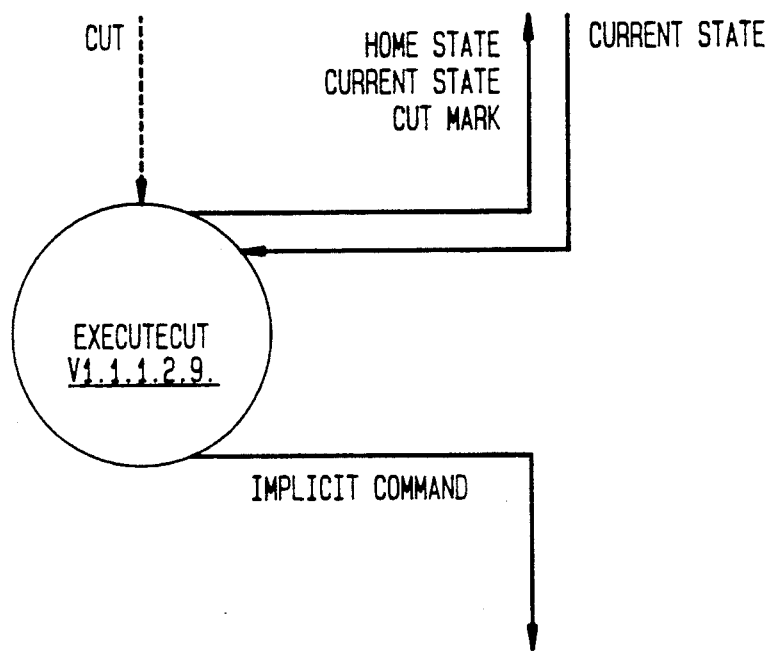

FIG. 42 shows executeCut module V1.1.1.2.9 which is invoked by CUT. Its outputs are Home State, Current State, Cut Mark, and Implicit Command. Its input is Current State.

Figure 43:
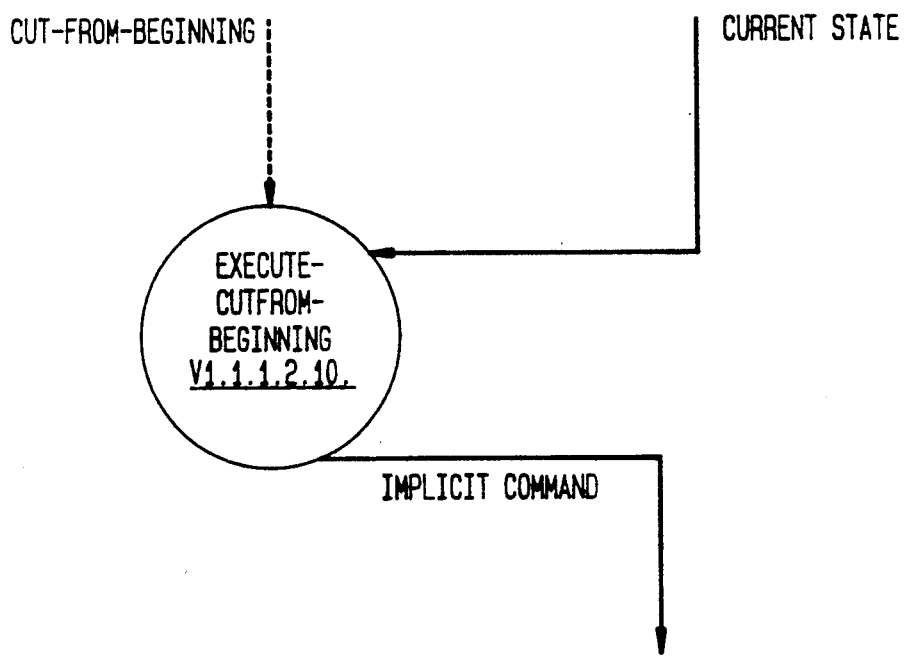

FIG. 43 shows executeCutFromBeginning module V1.1.1.2.10 which is invoked by CUT-FROM-BEGINNING. Its output is Implicit Command and its input is Current State.

Figure 44:
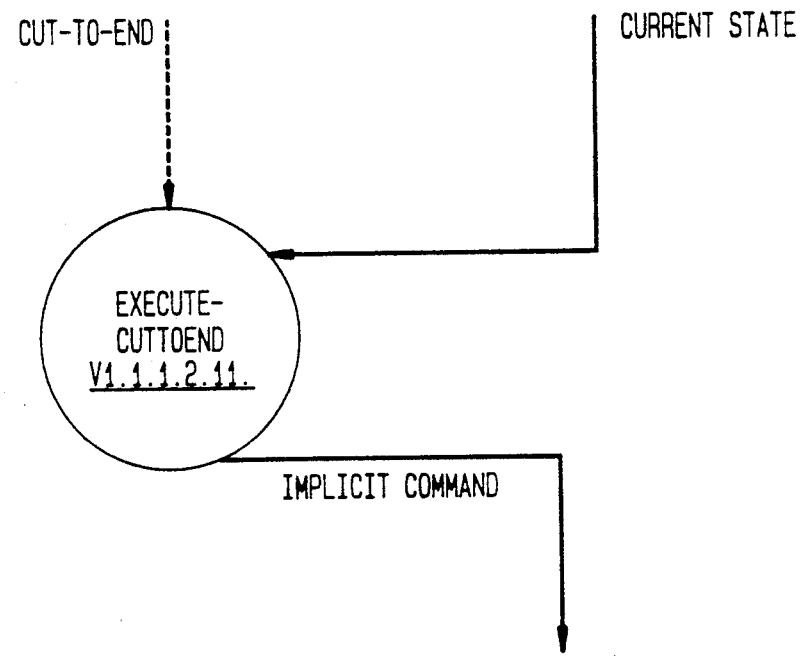

FIG. 44 shows executeCutToEnd module V1.1.1.2.11 which is invoked by CUT-TO-END. Its output is Implicit Command and its input is Current State.

Figure 45:
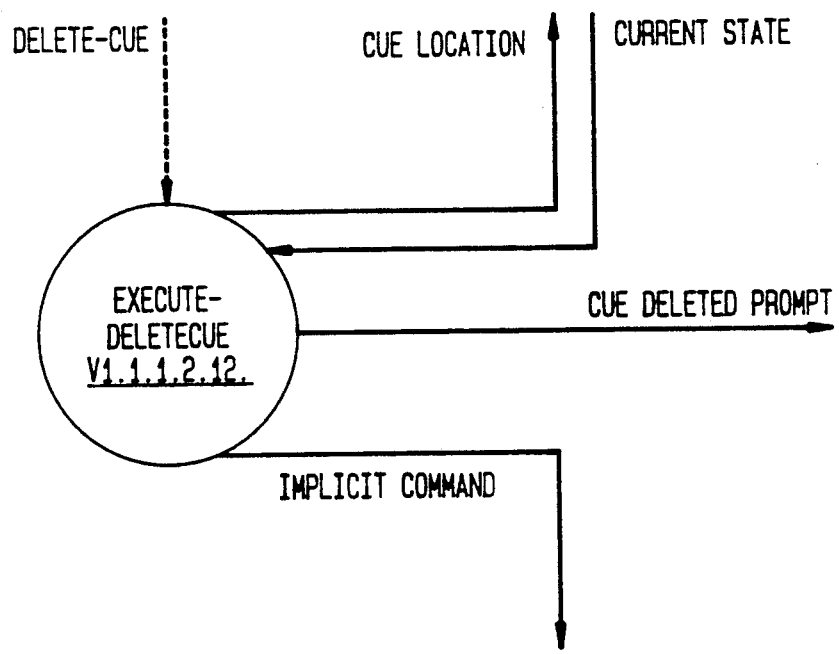

FIG. 45 Shows executeDeleteCue module V1.1.1.2.12 which is invoked by DELETE-CUE. Its outputs are: Cue Location, Implicit Command, and Cue Deleted Prompt. Its input is Current State.

Figure 46:
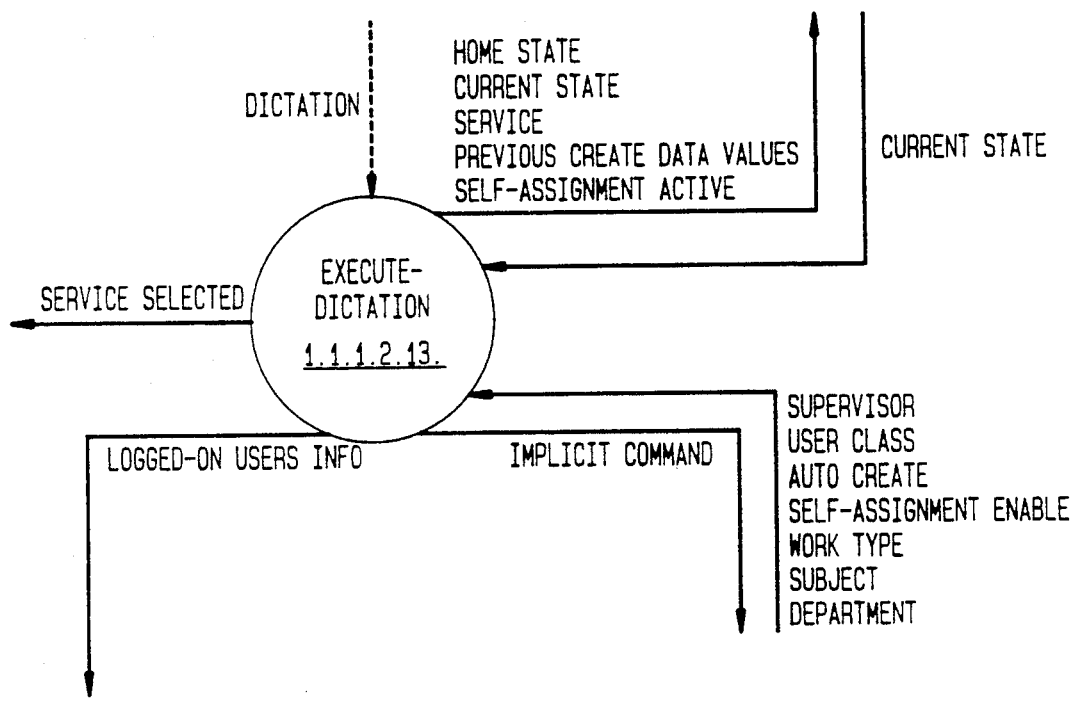

FIG. 46 shows executeDictation module V1.1.1.2.13 which is invoked by DICTATION. Its outputs are: Home State, Current State, Service, Previous Create Data Values, SelfAssignment Active, Service Selected, Logged On Users Info, and Implicit Command. Its inputs are: Supervisor, User Class, Auto Create, Self-Assignment Enable, Work Type, Subject, Department and Current State.

Figure 47:
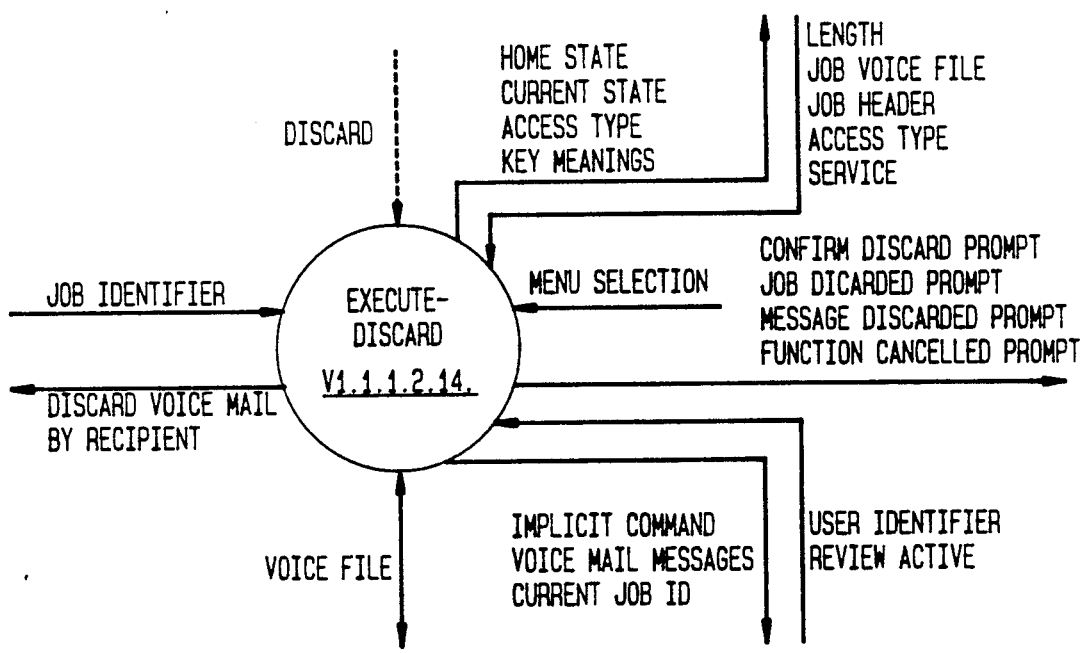

FIG. 47 shows executeDiscard module V1.1.1.2.14 which is invoked by DISCARD. Its outputs are: Home State, Current State, Access Type, Key Meanings, Discard Voice Mail By Recipient, Implicit Command, Voice Mail Messages, Current Job ID, Confirm Discard Prompt, Job Discarded Prompt, Message Discarded Prompt, Voice File, and Function Cancelled Prompt. Inputs are: Job Identifier, Voice File, User Identifier, Review Active, Menu Selection, Length, Job Voice File, Job Header, Access Type and Service.

Figure 48:
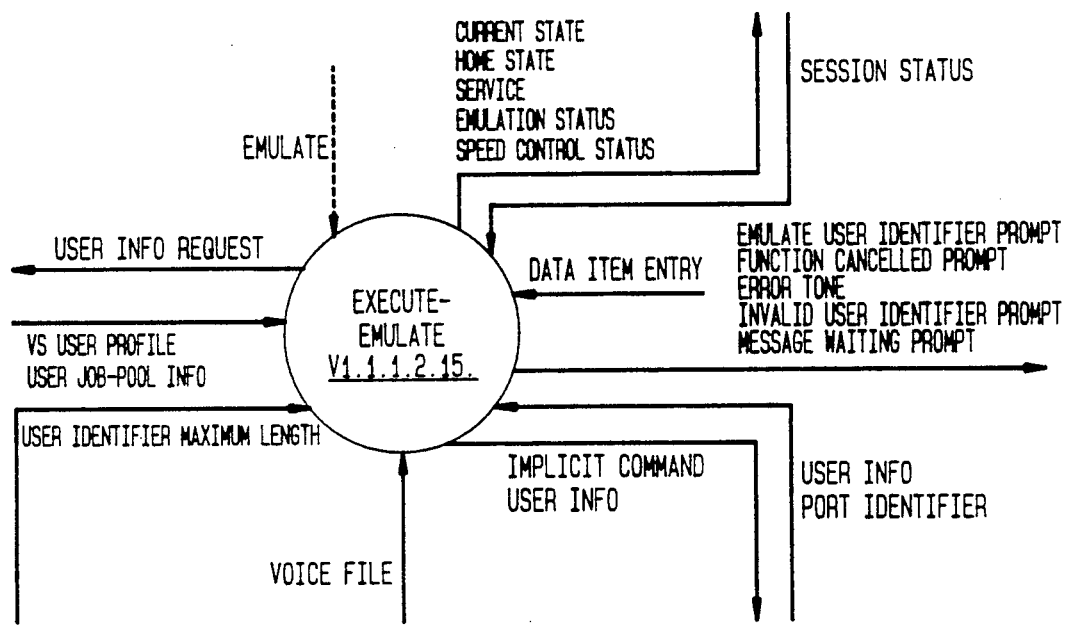

FIG. 48 shows executeEmulate module V1.1.1.2.15 which is invoked by EMULATE. Its outputs are: Current State, Home State, Service, Emulation Status, Speed Control Status, User Info Request, Implicit Command, User Info, Emulate User Identifier Prompt, Function Cancelled Prompt, ERROR TONE, Invalid User Identifier Prompt, and Message Waiting Prompt. Inputs are: DS User Profile, User Job Pool Info, User Identifier Maximum Length, Voice File, User Info, Port Identifier, Data Item Entry, and Session Status.

Figure 49:
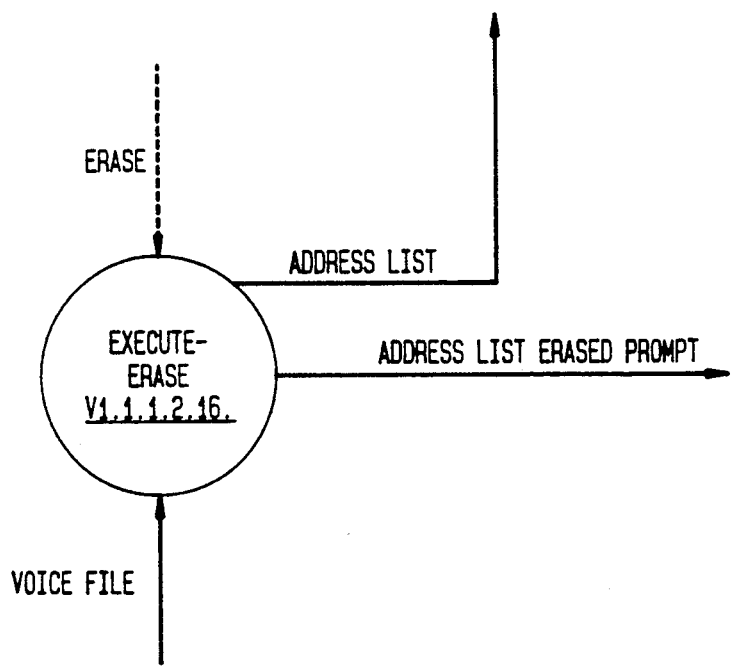

FIG. 49 shows executeErase module V1.1.1.2.16 which is invoked by ERASE. Its outputs are Address List and Address List Erased Prompt. Its input is Voice File.

Figure 50:
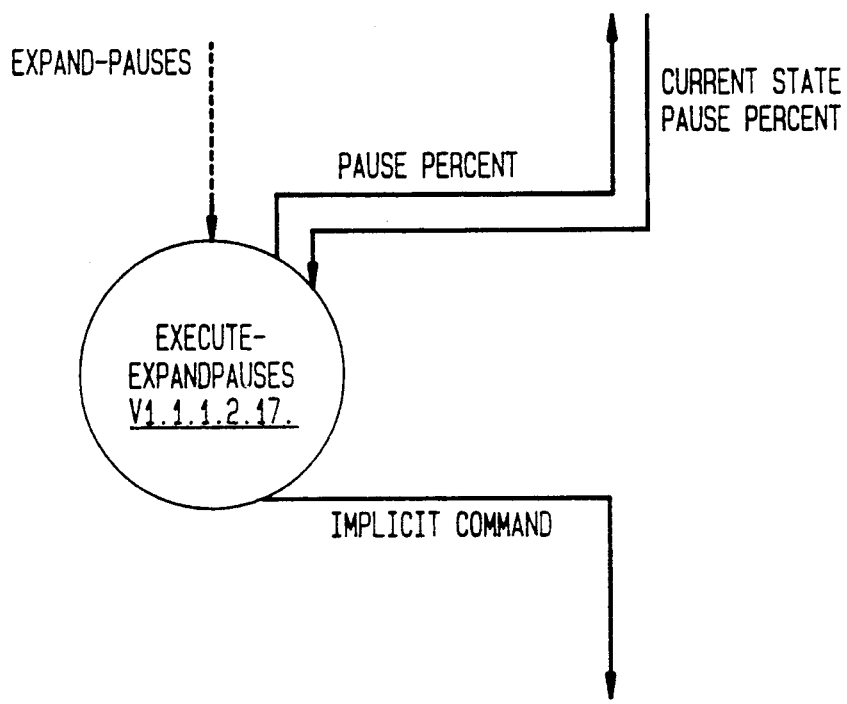

FIG. 50 shows executeExpand Pauses module V1.1.1.2.17 which is invoked by EXPAND PAUSES. Its outputs are Pause Percent and Implicit Command. Its inputs are Current State and Pause Percent.

Figure 51:
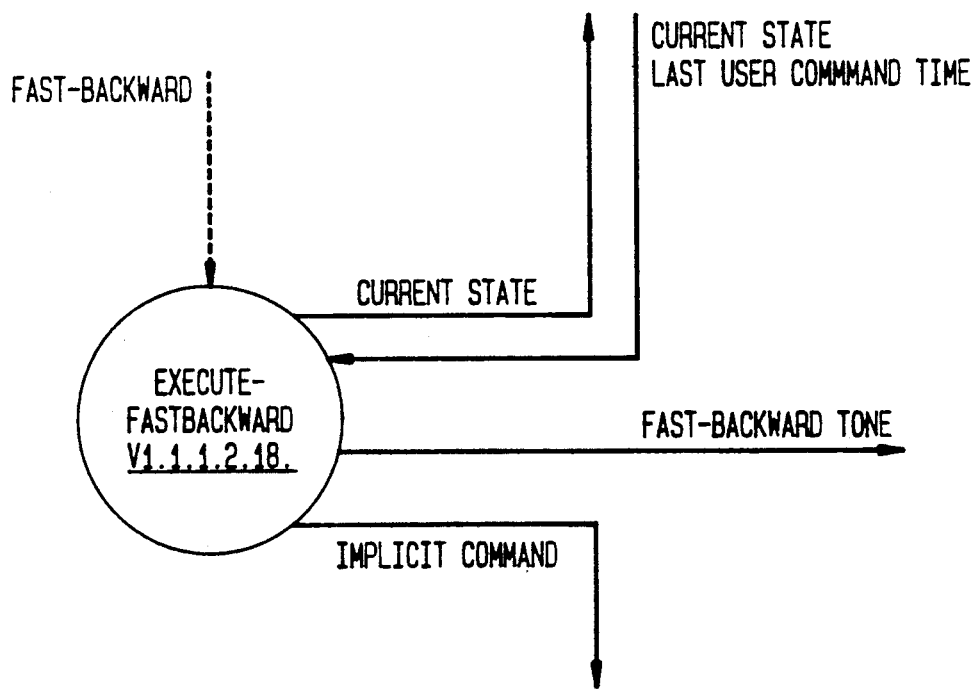

FIG. 51 shows executeFastBackward module V1.1.1.2.18 which is invoked by FAST-BACKWARD. Its outputs are Current State, Implicit Command and FAST-BACKWARD TONE. Its inputs are Current State and Last User Command Time.

Figure 52:
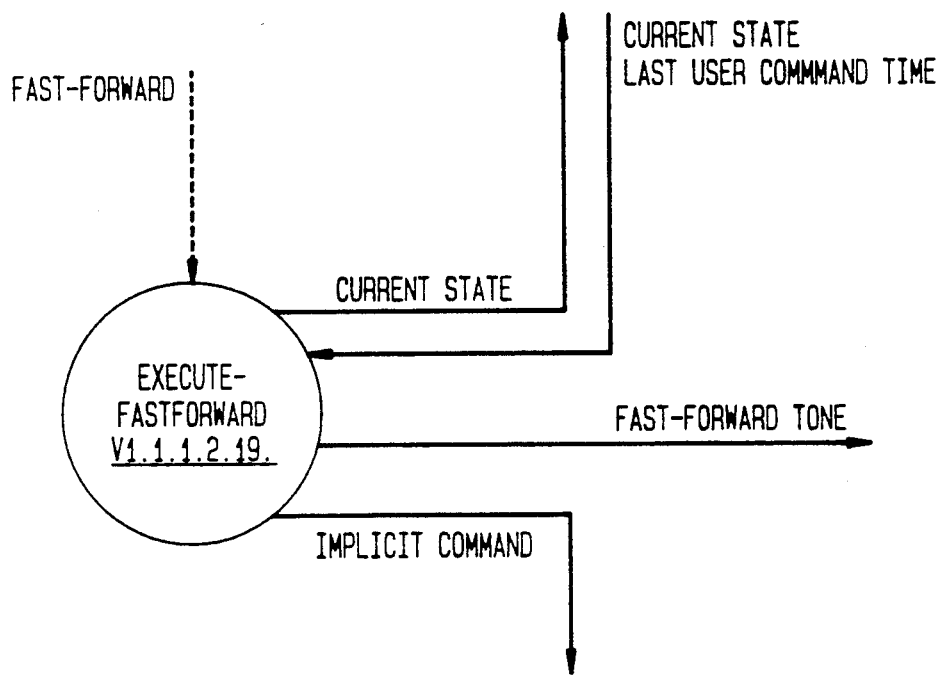

FIG. 52 shows executeFast Forward module V1.1.1.2.19 which is invoked by FAST-FORWARD. Its outputs are Current State, Implicit Command and FAST-FORWARD TONE. Its inputs are Current State and Last User Command Time.

Figure 53:
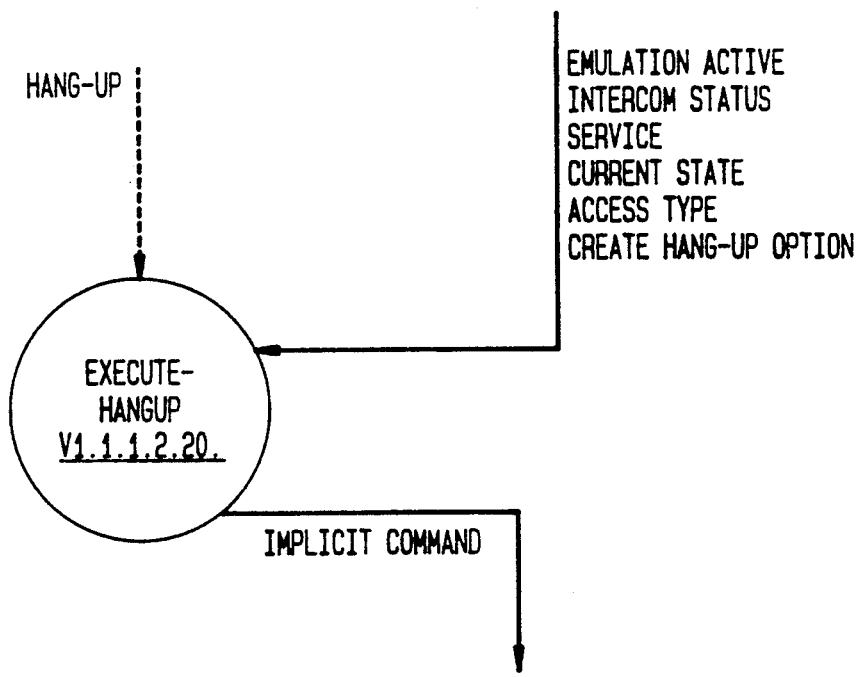

FIG. 53 shows executeHangUp module V1.1.1.2.20 which is invoked by HANG-UP. Its output is Implicit Command. Its inputs are: Emulation Active, Intercom Status, Service, Current State, Access Type, and Create Hand-Up Option.

Figure 54:
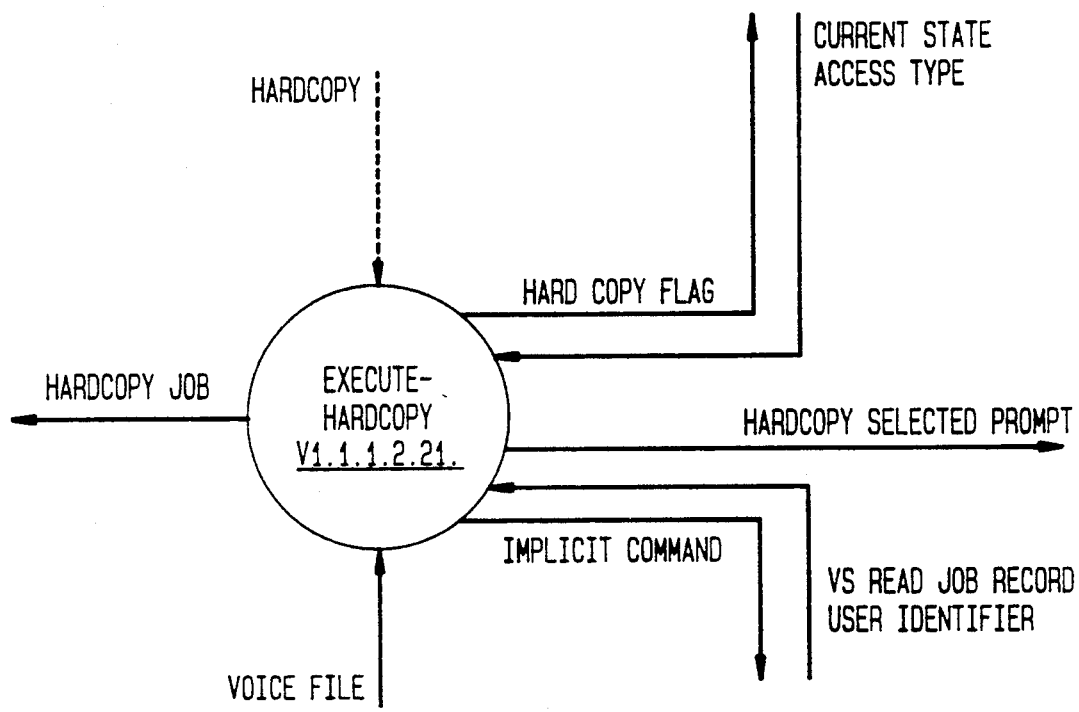

FIG. 54 shows executeHardcopy module V1.1.1.2.21 which is invoked by HARDCOPY. Its outputs are: Hardcopy Flag, Hardcopy Job, Implicit Command and Hardcopy Selected Prompt. Inputs are: Voice File, VS Read Job Record, User Identifier, Current State, and Access Type.

Figure 55:
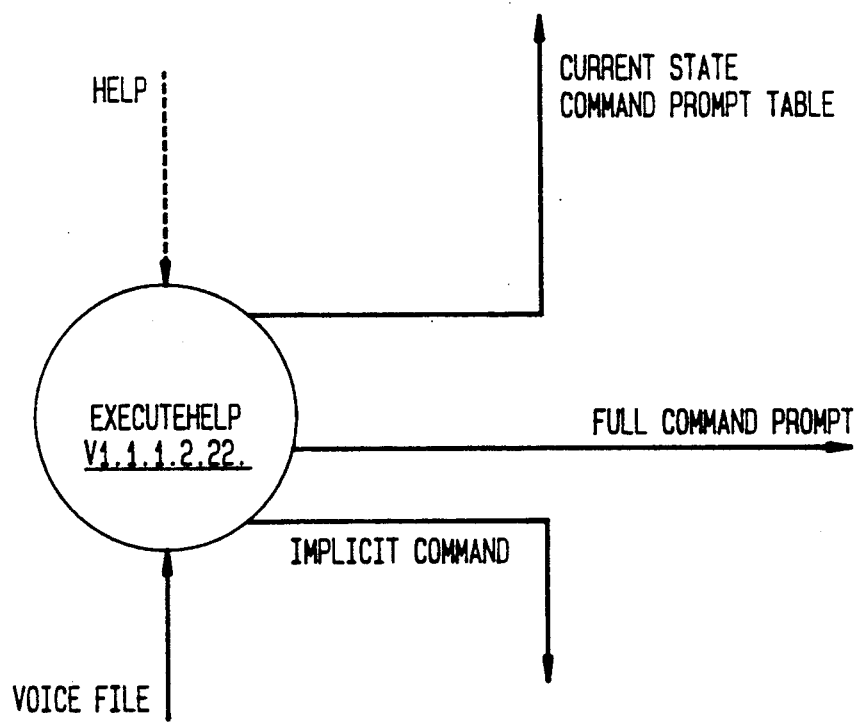

FIG. 55 shows executeHelp module V1.1.1.2.22 which is invoked by HELP. Its outputs are Full Command Prompt and Implicit Command. Its inputs are Current State, Command Prompt Table and Voice File.

Figure 56:
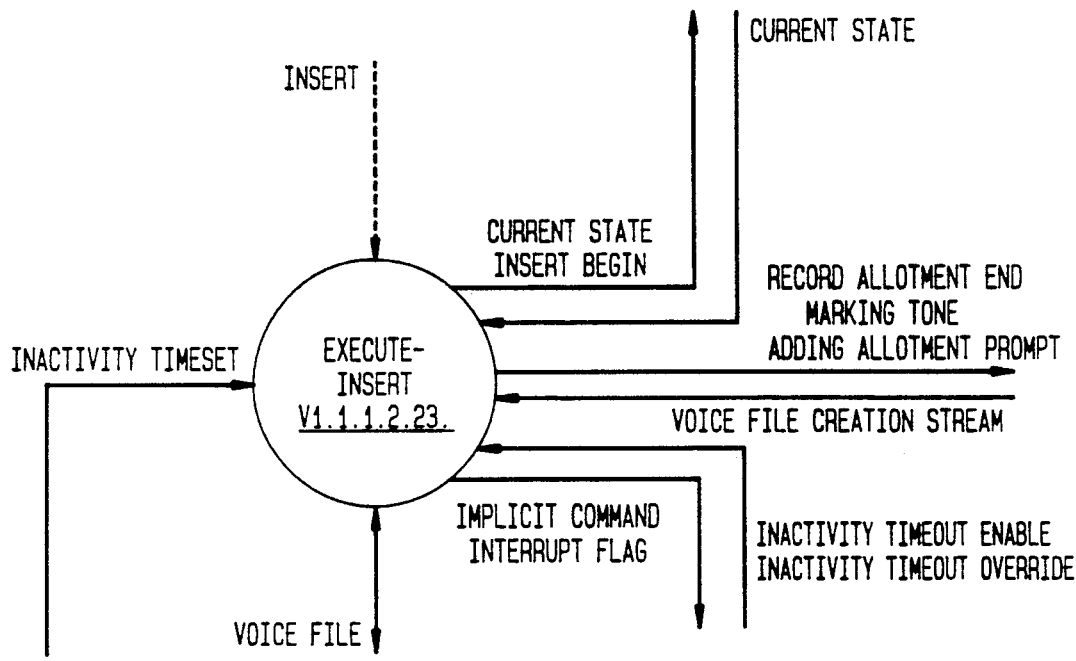

FIG. 56 shows executeInsert module V1.1.1.2.23 which is invoked by INSERT. Its outputs are: Current State, Insert Begin, Voice File, Implicit Command, Interrupt Flag, RECORD ALLOTMENT AND WARNING TONE, and Adding Allotment Prompt. Its inputs are: Inactivity Timeout, Voice File, Inactivity Timout Enable, Inactivity Timout Override, Voice File Creation Stream, and Current State.

Figure 57:
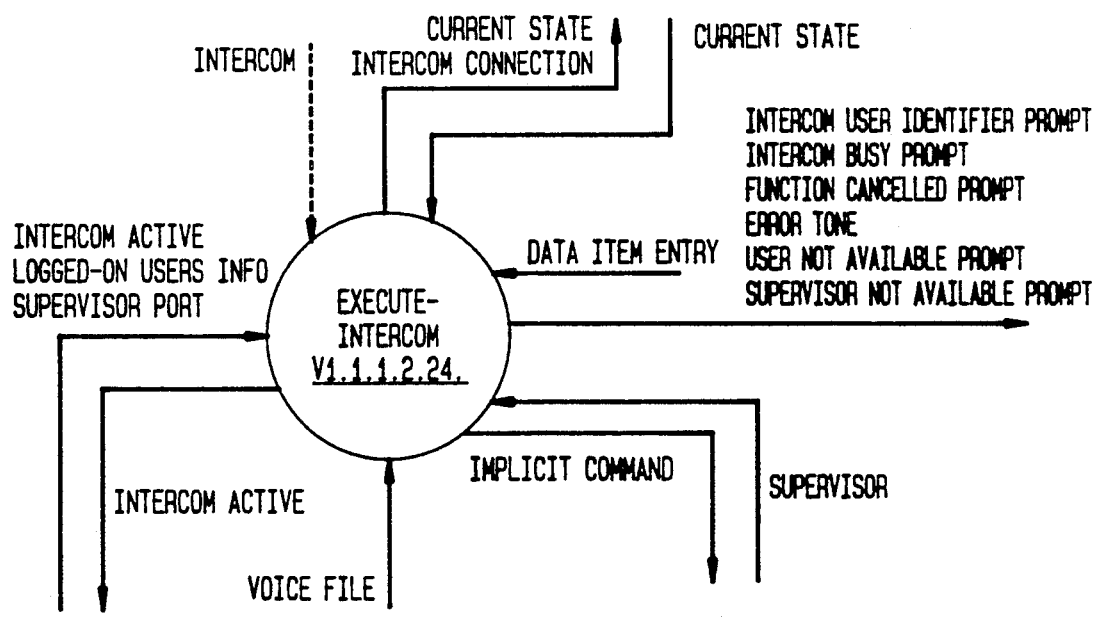

FIG. 57 shows executeIntercom module V1.1.1.2.24 which is invoked by INTERCOM. Its outputs are Current State, Intercom Connection, Intercom Active, Implicit Command, Intercome User Identifier Prompt, Intercom Busy Prompt, Function Cancel Prompt, ERROR TONE, User Not Available Prompt, and Supervisor Not Available Prompt. Its inputs are: Intercome Active, Logged On Users Info, Supervisor Port, Voice File, Supervisor, Data Item Entry, and Current State.

Figure 58:
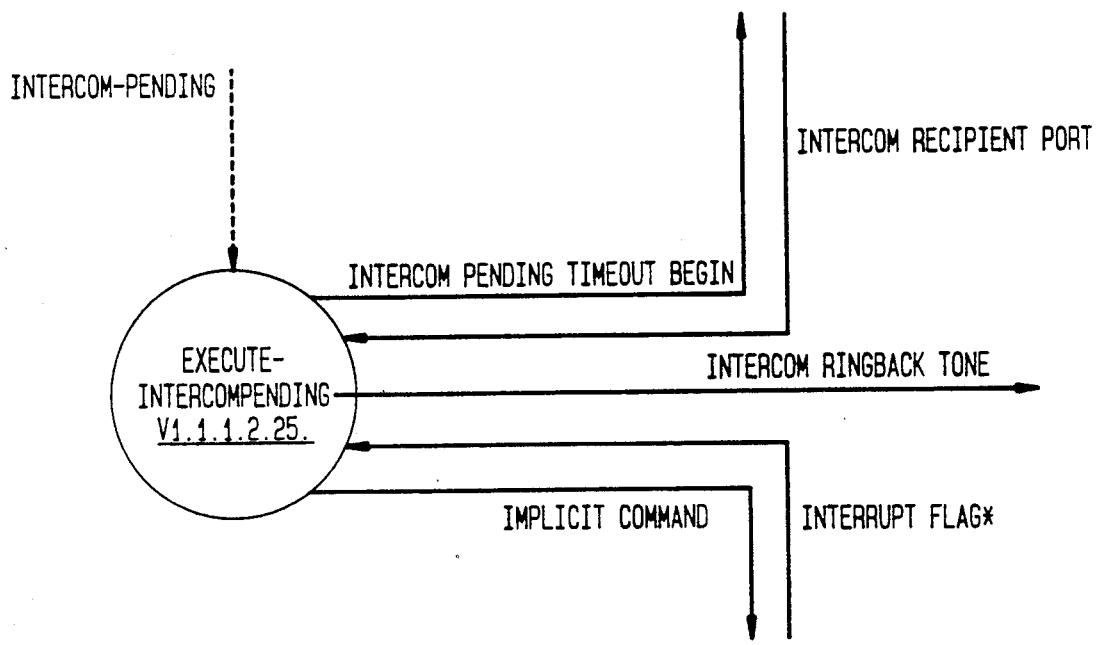

FIG. 58 shows executeIntercomPending module V1.1.1.2.25 which is invoked by INTERCOM-PENDING. Its outputs are: Intercom Pending, Timeout Begin, Implicit Command*, INTERCOM RINGBACK TONE. Its inputs are: Interrupt Flag* and Intercom Recipient Port. (*In user session of another user)

Figure 59:
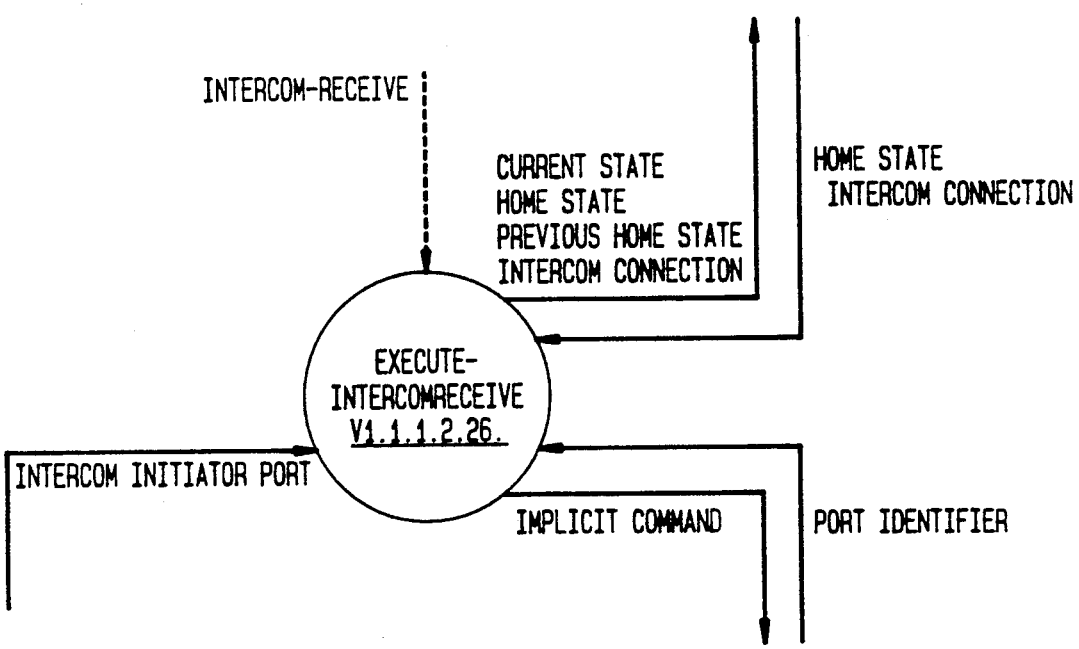

FIG. 59 shows executeIntercomReceive module V1.1.1.2.26 which is invoked by INTERCOM-RECEIVE. Its outputs are: Current State, Home State, Previous Home State, Intercom Connection, and Implicit Command*. Its inputs are: Intercom Initiator Port, Port Identifier, Home State and Intercom Connection. (*In user session of another user)

Figure 60:
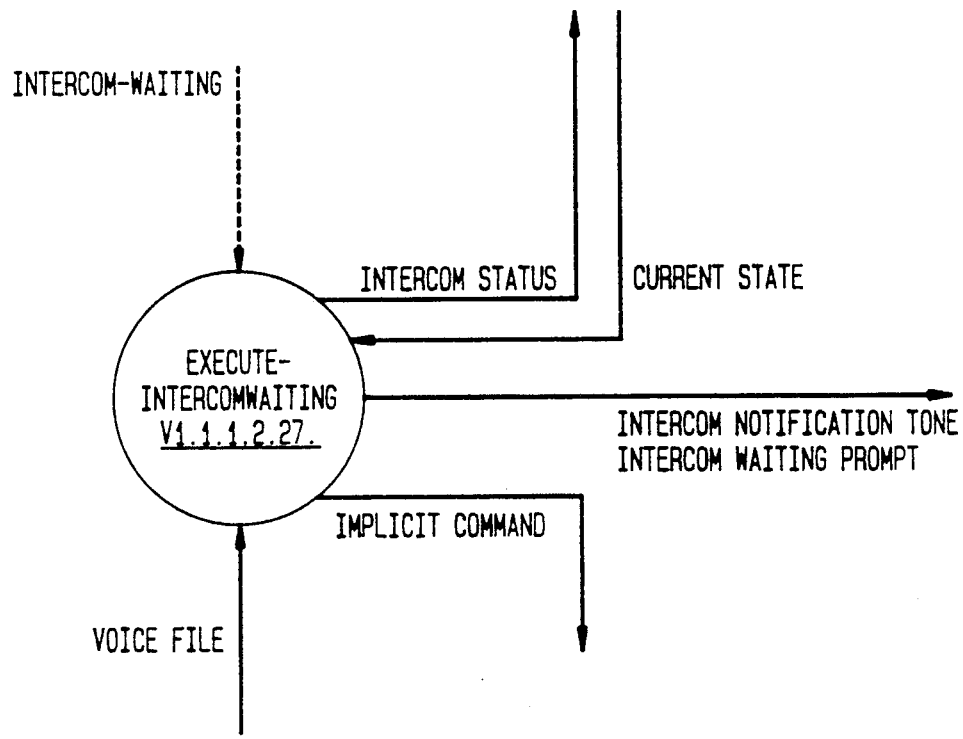

FIG. 60 shows executeIntercomWaiting module V1.1.1.2.27 which is invoked by INTERCOM-WAITING. Its outputs are: Intercom Status, Implicit Command, INTERCOM NOTIFICATION TONE, and Intercom Waiting Prompt. Its inputs are Current State and Voice File.

Figure 61:
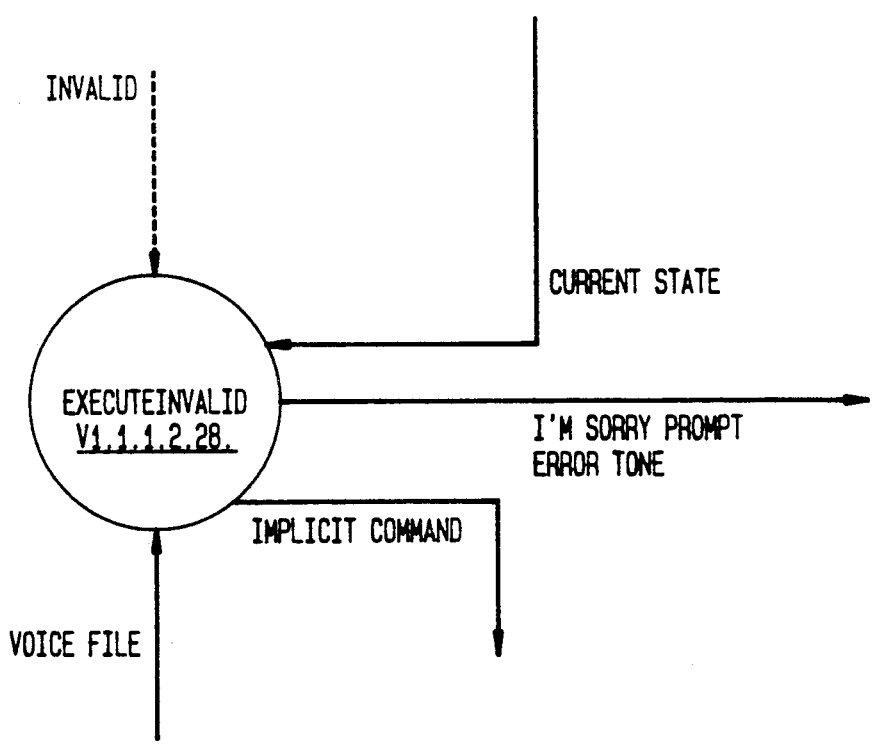

FIG. 61 shows executeInvalid module V1.1.1.2.28 which is invoked by INVALID. Its outputs are Implicit Command, I'm Sorry Prompt, and ERROR TONE. Its inputs are Current State and Voice File.

Figure 62:
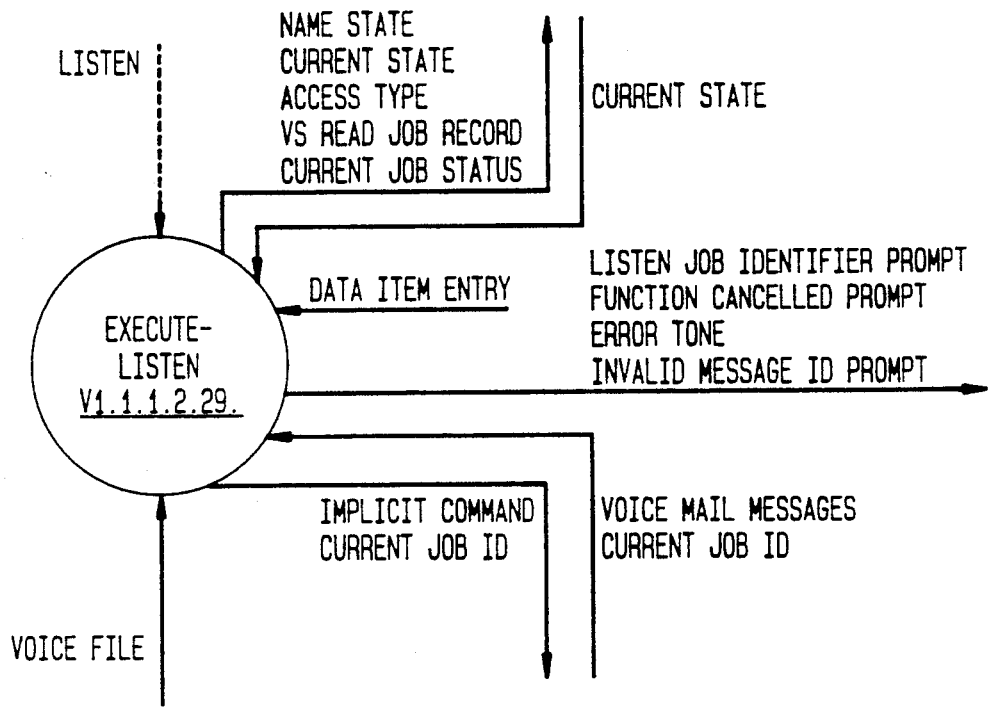

FIG. 62 shows executeListen module V1.1.1.2.29 which is invoked by LISTEN. Its outputs are: Home State, Current State, Access Type, VS Read Job Record, Current Job Status, Implicit Command, Current Job ID, Listen Job Identifier Prompt, Function Cancelled Prompt, ERROR TONE and Invalid Message ID Prompt. Its inputs are: Voice File, Voice Mail Messages, Current Job ID, Data Item Entry and Current State.

Figure 63:
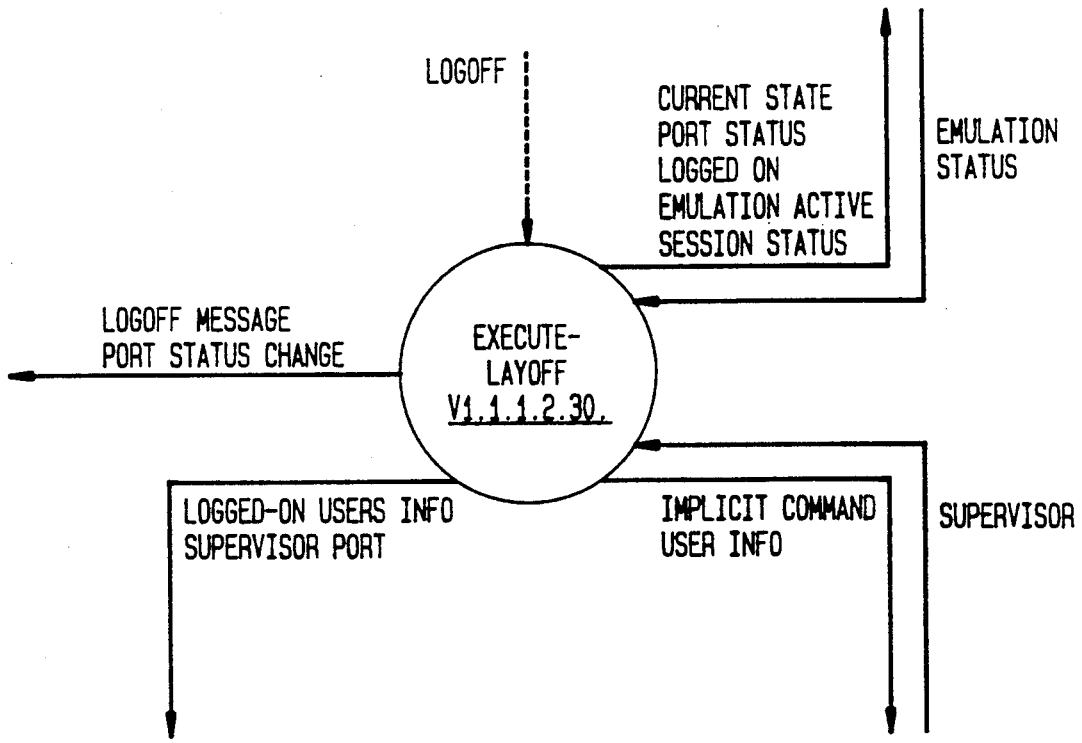

FIG. 63 shows executelog-off module V1.1.1.2.30 which is invoked by log-off. Its outputs are: Current State, Port Status, Logged On, Emulation Active, Session Status, log-off Message, Port Status Change, Logged On User Info, Supervisor Port, Implicit Command, and User Info. Its inputs are Supervisor and Emulation Status.

Figure 64:
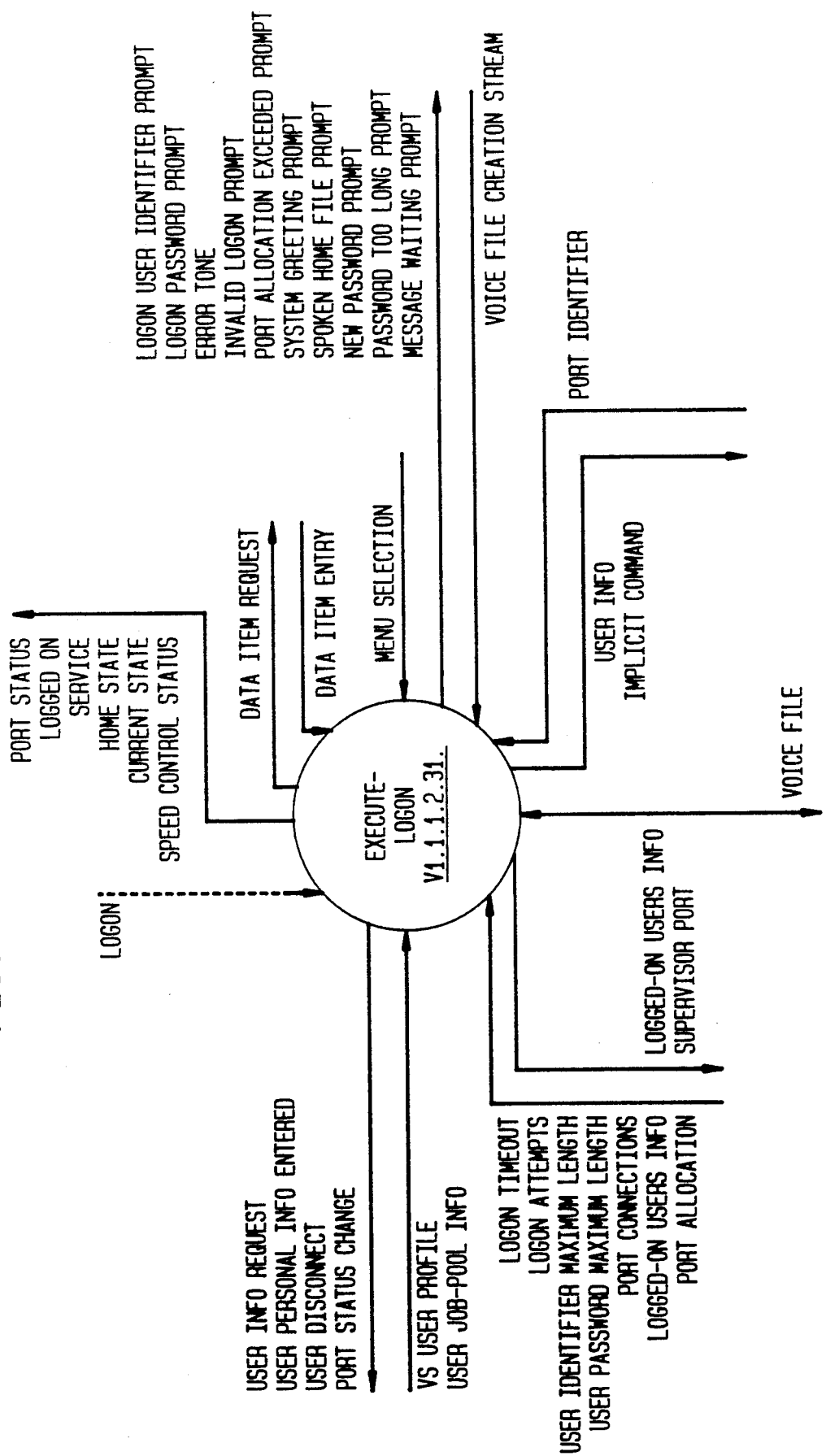

FIG. 64 shows executeLog-on module V1.1.1.2.31 which is invoked by LOG-ON. Its outputs are: Port Status, Logged On, Service, Home State, Current State, Speed Control Status, User Info Request, User Personal Info Entered, User Disconnect, Port Status Change, Logged On Users Info, Supervisor Port, Voice File, User Info, Implicit Command, Log On User Identifier Prompt, Log On Password Prompt, ERROR TONE, Invalid Log On Prompt, Port Allocation Exceeded Prompt, System Greeting Prompt, Spoken Name File Prompt, New Password Prompt, Password Too Long Prompt, Message Waiting Prompt, and Data Item Request. Its inputs are: VS User Profile, User Job Pool Info, Log On Timeout, Log On Attempts, User Identifier Maximum Length, User Password Maximum Length, Port Connections, Logged On Users Info, Port Allocation, Voice File, Port Identifier, Voice File Creation Stream, Menu Selection, and Data Item Entry.

Figure 65:
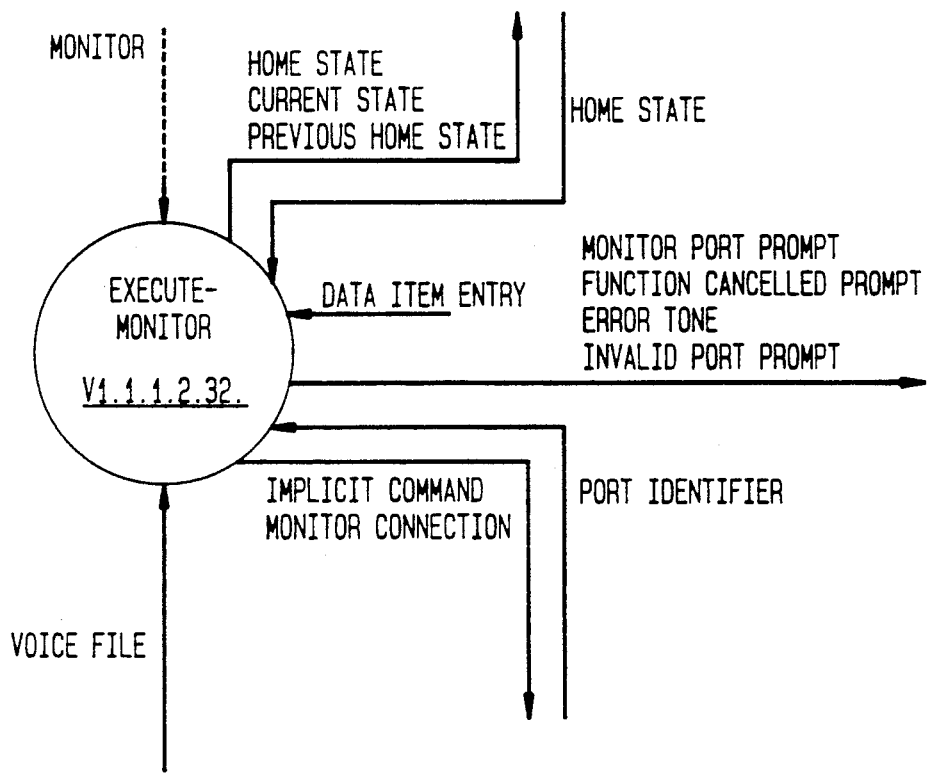

FIG. 65 shows executeMonitor module V1.1.1.2.32 which is invoked by MONITOR. Its outputs are: Home State, Current State, Previous Home State, Implicit Command, Monitor Connection, Monitor Port Prompt, Function Cancelled Prompt, ERROR TONE, and Invalid Port Prompt. Its inputs are: Home State, Voice File, Port Identifier, and Data Item Entry.

Figure 66:
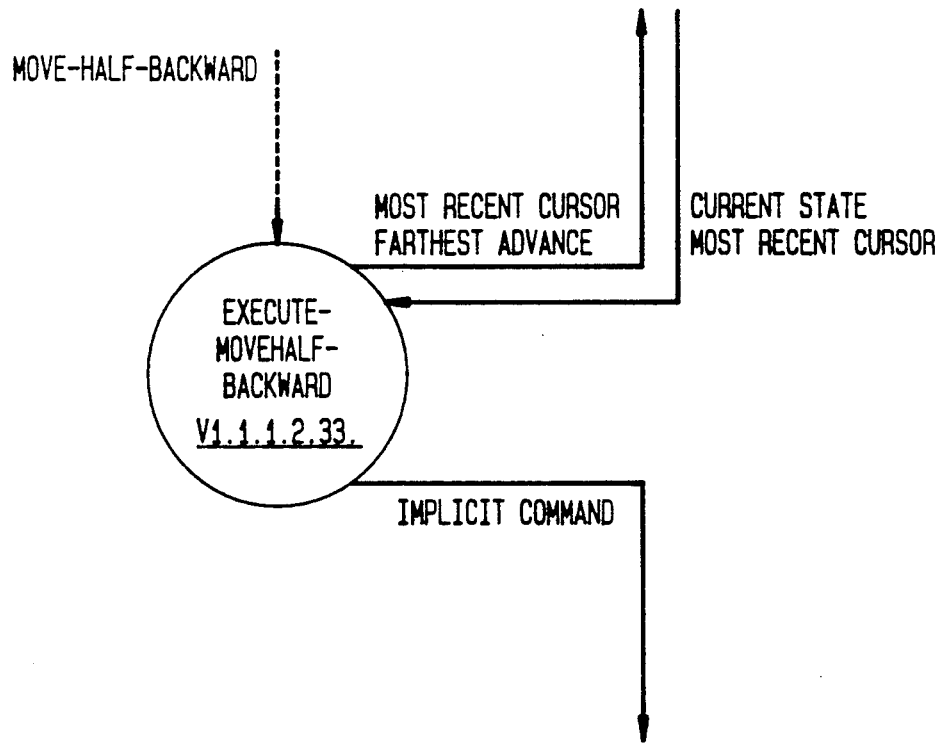

FIG. 66 shows executeMoveHalfBackward module V1.1.1.2.33 which is invoked by MOVE-HALF BACKWARD. Its outputs are Most Recent Cursor, Farthest Advance, and Implicit Command. Its inputs are Current State and Most Recent Cursor.

Figure 67:
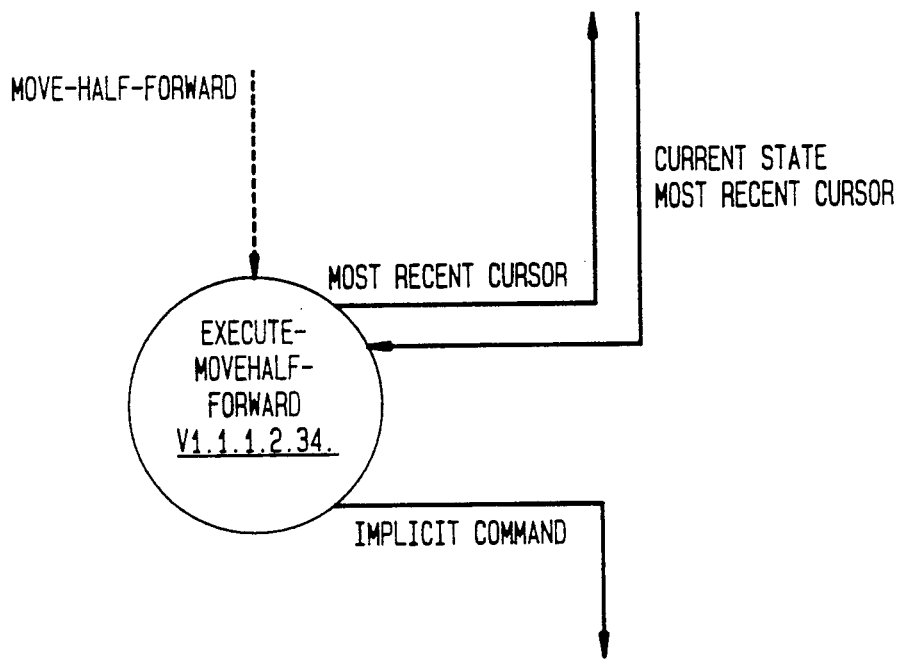

FIG. 67 shows executeMoveHalfForward module V1.1.1.2.34 which is invoked by MOVE-HALF-FORWARD. Its outputs are Most Recent Cursor and Implicit Command. Its inputs are Current State and Most Recent Cursor.

Figure 68:
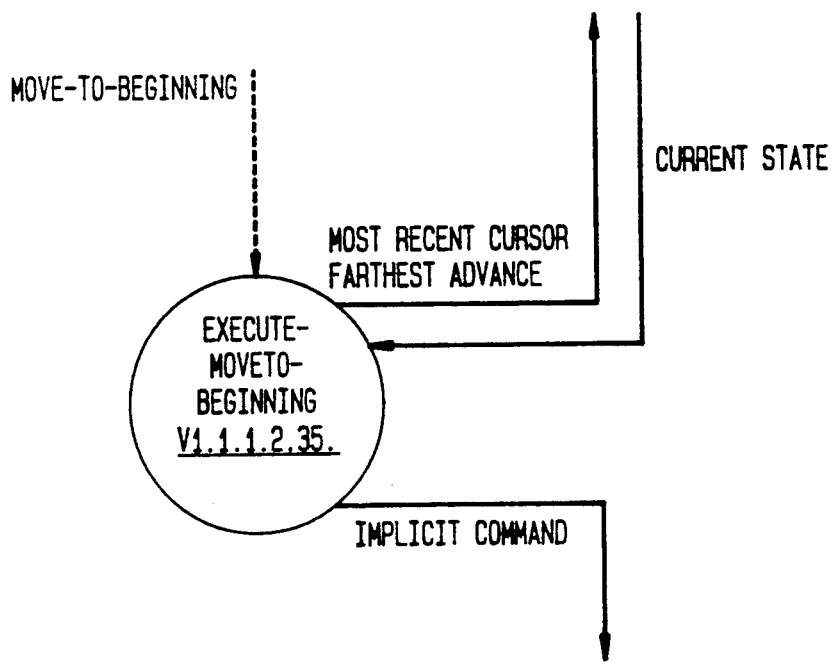

FIG. 68 shows executeMoveToBeginning module V1.1.1.2.35 which is invoked by MOVE-TO-BEGINNING. Its outputs are Most Recent Cursor, Furthest Advance, and Implicit Command. Its inputs is Current State.

Figure 69:
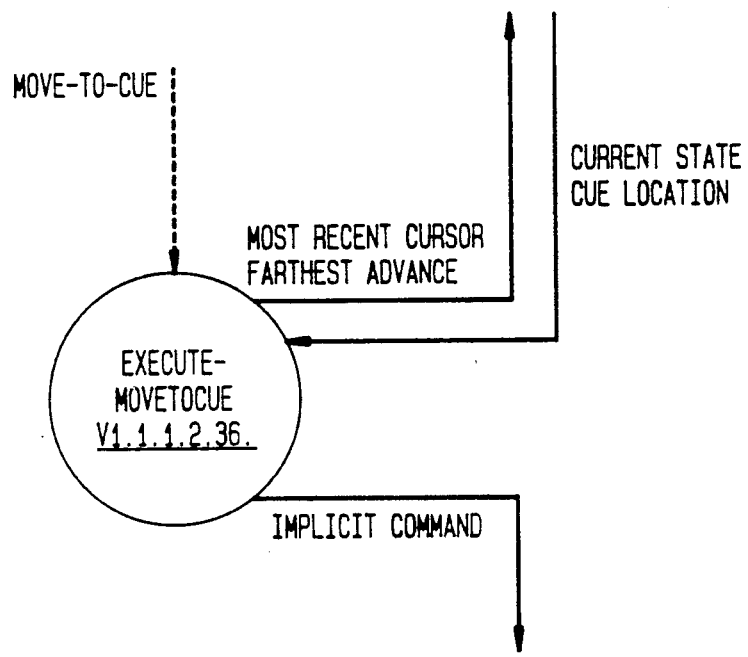

FIG. 69 shows executeMoveToCue module V1.1.1.2.36 which is invoked by MOVE-TO-CUE. Its outputs are Most Recent Cursor, Farthest Advance and Implicit Command. Its inputs are Current State and Cue Location.

Figure 70:
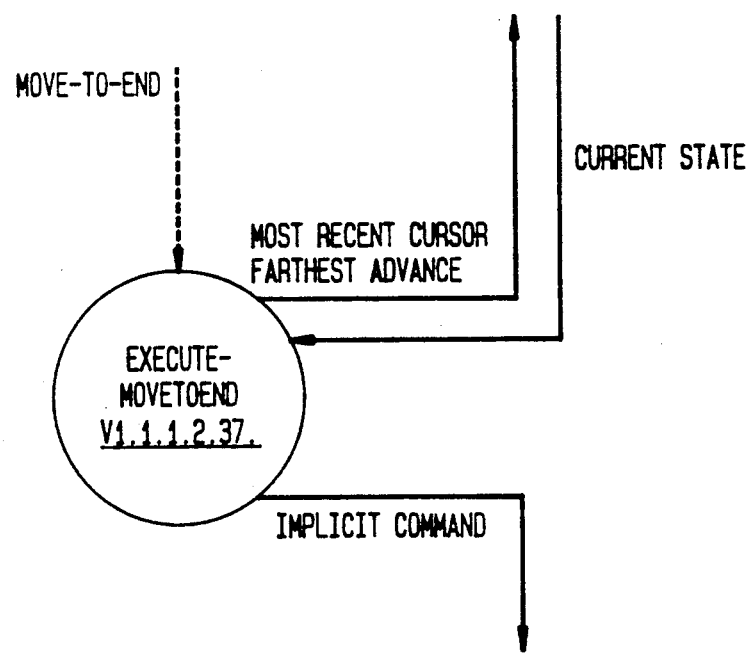

FIG. 70 shows executeMoveToEnd module V1.1.1.2.37 which is invoked by MOVE-TO-END. Its outputs are Most Recent Cursor, Farthest Advance, and Implicit Command. Its input is Current State.

Figure 71:
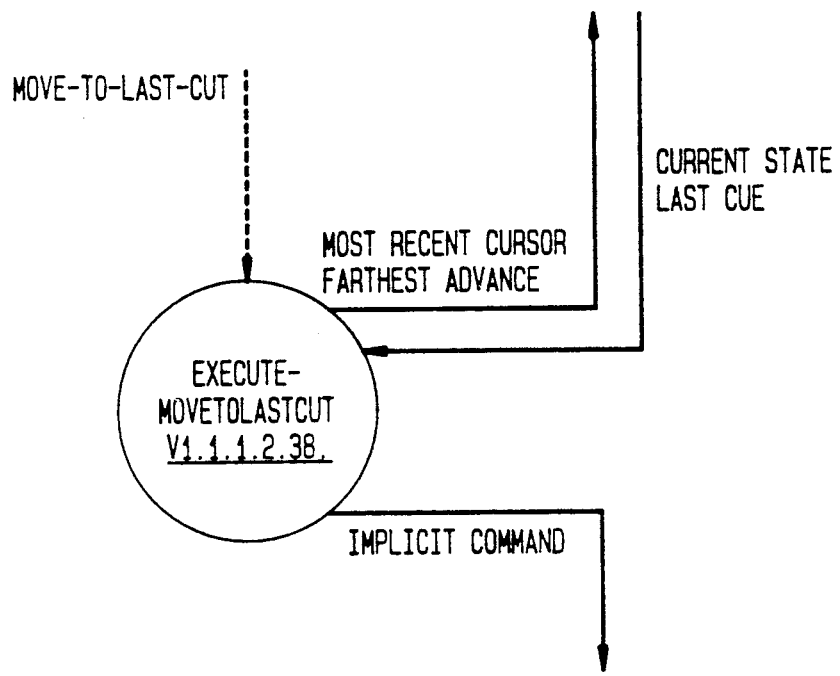

FIG. 71 shows executeMoveToLastCut module V1.1.1.2.38 which is invoked by MOVE-TO-LAST-CUT. Its outputs are Most Recent Cursor, Farthest Advance and Implicit Command. Its inputs are Current State and Last Cut.

Figure 72:
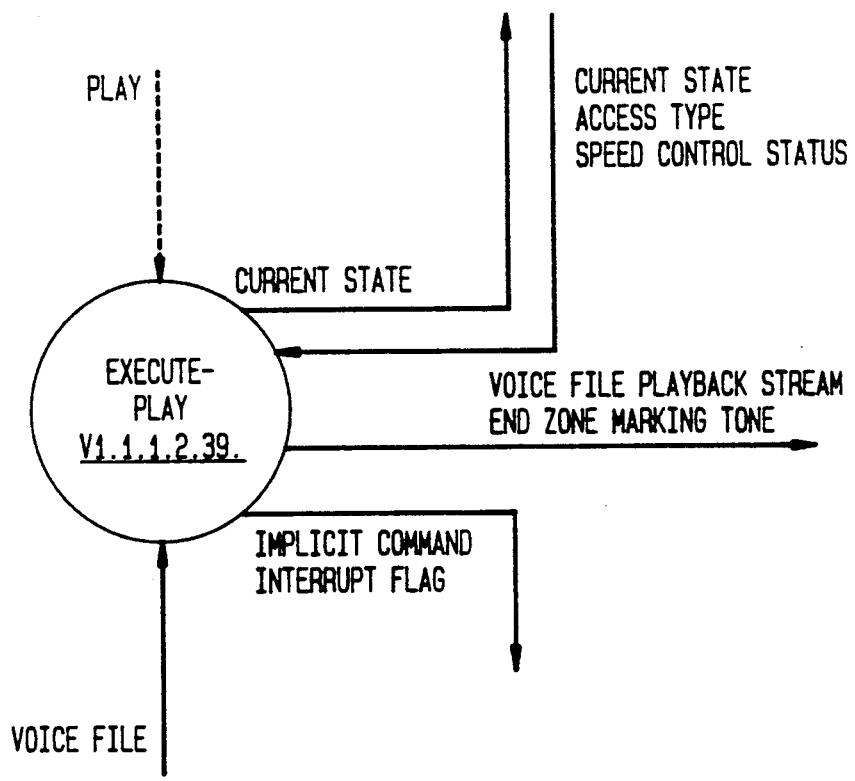

FIG. 72 shows executePlay module V1.1.1.2.39 which is invoked by PLAY. Its outputs are Current State, Implicit Command, Interrupt Flag, Voice File Playback Stream, and End Zone Warning Tone. Its inputs are Current State, Access Type, Speed Control Status, and Voice File.

Figure 73:
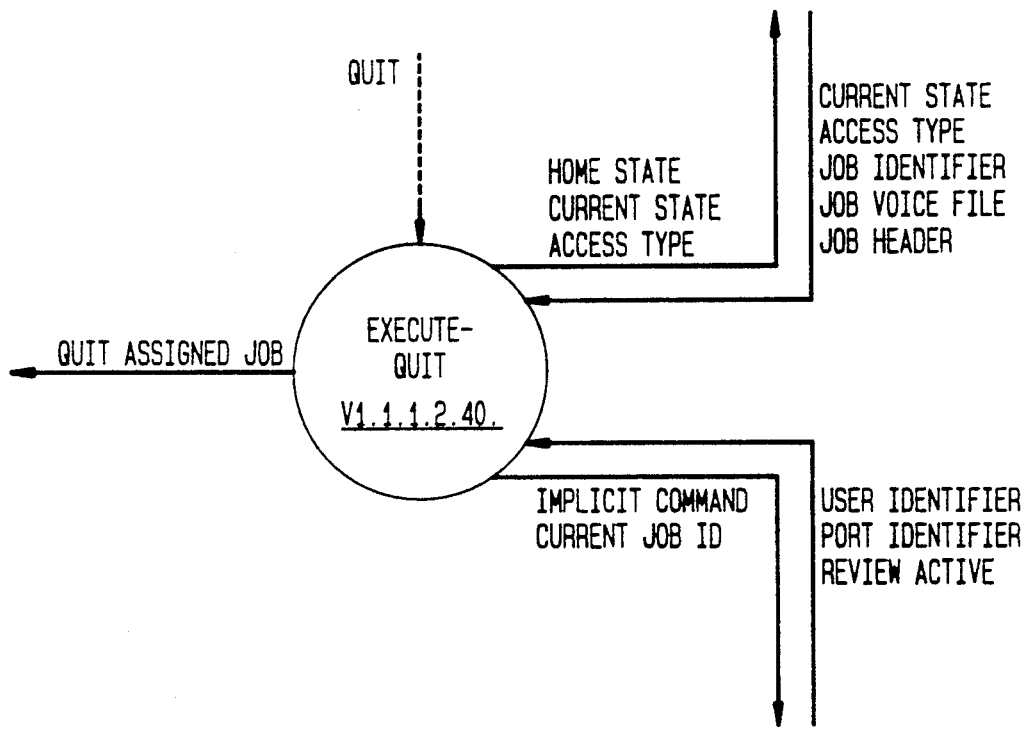

FIG. 73 shows executeQuit module V1.1.1.2.40 which is invoked by QUIT. Its outputs are: Home State, Current State, Access Type, Quit Assigned Job, Implicit Command, and Current Job ID. Its inputs are: Current State, Access Type, Job Identifier, Job Voice File, Job Header, User Identifier, Port Identifier, and Review Active.

Figure 74:
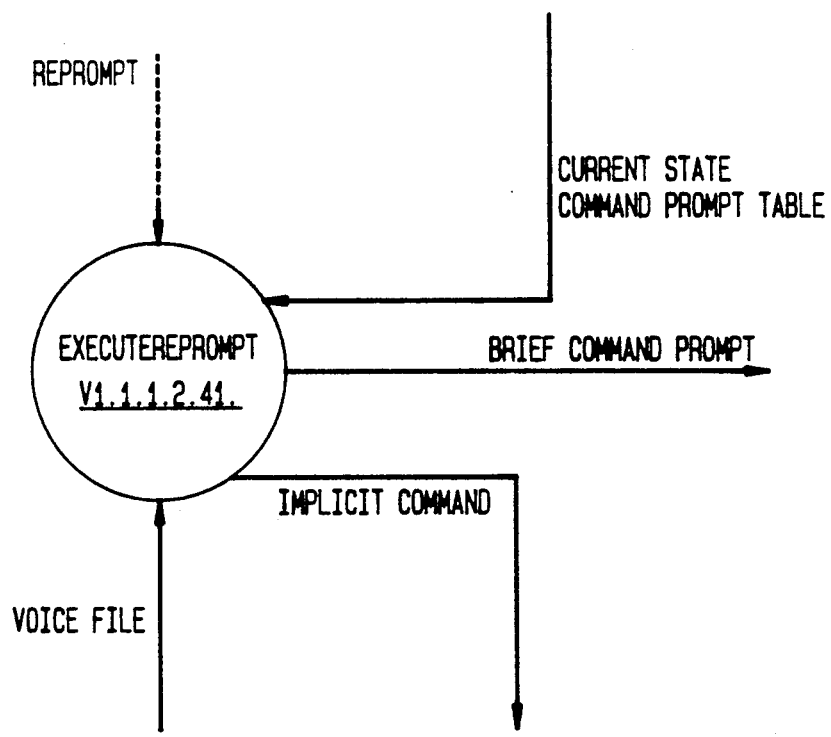

FIG. 74 shows executeReprompt module V1.1.1.2.41 which is invoked by REPROMPT. Its outputs are Implicit Command and Brief Command Prompt. Its inputs are Current State, Command Prompt Table, and Voice File.

Figure 75:
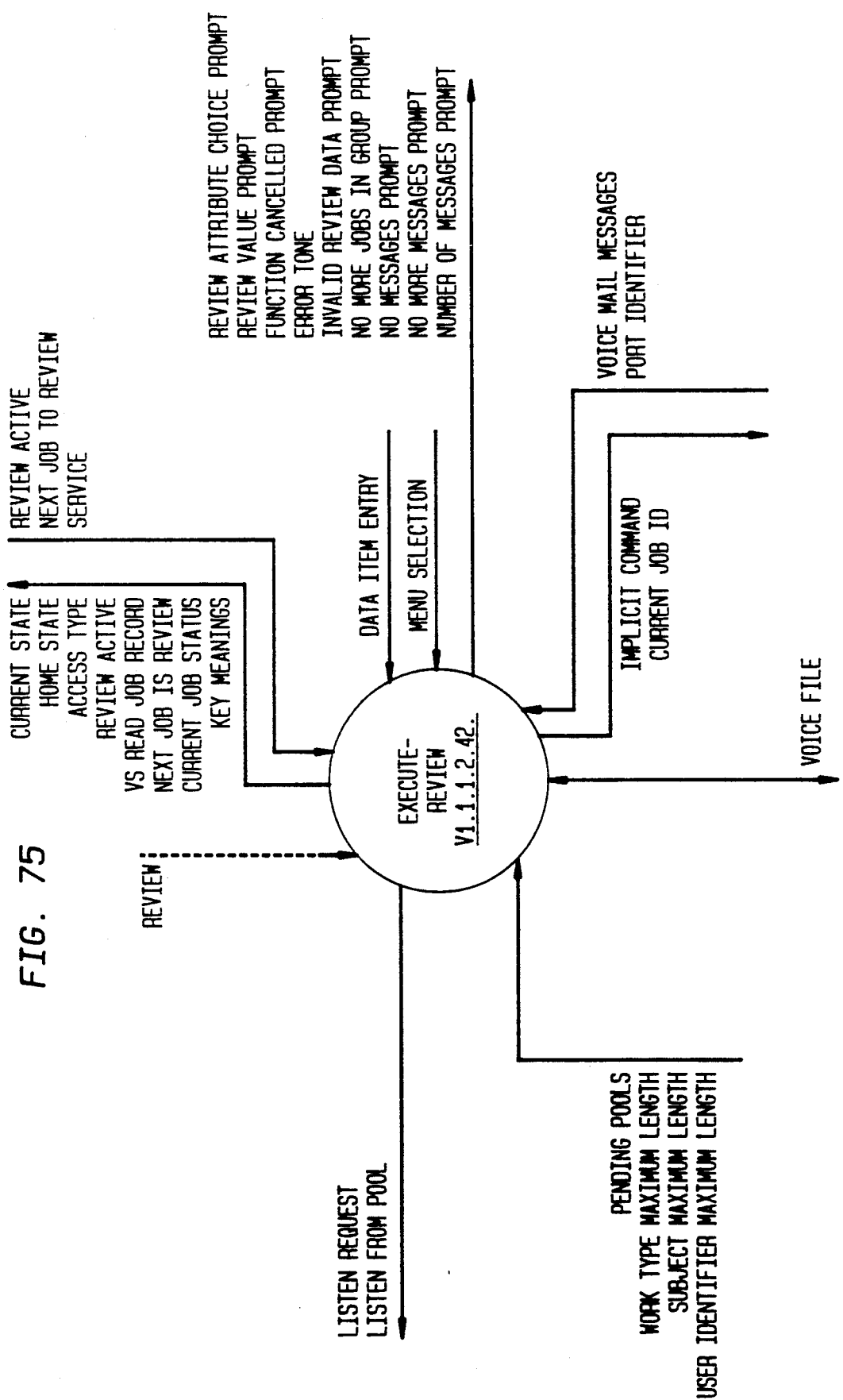

FIG. 75 shows executeReview module V1.1.1.2.42 which is invoked by REVIEW. Its outputs are: Current State, Home State, Access Type, Review Active, VS Read Job Record, Next Job To Review, Current Job Status, Key Meanings, Listen Request, Listen From Pool, Implicit Command, Current Job ID, Review Attribute Choice Prompt, Review Value Prompt, Function Cancelled Prompt, ERROR TONE, Invalid Review Data Prompt, No More Jobs In Group Prompt, No Messages Prompt, No More Messages Prompt, and Number of Messages Prompt. Its inputs are: Pending Pools, Work Type Maximum Length, Subject Maximum Length, User Identifier Maximum Length, Voice File, Voice Mail Messages, Port Identifier, Menu Selection, Data Item Entry, Review Active, Next Job To Review, and Service.

Figure 76:
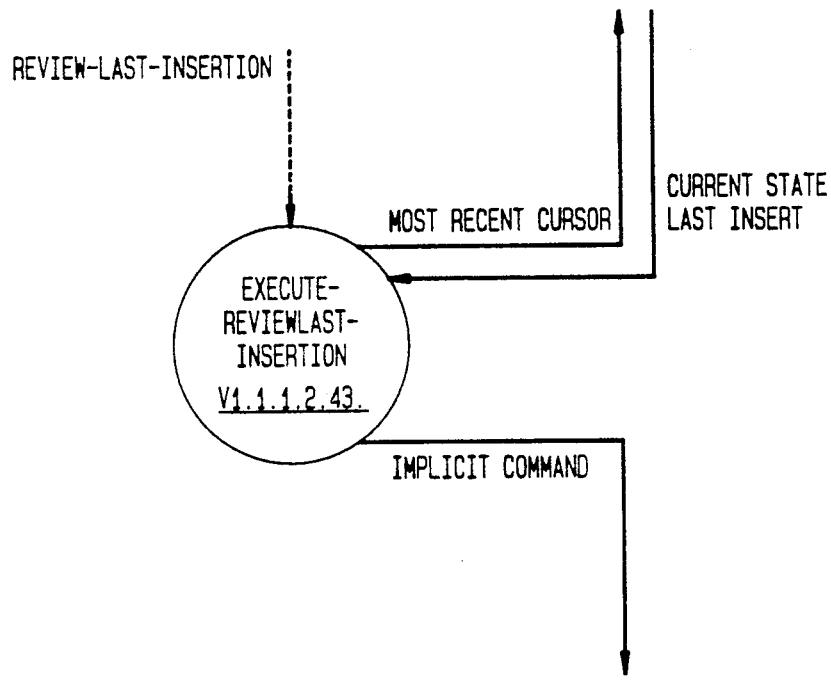

FIG. 76 shows executeReviewLastInsertion module V1.1.1.2.43 which is invoked by REVIEW-LAST-INSERTION. Its outputs are Most Recent Cursor and Implicit Command. Its inputs are Current State and Last Insert.

Figure 77:
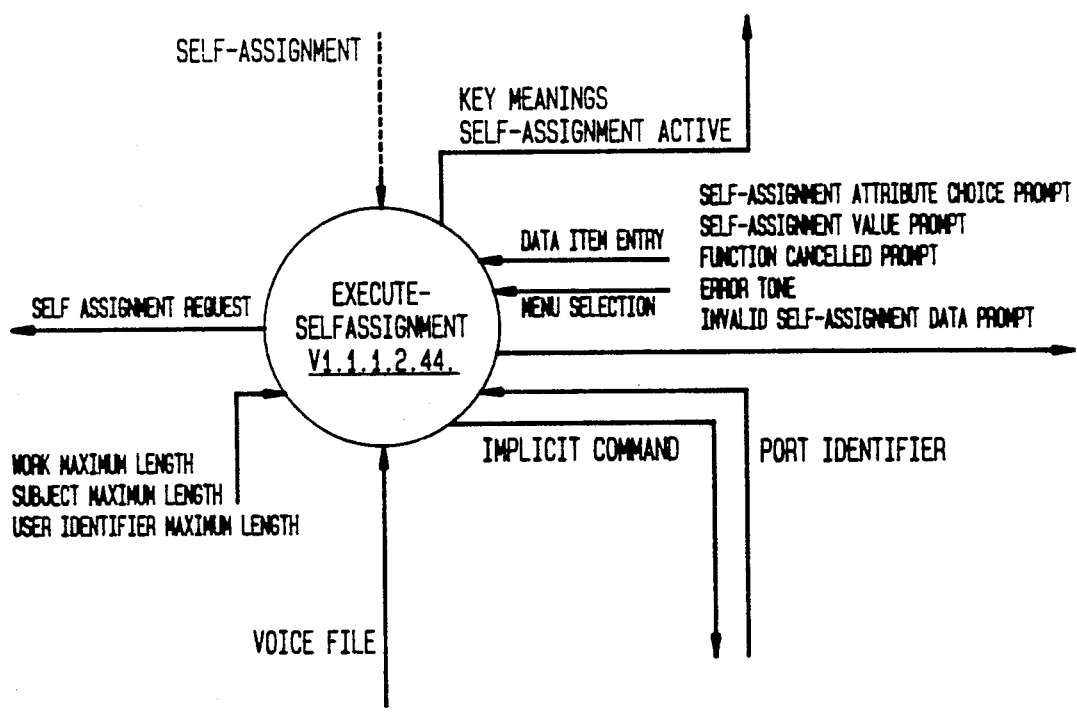

FIG. 77 shows executeSelfAssignment module V1.1.1.2.44 which is invoked by SELF-ASSIGNMENT. Its outputs are: Key Meanings, Self-Assignment Active, Self Assignment Request, Implicit Command, Self-Assignment Attribute Choice Prompt, Self-Assignment Value Prompt, Function Cancelled Prompt, ERROR TONE, and Invalid Self-Assignment Data Prompt. Its inputs are: Work Type maximum Length, Subject Maximum Length, User Identifier Maximum Length, Voice File, Port Identifier, Menu Selection and Data Item Entry.

Figure 78:
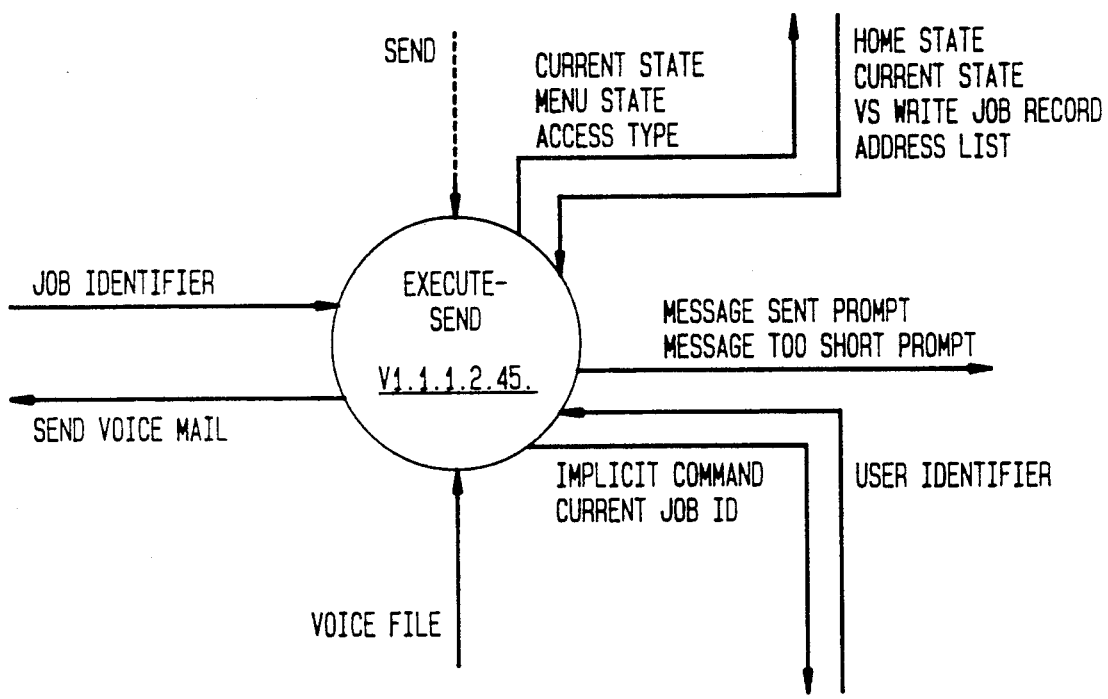

FIG. 78 shows executeSend module V1.1.1.2.45 which is invoked by SEND. Its outputs are: Current State, Home State, Access Type, Send Voice Mail, Implicit Command, Current Job ID, Message Sent Prompt, and Message Too Short Prompt. Its inputs are: Home State, Current State, VS Write Job Record, Address List, Job Identifier, Voice File and User Identifier.

Figure 79:
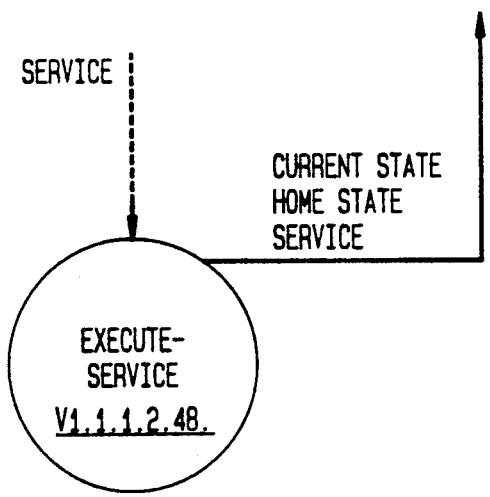

FIG. 79 shows executeService module V1.1.1.2.46 which is invoked by SERVICE. Its outputs are Current State, Home State and Service.

Figure 80:
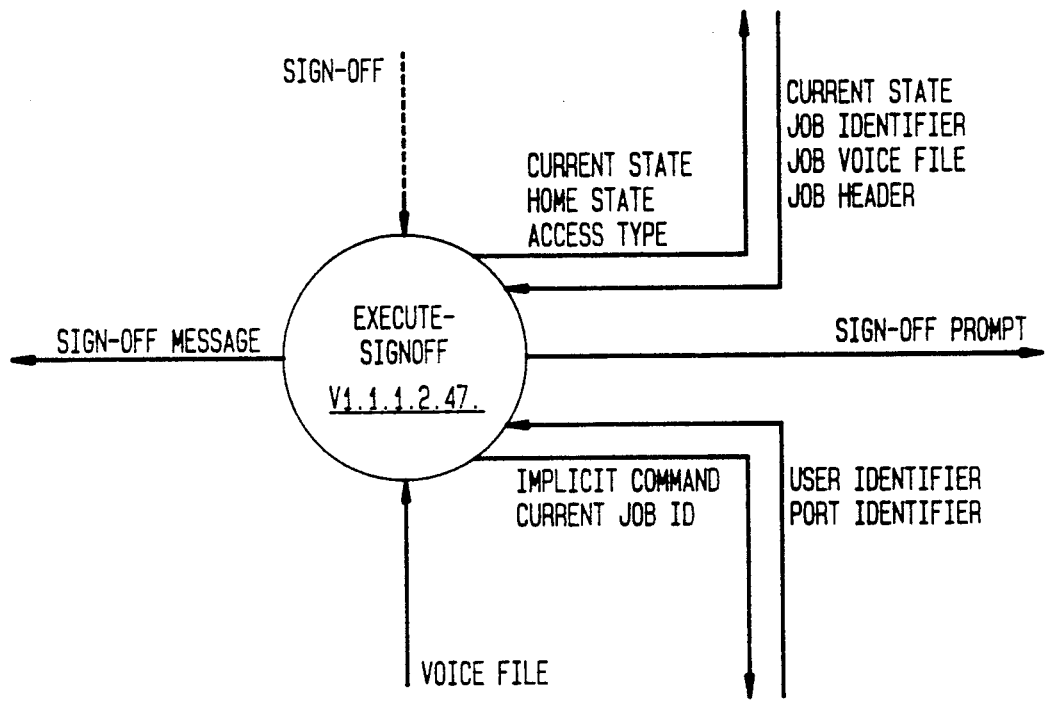

FIG. 80 shows executeSignOff module V1.1.1.2.47 which is invoked by SIGN-OFF. Its outputs are: Current State, Home State, Access Type, Signoff Message, Implicit Command, Current Job ID, and Sign-Off Prompt. Its inputs are: Voice File, User Identifier, Port Identifier, Current Job State, Job Identifier, Job Voice File, and Job Header.

Figure 81:
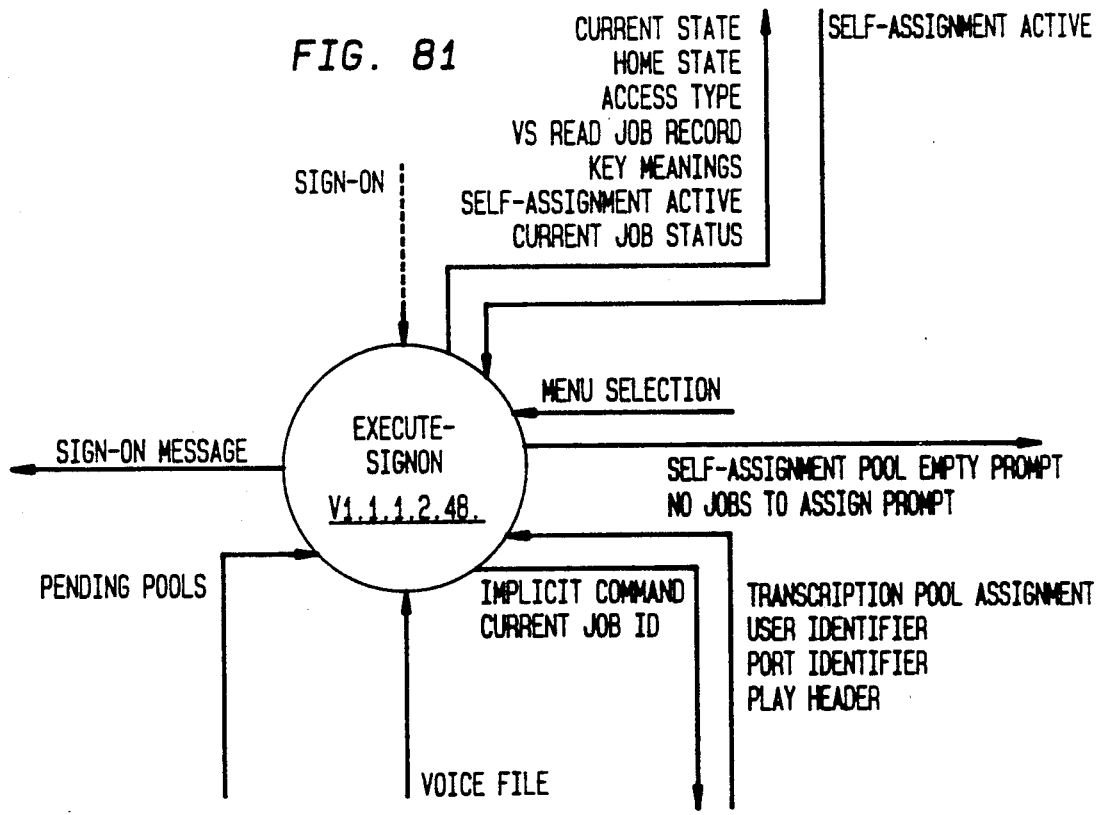

FIG. 81 shows executeSignOn module V1.1.1.2.48 which is invoked by SIGN-ON. Its outputs are: Current State, Home State, Access Type, VS Job Read Record, Key Meanings, SelfAssignment Active, Current Job Status, Sign-On Message, Implicit Command, Current Job ID, Self Assignment Pool Empty Prompt, and No Jobs to Assign Prompt. Its inputs are: Pending Pools, Voice File, Transcription Pool Assignment, User Identifier, Port Identifier, Play Header, Menu Selection, and Self-Assignment Active.

Figure 82:
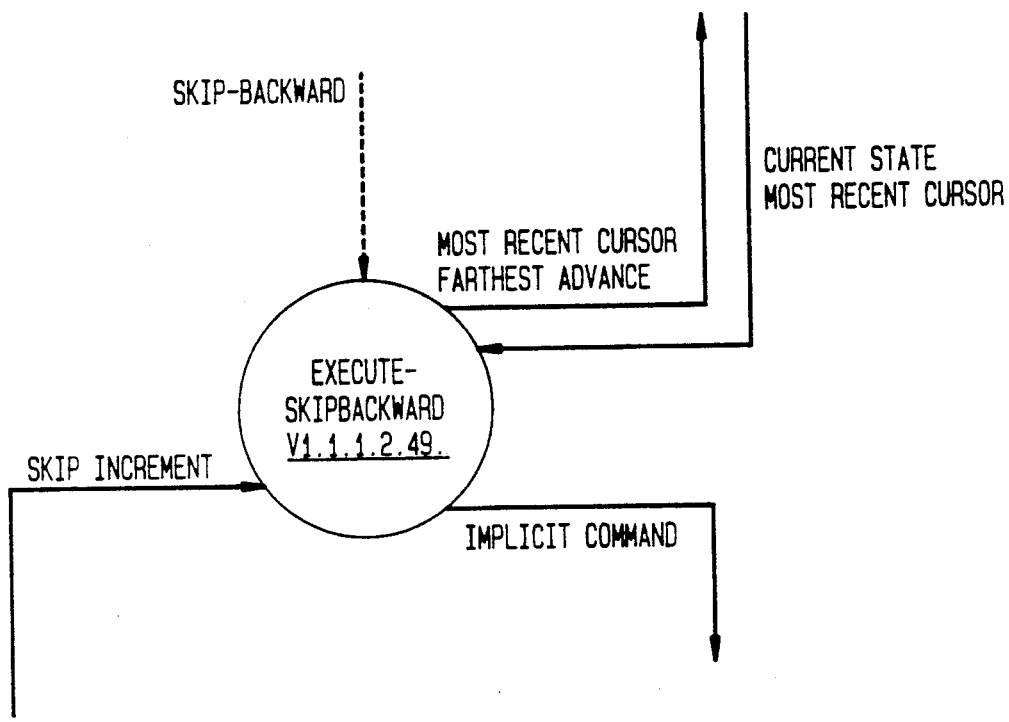

FIG. 82 shows executeSkipBackward module V1.1.1.2.49 which is invoked by SKIP-BACKWARD. Its outputs are Most Recent Cursor, Farthest Advance, and Implicit Command. Its imputs are Current State, Most Recent Cursor and Skip Increment.

Figure 83:
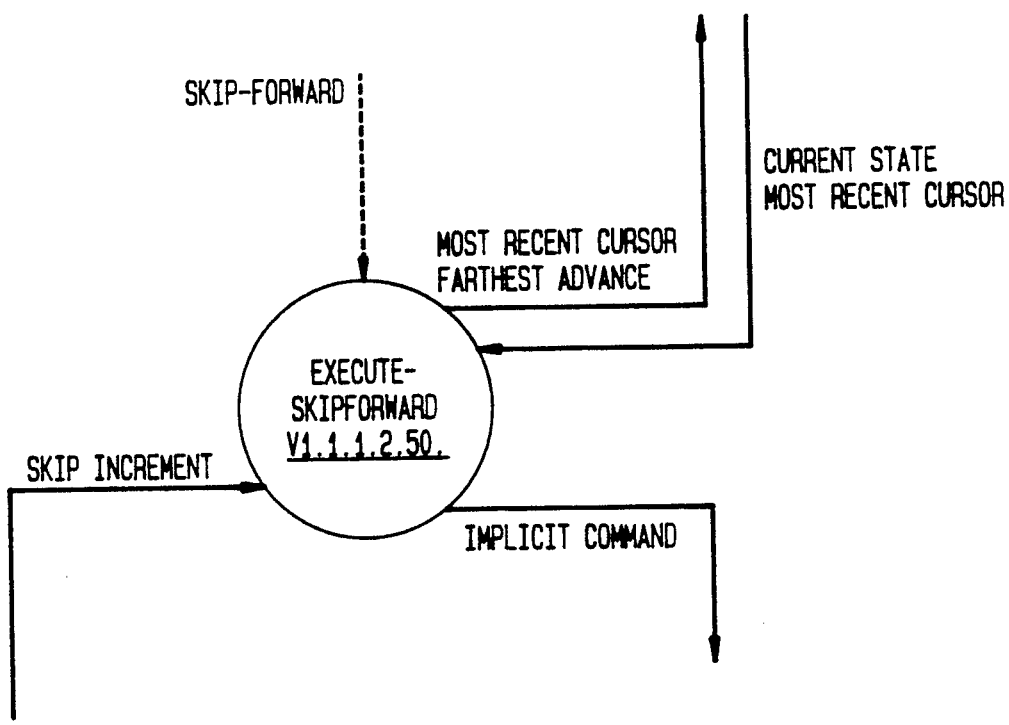

FIG. 83 shows executeSkipForward module V1.1.1.2.50 which is invoked by SKIP-FORWARD. Its outputs are: Most Recent Cursor, Farthest Advance, Skip Increment, and Implicit Command. Its inputs are Current State and Most Recent Cursor.

Figure 84:
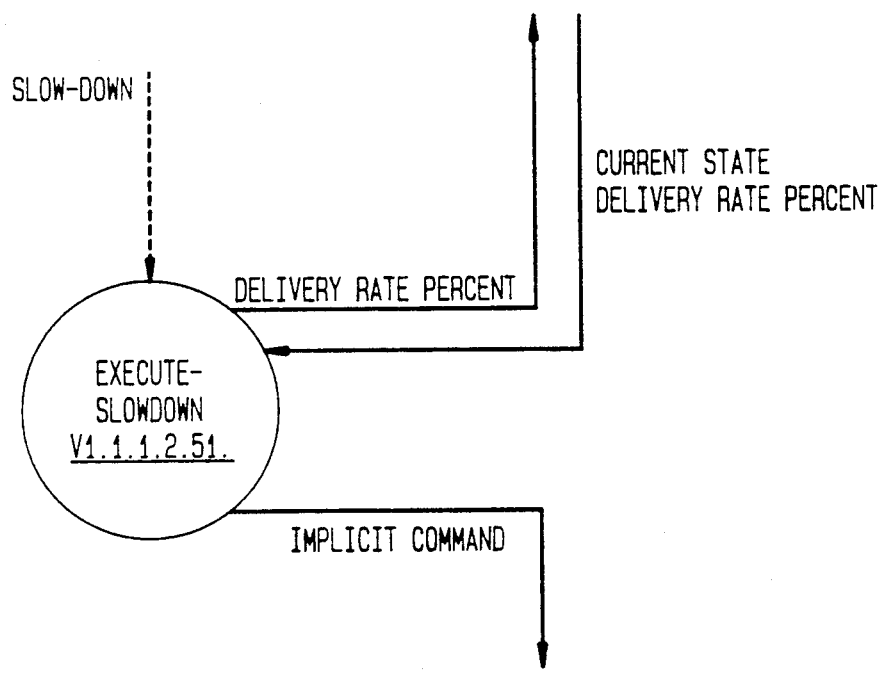

FIG. 84 shows executeSlowDown module V1.1.1.2.51 which is invoked by SLOW DOWN. Its outputs are Delivery Rate Percent and Implicit Command. Its inputs are Current State and Delivery Rate Percent.

Figure 85:
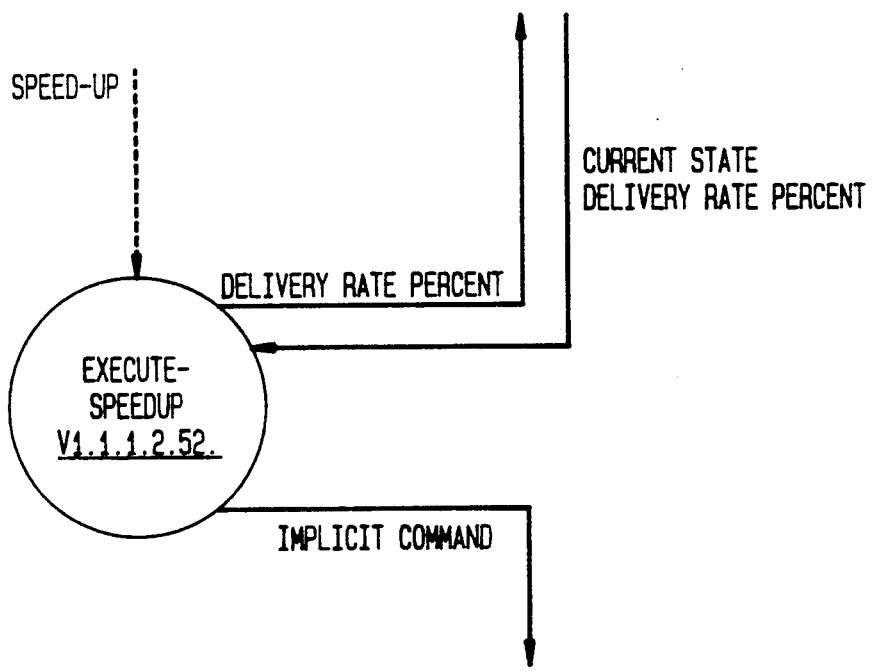

FIG. 85 shows executeSpeedUp module V1.1.1.2.52 which is invoked by SPEED UP. Its outputs are Delivery Rate Percent and Implicit Commnd. Its inputs are Current State and Delivery Rate Percent.

Figure 86:
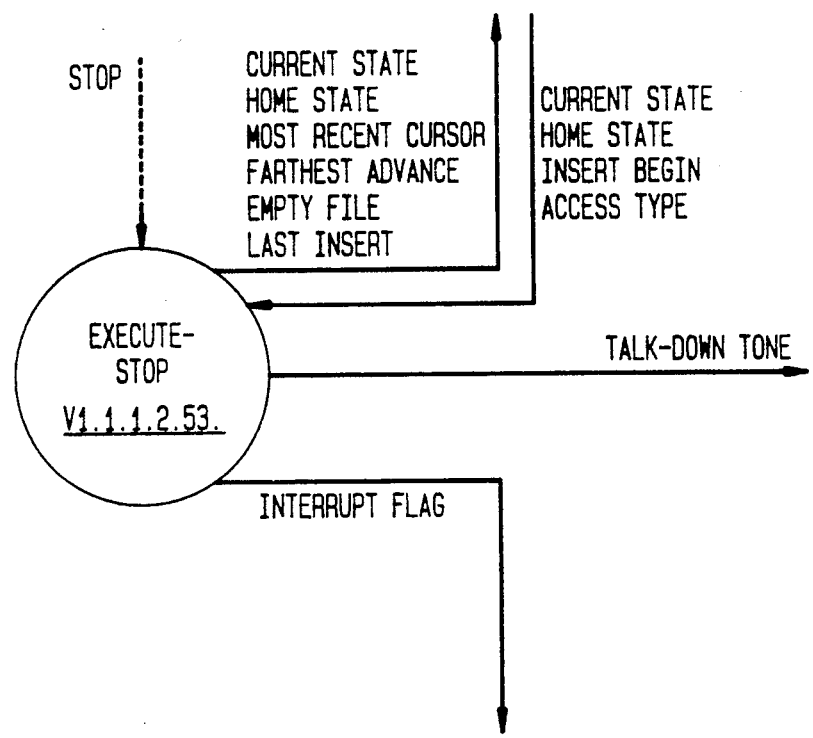

FIG. 86 shows executeStop module V1.1.1.2.53 which is invoked by STOP. Its outputs are: Current State, Home State, Most Recent Cursor, Farthest Advance, Empty File, Last Insert, Interrupt Flag, and TALK-DOWN TONE. Its inputs are: Current State, Home State, Insert Begin and Access Type.

Figure 87:
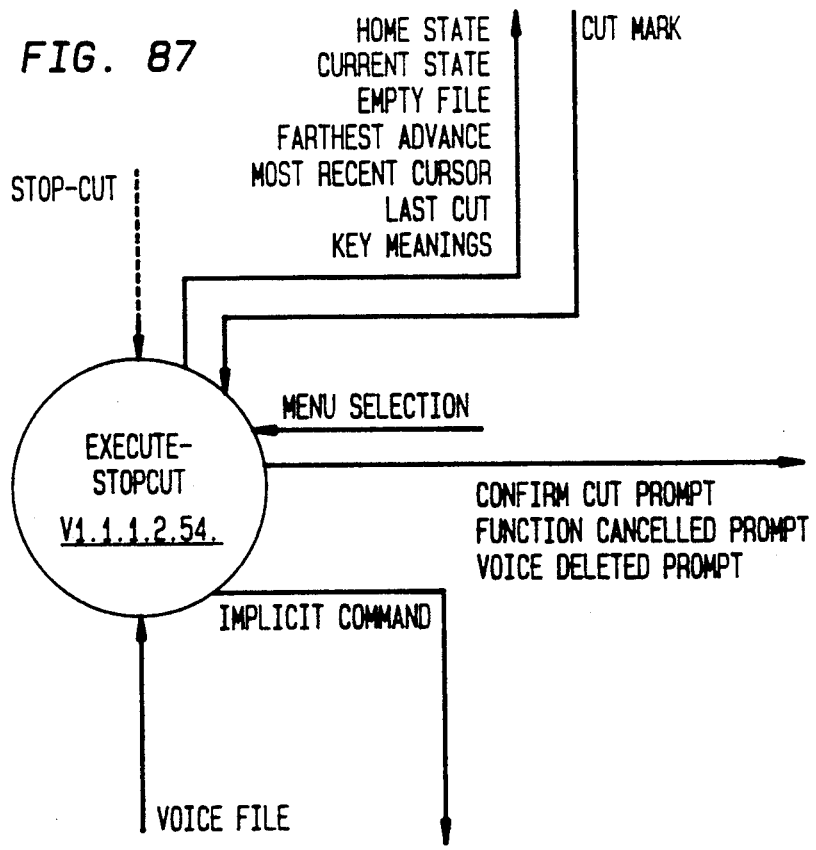

FIG. 87 shows executeStopCut module V1.1.1.2.54 which is invoked by STOP-CUT. Its outputs are: Home State, Current State, Empty File, Farthest Advanced, Most Recent Cursor, Last Cut, Key Meanings, Implicit Command, Confirm Cut Prompt, Function Cancel Prompt, Voice Deleted Prompt. Its inputs are Voice File, Menu Selection and Cut Mark.

FIG. 88 shows executeVoiceMail module V1.1.1.2.55. Its outputs are: Service, Home State, Current State, Logged-On Users Info and Implicit Command. Its input is Current State.

MODI SPECIFICATIONS FOR SUPERVI SESSION

Module Specifications for Supervisor Session alarms Module LI

NAME alarms — tests for a set of conditions. If any of the conditions are met, alarm notifications are sent to the appropriate process.

DESCRIPTION

Receive Spool Capacity, Job Capacity Change, Voice Capacity Change, Alarm Levels and the Backlog. Test the available capacities against alarm levels set by the supervisor. If any of the conditions are met, send appropriate alarm notifications.

PSEUDOCODE

```
GET Alarm Levels
GET Spool Capacity
IF Spool Capacity Margin >= 100 - Spool Capacity
THEN put online Spool Capacity Alarm
    put offline Spool Capacity Alarm
ENDIF GET Job Capacity
IF Job Record Alarm Margin >= 100 - Job Capacity
THEN put online Job Record Alarm
    put offline Job Record Alarm
ENDIF GET Voice File Usage
IF Voice Capacity Alarm Margin >= 100 - Voice File Usage
THEN put online Voice Capacity Alarm
    put offline Voice Capacity Alarm
ENDIF GET Backlog
IF Backlog Alarm Level >= Backlog
    put online Backlog Alarm
    put offline Backlog Alarm
ENDIF
``` jobRecordArchi.                          Module 1.2.1

NAME jobRecordArchiver — Moves Archivable Jobs to an external media.

DESCRIPTIONS

Receives all Archivable Job Records, modifies them for long term storage and stores them on archive media.

PSEUDOCODE

```
GET Archivable Job Record
convert record to form appropriate for long term storage
    * remove unnecessary fields (e.g. status), compress data *
PUT Job To Archive to archive media
``` archiveRead                               Module 1.2.2

NAME archiveRead — Retrieves the Archived Job Records that meet the Selection Criteria, passes them to proper processes.

DESCRIPTION

When Archive Job Records are requested, retrieve Archived Job Records from the archive media, reformat them, select the requested Job Records and pass them to the requesting process.

PSEUDOCODE

```
LOOP UNTIL last Record
     GET Archive Job Record that meets the Selection Criteria,
     Convert Archive Job Record to Job Record
          * expand compressed fields, restore deleted fields           *
          * (e.g. status)                                              *
     PUT Selected Archived Job
ENDLOOP
``` reportControl                                              Module 1.3.1

NAME reportControl - Controls information requests required to generate a report.

DESCRIPTION

Get a Report Request, then get the Report Definition. Put a SI Selection Request according to the Report Type and Selection Criteria and/or an Archived Job Record Request. Put Required Fields and Order Of Fields. If a post defined cost allocation, put Total Cost, if unit cost, put Unit Cost.

PSEUDOCODE

```
Get Report Request
Get Report Definition:   Retrieve the Report Definition by passing the
                         Report Identifier CASE of Report Type
     USER PROFILE: put User Profile Request
                                       * sends the User Profile        *
                                       * selection criteria to the     *
                                       * SiMessageDispatcher           *

COST ALLOCATION, JOB RECORD:
          CASE of status
               CREATING, READY, SENT, PENDING, ASSIGNED,
               SIGNED-OFF, CANCELLED,
               DISCARDED, FINISHED:
                                        put Job Record Request
               ARCHIVED:                put Archived Job Record
                                        Request
               ARCHIVED + [CREATING, READY, SENT, PENDING
               ASSIGNED, SIGNED-OFF, CANCELLED, DISCARDED,
               FINISHED]:
                                put Job Record Request
                                put Archived Job Record Request
```

```
              ENDCASE
              IF Report Type = COST ALLOCATION
                  IF post defined
                       put Total Cost
                  ELSE IF Unit Cost are NULL
                       get Default Unit Costs
                  ENDIF
                  put Unit Costs
              ENDIF
        ENDIF
``` reportInfoRetrieve                                        Module 1.3.2

NAME reportInfoRetrieve — Receives information required to generate a report and sorts them.

DESCRIPTION

Receives Report Info and/or Selected Archived Jobs if appropriate, and sorts them. Sends Job Records and User Profiles.

PSEUDOCODE

```
GET Report Info
GET Selected Archived Jobs if necessary
GET Sort Criteria
SORT the Records
PUT the sorted Job Records or User Profiles
``` caCalculate                                               Module 1.3.3

NAME caCalculate - performs calculations necessary for cost allocation reports.

DESCRIPTION

Get Job Records, and for dictation, the corresponding Weighting Factors. For all jobs with the same Primary Field and Secondary Field, build a single Cost Allocation Record as follows. For dictation, calculate weighted length = Length * weighting factor for the work type * weighting factor for the priority for each job. For dictation and voice mail, add to values in the Cost Allocation Record, subtotals and totals for the number of jobs and Length. For dictation only, also sum Real Turnaround Time and Weighted Length.

If the report is post defined, get Total Cost and calculate Dictation Unit Cost = Total Cost/total weighed length, otherwise get Unit Costs and calculate Total Cost below.

For each Dictation Cost Allocation Record, i.e., a record representing all dictation jobs with the same Primary Field and Secondary Field, calculate cost = weighted length * Dictation Unit Cost. For Voice Mail Cost Allocation Records, calculate message cost = number of jobs * Voice Mail Unit Cost. Also add to cost subtotal and total. Calculate the percentage of subtotal and total represented in each Cost Allocation Record for the number of jobs and Length, and for Dictation the weighted length.

Output each completed Cost Allocation Record. When the Primary Field changes, output subtotals for cost, jobs and Length, and for dictation, Real Turnaround Time and weighted length. Similarly, output totals after all records are output.

fieldSelection                                            Module 1.3.4

NAME fieldSelection — Receives records. Selects the desired fields and arranges their orders.

DESCRIPTION

Select the Required Fields and arrange them in Order Of Fields to form Report Records. Also select and arrange calculated fields from Cost Allocation Records. Put the Report Record.

reportFormatter                                           Module 1.3.5

NAME reportFormatter — Receives the Report Records and other information required to generate a report and formats them into the desired form.

DESCRIPTION

Get Report Records, Definition Info, and Weighting Factors if a Cost Allocation report is being produced; format them according to the report format and put the Formatted Report.

eventHandler                                              Module 1.4.1

NAME eventHandler — Keeps track of system events.

DESCRIPTION

Collect system events which are logged in a circular buffer. Format the logged events into a report and output.

reportSpooling                                            Module 1.4.2

NAME reportSpooling — Monitors spooling and printing of reports and system events.

DESCRIPTION

Receive reports and increase Spool Capacity. Output Printer Text and decrease Spool Capacity. Between printing of each complete report, check the Audit Trail parameter and if it is ON, then get a Log Report and send it to the printer. When a KILL command is received, throw away the currently printing report if any and print the next report. If a STOP command is received, stop printing until a START command is received. When a START command is received, begin printing if the Spool queue is non-empty.

inputInterpreter — Module 1.5.1

NAME inputInterpreter - collect input characters into proper data values and command tokens.

DESCRIPTION

This module is used to collect Characters and covert them into the input expected, i.e. command, data, or menu data. In the case of data, Input Types may be integer, string, floating, fixed, enumerated, etc. All input editing functions, e.g. a backspace key, are handled in this module. The resultant output is verified against the desired type.

PSEUDOCODE

```
*      Local variables
*
*      Character List   -   a collection of user input characters which will form the
*                           Input Token.
*      Input Type       -   the type of input desired (e.g. integer)
*      Command List     -   a list containing single keystroke commands (e.g. Help,
*                           control menu select)
*      Menu Definition  -   A definition for a menu selection. This is expected to
*                           be generated by internal tables.
get Character
IF command is expected THEN
      IF Character in Command List THEN
            Command Token = Character
      ENDIF
ENDIF IF data is expected THEN
      determine Input Type according to the type of control used
      LOOP UNTIL Character = ENTER
            CASE Character OF
                  HELP            :   Command Token = Character; exit
                  .FLASH-REPORT   :   Command Token = Character; exit
                  CANCEL          :   Command.Token = .Character; exit
                  KEYBOARD LOCK   :   Command Token = Character; exit
                  BACKSPACE       :   remove last character from character list
                  OTHERWISE       :   * proceed as normal *
            ENDCASE
            check Character applicability in Input Type
            place Character in Character List
            get Character
      ENDLOOP
      Input Value = Character List
ENDIF
```

```
IF menu data is expected THEN
    IF Character = valid menu selection THEN
        Menu Selection = Character + Menu Definition
    ENDIF
ENDIF
``` commandProcessor                                      Module 1.5.2

NAME commandProcessor - Interpret supervisor input and determine which DDS functions to perform. The functions are performed by executing the function transactions.

DESCRIPTION

This module will compare the input Command Token with the Current State to determine which commands to process. Once Command To Process is determined, the Transaction List to perform that command is determined and executed.

PSEUDOCODE

```
*   Local Variables
*       Command To Process -    the command to be executed
*       Transaction List   -    a list of transactions which comprise Command
*                               To Process
*   get Command Token
    get Current State
    determine Command To Process according to State Info and Command Token
    determine Transaction List according to Command To Process LOOP UNTIL Transaction List is empty
        get next Transaction from Transaction List
        CASE Transaction OF
            DICTATION FINISH    : call dictationFinish
            .
            .
            .
            OTHERWISE           : * no other possibilities *
        ENDCASE
    ENDLOOP get Update Failure
        inform the user of a failure with updating the database
``` executeJobRecordTransaction                           Module 1.5.3.1

NAME executeJobRecordTransaction - Module contains all the transaction procedures specifically for Job Record Functions.

ASSUMPTIONS

Noted below in specific transaction descriptions.

DESCRIPTION

The following is a description of the job record transactions.

dictationFinish - Finish a single job or group of jobs. The job must have a signed-off status. Send a Job Record And Voice File Update Request.

externalJobEntry - Set up the parameters to create external dictation job entries. The Mark Request will be set to FIELD and the Edit Type set to EXTERNAL-JOB-EDIT.

jobCancel - Cancel a single job or a group of jobs. To successfully cancel a job, it must be in the Ready status. Send a Job Record And Voice File Update Request.

jobRecordInquiry - Get the selection and sorting criteria and request a Job Record Inquiry Screen. The Marked Request will be set to RECORD.

jobRecordInquirySelect - Request a job record inquiry type from the user and store the Job Type for use by other transactions.

jobRecordModify - This transaction will allow the supervisor to modify a selected set of fields of a job record. The current marked record is always selected as the record to modify. The Job Type is used to determine the Edit Type which is placed in the Supervisor Info data store. A Mark Request is made to set the Mark Type to FIELD.

jobRecordRetrieve - Get the required job record from the inquiry and place it in Supervisor Info data store.

prioritize - This transaction will allow the supervisor to directly change a job priority.

readyJobInquiry - Create a ready job inquiry. The selection criteria, Selection Input Ready Modification, will be modified to select according to each pool criteria, the users input selection, and a status equal to READY.

sign-off - Sign-off a single or group of jobs. The jobs must be external to qualify. If a job contains an auto-finish work type, it will also be finished.

executePoolTransaction          Module 1.5.3.2

NAME executePoolTransaction - This module contains all the transaction procedures specific to pool functions.

ASSUMPTIONS

Noted below in specific transaction descriptions.

DESCRIPTION

The following is a description of the pool transactions.

poolDefinitionAdd - Accept and verify the input required to add a previously undefined pool. A Pool Definition Update will be created.

poolDefinitionDel - Delete a previously defined pool definition. The supervisor is prompted for a delete confirmation (yes/no) before preceeding with the delete.

poolDefinitionModify - This transaction will allow the supervisor to modify a previously defined pool definition. All prompt and menu sequences will be displayed for direct input into the transaction. Verify the input. Send a Pool Definition Update.

poolInquiry - Request a pool definition inquiry.

transAssignmentAdd - Accept and verify the input required to assign a new pool to a transcriptionist. The transcriptionist may or may not have any pools currently assigned to him.

transAssignmentDel - Delete a pool assignment from a transcriptionist. Any single pool or list of pools currently assigned to the transcriptionist may be deleted. Display all prompts required to accept the pool number list to delete from the supervisor. Verify the input. The new transcriptionist pool assignment is sent.

transAssignmentMod - Prompt the supervisor for a new and old pool number and a transcriptionist. The old pool, if found, is modified to the new pool for the specified transcriptionist. The new transcriptionist Pool Assignment is sent.

transAssignmentInquiry - Send a request for the transcriptionist assignment inquiry screen.

executeReportTransaction                                     Module 1.5.3.3

NAME executeReportTransaction - This module contains all the transaction procedures specific to Report functions.

ASSUMPTIONS

Noted below in specific transaction descriptions.

DESCRIPTION

The following is a description of the report transactions.

reportDefinitionCreate - Get Report Type and the supervisor input. Verify the input. The report type is used to determine the type of report definition display. This transaction must be followed by a reportDefinitionModify transaction to complete the create function.

reportDefinitionDelete - Delete a previously defined report definition. A Delete Confirmation prompt is issued before issuing the Report Definition Update.

reportDefinitionGenerate - Send a Report Request to generate the report definition currently displayed.

reportDefinitionModify - Modify a previously defined report definition. The report type is used to determine the correct Edit Type which is placed in the supervisor info data store. Mark Request is set to FIELD and sent.

reportDefinitionSave - Get the current screen generator fields and send a Report Definition Update. A Save Notification is sent.

reportIndex - A Report Index Screen and Report Identifier prompt is issued. Get Report Identifier. If the Report Identifier is NULL a create function is assumed.

reportTypeSelect - Request Report Type from the supervisor by sending a Report Type Select Prompt. Update the Supervisor Info data store with the selected report type.

startSpool - Send a START spool command.

stopSpool - Send a STOP spool command.

killSpool - A Delete Confirmation prompt is issued before sending a KILL spool command.

executeUserProfileTransaction — ·Module 1.5.3.4 executeUserProfileTransaction - This module contains all the transaction procedures specific to User Profile functions.

ASSUMPTIONS

Noted below in specific transaction descriptions.

DESCRIPTION

The following is a description of the user profile transactions:

userProfileInquiry - Collect the selection and sorting criteria and request a User Profile Inquiry Screen. Set the Mark Request to RECORD and send it.

userProfileRetrieve - Get the desired User Profile from the inquiry and place it in the Supervisor Info data store.

userProfileAdd - Create an empty User Profile and placed it in the Supervisor Info data store.

userProfileDelete - Delete a previously defined User Profile. A Delete Confirmation prompt is issued before proceeding with the delete.

userProfileModify - Modify a selected set of fields of a User Profile. The correct Edit Type is placed in the Supervisor Info data store. A Mark Request is made.

executeSystemOperationTransaction       Module 1.5.3.5

NAME executeSystemOperationTransaction - This module contains all the transaction procedures specific to system operation functions.

ASSUMPTIONS

Noted below in specific transaction descriptions.

DESCRIPTION

The following is a description of the system operation transactions:

portConfiguration - Modify port configuration. Set the System Operation Edit Type to PORT-CONFIGURATION-EDIT and place it in the Supervisor Info data store. Mark Request is set to Field and sent.

weightingFactors - Modify the weighting factors information. Set System Operation Edit Type to WEIGHTING-FACTOR-EDIT and place it in the Supervisor Info data store. Mark Request is set to Field and sent.

autoFinishWorkTypes - Modify Auto Finish Work Types. Set the System Operation Edit Type to AUTO-FINISH-EDIT and place it in the Supervisor Info data store. Mark Request is set to Field and sent.

recalculateBacklog - Request a backlog recalculation to be performed.

systemSetups - Modify System Set Ups. Set the System Operation Edit Type to SYSTEM-SETUP-EDIT and place in the Supervisor Info data store. Mark Request is set to Field and sent.

linesPerStatusDisplay - Request a bar graph screen showing lines of dictation in each status category.

linesPerPoolDisplay - Request a bar graph screen showing the lines of dictation remaining in each pool.

estimatedTATDisplay - Request a bar graph screen showing the estimated turnaround time for each defined pool.

executeSupportTransaction                    Module 1.5.3.6

NAME executeSupportTransaction - This module contains all the transaction procedures used as generalized support to the specific function groups (e.g. Job Record).

ASSUMPTIONS

Noted below in specific transaction descriptions.

DESCRIPTION

The following is a description of the support transactions:

selectionInput - Send Support Prompts and Support Data Menus required for the input of record selection information. Get the current state to determine if job record or user profile selection is desired. The supervisor input is placed in the Supervisor Info data store as Selection Criteria.

sortingInput – Send Support Prompts and Support Data Menus required for the input of record sorting information. Get the current state to determine if the job record or user profile sorting is desired. The supervisor input is placed in the Supervisor Info data store as Sort Criteria.

displayControlMenu – Get the current state. Send Control Menus.

displayInquiry – Get the current state. Send Display Screens.

executeInterruptFunctions                  Module 1.5.3.7

NAME executeInterruptFunctions – this module contains all the transaction procedures specific to interrupt functions.

ASSUMPTIONS

Noted below in specific transaction descriptions.

DESCRIPTION

The following is a description of the interrupt transactions:

executeFlashReport – Send Screen Generator Request.

executeHelp – Get the current state information. Display the appropriate help screen desired.

executeCancel – Cancel the current activity. The state information will be used to determine what action to take.

executeKeyboardLock – This transaction will lock the supervisor keyboard from any input other then the Keyboard Lock Password.

executeLogoff – Send Logoff Time. Send Logon Screen.

executeLogon – Send Logon Time. Send Top Level Menu.

getGlobalEditCriteria                  Module 1.5.3.8.1

NAME getGlobalEditCriteria – Requests the supervisor to enter the data necessary to perform a global update.

DESCRIPTION

Get the Global Edit Field, current value of the field and the value that the supervisor wants to change the field to. Have the field values that were just entered validated. Put the Global Edit Field and the current field value, so that the records that meet this criteria in the global edit command can be sent to the recordUpdate module for updating. Store the data necessary to perform the update or a repeat command.

repeat                                                    Module 1.5.3.8.2

NAME repeat - Sends the last global edit command data that was entered by the supervisor.

DESCRIPTION

Send the last global edit command, field and field value that the supervisor entered, so that the supervisor's last global edit command can be repeated.

recordUpdate                                              Module 1.5.3.8.3

NAME recordUpdate - Performs updates on Inquiry Records and sends update messages to the appropriate system manager database.

DESCRIPTION

Get an Inquiry Record, field and value to update. Update the value of the record field and put an update database message.

If the value being updated is an Author Identifier, then the Author Name and Special Designator in the Job Record will also be updated, reflecting these values associated with the Author Identifier.

If the value being updated is a Transcriptionist Identifier, then the Transcriptionist Name in the Job Record will also be updated, reflecting the name associated with the Transcriptionist Identifier.

modify                                                    Module 1.5.3.8.4

NAME modify - handles modifications of fields displayed on the screen. Sends an update message to the appropriate database after the supervisor updates the screen.

DESCRIPTION

For each screen field which the supervisor edits, get the field and new field value. Have the field value that was just entered validated. If the field value entered is valid, update the screen showing the new value. When the supervisor is finished updating the screen, put an update database message.

If the value being updated is an Author Identifier, then the Author Name and Special Designator in the Job Record will also be updated, reflecting these values associated with the Author Identifier.

If the value being updated is a Transcriptionist Identifier, then the Transcriptionist Name in the Job Record will also be updated, reflecting the name associated with the Transcriptionist Identifier.

contextValidation	Module 1.5.3.8.5

NAME contextValidation - Verifies the field value entered by the supervisor.

DESCRIPTION

Get a field and field value. Look up in the record description table to check if the value is within legal bounds. Additional checking is done on certain fields as follows.

If the value being verified is an Author Identifier, then check the User Profile database to insure that the Author Identifier is already defined.

If the value being verified is a Transcriptionist Identifier, then check the User Profile database to insure that the Transcriptionist Identifier is already defined.

findNext	Module 1.5.3.8.6

NAME findNext - Requests the supervisor to enter the data necessary to perform a Find-Next Comand.

DESCRPTION

Get the field and field value that the supervisor entered. Have the field value that was just entered validated. Put the field and field value so that the next occurrence of the field value in the inquiry can be found.

screenControl	Module 1.6.1

NAME screenControl - Receives Screen Generator Request and controls coordination of the screenGenerator components.

DESCRIPTION

When a Display Request, Online Alarm Notification or Alert is received, get the corresponding Screen Definition. For alarms, alerts, errors, menus, messages and prompts are translated into text and the format obtained using the screenDefinition. Output Display Format and Window Update to reflect screen changes. If necessary, based upon Selection Criteria make a Job Record Request, Archived Job Record Request, or User profile Request as appropriate.

Clear requests clears a field, record, window, or the screen through Display Format.

Inquiry Requests and Mark Requests are sent to appropriate modules.

When FLASH REPORT request is received, screen Control causes a Flash Report to be printed.

windowHandler -                                                         Module 1.6.2

NAME windowHandler - Maintains the current window definitions for each of the six screen windows and controls of marked displays.

DESCRIPTION

When a Window Update is received, update active windows in the current screen definition. To control display of information in windows, Position is output. Active Info and Selection Criteria are output. All Mark Requests are serviced in this module. The Mark Position is output to indicate the field or record to be highlighted.

PSEUDOCODE

```
*       Local variables
*       Current Marked Field      - the field currently marked              *
*       Current Marked Record     - the record currently marked             *
*       Last Marked Field         - the field that was previously marked.   *
*       Last Marked Record        - the record that was previously marked   *
*       Mark Position             - the field or record currently marked.   *
*                                   This variable is passed to other modules. *
get Window Update
    Replace the current window definition with the Window Update.
    IF Window Type = DATA
        Active Info = Record Type
        send Active Info to siMessageArbiter
    ENDIF
get Mark Request
    IF Mark Type = FIELD
        CASE Mark Request OF
            UP      : Mark Position = previous field in Mark Definition
            DOWN    : Mark Position = next field in Mark Definition
            OFF     : Last Marked Field = Current Marked Field
                      Mark Position = NONE
            ON      : Mark Position = Last Marked Field
            FIELD   : Mark Position = Field Description specified
        ENDCASE
    ELSE IF Mark Type = RECORD
        CASE Mark Request OF
            UP      : Mark Position = previous record in inquiry using Record
                                      Indicator
            DOWN    : Mark Position = next record in inquiry using Record
                                      Indicator
            OFF     : Last Marked Record = Current Marked Record
                      Mark Position = NONE
            ON.     : Mark Position = Last Marked Record
            CURRENT : Mark Position = record currently being pointed to in
                                      the inquiry control
        ENDCASE
    ENDIF
``` displayControl                                                          Module 1.6.3

NAME displayControl - Converts an Inquiry Record to the format required for display.

DESCRIPTION

Inquiry Records are formatted into Text Fields according to the Display Format. The Display Format indicates how the Inquiry Record will appear on the screen including column ordering, video characteristics, and the display representation of internal values (e.g. an internal value of status may be 3, but it may display on the screen as "READY"). The module highlights the marked field or record according to Mark Position.

inquiryControl                                                          Module 1.6.4

NAME inquiryControl - Receives incoming records and maintains them in a buffer. Outputs the records as requested by the displayControl or the supervisorControl for editing.

ASSUMPTIONS

An Inquiry Record To Remove is ensured to be already in the inquiry by the siMessageArbiter and an Inquiry Record to add is ensured to meet the selection criteria of the inquiry.

DESCRIPTION

This module will maintain the Inquiry Buffer. Inquiry Records will be sorted, inserted, and deleted from the Inquiry Buffer. The Inquiry Buffer also stores Selected Archived Jobs or Supervisor Database Screen Information received. A Start Record Indicator identifies records currently displayed.

Field display capabilities are provided which allow Field Updates to be made to the inquiry without sending the changes to the data base for functions such as editing. Field Updates include changes to single attributes in records and single data items which are collected for display such as capacity values, and Supervisor Database Screen Info.

PSEUDOCODE

```
*     Local Variables                                                            *
*     Inquiry Buffer          -    stores sorted records which may be            *
*                                  indexed                                       *
*     Start Record Indicator  -    the pointer to indicate the record at         *
*                                  the top of the display page.                  *
*     End-Of-Inquiry          -    a pointer to the last record in the           *
*                                  inquiry                                       * get Inquiry Record or Selected Archived Jobs
     find sorted record location using Sort Criteria
     update Inquiry, modifying Start Record Indicator or End-Of-Inquiry as needed
``` get Inquiry Record to Remove
    find record in inquiry
        remove record, modifying Start Record Indicator or End-Of-Inquiry as needed get Field Update
    Replace current Field Value with new Field Value from update get Voice File Usage, Job Capacity, or Spool Capacity
    update existing display values inquiryControl                                                Module 1.6.4

PSEUDOCODE (cont'd)

get Supervisor Data Base Screen Info
    display appropriate values get Inquiry Control Request
    CASE Inquiry Control Request OF
        BACKWARD    :   decrement Start Record Indicator by Number Of
                        Records
        BOTTOM      :   set Start Record Indicator to End-of-Inquiry
        FORWARD     :   increment Start Record Indicator by Number Of
                        Records
        TOP         :   set Start Record Indicator to 1
    ENDCASE get Inquiry Read Request
    CASE Inquiry Read Request OF
        READ FIELD  :   find Field Description in Inquiry Buffer
                        IF Field Description found
                            Put Field
                        ENDIF
        READ MARK   :   CASE Mark Position OF
                            Field               :   get marked field
                                                    Put Field
                            Record Indicator    :   get marked record
                                                    put Database
                                                        Record
                        ENDCASE
        READ RECORD :   find Record Description in Inquiry Buffer
                        IF Record Description found
                            Put Database Record
                        ENDIF
    ENDCASE get Inquiry Search Request
    LOOP UNTIL Search Space exhausted
        get next record from Inquiry Buffer
        IF Field Description found in record
            update Start Record Indicator
            Put Record
        ENDIF
    ENDLOOP
get Inquiry Update Request
    find Field in Inquiry Buffer
    IF Field found
        old Field Value = new Field Value ENDIF
output previous or next Record indicator, based upon Mark Position, when requested.

screenOutputControl                              Module 1.6.5

NAME screenOutputControl - Directs the display output to the proper terminal screen location and generates Flash Reports.

DESCRIPTION

Formatted text is placed at the desired location on the screen according to Position. The various attributes of the specific terminal used are contained in an internal data store and control positioning and video attributes for input Display Records. The module outputs Screen Text and Screen Commands required.

As a result of a Screen Generator Request, a Flash Report of the screen can be generated. If the terminal does not provide this capability, a screen buffer must be maintained.

siMessageAribter                                  Module 1.7

NAME siMessageArbiter - distributes messages from the systemManager or voiceSession to appropriate supervisorInterface modules.

DESCRIPTION

The information in messages arriving at siMessageArbiter is routed to supervisorInterface modules as follows:

Accessible Work Types - send to screenGenerator if in Active Info.

Alerts - send to screenGenerator and spooler.

Auto Finish Work Types - send to screenGenerator if in Active Info.

Job Capacity Change - send to alarms and to the screenGenerator.

Job Identifier - send to supervisorControl for external job entry.

Job Listen Access - send to spooler for logging.

Job Record Change - all changes are sent to the spooler for logging. If the change indicates that the job newly qualifies to be part of the backlog, i.e. Ready, Pending or Assigned dictation jobs, or no longer qualifies to be part of the backlog, then the backlog database must be informed. Based upon the input Active Info and Selection Criteria, the Job Record Change may send a new Job Record or Job Record To Remove to screenGenerator. If the job was Cancelled, Finished, or Discarded, send the Job Record to the archiver.

Job Record Response - send Job Records to the requesting module, which is either backlog in supervisorDataBase, the reportGenerator, or screenGenerator.

Pool Definitions – send to the screenGenerator if in Active Info.

Pool Definition Change – send to the spooler and, if in Active Info, to the screenGenerator.

Purged Job – send to the spooler.

Redundancy – send to the screenGenerator if in Active Info.

System Activity – send to the screenGenerator if in Active Info.

System Activity Change – send to the screenGenerator if in Active Info.

System Date & Time Change – send to the screenGenerator.

siMessageArbiter                                           Module 1.7

DESCRIPTION (cont'd)

Transcription Pool Assignments – send to screenGenerator if in Active Info.

Transcription Pool Assignment Change – send to screenGenerator if in Active Info.

Update Failure – send to supervisorControl.

User Profile Change – send all changes to the spooler. Depending upon Active Info, the New User Profile may need to be sent to screenGenerator. If the user was deleted, send a User Profile To Delete to screenGenerator.

User Profile Response – send the User Profiles to the requesting module, either the reportGenerator, supervisorControl, or screenGenerator.

VF Copied – send to the spooler.

VF Deleted – send to the spooler.

Voice Capacity Change – send to the screenGenerator and alarms.

Voice Safety Factors – send to screenGenerator if in Active Info.

VS Set Ups – send to screenGenerator if in Active Info.

siMessageDispatcher                                        Module 1.8

NAME siMessageDispatcher – send messages from the supervisorInterface to the systemManager.

DESCRIPTION –

All messages sent by any supervisorInterface module and destined for any systemManager or voiceSession module are collected by siMessage Dispatcher. Type messages and send over the applicable communication channel.

supervisorDataBase    Module 1.9

NAME supervisorDataBase — maintains data used by multiple modules within supervisorInterface.

DESCRIPTION

SupervisorDataBase maintains a number of data types, each of which is discussed below.

Alarm Levels - the values are modified when an Alarm Level Update is received. Outputs Alarm Levels when requested.

Audit Trail - the value is modified when an Audit Trail Update is received. Outputs Audit Trail when requested.

Backlog - the current center backlog is maintained. Receives Job Record Backlog Change. When dictation is Completed, or a Hardcopy job created, the backlog is increased by the job Length. When a dictation job is cancelled or signed-off, the backlog is decreased by the job Length. The supervisor may request the backlog be recalculated. Make a Job Record Request for jobs with status of Ready, Pending, or Assigned. Receive a Job Record Response and sum Lengths.

Center Transcription Rate - the value is modified when a Center Transcription Rate Update is received. Puts the Center Transcription Rate when requested.

Center Turnaround Time - receive Backlog and Center Transcription Rate. Divide Backlog by Center Transcription Rate to form Center Turnaround Time. Put Center Turnaround Time when requested.

Record Description - outputs Record Description when requested.

Report Definitions - receives Report Definition Updates. Adds the definition if the report does not exist. If it exists, it is modified. If it is a deletion, the definition is removed. Outputs Report Definitions on request.

Screen Definitions - output when requested. Selection Required, part of a Screen Definition, is also output when requested.

Unit Costs - modifies the values when a Default Unit Cost Update is received. Outputs Default Unit Costs when requested.

Weighting Factors - the values are modified when a Weighting Factors Update is received. Outputs Weighting Factors when requested.

jobIdGenerator    Module 2.1

NAME jobIdGenerator - distribute job identifiers for new jobs.

DESCRIPTION

A table of the 10,000 available Job Identifiers is maintained. When a Job Identifier is requested by a supervisor session module, the next available one is returned and marked as no longer available and put Job Capacity Change. When an Archived Job Identifier arrives, the identifier is made available, and put Job Capacity Change.

When a Job Id Request is received, put a Job Id Reply using the next available Job Identifier. Put Job Capacity Change.

smMessageArbiter                                          Module 2.2

NAME smMessageArbiter - distribute messages from supervisorInterface to systemManager or voiceSession modules.

DESCRIPTION

Messages are received from the supervisorInterface via a communications channel. Distributes the message to recipient systemManager modules or reformat and forward them to voiceSession. Note that a User Profile To Delete is directed to vsUserProfileSupport rather than directly to systemDataBase since the Spoken Name File must also be deleted.

smMessageDispatcher                                       Module 2.3

NAME smMessageDispatcher - send messages from systemManager to supervisorInterface.

DESCRIPTION

All messages sent by any systemManager or voiceSession module and destined for any supervisorInterface module are collected by smMessageDispatcher. The messages are given a type and sent over the applicable communication channel.

updateJobRecord                                           Module 2.4.1.1

NAME updateJobRecord - Performs updates for job records.

DESCRIPTION

Receive a Job Record Update Request or a VS Job Record Update. If the record does not exist, then it will be created. If the update cannot be made (e.g. Status = Pending or Qualification not met) then send Update Failure; otherwise send Job Record Change.

If redundancy is in effect, then updates will cause job records to be updated on both the primary and alternate disks for all fields except the Voice File and Header. When either the Voice file gets created or the job header gets created or changed, the data base will be told which disk to perform the update on.

archiveChecker                                                   Module 2.4.1.2

NAME archiveChecker - Delete all archivable job records from the database and send them to be archived.

DESCRIPTION

Remove jobs that have a status of Finish, Cancel, or Discard from the database and send them to be archived. Send a Job Record Change and Archived Job Identifier for each archivable job record.

getSelectedJobRecord                                  Module 2.4.1.3

NAME getSelectedJobRecord - Select all of the job records that meet the selected criteria.

DESCRIPTION

Search the database to find all of the records that meet the selected criteria in a Job Record Request and send a Job Record Response containing them.

newJobHeader                                               Module 2.4.1.4

NAME newJobHeader - Keep track of all changes made to Ready jobs to see if a new job header must be created.

DESCRIPTION

Receive a Job Record Change. If the update affects one of the fields that comprise a Job Header (Author Identifier, Author Name, Subject, or Work Type) and the status of the job is READY, then the New Header flag for that job identifier will be set.

A New Header flag may also be directly read or updated by another module.

updateUserProfile                                     Module 2.4.2.1

NAME updateUserProfile - Perform updates for user profile.

DESCRIPTION

Receive a request to update a user profile record. If the record does not exist, then it will be created. This module will also receive requests for deleting a user profile record.

If redundancy is in effect, then updates (including creating/deleting) will affect user profile records on both the primary and alternate disks for all fields except the Spoken Name File. When the Spoken Name File is created, the database will be told which disk to perform the update on.

Send User Profile Change for each update to the appropriate other modules.

getSelectedUserProfile — Module 2.4.2.2

NAME getSelectedUserProfile - Select all of the user profile records that meet the selected criteria.

DESCRIPTION

Receive a User Profile Request. Search the database to find all of the records that meet the selected criteria and send the User Profile Response containing them.

systemManagerDataBase — Module 2.4.3

NAME systemManagerDatabase - Performs database functions for Accessible Work Types, Auto Finish Work Types, Baskets, Pool Definitions, Port Information, Redundancy, Transcription Pool Assignments, Voice Safety Factors, VS Set Ups, and Working Hours.

DESCRIPTION systemManagerDatabase maintains a number of data types, each of which is discussed below. All changes to databases, except changes to baskets or working hours, will be sent from the database to either be logged or shown as live screen updates.

Accessible Work Types - The values are modified when an Accessible Work Type Update is received. Outputs Accessible Work Types when requested.

Auto Finish Work Types - The values are modified when an Auto Finish Work Type Update is received. Outputs Auto Finish Work Types when requested.

Baskets - Send the list of voice mail messages a user has when requested. Modify a Basket when a voice mail message is sent to a user.

Pool Definitions - Receive a Pool Definition Update. Add the definition if the pool does not exist. If it exists, it is modified. If it is a deletion, the pool is removed. Output Pool Definition Change. Outputs Pool Definitions on Request.

Port Information - Port Information is modified when Port Information is received. Send Port Information when requested.

Redundancy - Redundancy cannot be turned on once it is off. Output Redundancy when requested.

Transcription Pool Assignments - Receive a Transcription Pool Assignment. Create a Transcription Pool Assignment for the transcreiptionist if one does not exist. If it exists, it is modified. If it is a deletion, the pool assignment is removed. A Transcription Pool Assignment change is sent for each update. Output Transcription Pool Assignments on request.

Voice Safety Factors - These values are modified when a Voice Safety Factor Update is received. Outputs Voice Safety Factors on request.

VS Set Ups - VS Set Ups are modified when a VS Set Up Update is received. Outputs VS Set Ups on request.

Working Hours - The Working Hours Database is modified when Logon Time and Logoff Time are received. Logon Time and Logoff Time are used to calculate a Working Hours Response after receiving a Working Hours Request.

userProfileSupport                                          Module 2.5

NAME userProfileSupport - handle updates to the User Profile Data Base which affect on-line users and requests from the voice session for user profile information.

PSEUDOCODE

```
get Address Request
    get User Profile using User Identifier from Address Request
    IF User Id is valid AND Voice Mail Subscriber
    THEN Valid Address = TRUE
        IF Spoken Name File is valid
        THEN set Spoken Name File in Address Reply
        ENDIF
    ELSE Valid Address = FALSE
    ENDIF
    set Port Identifier in Address Reply to value of Port Identifier from
        Address Request
    put Address Reply get User Personal Info Entered
    get User Profile
    set Spoken Name File and Password of User Profile to values
        in User Personal Info Entered
    put User Personal Info Update
    IF Redundancy
    THEN put Copy Voice File with Voice File Pointer = Spoken Name File
            and Voice File Type = SPOKEN NAME FILE
        get corresponding Voice File Copied
        put User Personal Info Update with Spoken Name File =
            Voice File Pointer from Voice File Copied and
            Alternate Disk = TRUE
    ENDIF
```

```
get User Profile Change
    get Port Information to see if user is logged on
    IF user is logged on
    THEN construct VS User Profile Update using Changed User Profile
                from User Profile Change and Port Identifier
                from Port Information
            put VS User Profile Update
    ENDIF get User Profile To Delete
    get corresponding User Profile
    IF Spoken Name File is present
    THEN put Delete Voice File with
                Voice File Pointer = Spoken Name File and
                Voice File Type = SPOKEN NAME FILE
                Disk Identifier = primary disk
``` userProfileSupport                                      Module 2.5

DESCRIPTION (cont'd)

```
            IF Redundancy
            THEN get same User Profile from alternate disk
                    put Delete Voice File with
                            Voice File Pointer = Spoken Name File on alternate
                                disk
                            Voice File Type = SPOKEN NAME FILE
                            Disk Identifier = alternate disk
            ENDIF
    ENDIF
    put User Profile Deletion
``` voiceFilePurger                                         Module 2.6

NAME voiceFilePurger - delete voice files when storage becomes low.

DESCRIPTION

Monitor the Voice File Usage Changes. Get the Voice Safety Factors. When the remaining capacity falls below the Voice Capacity Safety Margin, voice purging will commence. To purge a job, put Job To Cancel if the job is to be cancelled, or Job To Finish if the job is to be finished; put Purged Job. Purging is done in four categories of jobs. Within each category, the oldest jobs are purged first. Continue purging until the available capacity exceeds the Voice Capacity Safety Margin. Voice mail jobs which are older than the Voice Mail Retention Period are cancelled first. Next, Signed-off dictation jobs will be finished. Third, all remaining voice mail jobs will be cancelled. Finally, Ready dictation jobs will be cancelled.

Note that voice files may not be deleted immediately by the voice session because they are currently accessed; voiceFilePurger cannot assume the files have been removed, it must await feedback through Voice File Usage Changes. Note also that because of a delay in the feedback voiceFilePurger must make provision to avoid purging more jobs than necessary.

userSessionSupport                                    Module 2.7

NAME userSessionSupport - handle requests for information necessary for a user session to be initiated or ended.

PSEUDOCODE

\* Maintains internal data store which keeps track of Emulation. Is it active, on which port, what user is being emulated. \*

```
get User Info Request
    get User Profile from the User Profile Data Base
    IF User Id is valid
    THEN pull out VS User Profile items from User Profile
            construct VS User Profile Reply using Port Identifier
                from User Info Request
            put VS User Profile Reply
            IF User Info Request Type = LOGON REQUEST
            THEN construct VS Port Information Update message with
                    following values:

Port Identifier = Port Identifier from User Info Request
                    User Identifier = User Identifier from User Info Request
                    Logon Time = Time from User Info Request
                    put VS Port Information Update
            ENDIF
            ELSE update emulation info
    ENDIF
``` userSessionSupport                                    Module 2.7

PSEUDOCODE (cont'd)

```
                Transition Type = ADD USER
                put User Transition
                get Basket if Voice Mail Subscriber
                get Transcription Pool Assignment if Transcriptionist or Supervisor
                add self assignment pool for the port to the front of Transcription
                    Pool Assignment
                update Transcription Pool Assignment in systemDataBase
                put Job Record Request for each job in Basket
                get Job Record Response for each job
                construct User Job-pool Reply
                put User Job-pool Reply
        ELSE the VS User Profile Reply must indicate the User Identifier
                is invalid
                put VS User Profile Reply
        ENDIF get User Disconnect
        IF emulation is active on port indicated
        THEN put User Transition with
``` userSessionSupport                                              Module 2.7

PSEUDOCODE (cont'd)

Transition Type = DELETE USER and
                    User Identifier = Identifier of emulated user
                    set emulation inactive
                    update Transcription Pool Assignment for the user to remove
                            self assignment pool
            ELSE put User Transition with
                    Transition Type = DELETE USER and
                    User Identifier from Port Information
                put VS Port Information Update with
                    User Identifier = none and Logon Time = none
                update Transcription Pool Assignment for the user to
                    remove self assignment pool
            ENDIF listenSupport                                                   Module 2.8.1

NAME listenSupport - handle supervisor session support of the voice session dictation service Review functions.

DESCRIPTION

When a Listen Request is received, get the Port Information for the indicated port. Get the User Profile for the user logged on to the port and store it in the Listen List for that port. Put a Job Record Request for internal dictation jobs based on the Attribute and Value from the Listen Request. Get the resulting Job Record Response. Check the Author Identifier for each job; if the author is the same as the user issuing the Listen Request, put the Job Record in the Listen List; otherwise put the Job Record in the Listen List only if its Work Type is an Accessible Work Type.

Put a Schedule Job message using a VS Ready Job Record constructed from the first job in the Listen List using the Pool Identifier for the pool reserved for listening at the port, and setting New Header to FALSE (since headers are not listened to). Set Next Job in the Listen List = 2.

When Listen From Pool message is received, put a Schedule Job message using a VS Read Job Record constructed from the job indicated by Next Job in the Listen List, using the Pool Identifier for the pool reserved for listening at the port, and setting New Header to FALSE. Put a Job Listen Access message using the same Job Record and the User Profile from the Listen List. Increment Next Job in the Listen List.

poolMonitor                                                     Module 2.8.2.1

NAME poolMonitor - handle supervisor session support of voice session functions involving pools.

DESCRIPTION poolMonitor uses the Active Pool Data Store to keep track of which pools are active and inactive. A pool is inactive if its Pool Assignment Count is 0; it is active if its Pool Assignment Count is greater than 0.

The newly active pool routine is:

If the pool is not a self assignment pool and Schedule Request for the pool is FALSE, put a Continue Scheduling message for the pool. (Scheduling will begin for a self assignment pool when a Self Assignment Request is received.)

The newly inactive pool routine is:

If there is a Current Job for the pool, send a Clear Pool message. (This applies to all pools, including self assignment pools.)

When a User Transition is received, get the Transcription Pool Assignment for the user. If the Transition Type is ADD USER, increment the Pool Assignment Count for each pool in the Transcription Pool Assignment; if the Transition Type is DELETE USER, decrement the Pool Assignment Counts. If a pool becomes active, perform the newly active pool routine; if a pool becomes inactive, perform the newly inactive pool routine.

When a Transcription Pool Assignment Change is received, check the Port Information to see if the user is currently logged on. If so, perform the following steps. Put a Transcription Pool Assignment Update message for the user. Decrement the Pool Assignment Count for each pool in the Old Transcription Pool Assignment; increment the count for each pool in the Changed Transcription Pool Assignment. If a pool becomes active, perform the newly active pool routine; if a pool becomes inactive, perform the newly inactive pool routine.

When a Pool Cleared message is received, if the Job Identifier it contains matches the Current Job for the pool, clear the Current Job. Otherwise do nothing.

When a Job To Schedule is received, the appropriate action depends on Job Available, whether the pool is active, and whether the pool is self assignment pool. There are five cases:

- If Job Available is TRUE and the pool is active, put a Schedule Job message, update the Current Job, and clear the Schedule Request.

poolMonitor Module 2.8.2.1

DESCRIPTION (cont'd)

- If Job Available is TRUE and the pool is inactive, put a VS Job Record Update updating the Status to READY, and clear the Schedule Request.

- If Job Available is FALSE, the pool is active, and it is a self assignment pool, put a Schedule Job message indicating no more jobs fit the self assignment criterion; clear the Schedule Request.

- If Job Available is FALSE, the pool is active, and it is not a self assignment pool, put a Continue Scheduling message for the pool.

- If Job Available is FALSE and the pool is inactive, clear the Schedule Request.

jobScheduler                                                     Module 2.8.2.2

NAME jobScheduler - schedule dictation jobs for pools according to their pool definitions.

DESCRIPTION

When Schedule Job For Pool is received, get the Pool Definition for the pool. Put a Job Record Request according to the Pool Definition with Status = READY. Get the resulting Job Record Response. If the response contains no jobs, set Job Available to FALSE; otherwise select which job to schedule by the following steps. Take the oldest job (i.e. the one with the oldest Date And Time Completed/Sent) of those having the highest priority. Put a VS Job Record Update with Status = PENDING, Pool = the Pool Identifier from Schedule Job For Pool and Qualification = READY. If Update Failure is received (which could happen, for example, if the job is cancelled), eliminate the job from the selection group and repeat the same selection process. When an update succeeds, put a VS Job Record Request for the job (to get the latest version in case it has changed), get the resulting VS Job Record Response and the New Header flag for the job. Use these and the Pool Identifier from Schedule Job For Pool to build a Job To Schedule. Put the Job To Schedule.

When Continue Scheduling is received, follow the same steps as for Schedule Job For Pool with the following exception. If the Job Record Response resulting from the Job Record Request built according to the Pool Definition contains no jobs, continue the cycle of getting the Pool Definition (in case it changes), using it to put a VS Job Record Request with Status = READY, and getting the resulting VS Job Record Response until a job to schedule is found.

transcriptionEventHandler                                        Module 2.8.2.3

NAME transcriptionEventHandler — handle supervisor session support of voice session events.

ASSUMPTIONS

The Status of a job in a Quit Assigned Job message is ASSIGNED. The Status of a job in a Sign-on message is PENDING. The Status of a job in a Sign-off message is ASSIGNED.

DESCRIPTION

The module must know what pool is the self assignment pool for each port.

When a Quit Assigned Job message is received, put a VS Job Record Update for the job with Status = READY and Date And Time Assigned cleared. If the pool is a self assignment pool and there is a Current Job for the pool, put a Clear Pool message.

When a Sign-on Message is received, put a VS Job Record Update for the job with Status = ASSIGNED and Date And Time Assigned = the current time. Put Schedule Job For Pool using the Pool Identifier from the Sign-on Message. Set Schedule Request = TRUE for the pool.

When a Sign-off Message is received, put a Job Record Request for the job, and get the resulting Job Record Response. Use the Date And Time Completed/Sent from the Job Record and the Date And Time Signed-Off = the current time to put Working Hours Request. Get the resulting Working Hours Response. Get the User Profile for the User Identifier in the Sign-off Message. Put a VS Job Record Update for the job with Status = SIGNED-OFF, Date And Time Signed-off = the same time as was used for the Working Hours Request, Real Turnaround Time = Date And Time Signed-off - Date And Time Completed/Sent, Working Turnaround Time = Working Hours Response, Transcriptionist = User Identifier from the Sign-off Message, Transcriptionist Name = Name from the User Profile. Get the Auto Finish flag for the job's Work Type. If it is TRUE, put Job To Finish for the job.

When a Self Assignment Request is received, put a Pool Definition Update for the self assignment pool for the port. Put a Job To Schedule for the port and set Schedule Request to True.

voiceFileSupport                                     Module 2.8.3

NAME voiceFileSupport - handle voice file changes involving the voice session.

ASSUMPTIONS

The Job Type of a Job To Cancel will be INTERNAL DICTATION or VOICE MAIL. The Job Type of a Job To Finish will be INTERNAL DICTATION. The Job Type of a Job To Discard will be VOICE MAIL. The Job Type of a Job To Copy will be INTERNAL DICTATION or VOICE MAIL.

DESCRIPTION

The basic voice file deletion routine is:
Put a Delete Voice File message for the Job Voice File with Disk Identifier = the primary disk. Put a Delete Voice File message for the Job Header with Disk Identifier = the primary disk. If Redundancy is in effect, put a Job Record Request for the job with Alternate Disk = TRUE. Get the resulting Job Record Response. Put a Delete Voice File message for the Job Voice File with Disk Identifier = the alternate disk. Put a Delete Voice File message for the Job Header with Disk Identifier = the alternate disk.

When a Job To Cancel is received, put a VS Job Record Update for the job with Status = CANCELLED, Date And Time Cancelled = the current time, Termination Status = CANCELLED, and Qualification = READY + SENT. If an Update Failure is received, do not proceed with the cancellation. Otherwise put a Job Record Request for the job and get the resulting Job Record Response. If the Job Type = VOICE MAIL, put Voice Mail To Cancel; get the Online Baskets. If the voice file is now unreferenced, (because of the Hardcopy function, a voice file may be referenced by both a voice mail Job Record and a dictation Job Record) perform the basic voice file deletion routine with the Online Baskets in the Delete Voice File message for the Job Voice File on the primary disk, but not in any of the others.

When a Job To Finish is received, put a VS Job Record Update for the job with Status = FINISHED, Date And Time Finished = the current time, Termination Status = FINISHED and Qualification = SIGNED-OFF. If an Update Failure is received, do not continue with the process. Otherwise, put a Job Record Request for the job and get the resulting Job Record Response. If the voice file is now unreferenced (i.e. is not pointed to by a voice mail Job Record), perform the basic voice file deletion routine.

When a Job To Discard is received, put a VS Job Record Update for the job with Status = DISCARDED, Date And Time Discarded = the current time, Termination Status = DISCARDED, and Qualification = SENT. If an Update Failure is received, do not continue the process. Otherwise, if the voice file is now unreferenced (i.e. is not pointed to by a dictation Job Record), perform the basic voice file deletion routine.

voiceFileSupport                                                                 Module 2.8.3

DESCRIPTION (cont'd)

When a Job To Copy is received, put a Copy Voice File message for the Job Voice File with the Voice File Type = JOB VOICE FILE and the Disk Identifier = the alternate disk. Also put a Copy Voice File message for the Job Header with the Voice File Type = JOB HEADER and the Disk Identifier = the alternate disk.

When a Voice File Copied message is received, put a VS Job Record Update for the Job Voice File or Job Header, as appropriate, and with Alternate Disk = TRUE.

When a New Job Header message is received, put a VS Job Record Update for the header with Alternate Disk = FALSE. If Redundancy is in effect, put a Copy Voice File message for the header with Voice File Type = JOB HEADER and the Disk Identifier = the alternate disk.

dictationSupport                                                                 Module 2.8.4

NAME dictationSupport - handle supervisor support of the voice session dictation functions.

DESCRIPTION

When a Complete Job message is received, get the User Profile for the author. Construct a VS Job Record Update using the Job Record fields from the Complete Job message; add the Author Name using the Name from the User Profile; add the Job Type = INTERNAL DICTATION, add the Special Designator from the User Profile; add Typing Length = Length * DICTATION RATE from the User Profile (* appropriate scaling factor); add Status = READY. Put the VS Job Record Update. If Redundancy is TRUE, put Job To Copy.

When a Hardcopy Job message is received, get the User Profile for the author. Construct a VS Job Record Update using the Job Record fields from the Hardcopy Job message; replace the Job Identifier with a new one from the jobIdGenerator; add the Author Name using the Name from the User Profile; add the Job Type = INTERNAL DICTATION; add the Work Type = Hardcopy Work Type; add the Special Designator from the User Profile; add Typing Length = Length * Dictation Rate from the User Profile (* appropriate scaling factor); add Status = READY. Put the VS Job Record Update. Set the New Header for the job to TRUE so that a header will be constructed when the job is scheduled.

voiceMailSupport                                                                Module 2.8.5

NAME voiceMailSupport - handle supervisor session support of the voice session voice mail functions.

DESCRIPTION

When a Send Voice Mail message is received, get the User Profile for the author. Construct a VS Job Record Update using the Job Record fields from the Send Voice Mail message; add the Author Name using the Name from the User Profile; add Job Type = VOICE MAIL; add Status = SENT. Put the VS Job Record Update.

Put the Job Identifier in the Basket of each user indicated in the Addresses in the Send Voice Mail message. Get the Port Information; put a New Voice Mail message for each user indicated in the Addresses who is currently logged on.

If Redundancy is TRUE, put Job To Copy.

If the Hardcopy Flag is the Send Voice Mail message is TRUE, get the User Profile for the author. Construct a VS Job Record Update using the Job Record fields from the Send Voice Mail Message; replace the Job Identifier with a new one from the jobIdGenerator; add the Author Name using the Name from the User Profile; add the Job Type = INTERNAL DICTATION; add the Work Type = Hardcopy Work Type; add the Special Designator from the User Profile; add Typing Length = Length * Dictation Rate from the User Profile (* appropriate scaling factor); add Status = READY. Put the VS Job Record Update. Set the New Header for the job to TRUE so that a header will be constructed when the job is scheduled.

When a Discard Voice Mail By Recipient message is received, remove the job Identifier from the Basket of the user indicated. If this was the last Basket containing the job, put Job To Discard.

When Voice Mail To Cancel is received, find which Baskets the job appears in and remove it from each. Check the Port Information; put Online Baskets containing each Basket of a logged-on user in which the job appears.

MODULE SPECIFICATIONS FOR VOICE SESSION determineCommandType                    Module 1.1.1.1

NAME determineCommandtype — receive a command and invoke the appropriate execute command module

DESCRIPTION

Receive a command and invoke the appropriate execute command module.

Commands may come from the Implicit Commands queue, from the user, or be automatically generated by timeout conditions. Implicit commands are given preference over other sources of commands. For a command entered by the user, update Last User Command Time.

If there is no Implicit Command ready, play the Brief Command Prompt, using the appropriate Voice Files. Before sending the prompts, take these steps:

1. Update the Key Meanings, and check for a user-entered command (from Command Entry). If a command is present, do not play the prompt.
2. Update the Command Prompt Table, and play the prompt.

Keep checking first for an Implicit Command then for a user-entered command until one is received. Then invoke the appropriate execute command module.

If the Inactivity Timeout Enable is set, and the Inactivity Timeout Override is not set, and the Inactivity Timeout is exceeded, execute the HANG-UP command. Check for Inactivity Timeout only if the Port Status is OFFHOOK. Reset the beginning time for checking Inactivity Timeout after every user-entered command is executed.

If the Current State is INTERCOM PENDING STATE and INTERCOM PENDING TIMEOUT (a local constant indicating how often to notify a user someone is intercoming him) is exceeded, execute the INTERCOM-PENDING command.

PSEUDOCODE

```
* Overview: The essential algorithm is, once a command to process       *
*           is found, do not look any further                     :     *

* Local Constant:
*    INTERCOM PENDING TIMEOUT — How often to notify a user some-        *
*                              one is intercoming him if he does        *
*                              not respond                              *

* Local Variables:
*    Last Command User-entered —    TRUE if the last command pro-       *
*                                   cessed was entered by the user      *
*    Check Inactivity Timeout —     TRUE if inactivity timeout should   *
*                                   be checked for                      *
*    Inactivity Timeout Begin —     time from which to calculate        *
*                                   inactivity                          *
*    Current Time              —    the current time                    *
*    Command To Process        —    the command to be processed         *
```

```
Command To Process = none
Check Inactivity Timeout = (Port Status = OFFHOOK)
                           AND Inactivity Timeout Enable
                           AND NOT Inactivity Timeout Override
IF Check Inactivity Timeout AND Last Command User-entered
THEN get Current Time
     Inactivity Timeout Begin = Current Time
ENDIF
IF Implicit Commands NOT empty
THEN dequeue Implicit Command
     Command To Process = Implicit Command
     Last Command User-entered = FALSE
ELSE IF Port Status = OFFHOOK      * Prompt need not be sent if onhook*
     THEN update Key Meanings
          get Command Entry
          IF Command Present
          THEN Command To Process = Command
               Last Command User-entered = TRUE
               update Last User Command Time
          ELSE update Command Prompt Table
               play Brief Command Prompt
          ENDIF
     ENDIF
ENDIF LOOP UNTIL Command To Process NOT = none
       get Current Time
            * Check for Inactivity Timeout *
       IF Check Inactivity Timeout
       AND (Current Time - Inactivity Timeout Begin > Inactivity Timeout)
       THEN Command To Process = HANG-UP
            Last Command User-entered = FALSE
       ENDIF

* Check for INTERCOM PENDING TIMEOUT *
       IF (Command To Process = none)
       AND (Current State = Pending)
       AND (Current Time - Intercom Pending Timeout Begin >
            INTERCOM PENDING TIMEOUT)
       THEN Command To Process = Intercom Pending
            Last Command User-entered = FALSE
       ENDIF
            * Check for Implicit Command *
       IF (Command To Process = none)
       AND Implicit Commands NOT empty
       THEN dequeue Implicit Command
            Command To Process = Implicit Command
            Last Command User-entered = FALSE
       ENDIF
            * Check for user-entered command (from Command Entry) *
       IF (Command To process = none)
       THEN get Command Entry
            IF Command Present
            THEN Command To Process = Command
                 Last Command User-entered = TRUE
                 update Last User Command Time
            ENDIF
       ENDIF
   ENDLOOP
```

```
* Execute the command *
CASE Command To Process OF
     ADDRESS                 : call executeAdddress
        .
        .
        .
     VOICE-MAIL              : call executeVoiceMail
     OTHERWISE               : * no other possibilities *
ENDCASE
``` executeAddress                              Module 1.1.1.2.1

NAME

ExecuteAddress

ASSUMPTIONS

On entry, Current State is ADDRESS STATE, STOP STATE, INSERT STATE,
   PLAY STATE, FAST FORWARD STATE, or FAST BACKWARD STATE.

DESCRIPTION

If the Current State is FAST FORWARD STATE, FAST BACKWARD STATE,
   PLAY STATE, or INSERT STATE then enqueue an implicit STOP command
   followed by an implicit ADDRESS command and return.

Otherwise, both the Home State and the Current State become ADDRESS STATE.
   If the Hardcopy Flag is set, play the Hardcopy Selected Prompt. Play a User
   Indicator for each Address on the Address List. A User Indicator is the Spoken
   Name File if one exists; otherwise it is a User Identifier Playback followed by
   an ADDRESS LIST DELIMITER TONE. Play the User Indicator at a delivery
   rate of 100% and a pause compression of 100% regardless of what these ratios
   are currently set to.

executeAddToList                            Module 1.1.1.2.2

NAME executeAddToList - add personal ID's to the address list.

ASSUMPTIONS

Current state is ADDRESS STATE.

PSEUDOCODE

```
* Local Variables:                                                    *
*    Addressing Done — TRUE when adding is complete                   *
*    Temp Address list — Temporary store for addresses and            *
*                        corresponding Spoken Name Files              *
*                        entered (kept in case user cancels function) *

IF Address List is full
THEN play Address List Full Prompt
    RETURN
```

```
            ENDIF
            play Enter Addresses Prompt
            Addressing Done = FALSE
            LOOP UNTIL Addressing Done OR Address List is full
                 get Data Item Entry
                 IF Embedded Command is present
                 THEN IF Embedded Command = CANCEL
                      THEN play Function Cancelled Prompt
                           RETURN
                      ELSE * Embedded Command = HANG-UP *
                           Addressing Done = TRUE
                           ENQUEUE HANG-UP on Implicit Commands queue
                      ENDIF
                 ELSE IF Num Digits = 0 * User indicates end by null address *
                      THEN Addressing Done = TRUE
                      ELSE IF Num Digits > User Identifier Maximum Length
                           THEN play ERROR TONE
                                play Invalid Address Prompt
                           ELSE put Address Request using Data Item and Port Identifier
                                get Address Info
                                IF NOT Valid Address
                                THEN play ERROR TONE
                                     play Invalid Address Prompt
                                ELSE play User Indicator
                                     add Address & Spoken Name File
                                          (if present) to Temp Address List
                                ENDIF
                           ENDIF
                      ENDIF
                 ENDIF
            ENDLOOP IF Address List is full
            THEN play Address List Full Prompt
            ENDIF
            add Temp Address List to Address List
``` executeBreak                                                  Module 1.1.1.2.3

NAME executeBreak - breaks the communication link between two user sessions.

ASSUMPTIONS

Two users are connected by either the Monitor function or the Intercom function. One of the two users must be the supervisor. The BREAK command can only be entered by the supervisor. On entry, the Current State is a Home State.

PSEUDOCODE

```
IF Current State = MONITOR STATE
THEN * connection is monitor *
     Home State = Previous Home State
     Current State = Previous Home State
     clear Monitor Connection
     break the connection
```

```
        RETURN
    ENDIF
    * Else connection is intercom *
    IF Intercom Status = WAITING
    THEN * other party cancelled *
        clear Intercom Connection
        RETURN
    ENDIF
    IF Supervisor AND Intercom Active
    THEN break the connection
        Intercom Active = FALSE
        enqueue BREAK in Implicit Commands queue of user session
            of Other Party Port
    ENDIF
    If Current State = INTERCOM RECEIVE STATE
    THEN Home State = Previous Home State
        Current State = Previous Home State
    ENDIF
    clear Intercom Connection
    play Intercom Ended Prompt
``` executeCancel                                                       Module 1.1.1.2.4

NAME executeCancel - cancel the currently executing function and return the user
    the Home State for the level.

PSEUDOCODE

```
    IF Intercom Status = PENDING
    THEN Intercom Active = FALSE
        play Function Cancelled Prompt
        enqueue BREAK on Implicit Commands queue of user session
            of Other Party Port
        clear Intercom Connection
        RETURN
    ENDIF IF Home State = Cut State
    THEN play Function Cancelled Prompt
        Current State = STOP STATE
        Home State = STOP STATE
        Most Recent Cursor = Cut Mark
        reset voice cursor to Cut Mark
        enqueue STOP on Implicit Commands queue
        RETURN
    ENDIF
CASE OF Current State
    INSERT STATE:   play Function Cancelled Prompt
                    cut voice stream from Insert Begin
                        to voice cursor location
                    * this resets voice cursor to Most Recent Cursor *
                    Current State = STOP STATE
                    enqueue STOP on Implicit Commands queue
    PLAY STATE:     play Function Cancelled Prompt
                    reset voice cursor to Most Recent Cursor
                    enqueue STOP on Implicit Commands queue
```

```
FAST BACKWARD, FAST FORWARD STATE:
                play Function Cancelled Prompt
                reset voice cursor to Most Recent Cursor
                enqueue STOP on Implicit Commands queue
OTHERWISE:      * do nothing *
ENDCASE
``` executeComplete                                    Module 1.1.1.2.5

NAME executeComplete - complete a dictation job.

ASSUMPTIONS

On entry, Current State is STOP STATE, INSERT STATE, PLAY STATE, FAST FORWARD STATE, FAST BACKWARD STATE, or CUT STATE.

PSEUDOCODE

```
IF Home State = CUT STATE
THEN enqueue CANCEL, COMPLETE on Implicit Commands queue
     RETURN
ENDIF
IF Current State NOT = STOP STATE
THEN enqueue STOP, COMPLETE on Implicit Commands queue
     RETURN
ENDIF Length of VS Write Job Record = length of voice file
IF Length < minimum allowed
THEN enqueue DISCARD on Implicit Commands queue
     play Job Too Short Prompt
     RETURN
ENDIF
close the Voice File indicated by Job Voice File
get Job Identifier and put in VS Write Job Record
Date & Time Completed/Sent in VS Write Job Record = current time
Author identifier in VS Write Job Record = User Identifier from
     Intersession Info
construct Job Header using VS Write Job Record
put Job Header in VS Write Job Record
put Complete Job
Current Job Id = none
Access Type = none
Current State = COMMAND STATE
Home State = COMMAND STATE
IF Auto Create
THEN enqueue CREATE on Implicit Commands queue
ENDIF
play Dictation Complete Prompt
``` executeCompressPauses                                    Module 1.1.1.2.6

NAME executeCompressPauses - decrease the amount of the recorded pause that is played.

ASSUMPTIONS

On entry, Current State is PLAY STATE, INSERT STATE, STOP STATE, or CUT STATE.

PSEUDOCODE

```
CASE OF Current State
     CUT STATE, STOP STATE:  IF Pause Percent NOT = lower limit for
                                pause compression
                             THEN decrease Pause Percent by 10%
                             ENDIF INSERT STATE: enqueue STOP, COMPRESS-PAUSES, INSERT on Implicit
                   Commands queue PLAY STATE:   enqueue STOP, COMPRESS-PAUSES, PLAY on Implicit
                   Commands queue OTHERWISE:    * There are no other possibilities *

ENDCASE
``` executeCreate                                    Module 1.1.1.2.7

NAME executeCreate - creates a new voice file, either a Dictation job or a Voice mail message.

ASSUMPTIONS

On entry, Current State is COMMAND STATE.

PSEUDOCODE

```
* For this module Create Data Item = [Work Type, Subject, Department] *
* Local variable:                                                     *
*    Valid Data — TRUE when user has entered a valid data item        * put Job Id Request using Port Identifier from Intersession Info
IF Service = DICTATION SERVICE
THEN for each Create Data Item
        IF Create Data Item Maximum Length = 0
        THEN Create Data Item = null
        ELSE IF NOT Create Data Item Prompt in Intersession Info
                THEN Create Data Item = Create Data Item in Previous
                     Create Data Values
                ELSE Valid Data = FALSE
                    LOOP UNTIL Valid Data
```

```
            play Enter Create Data Item Prompt
            get Data Item Entry
            IF Embedded Command is present
            THEN IF Embedded Command = CANCEL
                    THEN play Function Cancelled Prompt
                    ELSE * Embedded Command = HANG-UP *
                        enqueue HANG-UP on Implicit Commands
                            queue
                    ENDIF
                    RETURN
            ENDIF
            IF Num Digits = 0
            THEN Create Data Item = Create Data Item in
                        Previous Create Data Values
                 Valid Data = TRUE
            ELSE IF  Data Item is valid for Create Data Item
                        using Create Data Item Maximum Length
                        (and range for Work Type)
                    THEN Create Data Item = Data Item
                         Valid Data = TRUE
                    ELSE play ERROR TONE
                         play Invalid Create Data Item Prompt
                    ENDIF
                ENDIF
            ENDLOOP
        ENDIF
     ENDIF
        Create Data Item in VS Write Job Record = Create Data Item
        Create Data Item in Previous Create Data values = Create Data Item
    end for
ENDIF create a new Voice File using Initial Creation Allotment
Job Voice File = pointer to the new Voice File
open the new Voice File and attach it with read/write access
Access Type = CREATE ACCESS
Author Identifier in VS Write Job Record = User Identifier in Intersession
    Info
Cue Location = null
Date & Time Created = current time Current State = STOP STATE
Home State = STOP STATE
initialize Current Job Status
``` executeCue                                          Module 1.1.1.2.8

NAME executeCue - place a cue in a voice file.

ASSUMPTION

On entry, Current State is STOP STATE, PLAY STATE, or INSERT STATE.

PSEUDOCODE

CASE OF Current State
        STOP STATE    :    set Cue Location to voice cursor
                                 play Cue Placed Prompt
        INSERT STATE :    enqueue STOP, CUE, INSERT on Implicit Commands
                                   queue
        PLAY STATE   :    enqueue STOP, CUE, PLAY on Implicit Commands
                                   queue
        OTHERWISE    :    * There are no other possibilities *
    ENDCASE executeCut                                       Module 1.1.1.2.9

NAME executeCut - place first mark for cutting voice from a file.

ASSUMPTION

On entry, Current State is PLAY STATE or STOP STATE.

PSEUDOCODE

IF Current State = PLAY STATE
    THEN enqueue STOP, CUT on Implicit Commands queue
        RETURN
    ENDIF
    Cut Mark = Most Recent Cursor
    Current State = CUT STATE
    Home State = CUT STATE executeCutFromBeginning                Module 1.1.1.2.10

NAME executeCutFromBeginning - remove the segment of voice from the beginning
    of the file to the current cursor location.

ASSUMPTIONS

On entry, Current State is CUT STATE or STOP STATE

PSEUDOCODE

IF Current State = STOP STATE
    THEN enqueue CUT, MOVE-TO-BEGINNING, STOP-CUT on Implicit Commands
        queue
    ELSE enqueue MOVE-TO-BEGINNING, STOP-CUT on Implicit Commands queue
    ENDIF executeCutToEnd                                  Module 1.1.1.2.11

NAME executeCutToEnd - remove the segment of voice from the current cursor location to the end of the file.

ASSUMPTIONS

On entry, Current State is CUT STATE or STOP STATE.

PSEUDOCODE

```
IF Current State = STOP STATE
THEN enqueue CUT, MOVE-TO-END, STOP-CUT on Implicit Commands queue
ELSE enqueue MOVE-TO-END, STOP-CUT on Implicit Commands queue
ENDIF
``` executeDeleteCue                                 Module 1.1.1.2.12

NAME executeDeleteCue - remove the cue from the voice file.

ASSUMPTION

On entry, Current State is PLAY STATE, STOP STATE, or INSERT STATE. Voice cursor need not be at Cue Location.

DESCRIPTION

```
CASE OF Current State
    STOP STATE    :   erase Cue Location
                      play Cue Deleted Prompt
    INSERT STATE  :   enqueue STOP, DELETE-CUE, INSERT on Implicit
                          Commands queue
    PLAY STATE    :   enqueue STOP, DELETE-CUE, PLAY on Implicit
                          Commands queue
    OTHERWISE     :   * There are no other possibilities *
ENDCASE
``` executeDictation                                 Module 1.1.1.2.13

NAME executeDictation - change service to Dictation.

ASSUMPTIONS

On entry, Current State is SERVICE STATE or COMMAND STATE. User must be a Dictation Subscriber.

PSEUDOCODE

```
    IF Current State = COMMAND STATE
    THEN enqueue SERVICE, DICTATION on Implicit Commands queue
        RETURN
    ENDIF Current State = COMMAND STATE
    Home State = COMMAND STATE
    Service = DICTATION SERVICE
    put Service Selected IF Supervisor
    THEN RETURN
    ENDIF IF User Class = DICTATOR
    THEN Work Type in Previous Create Data Values =
            Work Type in Intersession Info
        same for Subject & Department
        IF Auto Create
        THEN enqueue CREATE on Implicit Commands queue
        ENDIF
    ELSE * User Class = TRANSCRIPTIONIST *
        Self-assignment Active = FALSE
        IF NOT Self Assignment Enable
        THEN enqueue SIGN-ON on Implicit Commands queue
        ENDIF
    ENDIF
``` executeDiscard                                         Module 1.1.1.2.14

NAME executeDiscard - discard the voice file currently accessed.

ASSUMPTIONS

On entry, Current State is STOP STATE. Access Type is CREATE ACCESS, LISTEN ACCESS, or REVIEW ACCESS.

PSEUDOCODE

```
    close the Voice File indicated by Job Voice File and the Job Header,
        if one exists
    IF Access Type = CREATE ACCESS
    THEN IF length > minimum allowed
        THEN put Confirm Discard Prompt
            update Key Meanings using CONFIRM, CANCEL
            get Menu Selection
            CASE OF Menu Selection
                CANCEL: play Function Cancelled Prompt
                        RETURN
                HANG-UP: enqueue HANG-UP on Implicit Commands queue
                        RETURN
                CONFIRM: IF Service = DICTATION SERVICE
                        THEN play Job Discarded Prompt
                        ELSE play Message Discarded Prompt
                        ENDIF
```

```
            OTHERWISE: * other selections are invalid *
        ENDCASE
    ENDIF
    get Job Identifier (from Requested Info) * only to synchronize *
    delete Voice File
ELSE * Access Type = LISTEN ACCESS OR REVIEW ACCESS *
    remove job from Voice Mail Messages
    put Discard Voice Mail By Recipient
    play Message Discarded Prompt
ENDIF IF Review Active
THEN enqueue REVIEW on Implicit Commands queue
ENDIF
Current Job Id = none
Access Type = none
Current State = COMMAND STATE
Home State = COMMAND STATE
``` executeEmulate                                          Module 1.1.1.2.15

NAME executeEmulate - emulate a user

ASSUMPTIONS

On entry, Current State is SERVICE STATE or COMMAND STATE. This command is only available to the supervisor.

PSEUDOCODE

```
* Local Variable:                                                       *
*    Valid Id — TRUE when the supervisor has entered a valid User       *
*                  Identifier                                           *
Valid Id = FALSE
LOOP UNTIL Valid Id
    play Emulate User Identifier Prompt
    get Data Item Entry
    IF Embedded Command is present
    THEN IF Embedded Command = CANCEL
         THEN play Function Cancelled Prompt
         ELSE * Embedded Command = HANG-UP *
             enqueue HANG-UP in Implicit Commands queue
         ENDIF
         RETURN
    ENDIF
    IF Num Digits = 0
    OR Num Digits > User Identifier Maximum Length
    THEN play ERROR TONE
        play Invalid User Identifier Prompt
    ELSE put User Info Request using Data Item for
            User Identifier and Port Identifier from Intersession Info
        get VS User Profile
        IF VS User Profile indicates invalid id
        THEN play ERROR TONE
            play Invalid User Identifier Prompt
        ELSE Valid Id = TRUE
```

```
                ENDIF
            ENDIF
ENDLOOP
Emulation Active = TRUE
Emulation Return State = Current State
Emulating User Session Status = Session Status
Emulating User Info = User Info from Intersession Info Data Store
update VS User Profile in Intersession Info Data Store from VS User Profile
get User Job-pool Info
update Transcription Pool Assignment and Voice Mail Messages
        in Intersession Info Data Store from User Job-pool Info
```

\_executeEmulate                                              Module 1.1.1.2.15

NAME executeEmulate - emulate a user

ASSUMPTIONS

On entry, Current State is SERVICE STATE or COMMAND STATE. This command is only available to the supervisor.

PSEUDOCODE

```
    * Local Variable:                                                       *
    *    Valid Id -- TRUE when the supervisor has entered a valid User      *
    *                     Identifier                                        *
    Valid Id = FALSE
    LOOP UNTIL Valid Id
        play Emulate User Identifier Prompt
        get Data Item Entry
        IF Embedded Command is present
        THEN IF Embedded Command = CANCEL
            THEN play Function Cancelled Prompt
            ELSE * Embedded Command = HANG-UP *
                enqueue HANG-UP in Implicit Commands queue
            ENDIF
            RETURN
        ENDIF
        IF Num Digits = 0
        OR Num Digits > User Identifier Maximum Length
        THEN play ERROR TONE
            play Invalid User Identifier Prompt
        ELSE put User Info Request using Data Item for
                User Identifier and Port Identifier from Intersession Info
            get VS User Profile
            IF VS User Profile indicates invalid id
            THEN play ERROR TONE
                play Invalid User Identifier Prompt
            ELSE Valid Id = TRUE
            ENDIF
        ENDIF
    ENDLOOP
Emulation Active = TRUE
Emulation Return State = Current State
Emulating User Session Status = Session Status
Emulating User Info = User Info from Intersession Info Data Store
``` update VS User Profile in Intersession Info Data Store from VS User Profile
get User Job-pool Info
update Transcription Pool Assignment and Voice Mail Messages
    in Intersession Info Data Store from User Job-pool Info
IF there are Voice Mail Messages in User Job-pool Info
THEN play Message Waiting Prompt
ENDIF Current State = SELECT STATE
Home State = SELECT STATE
Service = none
CASE OF Logon Auto-select from Intersession Info Data Store
    DICTATION SERVICE: enqueue DICTATION on Implicit Commands queue
    VOICE MAIL SERVICE: enqueue VOICE MAIL on Implicit Commands queue
    OTHERWISE: * do nothing *
ENDCASE
Delivery Rate Percent = DELIVERY100
Pause Percent = PAUSE100 executeErase                                    Module 1.1.1.2.16

NAME executeErase the Address list of a voice mail message.

ASSUMPTION

On entry, Current state is ADDRESS STATE.

DESCRIPTION

Set Hardcopy Flag to FALSE. Clear the Address List.
    Play the Address List Erased Prompt.

executeExpandPauses                             Module 1.1.1.2.17

NAME executeExpandPauses -- increase the amount of the recorded pause which is
    actually played.

ASSUMPTIONS

On entry, Current State is PLAY STATE, INSERT STATE, CUT STATE or STOP
    STATE.

PSEUDOCODE

CASE OF Current State
        CUT STATE, STOP STATE:  IF Pause Percent NOT = upper limit for
                                pause expansion
                                THEN increase Pause Percent by 10%
                                ENDIF INSERT STATE: enqueue STOP, EXPAND-PAUSES, INSERT on Implicit
                      Commands queue PLAY STATE: enqueue STOP, EXPAND-PAUSES, PLAY on Implicit Commands queue OTHERWISE: * There are no other possibilities *

ENDCASE executeFastBackward          Module 1.1.1.2.18

NAME executeFastBackward - start tone generation for fast-backward movement.

ASSUMPTION

On entry, Current State is STOP STATE, CUT STATE, FAST BACKWARD STATE, FAST FORWARD STATE, INSERT STATE, or PLAY STATE.

PSEUDOCODE

```
*    Local Variables:                                                          *
*        Fast Motion Begin Time - the time the FAST BACKWARD                   *
*            command was entered                                               *
*        Fast Motion End Time - the time the movement is stopped               *
*                                                                              *
*    The Fast Backward function moves the voice cursor                         *
*        past ten seconds of voice for every tone generated                    *
*        Tones are generated every half second. It is                          *
*        assumed that the times are based on the system clock                  *
*        which is accurate to a fraction of a second                           *

IF Current State =  FAST BACKWARD STATE
            OR FAST FORWARD STATE
            OR INSERT STATE
            OR PLAY STATE THEN enqueue STOP, FAST-BACKWARD on Implicit Commands queue
     RETURN
ENDIF
Current State = FAST BACKWARD STATE
Fast Motion Begin Time = Last User Command Time
calculate the number of half seconds from the current voice cursor
    location to the beginning of the voice file.
start generating the FAST-BACKWARD TONE, one every half second
IF the beginning of the file is reached before a telephony event is detected
THEN set voice cursor to the beginning of the voice file
ELSE     * a telephony event occurred *
    stop generating tones
    Fast Motion End Time = Last User Command Time
    calculate the number of half seconds between Fast Motion Begin Time
        and Fast Motion End Time
    number of half seconds   * 10 = number of seconds to move voice cursor
    set the voice cursor back the appropriate amount of time
ENDIF
enqueue STOP, PLAY on Implicit Commands queue
``` executeFastForward                                          Module 1.1.1.2.19

NAME executeFastForward - start tone generation for fast-forward movement.

ASSUMPTION

On entry, Current State is STOP STATE, CUT STATE, FAST BACKWARD STATE, FAST FORWARD STATE, INSERT STATE, or PLAY STATE.

PSEUDOCODE

```
    *    Local Variables:                                                        *
    *        Fast Motion Begin Time - the time the FAST FORWARD                  *
    *            command was entered                                             *
    *        Fast Motion End Time - the time the movement is stopped             *
    *                                                                            *
    *        The Fast forward function moves the voice cursor                    *
    *            past ten seconds of voice for every tone generated              *
    *            Tones are generated every half second. It is                    *
    *            assumed that the times are based on the system clock            *
    *            which is accurate to a fraction of a second                     *

IF Current State =   FAST BACKWARD STATE
                    OR FAST FORWARD STATE
                    OR INSERT STATE
                    OR PLAY STATE THEN enqueue STOP, FAST-FORWARD on Implicit Commands queue
         RETURN
    ENDIF
    Current State = FAST FORWARD STATE
    Fast Motion Begin Time = Last User Command Time
    calculate the number of half seconds from the current voice cursor
        location to the end of the voice file.
    start generating the FAST-FORWARD TONE, one every half second
    IF the end of the file is reached before a telephony event is detected
    THEN set voice cursor to the end of the voice file
    ELSE     * a telephony event occurred *
        stop generating tones
        Fast Motion End Time = Last User Command Time
        calculate the number of half seconds between Fast Motion Begin Time
            and Fast Motion End Time
        number of half seconds   * 10 = number of seconds to move voice cursor
        set the voice cursor forward the appropriate amount of time
        enqueue STOP, PLAY on Implicit Commands queue
    ENDIF
``` executeHangUp                                               Module 1.1.1.2.20

NAME executeHangUp - gracefully end a voice session and log the user off.

ASSUMPTIONS

A user terminated their voice session by setting their telephone-like device on-hook.

PSEUDOCODE

```
IF Emulation Active
THEN Emulation Active = FALSE
ENDIF
IF Intercom Status = PENDING
THEN enqueue CANCEL, HANG-UP on Implicit Commands queue
    RETURN
ENDIF
IF Current State =  SERVICE STATE
              OR COMMAND STATE
THEN enqueue CANCEL, LOGOFF on Implicit Commands queue
    RETURN
ELSE IF Current State =  MONITOR STATE
              OR INTERCOM RECEIVE STATE
    THEN enqueue BREAK, HANG-UP on Implicit Commands queue
        RETURN
    ENDIF
ENDIF CASE OF (Access Type)
    CREATE ACCESS:
        CASE OF (Current State)
            STOP STATE:  IF (Create Hang-up Option = Complete-Send)
                         THEN IF SERVICE = DICTATION SERVICE
                              THEN enqueue COMPLETE on Implicit
                                   Command queue
                              ELSE enqueue SEND on Implicit Command
                                   queue
                              ENDIF
                         ELSE enqueue DISCARD on Implicit
                              Command queue
                         ENDIF
                         enqueue LOGOFF on Implicit Command queue
            ADDRESS STATE: enqueue STOP, HANG-UP on Implicit
                           Command queue
            INSERT STATE: enqueue STOP, HANG-UP on Implicit Command
                          queue
            OTHERWISE:    enqueue CANCEL, HANG-UP on Implicit
                          Command queue
        ENDCASE
    OTHERWISE:
        enqueue CANCEL, QUIT, LOGOFF on Implicit Commands queue
ENDCASE
``` executeHardcopy  Module 1.1.1.2.21

NAME executeHardcopy - send a job record to the dictation system so a voice mail message can be transcribed.

ASSUMPTIONS

User is a subscriber of both voice mail and dictation services and is a dictator. The user is either addressing a voice mail message, or reviewing one he has received. On entry, Current State is PLAY STATE, STOP STATE, ADDRESS STATE, or INSERT STATE.

PSEUDOCODE

```
* Local Constant:                                                *
*    HARDCOPY WORK TYPE — Work Type used for Hardcopy            *
CASE OF Access Type
     LISTEN ACCESS, REVIEW ACCESS:
          IF Current State = STOP STATE
              THEN put Hardcopy Job using
                      VS Read Job Record and User Identifier
                      and HARDCOPY WORK TYPE
                  play Hardcopy Selected Prompt
              ELSE * Current State = PLAY STATE *
                  enqueue STOP, HARDCOPY, PLAY on
                      Implicit Commands queue
          ENDIF
     CREATE ACCESS:
          CASE OF Current State
                  ADDRESS STATE:      Hardcopy Flag = TRUE
                                      play Hardcopy Selected Prompt
                  STOP STATE:         enqueue ADDRESS, HARDCOPY,
                                          STOP on Implicit
                                          Commands queue
                  PLAY STATE:         enqueue STOP, ADDRESS,
                                          HARDCOPY, STOP, PLAY
                                          on Implicit Commands queue
                  INSERT STATE:       enqueue STOP, ADDRESS,
                                          HARDCOPY, STOP, INSERT
                                          on Implicit Commands
                                          queue
                  OTHERWISE:          * no other possibilities *
          ENDCASE
     OTHERWISE:  * no other possibilities *
ENDCASE
``` executeHelp                                          Module 1.1.1.2.22

NAME executeHelp - play help prompt for appropriate state.

ASSUMPTIONS

Help can be done at any time except when the system is expecting data.

PSEUDOCODE

```
IF Current State = INSERT STATE OR PLAY STATE OR FAST-BACKWARD
            STATE OR FAST-FORWARD STATE
THEN enqueue STOP on Implicit Commands queue
ENDIF
play Full Command Prompts based on Command Prompt Table
``` executeInsert                                                                                     Module 1.1.1.2.23

NAME executeInsert – insert voice into voice file at the current cursor location.

ASSUMPTIONS

On entry, the Current State is STOP STATE, PLAY STATE, or INSERT STATE.

PSEUDOCODE

```
* Local Variable:                                                            *
*    Done — TRUE when insertion is complete                                  *

IF Current State = INSERT STATE
            OR PLAY STATE
THEN enqueue STOP, INSERT on Implicit Commands queue
ELSE * Current State = STOP STATE *
     Current State = INSERT STATE
     Insert Begin = voice cursor location
     Interrupt Flag = TRUE
     LOOP
          start recording at voice cursor, using Inactivity Timeout (IF Inactivity
               Timeout Enable AND NOT Inactivity Timeout Override), with
               RECORD ALLOTMENT END WARNING TONE when allotment
               end is being reached
          when recording ends
          IF end of allotment was reached
          THEN Done = FALSE
               Play Adding Allotment Prompt
               extend allotment
          ELSE Done = TRUE
               Interrupt Flag = FALSE
          ENDIF
     UNTIL DONE
     ENDLOOP
ENDIF
``` executeIntercom                                                                           Module 1.1.1.2.24

NAME executeIntercom – request a two-way communication link between two user sessions.

ASSUMPTIONS

One of the users involved in the call is the supervisor. The user who enters the Intercom command is the intercom initiator. The user to whom the intercom is sent is the intercom recipient. Current State is SELECT STATE, COMMAND STATE, STOP STATE, INSERT STATE, PLAY STATE, FAST FORWARD STATE, FAST BACKWARD STATE, or CUT STATE.

PSEUDOCODE

```
* Local Variable:
*   Valid Id —      TRUE when the supervisor has entered a User
*                   identifier of a logged-on user
IF Current State = INSERT STATE
            OR PLAY STATE
            OR FAST BACKWARD STATE
            OR FAST FORWARD STATE
THEN enqueue STOP, INTERCOM on Implicit Commands queue
     RETURN
ENDIF
IF Intercom Active
THEN play Intercom Busy Prompt
     RETURN
ELSE Intercom Active = TRUE
     Intercom Initiator Port = Port Identifier from Intersession Info
ENDIF
IF Supervisor
THEN Valid Id = FALSE
     LOOP UNTIL Valid Id
        play Intercom User Identifier Prompt
        get Data Item Entry
        IF Embedded Command is present
        THEN IF Embedded Comand = CANCEL
             THEN play Function Cancelled Prompt
             ELSE * Embedded Command = HANG-UP *
                  enqueue HANG-UP on Implicit Commands queue
             ENDIF
             Intercom Active = FALSE
             RETURN
        ENDIF
        IF Data Item is User Identifier of a logged on user (from
             Logged-on Users Info)
        THEN Other Party Port = Port Identifier from Logged-on Users Info
             Valid Id = TRUE
        ELSE play ERROR TONE
             play User Not Available Prompt
``` executeIntercom (cont'd)

```
        ENDIF
     ENDLOOP
ELSE IF Supervisor Port = null
     THEN play Supervisor Not Available Prompt
          Intercom Active = FALSE
          RETURN
     ELSE Other Party Port = Supervisor Port
     ENDIF
ENDIF
enqueue INTERCOM PENDING on Implicit Commands queue
Intercom Status = PENDING
``` executeIntercomPending

Module 1.1.1.2.25

NAME executeIntercomPending — send intercom notification

ASSUMPTIONS

User is intercom initiator. His Intercom Status = PENDING

PSEUDOCODE

```
enqueue INTERCOM-WAITING on Implicit Commands queue of user session
    of Other Party Port
IF Interrupt Flag in user session of Other Party Port
THEN stop voice stream or tone generation at Other Party Port
ENDIF
play INTERCOM RINGBACK TONE
Intercom Pending Timeout Begin = current time
``` executeIntercomReceive

Module 1.1.1.2.26

NAME executeIntercomReceive - complete a two-way communication link between two user sessions.

ASSUMPTIONS

One of the users involved in the call is the supervisor. The user who enters the Intercom-receive command is the intercom recipient. The user who sent the intercom call is the intercom initiator. Upon entry, the Intercom Status is WAITING (for recipient) or PENDING (for initiator).

PSEUDOCODE

```
CASE OF Intercom Status
    WAITING: Intercom Status = RECIPIENT
             enqueue INTERCOM-RECEIVE in Implicit Commands
                 queue of user session of Intercom Initiator Port
             Previous Home State = Home State
             Current State = INTERCOM RECEIVE STATE
             Home State = INTERCOM RECEIVE STATE
             Other Party Port = Intercom Initiator Port
    PENDING: Intercom Status = INITIATOR
             establish two-way communication with
                 Port Identifier from Intersession Info as
                 master port and Other Party Port from
                 Intercom Connection as slave port
    OTHERWISE:  * user has cancelled intercom;        *
                * do nothing                          *
ENDCASE
``` executeIntercomWaiting                                  Module 1.1.1.2.27

NAME executeIntercomWaiting — notify user another party is trying to intercom him.

ASSUMPTIONS

User is intercom recipient of an intercom initiated by another user. On entry,
    Current State is SELECT STATE, COMMAND STATE, INSERT STATE, STOP
    STATE, PLAY STATE, or CUT STATE.

PSEUDOCODE

IF Current State = INSERT STATE
                OR PLAY STATE
    THEN enqueue STOP, INTERCOM-WAITING on Implicit Commands queue
         RETURN
    ENDIF Intercom Status = WAITING
    play INTERCOM NOTIFICATION TONE
    play Intercom Waiting Prompt executeInvalid                                          Module 1.1.1.2.28

NAME executeInvalid — handle an invalid command

ASSUMPTIONS

On entry, Current State can be any.

PSEUDOCODE

IF Current State = INSERT STATE
                OR PLAY STATE
                OR FAST BACKWARD STATE
                OR FAST FORWARD STATE
    THEN * treat as STOP *
         enqueue STOP, INVALID on Implicit Commands queue
         RETURN
    ENDIF
    play ERROR TONE
    play I'm Sorry Prompt
    IF Current State = STOP STATE
    THEN enqueue STOP on Implicit Commands queue
    ENDIF executeListen　　　　　　　　　　　　　　　　　　　　　　　　Module 1.1.1.2.29

NAME executeListen - open a voice file for playback only.

ASSUMPTIONS

On entry, Current State is either COMMAND STATE, STOP STATE, PLAY STATE, FAST BACKWARD STATE or FAST FORWARD STATE. For all except COMMAND STATE, a review is active and user is accessing header of voice file he wishes to listen to.

PSEUDOCODE

```
* Local Variable:                                                          *
*    Valid Id — TRUE when the user has entered a valid job                 *
*        identifier                                                         *
IF Current State = PLAY STATE
             OR FAST BACKWARD STATE
             OR FAST FORWARD STATE
THEN enqueue STOP, LISTEN on Implicit Commands queue
     RETURN
ENDIF IF Current State = STOP STATE
THEN move voice cursor to end of Job Header file
     find Job Voice File in Voice Message indicated
         by current Job Id and attach it to voice message stream
         (i.e. behind Job Header)
     enqueue STOP, PLAY on Implicit Commands queue
     Access Type = LISTEN ACCESS
     RETURN
ENDIF
* Otherwise Current State = COMMAND STATE *
Valid Id = FALSE
LOOP UNTIL Valid Id
     play Listen Job Identifier Prompt
     get Data Item Entry
     IF Embedded Command is present
     THEN IF Embedded Command = CANCEL
          THEN play Function Cancelled Prompt
          ELSE * Embedded Command = HANG-UP *
                 enqueue HANG-UP on Implicit Commands queue
          ENDIF
          RETURN
     ENDIF
     IF Data Item is the Job Identifier at one of the Voice Mail Messages
     THEN Valid Id = TRUE
          Current Job Id = Data Item
     ELSE play ERROR TONE
          play Invalid Message Id Prompt
     ENDIF
ENDLOOP
``` executeListen (cont'd)

open the Voice File indicated by Job Voice File in the Voice Mail Message
        indicated by Current Job Id
    open the Job Header of the Voice Mail Message
        and temporarily append the Voice File to it Access Type = LISTEN ACCESS
    VS Read Job Record = Voice Mail Message indicated by Current Job Id
    Current State = STOP STATE
    Home State = STOP STATE
    initialize Current Job Status
    enqueue PLAY on Implicit Commands queue executeLogoff                                    Module 1.1.1.2.30

NAME executeLogoff - disconnect the user from the system.

ASSUMPTION

On entry, Current State is either COMMAND STATE or SERVICE STATE.

PSEUDOCODE

```
IF (Emulation Active = TRUE)
THEN
    User Info = Emulating User Info
    Session Status = Emulating User Session Status
    Current State = Emulation Return State
    Emulation Active = FALSE
    RETURN
ELSE
    send Logoff Message to supervisor session
    Logged On = FALSE
    Port Status = ONHOOK
    put Port Status Change
    IF (Supervisor = TRUE)
    THEN Supervisor Port = null
    ENDIF
    update Logged-on Users Info
    clear Implicit Commands, phone port queue
ENDIF
``` executeLogon                                     Module 1.1.1.2.31

NAME executeLogon - connect a user to a port

ASSUMPTIONS

The user is currently not connected to the system and has a valid user profile residing in the system.

DESCRIPTION

```
put port offhook
put Port Status Change
Port Status = OFFHOOK
get the User Identifier and Password (playing Logon User Identifier Prompt and
     Logon Password Prompt, and using Data Item Entry)
when the User Identifier is received, put the User Info Request,
     then get the VS User Profile and (at some later point) User Job-pool
     Info
verify the User Identifier using User Identifier Maximum Length
     and VS User Profile
verify the Password from User Password Maximum Length
     and VS User Profile
if Password Maximum Length = 0, no Password is required
tell the user his logon is unsuccessful (playing Invalid Logon Prompt)
     only after he has entered both a User Identifier and Password
every error increments the number of invalid attempts
if the user enters CANCEL during data entry
     increment the number of invalid attempts and start over from the
     beginning
if the number of invalid attempts exceeds Logon Attempts,
     abort the logon
also abort the logon if the Logon Timeout is exceeded or
     the user hangs up at any point
when getting a Data Item Entry, put a Data Item Request
     first, setting the Timeout to the time remaining until
     Logon Timeout is exceeded; check Timeout Flag when getting Data
     Item Entry
also abort the logon if this user would exceed Port Allocation
     (use Port Connections, Port Allocation, and Logged-on users Info
     to check this)
to abort the logon, put port onhook, put Port Status Change,
     Port Status = ONHOOK, and put USER DISCONNECT with UNSUCCESSFUL
          LOGON using Port Identifier from Intersession Info
update User Info from VS User Profile and User Job-pool Info
Logged On = TRUE
update Logged-on Users Info
IF NOT Initial Session Complete

- THEN perform initial session as follows (except for users who are
     only transcriptionists)
     play the System Greeting Prompt
     get the spoken name file, playing the Spoken
          Name File Prompt; the user records his
          spoken name and user identifier within a limited time
     the user ends recording by entering a Menu Selection of CANCEL
          or OK or by letting the recording time out
     if a Menu Selection was entered, check it; if it is CANCEL,
          give the user another chance to enter the Spoken Name File
     when the Spoken Name File is successfully recorded,
          put Spoken Name File in User Info
     get a new Password for the user, playing the
          New Password Prompt, and getting Data Item Entry
     if User Password Maximum Length = 0, no Password is required
     if the user enters an Embedded Command of CANCEL,
          give him another chance to enter a new Password
```

```
            if the user enters a password too long according to
                User Password Maximum Length, inform him by playing Password Too
                Long Prompt and give him another chance
            when the new Password is successfully entered,
                put it in the User Info
            put User Personal Info Entered
ENDIF
IF Voice Mail Subscriber
AND there are Voice Mail Messages in User Job-pool Reply
THEN play Messages Waiting Prompt
ELSE IF Logon Auto-select = DICTATION SERVICE
     OR only a Dictation Subscriber
         THEN enqueue Dictation on Implicit Commands queue
         ENDIF
ENDIF
IF Logon Auto-select = VOICE MAIL SERVICE
OR only a Voice Mail Subscriber
THEN enqueue VOICE MAIL on Implicit Commands queue
ENDIF Current State = SERVICE STATE
Home State = SERVICE STATE
Service = none
Review Active = FALSE
Delivery Rate Percent = DELIVERY100
Pause Percent = PAUSE100
``` executeMonitor                                              Module 1.1.1.2.32

NAME executeMonitor - establish a one-way communication link between the supervisor and another user.

ASSUMPTIONS

The user who entered the command must be the supervisor.
The data entered is a Port Identifier. On entry Current State is a Home State.

PSEUDOCODE

```
* Local Variable:                                                              *
*    Valid Port — TRUE when the supervisor has entered a valid                 *
*                 port number                                                  *
Valid Port = FALSE
LOOP UNTIL Valid Port
    play Monitor Port Prompt
    get Data Item Entry
    IF Embedded Command is present
    THEN IF Embedded Command = CANCEL
         THEN play Function Cancelled Prompt
         ELSE * Embedded Command = HANG-UP *
              enqueue HANG-UP on Implicit Commands queue
         ENDIF
         RETURN
```

```
    ENDIF
    IF Data Item is a valid port
    THEN Valid Port = TRUE
    ELSE play ERROR TONE
         play Invalid Port Prompt
    ENDIF
ENDLOOP
Other Party Port = Data Item
Previous Home State = Home State
Current State = MONITOR STATE
Home State = MONITOR STATE
establish one-way connection with Other Party Port as master port and Port
    Identifier from Intersession Info Data Store as salve port
``` execute MoveHalfBackward　　　　　　　　Module 1.1.1.2.33

NAME executeMoveHalfBackward - move the voice cursor halfway from the current location to the beginning of the voice file.

ASSUMPTION

On entry, Current State is STOP STATE, CUT STATE, FAST BACKWARD STATE, FAST FORWARD STATE, INSERT STATE, OR PLAY STATE.

PSEUDOCODE

```
IF Current State =  FAST BACKWARD STATE
            OR FAST FORWARD STATE
            OR INSERT STATE
            OR PLAY STATE
   THEN enqueue STOP, MOVE-HALF-BACKWARD on Implicit Commands queue
        RETURN
ENDIF set voice cursor position to halfway between Most Recent Cursor
    and the beginning of the file.
update Most Recent Cursor to this value
enqueue PLAY on Implicit Commands queue
update Farthest Advance
``` executeMoveHalfForward　　　　　　　　Module 1.1.1.2.34

NAME executeMoveHalfForward - move the voice cursor halfway from its current location to the end of the file.

ASSUMPTIONS

On entry Current State is CUT STATE, FAST FORWARD STATE, FAST BACKWARD STATE, INSERT STATE, STOP STATE, OR PLAY STATE.

PSEUDOCODE

```
IF Current State = FAST BACKWARD STATE
              OR FAST FORWARD STATE
              OR INSERT STATE
              OR PLAY STATE
THEN enqueue STOP, MOVE-HALF-FORWARD on Implicit Commands queue
     RETURN
ENDIF set voice cursor position to halfway between Most Recent Cursor and the end
    of the file
update Most Recent Cursor to this value
enqueue PLAY on Implicit Commands queue
``` executeMoveToBeginning　　　　　　　　　Module 1.1.1.2.35

NAME executeMoveToBeginning - move the voice cursor to the beginning of the file.

ASSUMPTIONS

On entry Current State is STOP STATE, CUT STATE, FAST BACKWARD STATE, FAST FORWARD STATE, INSERT STATE, or PLAY STATE.

PSEUDOCODE

```
IF Current State = FAST BACKWARD STATE
              OR FAST FORWARD STATE
              OR INSERT STATE
              OR PLAY STATE
THEN enqueue STOP, MOVE-TO-BEGINNING on Implicit Commands queue
     RETURN
ENDIF update current cursor location and Most Recent Cursor to point to beginning
    of file
update Farthest Advance
enqueue PLAY on Implicit Commands queue
``` executeMoveToCue　　　　　　　　　　　Module 1.1.1.2.36

NAME executeMoveToCue - move voice cursor to position of cue.

ASSUMPTIONS

On entry, Current State is STOP STATE, CUT STATE, FAST BACKWARD STATE, FAST FORWARD STATE, INSERT STATE, or PLAY STATE.

PSEUDOCODE

```
IF Current State = FAST BACKWARD STATE
              OR FAST FORWARD STATE
              OR INSERT STATE
              OR PLAY STATE
```

```
     THEN enqueue STOP, MOVE-TO-CUE on Implicit Commands queue
         RETURN
     ENDIF set voice cursor to Cue Location
     Most Recent Cursor = Cue Location
     update Farthest Advance
     enqueue PLAY on Implicit Commands queue
``` executeMoveToEnd                                Module 1.1.1.2.37

NAME executeMoveToEnd - move the voice cursor to the end of the file.

ASSUMPTIONS

On entry, Current State is FAST BACKWARD STATE, CUT STATE, FAST FORWARD STATE, INSERT STATE, STOP STATE, OR PLAY STATE.

PSEUDOCODE

```
     IF Current State =  FAST BACKWARD STATE
                 OR FAST FORWARD STATE
                 OR INSERT STATE
                 OR PLAY STATE
     THEN enqueue STOP, MOVE-TO-END on Implicit Commands queue
         RETURN
     ENDIF set voice cursor to end of file
     update Most Recent Cursor to end of file
     update Farthest Advance
``` executeMoveToLastCut                            Module 1.1.1.2.38

NAME executeMoveToLastCut - move voice cursor to the position of the last Cut function.

ASSUMPTIONS

On entry, Current State is STOP STATE, CUT STATE, FAST BACKWARD STATE, FAST FORWARD STATE, INSERT STATE, or PLAY STATE.

PSEUDOCODE

```
     IF Current State =  FAST BACKWARD STATE
                 OR FAST FORWARD STATE
                 OR INSERT STATE
                 OR PLAY STATE
     THEN enqueue STOP, MOVE-TO-LAST-CUT on Implicit Commands queue
         RETURN
     ENDIF set voice cursor to Last Cut
     set Most Recent Cursor to Last Cut
     update Farthest Advance
``` executePlay                                    Module 1.1.1.2.39

NAME executePlay - start playback

ASSUMPTIONS

On entry, Current State = CUT STATE, FAST BACKWARD STATE, FAST
   FORWARD STATE, INSERT STATE, PLAY STATE or STOP STATE.

PSEUDOCODE

IF Current State =   STOP STATE
                 OR CUT STATE
   THEN Current State = PLAY STATE
       IF User Event Queue is NOT empty
       THEN RETURN
       ENDIF
       Interrupt Flag = TRUE
       IF Access Type = SIGN-ON ACCESS
       THEN start playback, with END ZONE WARNING TONE
            every 6 seconds in last 30 seconds, using Speed Control status
       ELSE start playback, with no END ZONE WARNING TONE,
            using Speed Control status
       ENDIF
       Interrupt Flag = FALSE ELSE enqueue STOP, PLAY on Implicit Commands queue
   ENDIF executeQuit                                    Module 1.1.1.2.40

NAME executeQuit - close a voice file from Sign-on, Listen or Review access.

ASSUMPTIONS

On entry, Current State is STOP STATE, PLAY STATE, FAST BACKWARD
   STATE, or FAST FORWARD STATE.

The access type is SIGN-ON ACCESS, LISTEN ACCESS, or REVIEW ACCESS.

PSEUDOCODE

IF Current State NOT = STOP STATE
   THEN enqueue STOP, QUIT on Implicit Commands queue
        RETURN
   ENDIF close the Voice File indicated by Job Voice File
   close the Job Header if one is open
   IF Access Type = SIGN-ON ACCESS
   THEN put Quit Assigned Job using Job Identifier from Session Info,
            User Identifier and Port Identifier from Intersession Info
   ENDIF

```
IF Review Active
THEN enqueue REVIEW on Implicit Commands queue
ENDIF

Current Job Id = none
Access Type = none
Current State = COMMAND STATE
Home State = COMMAND STATE
``` executeReprompt　　　　　　　　　　　Module 1.1.1.2.41

NAME executeReprompt — play the Brief Command Prompt

ASSUMPTIONS

On entry, Current State may be any state. Command Prompt Table is correct as is (i.e. does not need to be updated).

PSEUDOCODE

```
IF Current State = INSERT STATE
            OR PLAY STATE
            OR FAST BACKWARD STATE
            OR FAST FORWARD STATE
THEN enqueue STOP, REPROMPT on Implicit Commands queue
     RETURN
ENDIF play the Brief Command Prompt, which is constructed by using the Command
     Prompt Table and the appropriate Voice Files.
``` executeReview　　　　　　　　　　　Module 1.1.1.2.42

NAME executeReview - review the headers of the voice mail messages in one's in-basket or a group of dictated jobs.

ASSUMPTIONS

On entry, Current State is COMMAND STATE.

DESCRIPTION

```
* Local variable:
*    Valid Data — TRUE when user has entered a valid data item
IF Service = DICTATION SERVICE
THEN IF NOT Review Active
     THEN update Key Meanings using WORK TYPE, SUBJECT, JOB IDENTIFIER
              AUTHOR IDENTIFIER, CANCEL
          play Review Attribute Choice Prompt
          get Menu Selection
          CASE OF Menu Selection
              WORK TYPE, SUBJECT, JOB IDENTIFIER,
```

```
                AUTHOR IDENTIFIER: Attribute in Listen Request =
                                  Menu Selection
                CANCEL: play Function Cancelled Prompt
                        RETURN
                HANG-UP: enqueue HANG-UP on Implicit Commands queue
                         RETURN
                OTHERWISE: * other selections are invalid *
        ENDCASE
        Valid Data = FALSE
        LOOP UNTIL Valid Data
                play appropriate Review Value Prompt
                get Data Item Entry
                IF Embedded Command is present
                THEN IF Embedded Command = CANCEL
                        THEN play Function Cancelled Prompt
                        ELSE * Embedded Command = HANG-UP *
                                enqueue HANG-UP on Implicit Commands queue
                     ENDIF
                     RETURN
                ENDIF
                IF Data Item is valid value for Attribute using maximum
                        lengths (& range for Work Type)
                THEN Valid Data = TRUE
                     Value in Listen Request = Data Item
                ELSE play ERROR TONE
                     play appropriate Invalid Review Data Prompt
                ENDIF
        ENDLOOP
        put Listen Request using Port Identifier from Intersession Info
        Review Active = TRUE
    ENDIF executeReview (cont'd)

get job from review pool in Pending Pools
    IF none
    THEN play No More Jobs In Group Prompt
         Review Active = FALSE
         RETURN
    ENDIF
    put Listen From Pool
    Current Job id = Job Identifier from Pending Job
    open the Voice File indicated by Job Voice File in Pending Job
    Access Type = REVIEW ACCESS
    VS Read Job Record = Pending Job
    Current State = STOP STATE
    Home State = STOP STATE
    initialize Current Job Status
    RETURN
    * Otherwise Service = VOICE MAIL SERVICE *
    IF NOT Review Active
    THEN IF there are no voice mail messages
         THEN play No Messages Prompt
              RETURN
         ELSE Review Active = TRUE
              Next Job To Review = 1
              play Number of Messages Prompt according to number of Voice
                   Mail Messages
         ENDIF
```

```
ENDIF
IF Voice Mail Message [Next Job To Review] is null
THEN play No More Messages Prompt
      Review Active = FALSE
      RETURN
ENDIF
Current Job Id = Job Identifier from Voice Mail Messages [Next Job to Review]
VS Read Job Record = Voice Mail Messages [Next Job To Review]
open Job Header of VS Read Job Record
increment Next Job To Review
Current State = STOP STATE
Home State = STOP STATE
initialize Current Job Status
enqueue PLAY on Implicit Commands queue
``` executeReviewLastInsertion                                    Module 1.1.1.2.43

NAME executeReviewLastInsertion - move voice cursor to the beginning location of the last insertion made.

ASSUMPTIONS

On entry, Current State is FAST FORWARD STATE, FAST BACKWARD STATE, CUT STATE, INSERT STATE, STOP STATE, OR PLAY STATE.

PSEUDOCODE

```
IF Current State =  FAST BACKWARD STATE
            OR FAST FORWARD STATE
            OR INSERT STATE
            OR PLAY STATE
THEN enqueue STOP, REVIEW-LAST-INSERTION on Implicit Commands queue
     RETURN
ENDIF set voice cursor to Last Insert
Most Recent Cursor = Last Insert
enqueue PLAY on Implicit Commands queue
``` executeSelfAssignment                                         Module 1.1.1.2.44

NAME executeSelfAssignment — select a group of dictation jobs for transcription.

PSEUDOCODE

```
* Local Variable:
*    Valid Data — TRUE when user has entered a valid data item update Key Meaning using WORK TYPE, SUBJECT, JOB IDENTIFIER, AUTHOR IDENTIFIER, CANCEL
play Self-assignment Attribute Choice Prompt
get Menu Selection
CASE OF Menu Selection
```

```
            WORK TYPE, SUBJECT, JOB IDENTIFIER, AUTHOR IDENTIFIER
                Attribute in Self Assignment Request = Menu Selection
            CANCEL:  play Function Cancelled Prompt
                     RETURN
            HANG-UP: enqueue HANG-UP on Implicit Commands queue
                     RETURN
            OTHERWISE: * other selections are invalid *
    ENDCASE Valid Data = FALSE
    LOOP UNTIL Valid Data
        play appropriate Self-assignment Value Prompt
        get Data Item Entry
        IF Embedded Command is present
        THEN IF Embedded Command = CANCEL
                THEN play Function Cancelled Prompt
                ELSE * Embedded Command = HANG-UP *
                        enqueue HANG-UP on Implicit queue
                ENDIF
                RETURN
        ENDIF
        IF Data Item is valid for Attribute using maximum lengths
                (and range for Work Type)
        THEN Valid Data = TRUE
                Value in Self-Assignment Request = Data Item
        ELSE play ERROR TONE
                play appropriate Invalid Self-assignment Data Prompt
        ENDIF
    ENDLOOP
    put Self Assignment Request using Port Identifier from Intersession Info
    Self-assignment Active = TRUE
    enqueue on SIGN-ON on Implicit Commands queue
``` executeSend                                                   Module 1.1.1.2.45

NAME executeSend - send a voice mail message to the users on the address list.

ASSUMPTIONS

On entry, Current State is STOP STATE, INSERT STATE, PLAY STATE, FAST FORWARD STATE, FAST BACKWARD STATE, ADDRESS STATE, or CUT STATE.

PSEUDOCODE

```
    IF Home State = CUT STATE
    THEN enqueue CANCEL, SEND on Implicit Commands queue
         RETURN
    ENDIF
    IF Current State NOT = STOP STATE
    THEN enqueue STOP, SEND on Implicit Commands queue
         RETURN
    ENDIF Length of VS Write Job Record = length of Voice File
    IF Length < minimum allowed
    THEN enqueue DISCARD on Implicit Commands queue
```

```
    play Message Too Short Prompt
    RETURN
ENDIF
close the Voice File indicated by Job Voice File
get Job Identifier and put in VS Write Job Record
Date & Time Completed/Sent in VS Write Job Record = current time
construct Job Header using VS Write Job Record
put Job Header in VS Write Job Record
put Send Voice Mail
Current Job Id = none
Access Type = none
Current State = COMMAND STATE
Home State = COMMAND STATE
play Message Sent Prompt
``` executeService                                          Module 1.1.1.2.46

NAME executeService - change Current State to service

ASSUMPTIONS

On entry, Current State is COMMAND STATE. A user must be a subscriber of both Dictation and Voice Mail services.

DESCRIPTION

Set the Current State and the Home State to SERVICE STATE.
    Set the Service to none.

executeSignOff                                          Module 1.1.1.2.47

NAME executeSignOff - sign-off a dictation job.

ASSUMPTIONS

On entry, Current State is STOP STATE, PLAY STATE, FAST BACKWARD STATE, or FAST FORWARD STATE.

PSEUDOCODE

```
IF Current State NOT = STOP STATE
THEN enqueue STOP, SIGN-OFF on Implicit Commands queue
    RETURN
ENDIF
close voice file indicated by Job Voice File
close the Job Header if one is open
put Sign-off Message using Job Identifier from VS Read Job Record
    in Session Info, User Identifier from Intersession Info
    and Port Identifier from Intersession Info
play Sign-off Prompt
Access Type = none
Current State = COMMAND STATE
Home State = COMMAND STATE
enqueue SIGN-ON on Implicit Commands queue
``` executeSignOn                                   Module 1.1.1.2.48

NAME executeSignOn - access a dictation job for the purpose of transcribing it.

ASSUMPTIONS

On entry, Current State is COMMAND STATE. Self-assignment pool is the first one on the Transcription Pool Assignment list.

PSEUDOCODE

```
IF Self-assignment Active
THEN IF first pool on Transcription Pool Assignment list
        has no Pending Job
      THEN update KEY MEANINGS with SELF-ASSIGNMENT, REGULAR
         play Self-Assignment Pool Empty Prompt
         get Menu Selection
         CASE OF Menu Selection
               SELF-ASSIGNMENT:    enqueue SELF-ASSIGNMENT on Implicit
                                   Commands queue
               REGULAR:            Self-assignment Active = FALSE
                                   enqueue SIGN-ON on Implicit Commands
                                   queue
               HANG-UP:            enqueue HANG-UP on Implicit Commands
                                   queue
               OTHERWISE:          * other selections are invalid *
         ENDCASE
         RETURN
      ENDIF
ENDIF
find first pool on Transcription Assignment Pool with a Pending Job
IF there is none
THEN play No Job To Assign Prompt
     RETURN
ENDIF
Current Job Id = Job Identifier from Pending Job
put  Sign-on Message using Job Identifier of Pending Job, Pool Identifier
     from Transcription Pool Assignment list, User Identifier and Port
     Identifier from Intersession Info
open the Voice File indicated by Job Voice File in the Pending Job
IF Play Header
THEN open the Job Header of the Pending Job
     and temporarily append the Voice File to it
ELSE attach the Voice File to the voice message stream
ENDIF
Access Type = SIGN-ON ACCESS
VS Read Job Record = Pending Job
Current State = STOP STATE
Home State = STOP STATE
initialize Current Job Status
``` executeSkipBackward                              Module 1.1.1.2.49

NAME executeSkipBackward - move the voice cursor backward by the amount Skip Increment.

ASSUMPTIONS

On entry, Current State is STOP STATE, CUT STATE, FAST BACKWARD STATE, FAST FORWARD STATE, INSERT STATE, or PLAY STATE.

PSEUDOCODE

```
IF Current State =  FAST BACKWARD STATE
            OR FAST FORWARD STATE
            OR INSERT STATE
            OR PLAY STATE
THEN enqueue STOP, SKIP-BACKWARD on Implicit Commands queue
    RETURN
ENDIF subtract Skip Increment from Most Recent Cursor
set voice cursor and Most Recent Cursor to the value
update Farthest Advance
enqueue PLAY on Implicit Commands queue
``` executeSkipForward  Module 1.1.1.2.50

NAME executeSkipForward - move the voice cursor forward by the amount Skip Increment.

ASSUMPTIONS

On entry, Current State is CUT STATE, FAST FORWARD STATE, FAST BACKWARD STATE, INSERT STATE, STOP STATE, OR PLAY STATE.

PSEUDOCODE

```
IF Current State =  FAST BACKWARD STATE
            OR FAST FORWARD STATE
            OR INSERT STATE
            OR PLAY STATE
THEN enqueue STOP, SKIP-FORWARD on Implicit Commands queue
    RETURN
ENDIF add Skip Increment to Most Recent Cursor
set voice cursor and Most Recent Cursor to this value
update Farthest Advance
IF (Farthest Advance NOT = TRUE)
    THEN enqueue PLAY on Implicit Commands queue
ENDIF
``` executeSlowDown  Module 1.1.1.2.51

NAME executeSlowDown - decrease the delivery rate of playback.

ASSUMPTIONS

On entry, Current State is PLAY STATE, INSERT STATE, CUT STATE OR STOP STATE.

PSEUDOCODE

CASE OF Current State
        CUT STATE, STOP STATE:  IF Delivery Rate Percent NOT = lower limit for delivery rate
                                        THEN decrease Delivery Rate Percent by 10%
                                        ENDIF INSERT STATE: enqueue STOP, SLOW-DOWN, INSERT on Implicit Commands queue PLAY STATE:   enqueue STOP, SLOW-DOWN, PLAY on Implicit Commands queue OTHERWISE:   * There are no other possibilities *

ENDCASE executeSpeedUp                                                  Module 1.1.1.2.52

NAME executeSpeedUp - increase the delivery rate of playback.

ASSUMPTIONS

On entry, Current State is PLAY STATE, INSERT STATE, CUT STATE OR STOP STATE.

PSEUDOCODE

CASE OF Current State
        CUT STATE, PLAY STATE:  IF Delivery Rate Percent NOT = upper limit for delivery rate
                                          THEN increase Delivery Rate Percent by 10%
                                        ENDIF INSERT STATE: enqueue STOP, SPEED-UP, INSERT on Implicit Commands queue PLAY STATE:   enqueue STOP, SPEED-UP, PLAY on Implicit Commands queue OTHERWISE:   * There are no other possibilities *

ENDCASE executeStop                                                        Module 1.1.1.2.53

NAME executeStop - stop the currently executing function and return the user to the stop state.

ASSUMPTIONS

On entry, Current State is STOP STATE, CUT STATE, ADDRESS STATE, FAST BACKWARD STATE, FAST FORWARD STATE, INSERT STATE or PLAY STATE.

PSEUDOCODE

```
IF Current State    = ADDRESS STATE
THEN  Home State    = STOP STATE
      Current State = STOP STATE
ELSE
     IF Current State = INSERT STATE
     THEN update Empty File
          Last Insert = Insert Begin
     ENDIF
     IF Access Type = SIGN-ON ACCESS
     AND Current State = PLAY STATE * Auto-backspace *.
     THEN move the voice cursor back by Skip Increment
     ENDIF
     update Most Recent Cursor
     update Farthest Advance
     Current State = Home State
     IF Access Type = CREATE ACCESS
     AND Implicit Commands queue is empty
     THEN Interrupt Flag = TRUE
          Play TALK-DOWN TONE
          Interrupt Flag = FALSE
     ENDIF
ENDIF
``` executeStopCut                                                Module 1.1.1.2.54

NAME executeStopCut - mark the second position of the segment to be cut from the voice file.

ASSUMPTIONS

On entry, Current State is CUT STATE.

PSEUDOCODE

```
update Key Meanings using CONFIRM, CANCEL
put Confirm Cut Prompt
get Menu Selection
CASE OF Menu Selection
     CANCEL:  play Function Cancelled Prompt
              enqueue CANCEL on Implicit Commands queue
              RETURN
     HANG-UP: enqueue HANG-UP on Implicit Commands queue
              RETURN
     CONFIRM: play Voice Deleted prompt
     OTHERWISE:  * other selections are invalid *
ENDCASE delete segment of voice file between Cut Mark and voice cursor
update Last Cut
``` update Empty File
update Farthest Advance
update Most Recent Cursor
Current State = STOP STATE
Home State = STOP STATE executeVoiceMail                                          Module 1.1.1.2.55

NAME executeVoiceMail – change service to Voice mail.

ASSUMPTIONS

On entry, Current State is SERVICE STATE or COMMAND STATE. User must be a Voice Mail Subscriber.

PSEUDOCODE

```
IF (Current State = COMMAND STATE)
THEN enqueue SERVICE, VOICE MAIL on Implicit Commands queue
     RETURN
ENDIF
Service = VOICE MAIL SERVICE
Current State = COMMAND STATE
Home State = COMMAND STATE
update Logged-on Users Info
``` getCommand                                                Module 1.1.1.3

NAME getCommand — translate a user-entered event into a command

PSEUDOCODE

```
IF User Event Queue is empty
THEN Command Present = FALSE
     RETURN
ENDIF

Command Present = TRUE
dequeue Event Entry
Command Time = Event Time

CASE OF Event
    RING EVENT    : Command = LOGON
    HANG-UP EVENT : Command = HANG-UP
    OTHERWISE     : Command = command found by looking up
                              appropriate key (Dtmf Event) in
                              Key Meanings
ENDCASE put Command Entry
RETURN
``` getDataItem                                    Module 1.1.1.4

NAME getDataItem — receive a data item from user

ASSUMPTIONS

Port is off-hook; therefore Ring Event cannot occur.

DTMFW, DTMFX, DTMFY, & DTMFZ will be unavailable on most user devices; if they do occur, they are ignored.

PSEUDOCODE

```
* Local variables:                                  *
*    Current Time — the current time; received from system*
*    Begin Time — time the module begins *
*    Data Done — TRUE when the data item reception is complete*
*    Inactivity Timeout Begin — time from which to calculate*
*         inactivity                     *
get Data Item Request get Current Time
Begin Time = Current Time
Inactivity Timeout Begin = Current Time Timeout Flag    = FALSE
Num Digits      = 0
Data Done       = FALSE LOOP UNTIL Data Done
    IF Timeout is present
    THEN get Current Time
        IF Current Time - Begin Time > Timeout
        THEN Timeout Flag = TRUE
             put Data Item Entry
             RETURN
        ENDIF
    ENDIF
    IF Inactivity Timeout Enable AND NOT Inactivity Timeout Override
    THEN get Current Time
        IF Current Time - Inactivity Timeout Begin > Inactivity Timeout
        THEN Embedded Command = HANG-UP
             put Data Item Entry
             RETURN
        ENDIF
    ENDIF
    IF User Event Queue is NOT empty
    THEN
         get Current Time
         Inactivity Timeout Begin = Current Time
         dequeue Event Entry
         CASE OF Event
           DTMFPOUND           :  Data Done = TRUE
           HANG-UP EVENT       :  Embedded Command = HANG-UP
                                  Data Done = TRUE
           DTMFSTAR            :  Embedded Command = CANCEL
```

```
        DTMF1                  :   Data Done = TRUE
                                   increment Num Digits
                                   add digit 1 to Data Item
        DTMF2 through DTMF0    :   handle in similar manner to DTMF1
        OTHERWISE              :   * ignore *
    ENDCASE
  ENDIF
ENDLOOP Put Data Item entry
RETURN
``` getMenuSelection                          Module 1.1.1.5

NAME getMenuSelection — translate a user-entered event into a menu selection.

PSEUDOCODE

```
* Local variable:
*   Inactivity Timeout Begin — Time from which to calculate
*         inactivity timeout Inactivity Timeout Begin = current time
Menu Selection = null
LOOP UNTIL Menu Selection NOT = null
    IF Inactivity Timeout Enable AND NOT Inactivity Timeout Override
    THEN IF current Time - Inactivity Timeout Begin > Inactivity Timeout
         THEN Menu Selection = HANG-UP
         ENDIF
    ENDIF
    IF User Event Queue NOT empty
    THEN dequeue Event Entry
         Menu Selection = appropriate entry in Key Meanings
    ENDIF
ENDLOOP put Menu Selection
``` getEvent                                  Module 1.1.2

NAME getEvent — receive a telephony event

DESCRIPTION

Receive a telephony event from the phone port queue and record the current time as Event Time. Enqueue Event Entry. Clear the event from the phone port queue. Use the current time and send the Activity message.

updateIntersessionInfo                    Module 1.2

NAME updateIntersessionInfo — handle updates of Intersession Info from SS

ASSUMPTIONS

Each message type has its own channel within the voice session; thus each is read separately.

PSEUDOCODE

```
get User Info Update
IF User Identifier from Intersession Info Data Store = User Identifier
      from User Info Update            * Is user still logged on? *
THEN update User Info
ENDIF get Inactivity Timeout Enable
update Inactivity Timeout Enable in Intersession Info Data Store
``` executeUserSessionService                        Module 1.3

NAME executeUserSessionService — execute part of SS request affecting user session

ASSUMPTIONS

Each message type has its own channel within the voice session; thus each is read separately.

PSEUDOCODE

```
* Local variable:                                      *
*    Done — TRUE if an operation is complete * get Delete Voice Mail
IF User Identifier from Intersession Info Data Store = User Identifier from
      Delete Voice Mail          * Is user still logged on? *
THEN Done = FALSE
      Loop UNTIL Done
            lock Review Active and Current Job Id
                  * To prevent race condition with Review or Listen *
            IF Review Active OR (Current Job id = Job Identifier from Delete
               Voice Mail)
            THEN unlock Review Active and Current Job Id
                  delay
            ELSE find and remove job from Voice Mail messages
                  unlock
                  Done = TRUE
            ENDIF
      ENDLOOP
ENDIF get Delete Job Check
      * See if the user is listening to the job currently;      *
      * job is not in user's Voice Mail Messages; else message would   *
      * have been Delete Voice Mail          *
wait until Current Job Id NOT = Job Identifier from Delete Job Check
      * Then job is no longer being accessed *
``` put Ok To Delete Job get Disconnect User
IF User Identifier from Intersession Info Data Store = User Identifier
    from Disconnect User          * Is same user still logged on?         *
THEN enqueue HANG-UP in Implicit Commands
    stop voice stream or tone at port
ENDIF requestedInfoHandler                       Module 2

NAME requestedInfoHandler — handles SS responses to VS requests

PSEUDOCODE get SS Requested Info put Requested Info          * to the User Session indicated by Port      *
                                            * Identifier in the message                 * unrequestedInfoHandler                     Module 3

NAME unrequestedInfoHandler — handle info from SS not requested by VS

PSEUDOCODE get SS Unrequested Info

IF message is Schedule Job
   THEN IF New Header
       THEN construct a new header for the job using New Header Info
           update Job Header in VS Read Job Record
           put New Job Header
       ENDIF
   ENDIF If message is Intersession Info Update
   THEN PUT New Intersession Info    * to the User Session indicated       *
                                           * by the Port Identifier in the      *
                                           * msg                                *

ENDIF

IF message is a VS Data Store Update
   THEN put New VS Data Store Info
   ENDIF supervisorServer                           Module 4

NAME supervisorServer — handles requests from the SS

DESCRIPTION

Get a SS Request message.

For a Copy Voice File message, copy the voice file indicated by the Voice File Pointer to the disk indicated by the Disk Identifier. Send a Voice File Copied message.

For a Delete Voice File message, check for Online Baskets in the message. If there are any, send a Delete Voice Mail message to each user session indicated. When all these user sessions have sent back a Voice Mail Deleted message, delete the voice file and send a Voice File Deleted message. (We know in this case that the job is voice mail, and thus do not need to check any of the other user sessions.)

If there are no Online Baskets in the message (i.e. the job is not among the Voice Mail Messages of any logged on user), send a Delete Job Check message to each user session. (We wait in this case until no user is listening to the job.) When all user sessions have sent back an Ok To Delete Job message, delete the voice file and send a Voice File Deleted message.

For a Disconnect message, send a Disconnect User message to the user session indicated by the Port Identifier in the original message.

For a Clear Pool message, clear the pool indicated by the Pool Identifier. Send a Pool Cleared message.

operationMonitor                                  Module 5

NAME operationMonitor — report changes in the voice file storage usage

DESCRIPTION

Keep as an internal data store the Last Voice File Usage, the Voice File Usage the last time a System Operation Event was sent.

Get the current Voice File Usage. If it differs by at least 1% from the Last Voice File Usage, send a System Operation Event message and update Last Voice File Usage.

DICTAPHONE DIGITAL DICTATION SYSTEM

Table 1

Data Dictionary :

= "is composed of "

+ "and" or "together with"

{} "iterations of"

x{}x "exactly 'x' iterations of"

x{} "'x' or more iterations of"

x{}y "from 'x' to 'y' iterations of"

[] "choose one" (exclusive or)

() "optional"

\*\* "comment"

Additional Conventions

— initial letters of the names of data items and data stores shall be in upper case — the initial letters of the names of data terminators shall be in upper case — the values of data items, e.g. enumerated values, shall be all upper case — attributes of data elements shall be lower case — names of constants shall be all upper case — module and data base names shall be a concatenated set of words; the initial letter of the first word shall be in lower case; the initial letter of subsequent words shall be in upper case; hyphens and underscores shall not be used (hyphens may be used to split names so they may fit in a bubble)

SUPERVISOR SESSION DATA DICTIONARY

Data Item

-A-

| | |
|---|---|
| Accessible Work Type | = [TRUE, FALSE] |
| Accessible Work Type Edit Prompt | = \* the prompt required for the <br> \* modification of accessible work types \* |
| Accessible Work Types | = NUM WORK TYPES {Accessible Work Type} <br> NUM WORK TYPES |
| Accessible Work Type Update | = Work Type + Accessible Work Type |
| Active Info | = [ACCESSIBLE WORK TYPES, AUTO FINISH, <br> JOB RECORD + Job Record Request, <br> POOL DEFINITION, <br> REDUNDANCY, SUPERVISOR DATABASE, <br> SYSTEM ACTIVITY, <br> TRANSCRIPTION POOL ASSIGNMENT, <br> USER PROFILE + User Profile Request, <br> VOICE SAFETY FACTORS, VS SETUPS] |

| | |
|---|---|
| Active Pool | = Pool Identifier + <br> Pool Assignment Count + <br>   * number of logged-on transcriptionist * <br>   * with this pool assigned             * <br> Current Job + <br>   * job currently pending in this pool   * <br> Schedule Request + <br>   * indicates whether a schedule request * <br>   * is outstanding                               * |
| Activity | = see Communications Interface Data Dictionary |
| Activity Time | = Time |
| Activity Change | = Port Identifier + Time |
| Address Reply | = see Communications Interface Data Dictionary |
| Address Request | = see Communications Interface Data Dictionary |
| Alarm Level Update | = [Backlog Alarm Level, <br>    Job Record Alarm Margin, <br>    Spool Capacity Margin, <br>    Voice Capacity Alarm Margin] |
| Alarm Levels | = Backlog Alarm Level + <br>    Job Record Alarm Margin + <br>    Spool Capacity Margin + <br>    Voice Capacity Alarm Margin |
| Alarm Type | = [BACKLOG ALARM, <br>    JOB RECORD ALARM, <br>    SPOOL CAPACITY ALARM, <br>    VOICE CAPACITY ALARM] |
| Alert | = Alert Type |
| Alert Type | = * screen definition which p: <br>    * alert messages |
| Alerts | = * important conditions chec <br>    * system hardware and sof |
| Alternate Disk | = [TRUE, FALSE] |
| Archivable Job Records | = [Cancelled Job Record, Disca <br>    Finished Job Record] |
| Archive Job Record | = * A Job Record in the form <br>    * for storage on the archi |
| Archived Job Identifier | = Job Identifier |
| Archived Job Record Request | = Job Record Request <br>    * only Archive status reque |
| Archived Jobs | = Archive Job Record |

| | |
|---|---|
| Audit Trail | = * A Boolean determining wh<br>* trail is to be printed |
| Audit Trail Update | = Audit Trail |
| Author Identifier | = see Voice Session Data Dict |
| Author Name | = * 15 characters for the aut |
| Auto Create | = see Voice Session Data Dict |
| Auto Finish | = [TRUE, FALSE] |
| Auto Finish Screen | = * A screen which presents<br>* types and indicates if th<br>* finished |
| Auto Finish Work Type Edit Prompt | = * The prompt required for<br>* modification of auto fini<br>* types |

Data Items

-B-

| | |
|---|---|
| Backlog | = * total length of Ready, Pending, and<br>* Assigned Jobs |
| Backlog Alarm Level | = * a level of backlog, which when<br>* exceeded, will cause an alarm |
| Basket | = User Identifier + 0 {Job Identifier}<br>MAX MESSAGES |
| Both Display Screen | = * A screen which presents an expanded<br>* record display of either a dictation<br>* or voice mail Job Record |
| Both Inquiry Screen | = * A screen which presents a job record<br>* inquiry for dictation and voice<br>* mail jobs |

Data Item

-C-

| | |
|---|---|
| Cancelled Job Record | = Job Record |
| Center Transcription Rate | = * the rate at which the center as a<br>* whole is capable of transcribing<br>* dictation |
| Center Transcription Rate Update | = Center Transcription Rate |
| Center Turnaround Time | = Time |
| Changed Job Record | = Job Record |

| | |
|---|---|
| Changed Pool Definition | = Pool Definition |
| Changed Transcription Pool Assignment | = Transcription Pool Assignment |
| Changed User Profile | = User Profile |
| Characters | = ascii characters |
| Clear Pool | = see Communications Interface Data Dictionary |
| Clear Request | = [FIELD + Field Description,<br>RECORD + Record Description,<br>SCREEN,<br>WINDOW + Window Type] |
| Column | = integer, column in display where field begins |
| Command Token | = * a command which will invoke a set of *<br>* transactions to execute that command * |
| Complete Job | = see Communications Interface Data Dictionary |
| Condition Menu | = * a menu which displays applicable *<br>* relationship types * |
| Continue Scheduling | = Pool Identifier |
| Control Menus | = [Top Level Menu,<br>Job Manipulation Menu,<br>Pool Function Menu,<br>System Operation Menu,<br>Transcriptionist Assignment Menu,<br>User Profile Function Menu,<br>Report Function Menu] |
| Copy Voice File | = see Communications Interface Data Dictionary |
| Cost Allocation Record | = [Dictation Cost Allocation Record, Voice Mail Cost Allocation Record] |
| Cost Allocation Report Edit Prompts | = * all prompts pertaining to the entry or *<br>* modification of cost allocation *<br>* report definitions * |
| Cost Allocation Report Screen | = * a screen which presents the report *<br>* definition data for a cost *<br>* allocation report * |
| Create Hang-up Option | = see Voice Session Data Dictionary |
| Cue Location | = see Voice Session Data Dictionary |
| Current Job | = Job Identifier |
| Current Transaction | = Transaction |
| Current Transaction Status | = [FAIL, IN-PROGRESS, SUCCESS] |

Data Item

-D-

| | |
|---|---|
| Data Menus | = [Edit Data Menus, Job Record Data Menus, Pool Data Menus, Report Data Menus, Support Data Menus, System Operation Data Menus] |
| Database Record | = [Inquiry Record, Supervisor Database Screen Info] |
| Date And Time Archived | = * date and time the Job Record was * <br> * archived * |
| Date And Time Assigned | = * date and time the Job was assigned * <br> * to a transcriptionist * |
| Date And Time Cancelled | = * date and time the Job was cancelled * <br> * by the supervisor * |
| Date And Time Completed/Sent | = see Voice Session Data Dictionary |
| Date And Time Created | = see Voice Session Data Dictionary |
| Date And Time Discarded | = * date and time a voice mail job was * <br> * discarded by the recipient * |
| Date And Time Finished | = * date and time a dictation job was * <br> * finished by the supervisor * |
| Date And Time Pending | = * date and time a job became Pending * |
| Date And Time Signed-off | = * date and time a job was signed off by * <br> * the transcriptionist * |
| DB Read | = [Accessible Work Type, Auto Finish, Basket, New Header, Pool Definition, Redundancy, Transcription Pool Assignment, User Profile] |
| Decimal Format | = * description of fixed point format * |
| Default Unit Costs | = Unit Costs |
| Default Unit Costs Update | = Default Unit Costs |
| Definition Info | = Report Title + Report Name + Report Type + Selection Criteria + Sort Criteria + (Total Cost, Unit Cost) <br> * present for post-defined and unit-cost * <br> * cost allocation reports respectively * |
| Delete Confirmation | = [YES, NO] <br> * indicates if a delete function is to * <br> * be completed * |

| | |
|---|---|
| Delete Notification | = * a message which informs the *<br>* supervisor a delete has been *<br>* performed * |
| Delete Voice File | = see Communications Interface Data Dictionary |
| Department | = see Voice Session Data Dictionary |
| Department Maximum Length | = see Voice Session Data Dictionary |
| Department Prompt | = see Voice Session Data Dictionary |
| Dictation Cost Allocation Record | = (Primary Field + Secondary Field +<br>Percent Subtotal Jobs +<br>Percent Subtotal Length +<br>Percent Subtotal Weighted Length +<br>Percent Total Jobs +<br>Percent Total Length +<br>Percent Total Weighted Length +)<br>* not present for subtotal and total *<br>* records *<br>Total Dictation Cost +<br>Total Jobs +<br>Total Length +<br>Total Real Turnaround Time +<br>Total Weighted Length |
| Dictation Display Screen | = * A screen which presents an expanded *<br>* record display of a dictation job *<br>* record * |
| Dictation Inquiry Screen | = * a screen which presents a job record *<br>* inquiry for dictation jobs * |
| Dictation Rate | = * the rate at which an author dictates * |
| Dictation Subscriber | = see Voice Session Data Dictionary |
| Dictation Unit Cost | = * cost to be charged per weighted length *<br>* for dictation jobs * |
| Discard Voice Mail By Recipient | = see Communications Interface Data Dictionary |
| Discarded Job Record | = Job Record |
| Disconnect | = see Communications Interface Data Dictionary |
| Disconnect Request | = Port Identifier + User Identifier |
| Display Format | = Fields To Display +<br>Format + Video |
| Display Record | = Text Field + Video |
| Display Request | = [ERROR + Error Type, MENU + Menu Type,<br>MESSAGE + Message Type,<br>PROMPT + Prompt Type, SCREEN + Screen Type] |

Display Screens = [Auto Finish Screen,
Both Display Screen,
Cost Allocation Report Screen,
Dictation Display Screen,
Job Record Report Screen,
Pool Definition Display Screen,
Port Configuration Screen,
System Setup Screen,
Transcriptionist Pool Assignment Screen,
User Profile Display Screen,
User Profile Report Screen,
Voice Mail Display Screen,
Weighting Factors Screen]

Data Item

-E-

Edit Data Menus = [Global Edit Menu,
Find Next Menu]

Edit Field = [ACCESSIBLE WORK TYPE,
AUTO FINISH WORK TYPE,
External Job Record Edit Field,
Job Record Edit Field,
Port Configuration Edit Field,
System Setup Edit Field,
User Profile Edit Field,
Weighting Factors Edit Field]

Edit Field Value = Field Value

Edit Input = [Edit Field Value,
New Value,
Old Value,
Value To Find]

Edit Menu Choice = [Global Edit Field,
Edit Field,
Find Next Field]

Edit Modify Prompts = [Accessible Work Type Edit Prompt,
Auto Finish Work Type Edit Prompt,
External Job Edit Prompts,
Job Record Edit Prompts,
Port Configuration Edit Prompts,
Report Definition Edit Prompts,
System Setup Edit Prompts,
User Profile Edit Prompts,
Weighting Factor Edit Prompts]

Edit Prompts = [Edit Modify Prompts,
Find Next Prompts,
Global Edit Prompts]

Edit Transactions = [CHANGE-INQUIRY,
CHANGE-NEXT,
CHANGE-SCREEN,

```
                              FIND-NEXT,
                              RECORD-UPDATE,
                              MODIFY,
                              REPEAT]

Edit Type                   = [EXTERNAL-JOB-EDIT,
                              JOB-RECORD-EDIT,
                              Report Definition Edit Type,
                              System Operation Edit Type,
                              USER-PROFILE-EDIT]

Ending Record               = [Record Indicator,
                              END-OF-INQUIRY,
                              END-OF-SCREEN,
                              NEXT-RECORD]

Equality Relationship Type  = [EQUAL, NOT EQUAL]

Error Type                  = * screen definitions which present
                              *   error information External Job Record Edit    = [AUTHOR IDENTIFIER,
Field                         DATE AND TIME ASSIGNED,
                              DATE AND TIME COMPLETED/SENT,
                              DATE AND TIME CREATED,
                              DATE AND TIME FINISHED,
                              DATE AND TIME PENDING,
                              DATE AND TIME SIGNED-OFF,
                              DEPARTMENT,
                              LENGTH,
                              PRIORITY,
                              SPECIAL DESIGNATOR,
                              STATUS,
                              SUBJECT,
                              TRANSCRIPTIONIST,
                              TURNAROUND TIME WORKING,
                              TYPING LENGTH,
                              WORK TYPE]

External Job Edit Prompt    = * all prompts pertaining to the entry
                              *   or modification of external jobs External Job Update         = Job Record
```

Data Item

-F-

```
Field                       = Field Description + Field Value

Field Description           = Field Name + Field Type

Field Name                  = * The name of any field which can be
                              *   displayed. e.g. AUTHOR ID is a valid
                              *   Field Name.

Field Type                  = DATE & TIME,
                              DECIMAL + Decimal Format,
```

ENUMERATED TYPE,
                                INTEGER,
                                MONEY,
                                STRING]

Field Update                    = Field

Field Range                     = * the range of legal field values            *

Field Value                     = * value for a screen field                   *

Fields To Display               = 0 {Field Name} NUM FIELD
                                  * order indicates how fields are to          *
                                  * be displayed                               *

Find Next Field                 = [Job Record Find Next Field, User Profile Find
                                    Next Field]

Find Next Menu                  = * a menu which displays the field names      *
                                  * for which a Find-Next Command is           *
                                  * allowed                                    *

Find Next Prompts               = * the prompts which get displayed when       *
                                  * the supervisor requests the Find-          *
                                  * Next command                               *

Finished Job Record             = Job Record

Flash Report                    = * image of supervisor terminal screen        *
                                  * to be printed                              *

Format                          = * Description of how internal values         *
                                  * are to be displayed                        *

Formatted Report                = * report as formatted by the report          *
                                  * generator for printing                     *

Function Set                    = see Voice Session Data Dictionary

Data Item

-G-

Global Edit Field               = [Global Job Record Edit Field,
                                   Global User Profile Edit Field]

Global Edit Menu                = * a menu which displays the field names      *
                                  * for which a global edit is allowed         *

Global Edit Prompts             = * the prompts which get displayed when       *
                                  * the supervisor requests a Change-          *
                                  * Screen, Change-All-For-Screen or           *
                                  * Change-Next command                        *

Global Job Record Edit Fields   = Job Record Edit Field

Global User Profile Edit Field  = [DICTATION RATE,

DICTATION SUBSCRIBER,
DEPARTMENT,
SPECIAL DESIGNATOR,
SUBJECT,
TRANSCRIPTION RATE,
USER CLASS,
USER IDENTIFIER,
USER NAME,
VOICE MAIL SUBSCRIBER,
WORK TYPE]

Data Item

-H-

| | |
|---|---|
| Hardcopy Job | = see Communications Interface Data Dictionary |
| Help Screens | = * screens which present help information * |

Data Item

-I-

| | |
|---|---|
| Inactivity Timeout | = see Voice Session Data Dictionary |
| Inactivity Timeout Enable | = see Voice Session Data Dictionary |
| Inactivity Timeout Enable Update | = see Communications Interface Data Dictionary |
| Inactivity Timeout Override | = see Voice Session Data Dictionary |
| Information Item Lengths | = Department Maximum Length + Subject Maximum Length + User Password Maximum Length + User Identifier Maximum Length + Work Type Maximum Length |
| Initial Creation Allotment | = see Voice Session Data Dictionary |
| Initial Session Complete | = see Voice Session Data Dictionary |
| Input Value | = [New Priority, Pool Input, Report Identifier, Delete Confirmation, Kill Confirmation, Edit Input, Support Input] |
| Inquiry Control Request | = [BACKWARD + Number Of Records, BOTTOM, FORWARD + Number of Records, TOP] |
| Inquiry Read Request | = [READ FIELD + Field Description, READ MARK, |

READ RECORD + Record Description]

| | |
|---|---|
| Inquiry Record | = [Accessible Work Types<br>Auto Finish Work Types,<br>Job Record,<br>Pool Definition,<br>Redundancy,<br>System Activity,<br>Transcription Pool Assignment,<br>User Profile,<br>Voice Safety Factors,<br>VS Set Ups] |
| Inquiry Record To Remove | = [Job Record To Remove,<br>User Profile To Remove] |
| Inquiry Request | = [Inquiry Control Request,<br>Inquiry Read Request,<br>Inquiry Search Request,<br>Inquiry Update Request] |
| Inquiry Search Request | = Search Space + Field |
| Inquiry Update Request | = Field |
| Internal Job Update | = Job Identifier + (Qualification) +<br>(Author Identifier) + (Author Name) +<br>(Department) + (Priority) +<br>(Special Designator) + (Subject) +<br>(Transcriptionist) + (Transcriptionist Name) +<br>(Typing Length) + (Work Type) |
| Interrupt Screens | = Help Screens |
| Interrupt Transaction | = [CANCEL,<br>FLASH-REPORT,<br>HELP,<br>KEYBOARD-LOCK] |

<u>Data Item</u>

-J-

| | |
|---|---|
| Job Available | = [TRUE, FALSE] |
| Job Capacity | = integer, 2 digits<br>* Percentage of job record capacity used * |
| Job Capacity Change | = Job Capacity |
| Job Header | = see Communications Interface Data Dictionary |
| Job Id Reply | = see Communications Interface Data Dictionary |
| Job Id Request | = see Communications Interface Data Dictionary |
| Job Identifier | = see Voice Session Data Dictionary |

| | |
|---|---|
| Job Listen Access | = Job Record + User Profile + Time |
| Job Manipulation Menu | = * a menu which presents the available *<br>* functions to manipulate job records * |
| Job Record | = Author Identifier +<br>Author Name +<br>Cue Location +<br>Date And Time Archived +<br>Date And Time Assigned +<br>Date And Time Cancelled +<br>Date And Time Completed/Sent +<br>Date And Time Created +<br>Date And Time Discarded +<br>Date And Time Finished +<br>Date And Time Pending +<br>Date And Time Signed-off +<br>Department +<br>Job Header +<br>Job Identifier +<br>Job Type +<br>Length +<br>Pool Identifier +<br>Priority +<br>Real Turnaround Time +<br>References +<br>Special Designator +<br>Status +<br>Subject +<br>Termination Status +<br>Transcriptionist + Transcriptionist Name +<br>Typing Length + Voice File +<br>Work Type + Working Turnaround Time |
| Job Record Alarm Margin | = * a level of Job Capacity, which when *<br>* exceeded will cause an alarm * |
| Job Record Backlog Change | = [COMPLETE, CANCEL, HARDCOPY, SIGN-OFF]<br>+ Length |
| Job Record Change | = Changed Job Record + Old Job Record |
| Job Record Data Menus | = [Job Type Selection Menu,<br>Single/Global Menu,<br>Job Record Select Attribute Menu] |
| Job Record Edit Field | = [AUTHOR IDENTIFIER,<br>DEPARTMENT,<br>PRIORITY,<br>SPECIAL DESIGNATOR,<br>SUBJECT,<br>TRANSCRIPTIONIST,<br>TYPING LENGTH,<br>WORK TYPE] |
| Job Record Edit Prompts | = * all prompts pertaining to the editing *<br>* of job records * |

| | |
|---|---|
| Job Record Find Next Field | = [AUTHOR IDENTIFIER, <br> AUTHOR NAME, <br> DATE AND TIME COMPLETED/SENT <br> DEPARTMENT, <br> JOB IDENTIFIER, <br> POOL, <br> PRIORITY, <br> SPECIAL DESIGNATYOR, <br> STATUS, <br> SUBJECT, <br> TRANSCRIPTIONIST, <br> TYPING LENGTH, <br> WORK TYPE] |
| Job Record Info | = [Edit Type, <br> Job Identifier, <br> Job Type, <br> Selection Criteria, <br> Selection Input Ready Modification] |
| Job Record Prompts | = New Priority Prompt |
| Job Record Request | = * Relationship Type + Lower Limit + <br> * Upper Limit <br> Alternate Disk + <br> (Relationship Type + Author Identifier + <br> (Author Identifier)) + <br> (Equality Relationship Type + Author Name) + <br> (Relationship Type + Date And Time Archived + <br> (Date And Time Archived)) + <br> (Relationship Type + Date And Time Assigned + <br> (Date And Time Assigned)) + <br> (Relationship Type + Date And Time Cancelled + <br> (Date And Time Cancelled)) + <br> (Relationship Type + Date And Time <br> Completed/Sent + (Date And Time Completed/ <br> Sent)) + <br> (Relationship Type + Date And Time Created + <br> (Date And Time Created)) + <br> (Relationship Type + Date And Time Discarded + <br> (Date And Time Discarded)) + <br> (Relationship Type + Date And Time Finished + <br> (Date And Time Finished)) + <br> (Relationship Type + Date And Time Pending + <br> (Date And Time Pending)) + <br> (Relationship Type + Date And Time <br> Signed-off + (Date And Time Signed-off)) + <br> (Relationship Type + Department + (Department)) + <br> (Relationship Type + Job Identifier + <br> (Job Identifier)) + <br> (Equality Relationship Type + Job Type) + <br> (Relationship Type + Length + (Length)) + <br> (Relationship Type + Pool Identifier + <br> (Pool Identifier)) + <br> (Relationship Type + Priority + (Priority)) + <br> (Relationship Type + Real Turnaround Time + <br> (Real Turnaround Time)) + |

(Relationship Type + Special Designator +
 (Special Designator)) +
(Relationship Type + Status + (Status)) +
 * Status not allowed if request is for      *
 *  Archived jobs                            *
(Relationship Type + Subject + (Subject)) +
(Equality Relationship Type +
 Termination Status) +
(Relationship Type + Transcriptionist +
 (Transcriptionist)) +
(Equality Relationship Type +
 Transcriptionist Name) +

| | |
|---|---|
| Job Record Request (cont'd) | (Relationship Type + Typing Length + (Typing Length)) + <br> (Relationship Type + Work Type + (Work Type)) + <br> (Relationship Type + Working Turnaround Time + (Working Turnaround Time)) + |
| Job Record Report Edit Prompts | = * all prompts pertaining to the entry     * <br>    * or modification of job record           * <br>    * report definitions                       * |
| Job Record Report Screen | = * a screen which presents the report      * <br>    * definition data for a job record          * <br>    * report                                    * |
| Job Record Response | = 0 {Job Record} MAX JOBS |
| Job Record Screens | = [Both Inquiry Screen, <br>    Dictation Inquiry Screen, <br>    Voice Mail Inquiry Screen] |
| Job Record Select Attribute Menu | = * a menu which displays all attribu       * <br>    * of the job record available for          * <br>    * selection                                 * |
| Job Record Sort Attribute | = * can only sort on attributes displayed * <br> [AUTHOR IDENTIFIER, AUTHOR NAME, <br> DATE AND TIME COMPLETED/SENT, <br> DATE AND TIME CREATED, <br> DEPARTMENT, JOB IDENTIFIER, LENGTH, POOL, PRIORITY, <br> SPECIAL DESIGNATOR, STATUS, SUBJECT, TRANSCRIPTIONIST, <br> WORK TYPE <br>    * the following are not available on       * <br>    * 80 column                                 * <br> (DATE AND TIME ARCHIVED, DATE AND TIME ASSIGNED, DATE AND TIME FINISHED, DATE AND TIME SIGNED-OFF, REAL TURNAROUND TIME, WORKING TURNAROUND TIME) <br>    * the following are available on on         * <br>    * reports                                   * <br> (DATE AND TIME CANCELLED, DATE AND TIME DISCARDED, DATE AND TIME PENDING, TRANSCRIPTIONIST NAME, TYPING LENGTH)] |

| | |
|---|---|
| Job Record Sort Attribute Menu | = * a menu which displays all attributes *<br>* of the job record available for *<br>* sorting |
| Job Record To Remove | = Job Identifier |
| Job Record Transaction | = [DICTATION FINISH,<br>EXTERNAL-JOB-ENTRY,<br>JOB-CANCEL,<br>JOB-RECORD-DISPLAY,<br>JOB-RECORD-INQUIRY,<br>JOB-RECORD-INQUIRY-SELECT,<br>JOB-RECORD-RETRIEVE,<br>PRIORITIZE,<br>READY-JOB-INQUIRY,<br>SIGN-OFF] |
| Job Record Update Request | = [External Job Update, Internal Job Update] |
| Job Record And Voice File Update Request | = [FINISH, CANCEL] + Job Identifier |
| Job To Cancel | = Job Identifier |
| Job To Copy | = Job Identifier + Job Voice File + Job Header |
| Job To Discard | = Job Identifier + Job Voice File + Job Header |
| Job To Finish | = Job Identifier |
| Job To Schedule | = Job Available +<br>* indicates whether a job is available *<br>* for scheduling *<br>(Job Record + New Header) +<br>* present if a job is available *<br>Pool Identifier |
| Job Type | = [EXTERNAL DICTATION, INTERNAL DICTATION, VOICE MAIL] |
| Job Type Selection Menu | = * menu which presents job types *<br>* available for selection * |
| Job Update Request | = [Job Record Update Request,<br>Job Record and Voice File Update Request] |
| Job Update Response | = [Job Record Change, Update Failure] |
| Job Voice File | = see Communications Interface Data Dictionary |
| Jobs To Archive | = Archive Job Record |

Data Item

-K-

| | |
|---|---|
| Kill Confirmation | = [YES, NO]<br>* indicates if a kill spooler is to be * |

|  |  |
|---|---|
| Kill Confirmation Prompt | = * Prompt requesting confirmation of a * spool kill command * completed * |

Data Item

-L-

|  |  |
|---|---|
| Length | = see Voice Session Data Dictionary |
| Listen From Pool | = see Communications Interface Data Dictionary |
| Listen List | = Port Identifier + User Profile + {Job Record} + Next Job * index into Job Record list * |
| Listen Request | = see Communications Interface Data Dictionary |
| Log Report | = * system events formatted as an audit * * trail report * |
| Logon Auto-select | = see Voice Session Data Dictionary |
| Logon Attempts | = see Voice Session Data Dictionary |
| Logon Time | = Time |
| Logon Time Change | = Logon Time + Port Identifier |
| Logon Timeout | = see Voice Session Data Dictionary |
| Lower Limit | = Value |

Data Item

-M-

|  |  |
|---|---|
| Mark Definition | = Mark Type (+ 0 {Field Name} NUM FIELD) * indictes field order for tabbing * |
| Mark Position | = [Record Indicator, Field, NONE] |
| Mark Request | = [CURRENT, DOWN, FIELD + Field Description, OFF, ON, UP] |
| Mark Type | = [RECORD, FIELD] |
| MAX ARCHIVE JOBS | = integer constant * capacity of archive medium * |

| | |
|---|---|
| MAX JOBS | = integer constant<br>* maximum number of jobs in a system * |
| MAX MESSAGES | = see Communications Interface Data Dictionary |
| MAX USERS | = integer constant<br>* maximum number of users in a system * |
| Menu Definition | = * a definition for a specific menu *<br>* selection * |
| Menu Selection | = Character + Menu Definition<br>* defines a valid menu selection A *<br>* through O * |
| Menu Type | = [Control Menus, Data Menus] |
| Message Type | = [Delete Notification, Save Notification] |

Data Item

-N-

| | |
|---|---|
| New Header | = see Communications Interface Data Dictionary |
| New Job Header | = see Communications Interface Data Dictionary |
| New Pool | = Pool |
| New Priority | = Priority |
| New Priority Prompt | = * prompt for a new job priority * |
| New Voice Mail | = see Communications Interface Data Dictionary |
| New Value | = Field Value |
| Next Job | = integer |
| NUM FIELD | = integer<br>* The number of fields being displayed * |
| NUM POOLS | = see Communications Interface Data Dictionary |
| NUM PORTS | = see Communications Interface Data Dictionary |
| NUM RECORD FIELDS | = integer<br>* number of fields of a record * |
| NUM WINDOW | = integer<br>* The number of windows defined in this *<br>* screen * |
| NUM WORK TYPES | = integer constant<br>* number of work types in the system * |
| Number Of Records | = Integer |

Data Item

-O-

- Offline Alarm Notification = Alarm Type + System Date & Time

Old Job Record = Job Record

Old Pool = Pool

Old Pool Definition = Pool Definition

Old Transcription Pool Assignment = Transcription Pool Assignment

Old User Profile = User Profile

Old Value = Field Value

- Online Alarm Notification = Alarm Type

Online Basket = see Communications Interface Data Dictionary

Online Baskets = 0 {Online Basket} NUM PORTS

Order Of Fields = * indicates the order in which Required *
         * Fields are to appear on a report *

Data Item

-P-

Password = * see VSDD *

Percent Subtotal Jobs = * the percentage of the number of jobs *
        * for a line in a cost allocation   *
        * report out of the subtotalled   *
        * number of jobs         *

Percent Subtotal Length = * the percentage of the length of jobs *
        * for a line in a cost allocation   *
        * report out of the subtotalled length *

Percent Subtotal Weighted Length = * the percentage of the weighted length *
        * of jobs for a line in a cost    *
        * allocation report out of the   *
        * subtotalled weighted length   *

Percent Total Jobs = * the percentage of the number of  *
        * jobs for a line in a cost allocation *
        * report out of the totalled number *
        * of jobs             *

Percent Total Length = * the percentage of the length of jobs *
        * for a line in a cost allocation   *
        * report out of the totalled length *

| | | |
|---|---|---|
| Percent Total Weighted Length | = | * the percentage of the weighted length *<br>* of jobs for a line in a cost *<br>* allocation report out of the *<br>* totalled weighted length * |
| Performance Monitoring Menu | = | * menu which presents the options *<br>* available during performance *<br>* monitoring * |
| Performance Monitoring Screens | = | * screens which present the performance *<br>* monitoring histograms * |
| Play Header | = | * see VSDD * |
| Pool Assignment Count | = | integer |
| Pool Cleared | = | * see CIDD * |
| Pool Criteria Select Attribute Menu | = | * menu which presents the available *<br>* attributes used for pool criteria *<br>* selection * |
| Pool Data Menus | = | [Condition Menu,<br>Pool Criteria Select Attribute Menu] |
| Pool Definition | = | * only one of the following may be *<br>* selected *<br>(Relationship Type + Author Identifier +<br>(Author Identifier)) +<br>(Equality Relationship Type + Author Name) +<br>(Relationship Type + Department + (Department)) +<br>(Relationship Type + Job Identifier +<br>(Job Identifier)) +<br>(Relationship Type + Length + (Length)) +<br>(Relationship Type + Special Designator +<br>(Special Designator)) +<br>(Relationship Type + Subject + (Subject)) +<br>(Relationship Type + Work Type + (Work Type)) |
| Pool Definition Change | = | Changed Pool Definition & Old Pool Definition |
| Pool Definition Display Screen | = | * screen which presents an expanded *<br>* record pool definition display * |
| Pool Definition Inquiry Screen | = | * a screen which presents the pool *<br>* definition inquiry * |
| Pool Definition Update | = | Pool Definition + Pool Identifier |
| Pool Definitions | = | NUM POOLS {Pool Definition} NUM POOLS |
| Pool Function Menu | = | * a menu which presents the available *<br>* pool functions * |
| Pool Identifier | = | see Voice Session Data Dictionary |
| Pool Input | = | [Delete Confirmation,<br>New Pool, |

```
                                    Old Pool,
                                    Pool,
                                    Pool Definition,
                                    Pool List,
                                    Transcriptionist]

Pool List                         = 0 {Pool} NUM POOLS

Pool Prompts                      = * all prompts pertaining to the input    *
                                    * of pool information                    *

Pool Screens                      = [Pool Definition Inquiry Screen,
                                    Transcriptionist Pool Assignment Screen]

Pool Transaction                  = [POOL-DEFINITION-ADD,
                                     POOL-DEFINITION-DELETE,
                                     POOL-DEFINITION-MODIFY,
                                     POOL-DISPLAY,
                                     POOL-INQUIRY]

Port Allocations                  = see Voice Session Data Dictionary

Port Configuration Edit Field     = [PORT CONNECTION,
                                     INACTIVITY TIMEOUT ENABLE,
                                     PORT ALLOCATIONS]

Port Configuration Edit           = * all prompts pertaining to the          *
Prompts                             * modification of port configurations    *

Port Configuration Screen         = * a screen which presents the port       *
                                    * configuration display                  *

Port Connection                   = see Voice Session Data Dictionary

Port Connections                  = see Communications Interface Data Dictionary Port Connections Update           = see Communications Interface Data Dictionary Port Identifier                   = see Voice Session Data Dictionary Port Information                  = Port Identifier + Activity Time + Logon Time +
                                    Port Status + Service + User Identifier Port Set Up Update                = [Inactivity Timeout Enable Update,
                                     Port Connections Update]

Port Status                       = see Voice Session Data Dictionary

Port Status Change                = see Communications Interface Data Dictionary Position                          = Row + Column Primary Field                     = * a single visible attribute from Job    *
                                    * Record                                 *

Primary Sort                      = Sort Attribute + Sort Order
```

| | |
|---|---|
| Printer Text | = ascii characters<br>   * to be output on printer * |
| Priority | = * indicates importance of a dictation *<br>   * job * |
| Priority Weighting Factors | = * scaling factor to charge for high *<br>   * priority jobs * |
| Prompt Type | = [Edit Prompts,<br>   Job Record Prompts,<br>   Pool Prompts,<br>   Report Prompts,<br>   System Operation Prompts,<br>   Support Prompts,<br>   User Profile Prompts] |
| Purge Time | = Time<br>   * when a voice file was purged * |
| ·Purged Job | = Job Identifier + Job Type + Purge Time |

Data Item

-Q-

| | |
|---|---|
| Qualification | = Status + (Status)<br>   * to determine if job still is in the *<br>   * inquiry * |
| Quit Assigned Job | = see Communications Interface Data Dictionary |

Data Item

-R-

| | |
|---|---|
| Real Turnaround Time | = * elapsed time between Date And Time *<br>   * Completed/Sent and Date And Time *<br>   * Signed-off * |
| Record Definition | = Record Type + 0{Field Description +<br>   Field Range} NUM RECORD FIELDS |
| Record Description | = Record Type + Record Indicator |
| Record Indicator | = * identifies a unique record within *<br>   * an inquiry * |
| Record Type | = [ACCESSIBLE WORK TYPES, AUTO FINISH,<br>   JOB RECORD,<br>   POOL DEFINITION,<br>   REDUNDANCY,<br>   SYSTEM ACTIVITY<br>   TRANSCRIPTION POOL ASSIGNMENT,<br>   USER PROFILE,<br>   VOICE SAFETY FACTORS,<br>   VS SETUPS] |

| | | |
|---|---|---|
| Redundancy | = | * determines whether duplicates of<br>* voice files and databases is kept |
| Redundancy Off Prompt | = | * prompt which ask the user to confirm<br>* the redundancy off function |
| Redundancy Update | = | Redundancy |
| References | = | * number of voice mail recipients who<br>* have not yet discarded a job and<br>* dictation job |
| Relationship Type | = | [Equality Relationship Type, RANGE]<br>* some relationships may include ranges<br>* others will only allow equality and<br>* inequality |
| Report Data Menus | = | Report Type Menu |
| Report Definition | = | Definition Info +<br>Required Fields + Order Of Fields |
| Report Definition Edit Prompts | = | [Cost Allocation Report Edit Prompts,<br>Job Record Report Edit Prompts,<br>User Profile Report Edit Prompts] |
| Report Definition Edit Type | = | [COST-ALLOCATION-REPORT-EDIT,<br>JOB-RECORD-REPORT-EDIT,<br>USER-PROFILE-REPORT-EDIT] |
| Report Definition Update | = | Report Definition |
| Report Delete Prompt | = | * prompt which ask user to confirm a<br>* report definition delete |
| Report Function Menu | = | * a menu which presents the available<br>* functions for report definition<br>* operations. e.g. generate a report |
| Report Identifier | = | * identifies a report in the index |
| Report Identifier Prompt | = | * prompt used to obtain a report<br>* identifier |
| Report Index Screen | = | * a screen which presents a report<br>* index inquiry |
| Report Info | = | [Job Record Response, User Profile Response] |
| Report Name | = | 15 characters<br>* text which identifies reports in the<br>* report index and appears on report<br>* pages |
| Report Prompts | = | [Kill Confirmation Prompt,<br>Report Delete Prompt,<br>Report Identifier Prompt] |

| | |
|---|---|
| Report Record | = [Cost Allocation Record, Job Record, User Profile]<br>    * with attributes selected and arranged *<br>    * as requested in the report definition * |
| Report Request | = Report Identifier |
| Report Screens | = [Cost Allocation Report Screen,<br>   Job Record Report Screen,<br>   Report Index Screen,<br>   User Profile Report Screen] |
| Report Title | = 50 characters<br>    * text which appears on top of all *<br>    * report pages * |
| Report Transactions | = [KILL-SPOOL,<br>   REPORT-DEFINITION-CREATE,<br>   REPORT-DEFINITION-DELETE,<br>   REPORT-DEFINITION-DISPLAY,<br>   REPORT-DEFINITION-MODIFY,<br>   REPORT-DEFINITION-SAVE, |
| Report Transaction (cont'd) | REPORT-INDEX,<br>REPORT-TYPE-SELECT,<br>START-SPOOL,<br>STOP-SPOOL] |
| Report Type | = [COST ALLOCATION, JOB RECORD, USER PROFILE] |
| Report Type Menu | = * a menu which presents available *<br>    * report types * |
| Required Fields | = [Job Record, User Profile]<br>    * as many fields as will fit on a *<br>    * report for Job Record and User *<br>    * Profile reports - only two permitted *<br>    * for Cost Allocation reports * |
| Row | = integer, row in display where field appears |

Data Item

-S-

| | |
|---|---|
| Save Notification | = * A message to the screen which *<br>    * indicates a report definition *<br>    * save has been performed * |
| Schedule Job | = see Communications Interface Data Dictionary |
| Schedule Job For Pool | = Pool Identifier |
| Schedule Request | = [TRUE, FALSE] |
| Screen Commands | = * terminal specific sequences for * |

* controlling placement of text,
* video attributes, etc.

| | |
|---|---|
| Screen Definition | = Screen Name +<br>0 {Window Definition} NUM WINDOW +<br>0 {Display Format} NUM WINDOW +<br>(Selection Required) |
| Screen Generator Request | = [Clear Request, Display Request, FLASH REPORT,<br>Inquiry Request, Mark Request] |
| Screen Name | = * any name of a screen which can be<br>* displayed |
| Screen Text | = ascii characters<br>* to be output on video terminal * |
| Screen Type | = [Interrupt Screens,<br>Job Record Screens,<br>Pool Screens,<br>Report Screens,<br>Support Screens,<br>System Operation Screens,<br>User Profile Screens] |
| Search Space | = Starting Record + Ending Record |
| Secondary Field | = * a single visible attribute from Job<br>* Record |
| Secondary Sort | = Sort Attribute + Sort Order |
| Select | = [TRUE, FALSE] |
| Selected Archived Jobs | = Job Record |
| Selection Criteria | = SI Selection Requests |
| Selection Input Ready Modification | = Job Record Request +<br>* users input selection request<br>0 {Job Record Request} NUM POOL<br>* select according to each pool<br>(+ EQUAL + READY)<br>* ensure status of READY is added |
| Selection Input Screen | = * a screen used for entering selection<br>* criteria |
| Selection Required | = Select + Sorting |
| Self Assignment Active | = [True, False] |
| Self Assignment Enable | = see Voice Session Data Dictionary |
| Self Assignment Request | = see Communications Interface Data Dictionary |
| Send Voice Mail | = see Communications Interface Data Dictionary |

| | |
|---|---|
| Service | = see Voice Session Data Dictionary |
| Service Change | = Port Identifier + Service |
| Service Selected | = see Communications Interface Data Dictionary |
| SI Selection Requests | = [Job Record Request, User Profile Request] |
| SI Updates | = [Accessible Work Type Update, Auto Finish Work Type Update, Disconnect Request, Job Update Request, Logoff Time, Logon Time, Pool Definition Update, Redundancy Update, SI User Profile Update, Transcription Pool Assignment, Voice Safety Factors Update, VS Set Up Update] |
| SI User Profile Update | = User Identifier + (Auto Create) + (Create Hang-up Option) + (Department) + (Department Prompt) + (Dictation Rate) + (Dictation Subscriber) + (Function Set) + (Inactivity Timeout Override) + (Initial Creation Allotment) + (Logon Auto-Select) + (Password) + (Play Header) + (Self-Assignment Enable) + (Special Designator) + (Subject) + (Subject Prompt) + (Supervisor) + (Transcription Rate) + (User Class) + (User Name) + (Voice Mail Subscriber) + (Work Type) + (Work Type Prompt) |
| Sign-off Message | = see Communications Interface Data Dictionary |
| Sign-on Message | = see Communications Interface Data Dictionary |
| Single Record Edit Data | = Edit Field Name + Edit Field Value |
| Single/Global Menu | = * a menu which presents the two job manipulation selection methods * |
| Skip Increment | = see Voice Session Data Dictionary |
| SM Changes | = [Alerts, Job Capacity Change, Job Listen Access, Job Record Change, Pool Definition Change, Purged Job, System Date & Time Change, Transcription Pool Assignment Change, Update Failure, User Profile Change, VF Copied, VF Deleted, Voice Capacity Change] |
| SM Database Info | = [Accessible Work Types, Auto Finish Work Types, Job Record Response, Pool Definitions, Redundancy, System Activity, Transcription Pool Assignments, User Profile Response, Voice Safety Factors, VS Set Ups] |

| | |
|---|---|
| ·SM Response | = [Job Identifier, SM Database Info] |
| ·SM Update Log | = [Job Record Change,<br>   Pool Definition Change,<br>   User Profile Change] |
| Sort Attribute | = [Job Record Sort Attribute,<br>   User Profile Sort Attribute] |
| Sort Criteria | = (Primary Sort + (Secondary Sort)) |
| Sort Input Screen | = * a screen used for entering sort *<br>   * criteria * |
| Sort Order | = [ASCENDING, DESCENDING] |
| Sort Order Menu | = * a menu which displays the available *<br>   * sort orders (ascending, descending) * |
| Sorting | = [TRUE, FALSE] |
| Special Designator | = * alphabetic character (A-Z) associated *<br>   * with a dictator * |
| Spoken Name File | = see Communications Interface Data Dictionary |
| ·Spool Capacity | = integer, 2 digits<br>   * percent of spool buffer area used * |
| Spool Capacity Margin | = * a level of Spool Capacity, which *<br>   * when exceeded, will cause an alarm * |
| ·Spool Commands | = [KILL, START, STOP] |
| SS Job-Pool Message | = [SS Transcription Message,<br>   SS Listen Message,<br>   SS Voice File Message,<br>   SS Voice Mail Message] |
| SS Listen Message | = Schedule Job |
| ·SS Request | = see Communications Interface Data Dictionary |
| ·SS Requested Info | = see Communications Interface Data Dictionary |
| SS Transcription Message | = [Clear Pool, Transcription Pool Assignment<br>   Update, Schedule Job] |
| ·SS Unrequested Info | = see Communications Interface Data Dictionary |
| SS User Profile Message | = [Address Reply, Copy Voice File,<br>   Delete Voice File, VS User Profile Update] |
| SS User Session Message | = User Info Reply |
| SS Voice File Message | = [Copy Voice File, Delete Voice File] |

| | | |
|---|---|---|
| SS Voice Mail Message | = | New Voice Mail |
| Starting Record | = | [Record Indicator, MARKED] |
| State Identifier | = | * Identifies the users current state<br>* in the menu and function group<br>* hierarchy. The identifiers are<br>* dependent on menu and user interface<br>* that will be defined |
| State Info | = | State Identifier + State Variables +<br>Current Transaction +<br>Current Transaction Status |
| State Variables | = | * variables specific to a state which<br>* are in the interpretation of<br>* commands |
| Status | = | * a value from the ordered set below<br>[CREATING, READY, SENT, PENDING, ASSIGNED, SIGNED-OFF, Termination Status, ARCHIVED] |
| Subject | = | see Voice Session Data Dictionary |
| Subject Maximum Length | = | see Voice Session Data Dictionary |
| Subject Prompt | = | see Voice Session Data Dictionary |
| Supervisor | = | see Voice Session Data Dictionary |
| Supervisor Database Screen Info | = | [Alarm Levels,<br>Audit Trail,<br>Backlog,<br>Center Transcription Rate,<br>Center Turnaround Time,<br>Default Unit Costs,<br>Record Description,<br>Report Definition,<br>Weighting Factors] |
| Supervisor Database Updates | = | [Alarm Level Update,<br>Audit Trail Update,<br>Center Transcription Rate Update,<br>Default Unit Costs Update,<br>Report Definition Update,<br>Weighting Factors Update] |
| Support Data Menus | = | [Condition Menu,<br>Job Record Select Attribute Menu,<br>Job Record Sort Attribute Menu,<br>Sort Order Menu,<br>User Profile Select Attribute Menu,<br>User Profile Sort Attribute Menu] |
| Support Input | = | [Value, Upper Limit, Lower Limit] |
| Support Prompts | = | * all prompts pertaining to the input<br>* of selection criteria |

| | |
|---|---|
| Support Screens | = [Display Screens,<br>　　Selection Input screen,<br>　　Sort Input Screen] |
| Support Transaction | = [DISPLAY-MENU,<br>　　DISPLAY-INQUIRY,<br>　　SELECTION-INPUT,<br>　　SORTING-INPUT] |
| System Activity | = Port Information + Voice File Usage |
| System Activity Screen | = * screen which presents the system<br>　　* activity inquiry |
| System Date & Time | = * date and time available from the<br>　　* system clock |
| System Date & Time Change | = System Date & Time |
| System Date & Time Update | = System Date & Time |
| System Operation Data Menus | = [System Operation Menu,<br>　　System Setup Menu,<br>　　Performance Monitoring Menu] |
| System Operation Edit Type | = [ACCESSIBLE-WORK-TYPE-EDIT,<br>　　AUTO-FINISH-EDIT,<br>　　PORT-CONFIGURATION-EDIT,<br>　　SYSTEM-SETUP-EDIT,<br>　　WEIGHTING-FACTOR-EDIT] |
| System Operation Menu | = * a menu which displays the available<br>　　* system operation functions |
| System Operation Prompts | = Redundancy Off Prompt |
| System Operation Screens | = [Performance Monitoring Screens,<br>　　System Activity Screen] |
| System Operation Transactions | = [AUTO-FINISH,<br>　　ESTIMATED-TAT,<br>　　LINES-PER-POOL,<br>　　LINES-PER-STATUS,<br>　　PORT-CONFIGURATION,<br>　　RECALCULATE-BACKLOG,<br>　　SYSTEM-SETUP,<br>　　WEIGHTING-FACTORS] |
| System Setup Edit Field | = [AUDIT TRAIL,<br>　　BACKLOG ALARM LEVEL,<br>　　CENTER TRANSCRIPTION RATE,<br>　　DEPARTMENT MAXIMUM LENGTH,<br>　　DICTATION UNIT COST,<br>　　INACTIVITY TIMEOUT,<br>　　JOB RECORD ALARM LEVEL,<br>　　KEYBOARD LOCK PASSWORD,<br>　　LOGON ATTEMPTS,<br>　　LOGON TIMEOUT, |

SKIP INCREMENT,
SPOOL CAPACITY ALARM MARGIN,
SUBJECT MAXIMUM LENGTH,
SYSTEM DATE AND TIME,
USER IDENTIFIER MAXIMUM LENGTH,
USER PASSWORD MAXIMUM LENGTH,
VOICE CAPACITY ALARM MARGIN,
VOICE CAPACITY SAFETY MARGIN,
VOICE MAIL RETENTION PERIOD,
VOICE MAIL UNIT COST,
WORK TYPE MAXIMUM LENGTH]

System Setup Edit Prompts = * all prompts pertaining to the
 * modification of system setup
 * parameters System Setup Menu = * menu which presents the options
 * available during system setup System Setup Screen = * a screen which presents the system
 * setup display for modifying values

Data Item

-T-

Termination Status = [CANCELLED, DISCARDED, FINISHED]

Text Field = Characters + Position

Time = see Voice Session Data Dictionary

Top Level Menu = * a menu which presents available
 * functions at the top most level in
 * the menu heirarchy Total Cost = * center's total cost to be distributed
 * amongst dictation jobs based on
 * weighted lengths Total Dictation Cost = * cost of dictation for a line, a sub-
 * totalled cost, or totalled cost in
 * a cost allocation report Total Jobs = * number of jobs for a line, subtotal,
 * or total in a cost allocation report Total Length = * length of jobs for a line, subtotal,
 * or total in a cost allocation report Total Message Cost = * cost for voice mail jobs for a line,
 * subtotal, or total in a cost
 * allocation report Total Real Turnaround Time = * turnaround time for jobs on a line,
 * subtotal, or total in a cost
 * allocation report

| | |
|---|---|
| Total Weighted Length | = * weighted length for jobs on a line,<br>  * subtotal, or total in a cost<br>  * allocation report |
| Transaction | = [Edit Transaction,<br>  Interrupt Transaction,<br>  Job Record Transaction,<br>  Pool Transaction,<br>  Report Transaction,<br>  Support Transaction,<br>  System Operation Transaction,<br>  Transcriptionist Transaction,<br>  User Profile Transaction] |
| Transaction Info | = [Edit Type,<br>  Job Record,<br>  Job Record Info,<br>  Record Definition, |
| Transaction Info (cont'd) | Report Identifier,<br>  Report Type,<br>  Selection Criteria,<br>  Single Record Edit Data,<br>  Sort Criteria,<br>  User Profile,<br>  User Profile Info] |
| Transcription Pool Assignment Update | = see Communications Interface Data Dictionary |
| Transcription Pool Assignments | = 0 {Transcription Pool Assignment} MAX USERS |
| Transcription Rate | = * the rate at which a transcriptionist<br>  * is capable of transcribing dictation |
| Transcriptionist | = User Identifier |
| Transcriptionist Assignment Menu | = * a menu which presents the available<br>  * functions used in transcriptionist<br>  * pool assignment |
| Transcriptionist Name | = * 15 characters for the transcriptionist<br>  * name |
| Transcriptionist Pool Assignment Change | = Transcriptionist +<br>  Changed Transcription Pool Assignment +<br>  Old Transcription Pool Assignment |
| Transcriptionist Pool Assignment Screen | = * a screen which presents the<br>  * transcriptionist pool assignment |
| Transcriptionist Transaction | = [ADD-TRANSCRIPTIONIST-ASSIGNMENT,<br>  DELETE-TRANSCRIPTIONIST-ASSIGNMENT,<br>  MODIFY-TRANSCRIPTIONIST ASSIGNMENT,<br>  TRANSCRIPTIONIST-ASSIGNMENT-INQUIRY] |
| Transition Type | = [ADD USER, DELETE USER] |

| | |
|---|---|
| Typing Length | = * an estimate of the number of lines *<br>* in a job - the length times *<br>* Dictation Rate * |

Data Item

-U-

| | |
|---|---|
| Unit Costs | = Dictation Unit Cost + Voice Mail Unit Cost |
| Update Failure | = Job Identifier |
| Upper Limit | = Value |
| User Change | = Port Identifier + User Identifier + User Name |
| User Class | = see Voice Session Data Dictionary |
| User Disconnect | = see Communications Interface Data Dictionary |
| User Identifier | = see Voice Session Data Dictionary |
| User Identifier Maximum Length | = see Voice Session Data Dictionary |
| User Info Reply | = see Communications Interface Data Dictionary |
| User Info Request | = see Communications Interface Data Dictionary |
| User Input | = [Edit Menu Choice,<br>Menu Selection,<br>Input Value] |
| User Name | = * 15 characters for the user's name * |
| User Password Maximum Length | = see Voice Session Data Dictionary |
| User Personal Info Entered | = see Communications Interface Data Dictionary |
| User Personal Info Update | = User Identifier +<br>(Password) +<br>* present if password is to be updated *<br>Spoken Name File + Alternate Disk |
| User Profile | = Auto Create +<br>Create Hang-up Option +<br>Department +<br>* Default *<br>Department Prompt +<br>Dictation Rate +<br>Dictation Subscriber +<br>Function Set +<br>Inactivity Timeout Override +<br>Initial Creation Allotment +<br>Initial Session Complete +<br>Logon Auto-select + |

User Profile (cont'd)      Password +
                           Play Header +
                           Self Assignment Enable +
                           Special Designator +
                           Spoken Name File +
                           Subject +
                           * Default *
                           Subject Prompt +
                           Supervisor +
                           Transcription Rate +
                           User Class +
                           User Identifier +
                           User Name +
                           Voice Mail Subscriber +
                           Work Type +
                           * default *
                           Work Type Prompt User Profile Change        = Changed User Profile + Old User Profile User Profile Delete Prompt = * prompt which asks user to confirm a *
                             * user profile delete                 *

User Profile Deletion      = User Identifier

User Profile Display Screen = * screen used to display a single user *
                              * profile record                        *

User Profile Edit Prompts  = * all prompts pertaining to the entry   *
                             * or modification of user profiles      *

User Profile Edit Field    = [AUTO CREATE,
                             CREATE HANG-UP OPTION,
                             DEPARTMENT,
                             DEPARTMENT PROMPT,
                             DICTATION RATE,
                             DICTATION SUBSCRIBER,
                             INITIAL CREATION ALLOTMENT,
                             LOGON AUTO-SELECT,
                             NAME,
                             SPECIAL DESIGNATOR,
                             SUBJECT,
                             SUBJECT PROMPT,
                             SUPERVISOR,
                             TRANSCRIPTION RATE,
                             USER CLASS,
                             USER IDENTIFIER,
                             VOICE MAIL SUBSCRIBER,
                             WORK TYPE,
                             WORK TYPE PROMPT]

User Profile Find Next Field = Global User Profile Edit Field

User Profile Function Menu = * a menu which presents the available *
                             * functions for user profile          *
                             * manipulation                        *

User Profile Info          = [User Profile, Edit Type]

| | |
|---|---|
| User Profile Inquiry Screen | = * screen used to display multiple user *<br>* profile records in a column oriented *<br>* display * |
| User Profile Prompts | = User Profile Delete Prompt |
| User Profile Request | = * Relationship Type + Lower Limit + *<br>* Upper Limit *<br>(Equality Relationship Type +<br>   Auto Create) +<br>(Equality Relationship Type +<br>   Create Hang-up Option) +<br>(Relationship Type + Department +<br>   (Department)) +<br>(Equality Relationship Type +<br>   Department Prompt) +<br>(Relationship Type + Dictation Rate +<br>   (Dictation Rate)) +<br>(Equality Relationship Type +<br>   Dictation Subscriber) +<br>(Equality Relationship Type + Function Set)<br>(Equality Relationship Type +<br>   Inactivity Timeout Override) +<br>(Relationship Type + Initial Creation<br>   Allotment + (Initial Creation Allotment)) +<br>(Equality Relationship Type +<br>   Logon Auto-select) +<br>(Equality Relationship Type +<br>   Play Header) +<br>(Equality Relationship Type +<br>   Self Assignment Enable) +<br>(Relationship Type + Special Designator +<br>   (Special Designator)) +<br>(Relationship Type + Subject + (Subject)) +<br>(Equality Relationship Type +<br>   Subject Prompt)<br>(Equality Relationship Type + Supervisor) +<br>(Relationship Type + Transcription Rate +<br>   (Transcription Rate)) +<br>(Equality Relationship Type + User Class) +<br>(Relationship Type + User Identifier +<br>   (User Identifier)) + |
| User Profile Request (cont'd) | (Equality Relationship Type + User Name) +<br>(Equality Relationship Type +<br>   Voice Mail Subscriber) +<br>(Relationship Type + Work Type +<br>   (Work Type)) +<br>(Equality Relationship Type +<br>   Work Type Prompt) |
| User Profile Report Edit Prompts | = * all prompts pertaining to the entry or *<br>* modification of user profile report *<br>* definitions * |
| User Profile Report Screen | = * a screen which presents the report *<br>* definition data for a user profile *<br>* report * |

| | |
|---|---|
| User Profile Response | = 0 {User Profile} MAX USERS |
| User Profile Screens | = User Profile Inquiry Screen |
| User Profile Select Attribute Menu | = * a menu which displays all attributes<br>* of the user profile available for<br>* selection |
| User Profile Sort Attribute | = [DEPARTMENT, DICTATION RATE,<br>SPECIAL DESIGNATOR, SUBJECT,<br>TRANSCRIPTION RATE, USER CLASS,<br>USER IDENTIFIER, USER NAME, WORK TYPE] |
| User Profile Sort Attribute Menu | = * a menu which displays all attributes<br>* of the user profile available for<br>* sorting |
| User Profile To Delete | = User Identifier |
| User Profile To Remove | = User Identifier |
| User Profile Transaction | = [USER-PROFILE-ADD,<br>USER-PROFILE-DELETE,<br>USER-PROFILE-DISPLAY,<br>USER-PROFILE-INQUIRY,<br>USER-PROFILE-MODIFY,<br>USER-PROFILE-RETRIEVE]<br>REPEAT] |
| User Transition | = User Identifier + Transition Type |

Data Item

-V-

| | |
|---|---|
| Valid Value | = [TRUE, FALSE] +<br>* Needed if Author Id is changed<br>(Author Name + SpecialDesignator) +<br>* Needed if Transcriptionist is changed<br>(Transcriptionist Name) |
| Validate Field Value | = Edit Type + Edit Field Name + Field Value |
| Value | = * a value for a valid job record or user<br>* profile selection attribute |
| Value To Find | = Field Value |
| VF Copied | = Job Identifier + VF Copy Time |
| VF Copy Time | = Time |
| VF Delete Time | = Time |
| VF Deleted | = Job Identifier + VF Delete Time |
| Video | = * Video characteristic to be used in<br>* the display. This field is specific |

|   |   |
|---|---|
| | * to the terminal configured in the DDS |
| | * Examples would be reverse video and |
| | * underscore |
| Voice Capacity Alarm Margin | = * a level of Voice File Usage which, |
| | * when exceeded, will cause an alarm |
| Voice Capacity Change | = Voice File Usage |
| Voice Capacity Safety Margin | = * a level of Voice File Usage which, |
| | * when exceeded, will cause jobs to |
| | * be cancelled or finished |
| Voice File | = see Voice Session Data Dictionary |
| Voice File Copied | = see Communications Interface Data Dictionary |
| Voice File Deleted | = see Communications Interface Data Dictionary |
| Voice File Usage | = see Communications Interface Data Dictionary |
| Voice File Usage Change | = see Communications Interface Data Dictionary |
| Voice Mail Cost Allocation Record | = (Primary Field + Secondary Field + Percent Subtotal Jobs + |
| Voice Mail Cost Allocation Record (cont'd) | Percent Subtotal Length + Percent Total Jobs + Percent Total Length +) |
| | * not present for subtotal and |
| | * total records |
| | Total Jobs + Total Length + Total Message Cost |
| Voice Mail Display Screen | = * a screen which presents an expanded |
| | * record display of a voice mail job |
| | * record |
| Voice Mail Inquiry Screen | = * a screen which presents a job record |
| | * inquiry for voice mail job only |
| Voice Mail Retention Period | = * voice mail jobs older than this are |
| | * cancelled first when Voice Capacity |
| | * Safety Margin is exceeded |
| Voice Mail Subscriber | = see Voice Session Data Dictionary |
| Voice Mail To Cancel | = Job Identifier |
| Voice Mail Unit Cost | = * cost per voice mail message * |
| Voice Safety Factors | = Voice Capacity Safety Margin + Voice Mail Retention Period |
| Voice Safety Factors Update | = [Voice Capacity Safety Margin, Voice Mail Retention Period] |
| VS Dictation Message | = [Complete Job, Hardcopy Job] |

| | |
|---|---|
| VS Event | = see Communications Interface Data Dictionary |
| VS Job-pool Message | = [VS Transcription Message,<br>VS Dictation Message,<br>VS Listen Message,<br>VS Voice File Message,<br>VS Voice Mail Message] |
| VS Job Record Update | = Job Identifier + (Qualification) +<br>(Author Identifier + Author Name +<br>Job Voice File + Job Type +<br>Work Type + Subject + Department +<br>Special Designator + Length +<br>Typing Length + References +<br>Cue Location + Date & Time Created +<br>Date & Time Completed/Sent) + |
| VS Job Record Update (cont'd) | * These fields are present for new jobs *<br>(Status) +<br>* Present for new jobs or status update *<br>([Date & Time Pending,<br>Date & Time Assigned,<br>Date & Time Signed-off,<br>Date & Time Finished,<br>Date & Time Cancelled,<br>Date & Time Discarded]) +<br>* Present for status updates *<br>(Termination Status) +<br>* Present for cancel & finish of dictation *<br>* jobs *<br>(Real Turnaround Time +<br>Working Turnaround Time +<br>Transcriptionist +<br>Transcriptionist Name +<br>* Present for sign-off *<br>(Job Header ) +<br>* Present for new job & new header *<br>Alternate Disk<br>* Indicates whether update is for *<br>* redundant version * |
| VS Listen Message | = [Listen Request, Listen From Pool] |
| VS No Reply Request | = see Communications Interface Data Dictionary |
| VS Port Information Update | = Port Identifier + User Identifier +<br>Logon Time |
| VS Read Job Record | = see Communications Interface Data Dictionary |
| VS Reply Request | = see Communications Interface Data Dictionary |
| VS Set Ups | = Inactivity Timeout + Inactivity Timeout<br>Enable + Information Item Lengths +<br>Logon Attempts + Logon Timeout +<br>Port Allocation + Port Connections +<br>Skip Increment |

| | |
|---|---|
| VS Set Up Update | = [Inactivity Timeout, Inactivity Timeout Enable, Information Item Lengths, Logon Attempts, Logon Timeout, Port Allocation, Port Connections, Skip Increment] |
| VS System Set Up Update | = see Communications Interface Data Dictionary |
| VS Transcription Message | = [Quit Assigned Job, Sign-off Message, Sign-on Message, Self Assignment Request, Pool Cleared] |
| VS User Profile Message | = [Address Request, User Personal Info Entered, Voice File Copied] |
| VS User Profile Update | = see Communications Interface Data Dictionary |
| VS User Session Message | = [User Info Request, User Disconnect] |
| VS Voice File Message | = [Voice File Copied, New Job Header] |
| VS Voice Mail Message | = [Send Voice Mail, Discard Voice Mail By Recipient] |

Data Item

-W-

| | |
|---|---|
| Weighting Factors | = Priority Weighting Factors + Work Type Weighting Factors |
| Weighting Factors Edit Field | = [Priority Weighting Factors, Work Type Weighting Factors] |
| Weighting Factor Edit Prompts | = * all prompts pertaining to the * * modification of weighting factors * |
| Weighting Factors Screen | = * a screen which presents all work * * types and priorities and their * * corresponding weighting factors * |
| Weighting Factors Update | = Weighting Factors |
| Window Definition | = Display Request + Mark Definition + Record Type + Window Type |
| Window Type | = [DATA, HEADER, MENU, NOTIFICATION, PERFORMANCE MONITORING, PROMPT] |
| Window Update | = Window Definition |
| Work Type | = see Voice Session Data Dictionary |

| | |
|---|---|
| Work Type Maximum Length | = see Voice Session Data Dictionary |
| Work Type Prompt | = see Voice Session Data Dictionary |
| Working Hours Request | = Date And Time Completed/Sent + Date And Time Signed-off |
| Working Hours Response | = Working Turnaround Time |
| Working Turnaround Time | = * the amount of time that a supervisor *<br>* was logged on (to the video terminal) *<br>* between the Date And Time Completed/ *<br>* Sent and the Date And Time Signed- *<br>* off * |
| Work Type Weighting Factors | = * scaling used to charge more for *<br>* certain work types * |

VOICE SESSION DATA DICTIONARY

Data Stores

The voice session has these data stores, which hold the indicated information:

1. VS Data Store (information global to the entire voice session):

- Intercom Active (indicates whether an intercom connection is active in the voice session)

- Intercom Initiator Port (present if Intercom Active is TRUE; port identifier of the intercom initiator

- Logged-on Users Info (information about users logged on the system; needed to determine whether another user of a particular class will be permitted to log on)

- Pending Pools (scheduled jobs)
        - Pending Job

- Port Connections (whether the ports are connected to a PBX, are hard-wired, or not connected)

- Supervisor Port (present if the supervisor is logged on; indicates which port the supervisor is on to)

- VS System Set Ups (the system set ups needed by the VS)
        - Department Maximum Length
        - Inactivity Timeout
        - Logon Attempts
        - Logon Timeout
        - User Password Maximum Length
        - Port Allocation
        - Skip Increment
        - Subject Maximum Length
        - User Identifier Maximum Length
        - Work Type Maximum Length 2. Intersession Info Data Store (information belonging to one user session which can be accessed by other user sessions or other processes):

- Port Identifier (indicates the port associated with the user session)

- Current Job Id (job identifier of job being accessed; present if a job is being accessed)

- Review Active (whether a Review function is currently in progress)

- Emulating User Info (information about a supervisor emulating another user; present if emulation is occurring)

- Implicit Commands (commands automatically generated by the system)

- Inactivity Timeout Enable (indicates whether the user will be disconnected if the inactivity timeout period elapses)

- Interrupt Flag (indicates whether another user session needs to stop a voice stream on this port in order to allow intercom notification)

- User Info (information about the user currently logged on or being emulated; present if a user is logged on)
     - VS User Profile
     - Transcription Pool Assignment (present if user is a transcriptionist or supervisor)
     - Voice Mail Messages (present if user is a voice mail subscriber)

3. Session Info Data Store (information private to one user session):

- Emulation Status (present if the user is logged on; indicates whether the user is a supervisor currently emulating another user)
     - Emulation Active
     - Emulating User Session Status (information about the user's session at the time he began emulating another user)
     - Emulating User Info (user information for the supervisor emulating another user).
     - Emulation Return State (state user will return to when done emulating)

- Intersession Connection (information about the user's monitor or intercom connection to another user session)
     - Monitor Connection
       - Other Party Port
     - Intercom Connection
       - Intercom Status
       - Other Party Port
       - Intercom Pending Timeout Begin

- Logged On (indicates whether a user is logged on at the port)

- Port Status (indicates whether the port is onhook or offhook)

- Session Status (present if a user is logged on; information about the session the user is in)
     - Access Type (the user's current file access type; present if the user is accessing a file)
     - Command Prompt Table (used to determine what prompts to play)

- Current Job Accessed (information about the job the user is currently accessing; present if the user is accessing a job)
    - VS Read Job Record or
    - VS Write Job Record (the job record of the job being accessed)
    - Address List (address list for a voice mail being created; present if the user is creating voice mail)
    - Current Job Status (status information about the job)
        - Cut Mark (where a cut function was begun)
        - Empty File (whether the voice file is currently empty)
        - Farthest Advance (whether the voice cursor is at the current end of the voice file)
        - Insert Begin (where the current insertion began)
        - Last Cut (where the last cut was made in the voice file; present if the voice file is being created)
        - Last Insert (where the last insertion was made in the voice file; present if the voice file is being created)
        - Most Recent Cursor (where the cursor was when the current function was begun)
- Current State (the user's current state)
- Home State (the user's home state)
- Key Meanings (indicates the command for each user device key)
- Previous Create Data Values (data values from the user's last created job this session; present if the user is a dictator)
- Previous Home State (used for break from monitor, intercom receive)
- Self-assignment Active (whether the user is transcribing jobs from a self-defined pool; present if the user is a transcriptionist)
- Service (service the user is currently in; present if the user is in a service)
- Speed Control Status (the current speed control settings)
    - Delivery Rate Percent
    - Pause Percent 4. User Event Queue (a FIFO list of events received from the user's telephone-like device):

- Event Entry (a telephony event and the time it occurred)

The composition of each member of the data stores is found in the dictionary entry for that member.

Data Items

-A-

| | |
|---|---|
| Access Type | = [CREATE ACCESS, LISTEN ACCESS, REVIEW ACCESS, SIGN-ON ACCESS] |
| Activity | * see Communication Interface Data Dictionary * |
| Adding Allotment Prompt | * prompt telling user the job he is creating is being extended |
| Address | * see Communication Interface Data Dictionary * |
| Address Info | = Address + Valid Address + (Spoken Name File) <br> * Present if Spoken Name File exists * |

| | |
|---|---|
| Address List | = Addressees + 0 {Spoken Name File} MAX ADDRESSES |
| Address List Erased Prompt | * prompt telling the user an address<br>* list has been erased |
| Address List Full Prompt | * prompt telling the user an address<br>* list is full |
| Addressees | * see Communication Interface Data Dictionary * |
| Address Request | * see Communication Interface Data Dictionary * |
| Author Identifier | = integer, 0-5 digits<br>* the user identifier of the creator *<br>* of the job *<br>* system-wide data item * |
| Auto Create | = [TRUE, FALSE]<br>* indicates whether the Create function<br>* will be automatically invoked when the<br>* user selects Dictation service or enters<br>* the Complete or Send command<br>* system-wide data item |

Data Items

-B-

| | |
|---|---|
| Brief Command Prompt | * prompt telling user most common commands<br>* available to him |
| Brief Flag | = [TRUE, FALSE] |

Data Items

-C-

| | |
|---|---|
| Clear Pool | * see Communication Interface Data Dictionary * |
| Command | = [ADDRESS,<br>ADD-TO-LIST,<br>BREAK,<br>CANCEL, COMPLETE,<br>COMPRESS-PAUSES, CREATE, CUE, CUT,<br>CUT-FROM-BEGINNING,<br>CUT-TO-END, DELETE-CUE, DICTATION, DISCARD,<br>EMULATE, ERASE, EXPAND-PAUSES,<br>FAST-BACKWARD, FAST-FORWARD,<br>HANG-UP, HARDCOPY, HELP, INSERT, INTERCOM,<br>INTERCOM-PENDING, INTERCOM-RECEIVE,<br>INTERCOM WAITING, INVALID, LISTEN, LOGOFF,<br>LOGON, MONITOR, MOVE-HALF-BACKWARD,<br>MOVE-HALF-FORWARD, MOVE-TO-BEGINNING,<br>MOVE-TO-END,<br>MOVE-TO-LAST-CUT,<br>PLAY, |

QUIT,
REPROMPT, REVIEW, REVIEW-LAST-INSERTION,
SELF ASSIGNMENT, SEND, SERVICE, SIGNOFF,
SIGN-ON,
SKIP-BACKWARD, SKIP-FORWARD, SLOW-DOWN,
SPEED-UP, STOP, STOP-CUT,
VOICE-MAIL,]

| | |
|---|---|
| Command Entry | = Command Present +<br>  * Indicates whether a user command was *<br>  * entered *<br>(Command + Command Time)<br>  * Present if a command was entered * |
| Command Present | = [TRUE, FALSE] |
| Command Prompt Table | = {Key Sequence Command Prompt +<br>   Brief Flag}<br>  * Indicates whether to include in brief *<br>  * command prompt * |
| Command Time | = Time |
| Complete Job | * see Communication Interface Data Dictionary * |
| Confirm Cut Prompt | * prompt the user to confirm a cut operation * |
| Confirm Discard Prompt | * prompt the user to confirm discarding of *<br>  * a voice file he is creating * |
| Copy Voice File | * see Communication Interface Data Dictionary * |
| Create Hang-up Option | = [COMPLETE-SEND, DISCARD]<br>  * action taken when Hang-up is detected during *<br>  * file access *<br>  * system-wide data item * |
| Cue Deleted Prompt | * prompt telling the user a cue has been deleted * |
| Cue Location | = integer, 10 digits<br>  * time, in milliseconds, the cue is placed *<br>  * away from the beginning of the file * |
| Cue Placed Prompt | * prompt telling the user a cue has been placed * |
| Current Job Id | = Job Identifier |
| Current Job Accessed | = [VS Read Job Record, VS Write Job Record,<br>   Address List<br>   Current Job Status]<br>  * Info about the job * |
| Current Job Status | = [Cut Mark, Empty File, Farthest Advance,<br>   Insert Begin<br>   Last Cut,<br>   Last Insert,<br>   Most Recent Cursor] |
| Current State | = State |

| | |
|---|---|
| Cursor Location | = integer, 10 digits<br>* Time in milliseconds voice cursor is away *<br>* from the beginning of the voice stream * |
| Cut Mark | = Cursor Location |

Data Items

-D-

| | |
|---|---|
| Data Item | = [Address, Department, Job Identifier, Password, Port Identifier, Subject, User Identifier, Work Type] |
| Data Item Entry | = Data Item +<br>Num Digits +<br>* The number of digits the user entered *<br>(Embedded Command) +<br>* A command entered during data entry; *<br>* present if user entered command *<br>* in midst of data item *<br>Timeout Flag<br>* Indicates whether the data entry timed out *<br>* before completion * |
| Data Item Request | = (Timeout)<br>* Present if data item entry must be done *<br>* within a time limit * |
| Date & Time Created | * date and time the voice file was created * |
| Date & Time Completed/Sent | * date and time the voice file was either *<br>* completed or sent * |
| Delete Job Check | = Job Identifier |
| Delete Voice File | * see Communication Interface Data Dictionary * |
| Delete Voice Mail | = Job Identifier + User Identifier |
| Delivery Rate Percent | = [DELIVERY 50, DELIVERY 60, DELIVERY 70,<br>DELIVERY 80, DELIVERY 90, DELIVERY 100,<br>DELIVERY 110, DELIVERY 120, DELIVERY 130,<br>DELIVERY 140, DELIVERY 150, DELIVERY 160<br>DELIVERY 170, DELIVERY 180, DELIVERY 190,<br>DELIVERY 200] |
| Department | = integer, 5 digits<br>* system-wide data item * |
| Department Maximum Length | = integer, 5 digits<br>* system-wide data item * |
| Department Prompt | = [TRUE, FALSE]<br>* indicates whether a user will be prompted *<br>* for department number when creating a file * |
| Dictation Complete Prompt | * prompt telling the user a dictation job *<br>* has been completed * |

| | |
|---|---|
| Dictation Subscriber | = [TRUE, FALSE] |
| Discard Voice Mail By Subscriber | * see Communication Interface Data Dictionary * |
| Disconnect | * see Communication Interface Data Dictionary * |
| Disconnect User | = User Identifier |
| Dtmf Event | = [DTMF1, DTMF2, DTMF3, DTMF4, DTMF5, DTMF6, DTMF7, DTMF8, DTMF9, DTMF0, DTMFPOUND, DTMFSTAR, DTMFW, DTMFX, DTMFY, DTMFZ] |

Data Items

-E-

| | |
|---|---|
| Embedded Command | = [CANCEL, HANG-UP] |
| Empty File | = [TRUE, FALSE] |
| Emulate User Identifier Prompt | * prompt the user to enter identifier of * <br> * user he wishes to emulate * |
| Emulating User Info | = User Info |
| Emulating User Session Status | = Session Status |
| Emulation Active | = [TRUE, FALSE] |
| Emulation Return State | = [SERVICE STATE, COMMAND STATE] |
| Emulation Status | = Emulation Active + Emulating User Session Status + Emulating User Info + Emulation Return State |
| Enter Addresses Prompt | * prompt the user to enter the addresses for * <br> * an address list * |
| Enter Author Identifier Prompt | * prompt the user to enter an author identifier * |
| Enter Create Data Item Prompt | = [Enter Create Work Type Prompt, <br>    Enter Create Subject Prompt, <br>    Enter Create Department Prompt] |
| Enter Create Department Prompt | * prompt the user for department * <br> * at dictation creation * |
| Enter Create Subject Prompt | * prompt the user for subject at dictation * <br> * creation * |
| Enter Create Work Type Prompt | * prompt the user for work type at * <br> * dictation creation * |
| Enter Job Identifier Prompt | * prompt the user to enter a job identifier * |

| | |
|---|---|
| Enter Subject Prompt | * prompt the user to enter a subject * |
| Enter Work Type Prompt | * prompt the user to enter a work type * |
| Event | = [Dtmf Event, RING EVENT, HANG-UP EVENT] |
| Event Entry | = Event + Event Time |
| Event Time | = Time |

Data Items

-F-

| | |
|---|---|
| Farthest Advance | = [TRUE, FALSE] |
| Full Command Prompt | * prompt telling the user all commands * |
| Function Set | = [BASIC, FULL] |

Data Items

-H-

| | |
|---|---|
| Hardcopy Flag | * see Communication Interface Data Dictionary * |
| Hardcopy Job | * see Communication Interface Data Dictionary * |
| Hardcopy Selected Prompt | * prompt telling the user he has selected * <br> * hardcopy for a voice mail message * |
| Home State | = [ADDRESS STATE, COMMAND STATE, CUT STATE, INTERCOM RECEIVE STATE, MONITOR STATE, SERVICE STATE, STOP STATE] |

Data Items

-I-

| | |
|---|---|
| I'm Sorry Prompt | * prompt played when user enters an invalid key * |
| Implicit Command | = Command |
| Implicit Commands | = {Implicit Command} |
| Inactivity Timeout | = integer <br> * time, in seconds, a user may be inactive * <br> *  before he is disconnected * <br> * system-wide data item * |
| Inactivity Timeout Enable | = [TRUE, FALSE] <br> * indicates whether a user will be discon- * <br> *  nected when Inactivity Timeout is exceeded * <br> * system-wide data item * |
| Inactivity Timeout Override | = [TRUE, FALSE] <br> * indicates whether exceeding the Inactivity |

|  |  |
|---|---|
|  | * Timeout will be ignored<br>* system-wide data item |
| Initial Creation Allotment | = integer<br>* time, in seconds, user is initially allotted<br>* system-wide data item |
| Initial Session Complete | = [TRUE, FALSE]<br>* indicates whether a user has completed the<br>*   initial session<br>* system-wide data item |
| Insert Begin | = Cursor Location |
| Intercom Active | = [TRUE, FALSE] |
| Intercom Busy Prompt | * prompt telling the user the intercom<br>*   connection is in use |
| Intercom Connection | = Intercom Status + Other Party Port +<br>Intercom Pending Timeout Begin |
| Intercom Ended Prompt | * prompt telling the user the intercom<br>*   connection has ended |
| Intercom Initiator Port | = Port Identifier |
| Intercom Pending Timeout Begin | = Time |
| Intercom Status | = [PENDING, WAITING, INITIATOR, RECIPIENT] |
| Intercom User Identifier Prompt | * prompt telling a supervisor to enter the<br>*   identifier he wishes to intercom |
| Intercom Waiting Prompt | * prompt telling the user another user is<br>*   trying to intercom him |
| Interrupt Flag | = [TRUE, FALSE] |
| Intersession Connection | = (Monitor Connection) +<br>   * Present if user is monitoring *<br>(Intercom Connection)<br>   * Present if user is intercoming * |
| Intersession Info | = [Port Identifier, Current Job Id, Review Active,<br>Emulating User Info,<br>Implicit Commands,<br>Inactivity Timeout Enable,<br>Interrupt Flag,<br>User Info] |
| Intersession Info Update | * see Communication Interface Data Dictionary |
| Invalid Address Prompt | * prompt telling the user an address is invalid |
| Invalid Author Identifier Prompt | * prompt telling the user an author identifier<br>*   is invalid |

| | |
|---|---|
| Invalid Job Identifier Prompt | * prompt telling the user a job identifier<br>* is invalid |
| Invalid Logon Prompt | * prompt telling the user the identifier-<br>* password combination he has entered is<br>* invalid |
| Invalid Message Id Prompt | * prompt telling the user the job identifier<br>* for a voice mail message is invalid |
| Invalid Port Prompt | * prompt telling the user a port identifier<br>* is invalid |
| Invalid Review Data Prompt | = [Invalid Author Identifier Prompt,<br>   Invalid Job Identifier Prompt,<br>   Invalid Subject Prompt,<br>   Invalid Work Type Prompt] |
| Invalid Self-assignment Data Prompt | = [Invalid Author Identifier Prompt,<br>   Invalid Job Identifier Prompt,<br>   Invalid Subject Prompt,<br>   Invalid Work Type Prompt] |
| Invalid Subject Prompt | * prompt telling the user a subject is invalid |
| Invalid Work Type Prompt | * prompt telling the user a work type is invalid |

Data Items

-J-

| | |
|---|---|
| Job Discarded Prompt | * prompt telling the user a dictation job he<br>* was creating is discarded |
| Job Header | = Voice File Pointer |
| Job Identifier | = integer<br>   1-10,000<br>* unique identifier for the job<br>* system-wide data item |
| Job Id Request | * see Communication Interface Data Dictionary |
| Job Too Short Prompt | * prompt telling the user a dictation job he<br>* has cretaed is too small to complete |
| Job Voice File | = Voice File Pointer |

Data Items

-K-

| | |
|---|---|
| Key Meanings | = NUM KEYS {Command} NUM KEYS |
| Key Sequence Command Prompt | * see Voice Session Prompt Script |

Data Items

-L-

| | |
|---|---|
| Last Cut | = Cursor Location |
| Last Insert | = Cursor Location |
| Last User Command Time | = Time |
| Length | = integer<br>* length of a voice file in units of time |
| Listen From Pool | * see Communication Interface Data Dictionary |
| Listen Job Identifier Prompt | * prompt the user for the identifier of a<br>* voice mail message he wishes to listen to |
| Listen Request | * see Communication Interface Data Dictionary |
| Logged On | = [TRUE, FALSE] |
| Logged-on Users Info | = NUM PORTS {Supervisor + (User Class) +<br>Port Identifier + User Identifier} NUM PORTS |
| Logon Attempts | = integer<br>* number of attempts a user has to logon before<br>* being disconnected<br>* system-wide data item |
| Logon Auto-select | = [DICTATION, VOICE MAIL, NONE]<br>* indicates which service the user will be<br>* automatically connected to<br>* system-wide data item |
| Logon Password Prompt | * prompt the user for his password at logon |
| Logon Timeout | = integer<br>* time, in seconds, the user has to<br>* successfully enter his User Identifier<br>* and Password<br>* system-wide data item |
| Logon User Identifier Prompt | * prompts the user for his identifier at logon |

Data Items

-M-

| | |
|---|---|
| MAX ADDRESSES | * see Communication Interface Data Dictionary |
| MAX MESSAGES | * see Communication Interface Data Dictionary |
| Menu Selection | = [AUTHOR IDENTIFIER, CANCEL, CONFIRM,<br>HANG-UP, JOB IDENTIFIER, REGULAR,<br>SELF ASSIGNMENT, SUBJECT, WORK TYPE] |
| Message Discarded Prompt | * prompt telling the user a voice mail message |

| | |
|---|---|
| | * he was creating is discarded |
| Message Sent Prompt | * prompt telling the user that a voice mail<br>* message he created has been sent |
| Message Too Short Prompt | * prompt telling the user that a voice mail<br>* message he created is too small to send |
| Message Waiting Prompt | * prompt telling the user he has voice mail<br>* messages to listen to |
| Monitor Connection | = Other Party Port |
| Monitor Port Prompt | * prompt the user for the identifier of the<br>* port he wishes to monitor |
| Most Recent Cursor | = Cursor Location |

Data Items

-N-

| | |
|---|---|
| New Header | * see Communication Interface Data Dictionary |
| New Header Info | * see Communication Interface Data Dictionary |
| New Intersession Info | = [User Info Update,<br>Inactivity Timeout Enable] |
| New Job Header | * see Communication Interface Data Dictionary |
| New Password Prompt | * prompt the user to enter a new password |
| New Scheduled Job | = VS Read Job Record + Pool Identifier |
| New VS Data Store Info | = [Port Connections, New Scheduled Job,<br>VS System Set Up] |
| Next Job To Review | = integer, 1 - MAX MESSAGES |
| No Jobs To Assign Prompt | * prompt telling the user there are no pending<br>* jobs to assign to him |
| No Messages Prompt | * prompt telling the user he has no voice<br>* mail messages to listen to |
| No More Jobs in Group Prompt | * prompt telling the user there are no more<br>* jobs to listen to in the group he selected |
| No More Messages Prompt | * prompt telling the user he has no more<br>* voice mail messages to review |
| Number of Messages Prompt | * prompt telling the user how many voice mail<br>* messages he has to review |
| Num Digits | = integer, 2 digits |
| NUM KEYS | = integer constant<br>   * Number of keys on user device * |

NUM POOLS                         * see Communication Interface Data Dictionary *

NUM PORTS                         * see Communication Interface Data Dictionary *

Data Items

-O-

Ok To Delete Job                  = Job Identifier + Port Identifier

Online Basket                     * see Communication Interface Data Dictionary*

Other Party Port                  = Port Identifier

Other Prompt                      * To be determined *

Data Items

-P-

Password                          = integer, 4 digits
                                  * user's logon password *
                                  * system-wide data item *

Password Too Long Prompt          * prompt telling the user a password is too long *

Pause Percent                     = [PAUSE 0, PAUSE 10, PAUSE 20, PAUSE 30,
                                    PAUSE 40, PAUSE 50, PAUSE 60, PAUSE 70,
                                    PAUSE 80, PAUSE 90, PAUSE 100, PAUSE 110,
                                    PAUSE 120, PAUSE 130, PAUSE 140, PAUSE 150,
                                    PAUSE 160, PAUSE 170, PAUSE 180, PAUSE 190,
                                    PAUSE 200]

Pending Job                       = VS Read Job Record

Pending Pools                     = NUM POOLS {Pending Job} NUM POOLS

Play Header                       = [TRUE, FALSE]
                                  * indicates whether a transcriptionist will    *
                                  * hear the job header first                    *
                                  * system-wide data item                        *

Pool Cleared                      * see Communication Interface Data Dictionary  *

Pool Identifier                   = integer, 3 digits
                                  * system-wide data item *

Port Allocation                   = 0 {Supervisor} 1 ÷ 0 {Transcriptionist} 16
                                  * the minimum number of ports reserved         *
                                  * for these types of users                     *
                                  * system-wide data item                        *

Port Allocation Exceeded Prompt
                                  * prompt telling the user the system is not    *
                                  * available to him because the port            *
                                  * allocation would be exceeded                 *

Port Connection                   = [PBX, HARD-WIRED]

```
                        * indicates the type of device connected to      *
                        *  the port                                       *
                        *  system-wide data item                          *

Port Connections        * see Communication Interface Data Dictionary *

Port Identifier         = integer, 2 digits
                        * the port's unique identifier                   *
                        * system-wide data item                          *

Port Status             = [ON HOOK, OFF HOOK, FAILED]
                        * system-wide data item                          *

Port Status Change      * see Communication Interface Data Dictionary  *

Previous Create Data    = Work Type + Subject + Department
Values

Previous Home State     = Home State

Prompt Help Messages    = [Adding Allotment Prompt,
                           Address List Erased Prompt,
                           Address List Full Prompt,
                           Brief Command Prompt,
                           Confirm Cut Prompt,
                           Confirm Discard Prompt,
                           Cue Deleted Prompt,
                           Cue Placed Prompt,
                           Dictation Complete Prompt,
                           Emulate User Identifier Prompt,
                           Enter Address Prompt,
                           Enter Create Data Item prompt,
                           Full Command Prompt, Function Cancelled Prompt,
                           Hardcopy Selected Prompt, I'm Sorry Prompt,
                           Intercom Busy Prompt,
                           Intercom Ended Prompt,
                           Intercom User Identifier Prompt,
                           Intercom Waiting Prompt, Invalid Address Prompt,
                           Invalid Create Data Prompt, Invalid Logon Prompt,
                           Invalid Message Id Prompt, Invalid Port Prompt,
                           Invalid Review Data Prompt,
                           Invalid Self-assignment Data Prompt,
                           Job Discarded Prompt, Job Too Short Prompt,
                           Listen Job Identifier Prompt,
                           Logon Password Prompt,
                           Logon User Identifier, Message Discarded Prompt,
                           Message Sent Prompt, Message Too Short Prompt,
                           Message Waiting Prompt, Monitor Port Prompt,
                           New Password Prompt, No Jobs To Assign Prompt,
                           No Messages Prompt,
                           No More Jobs In Group Prompt,
                           No More Messages Prompt,
                           Number of Messages Prompt,
                           Password Too Long Prompt,
                           Port Allocation Exceeded Prompt,
                           Review Attributes Choice Prompt,
                           Review Value Prompt,
                           Self-assignment Attribute Choice Prompt,
```

Self-assignment Pool Empty Prompt,
Self-assignment Value Prompt,
Sign-off Prompt,
Spoken Name File Prompt,
Supervisor Not Available Prompt,
System Greeting Prompt,
User Identifier Playback,
User Not Available Prompt,
Voice Deleted Prompt]

Data Items

-Q-

Quit Assigned Job * see Communication Interface Data Dictionary*

Data Items

-R-

Requested Info = [Address Info, Job Identifier, VS Read Job Record, VS User Profile, User Job-pool Info]

Review Active = [TRUE, FALSE]

Review Attribute Choice Prompt
* prompt the user to choose an attribute for a
* group of dictation jobs to review Review Value Prompt = [Enter Author Identifier Prompt,
Enter Job Identifier Prompt,
Enter Subject Prompt,
Enter Work Type Prompt]

Data Items

-S-

Schedule Job * see Communication Interface Data Dictionary

Self-assignment Active = [TRUE, FALSE]

Self-assignment Attribute Choice Prompt
* prompt the user to choose an attribute for
* a group of dictation jobs to transcribe Self-assignment Enable [TRUE, FALSE]
* indicates whether user is allowed to self-
* assign dictation to transcribe
* system-wide data item Self-assignment Request * see Communications Interface Data Dictionary Self-assignment Value Prompt
* [Enter Author Identifier Prompt,
Enter Job Identifier Prompt,
Enter Subject Prompt,
Enter Work Type Prompt]

Send Voice Mail * see Communications Interface Data Dictionary

| | |
|---|---|
| Service | = [DICTATION SERVICE, VOICE MAIL SERVICE] |
| Service Selected | * see Communication Interface Data Dictionary * |
| Session Info | = [Emulation Status,<br>Intersession Connection,<br>Intercom Pending Timeout Begin<br>    * Time to calculate *<br>    * Intercom Pending Timeout from *<br>Logged On,<br>Port Status,<br>Session Status] |
| Session Status | = [Access Type,<br>    * The user's current file access type *<br>Command Prompt Table,<br>    * Used to determine what prompts to play *<br>Current Job Accessed,<br>    * Info about job user is currently *<br>    * accessing *<br>Current State,<br>    * User's current state *<br>Home State,<br>    * User's home state *<br>Key Meanings,<br>    * Indicates command for each user device *<br>    * key *<br>Last User Command Time<br>    * Time of last command entered by user *<br>Next Job To Review<br>    * Index into Voice Mail Messages * |
| Session Status | Previous Create Data Values,<br>    * Data values from user's last created job *<br>    * this session; *<br>Previous Home State,<br>    * Used for break from monitor, intercom *<br>    * receive *<br>Self-assignment Active,<br>    * whether the user is transcribing jobs *<br>    * from a self-defined pool *<br>Service,<br>    * Service the user is currently in; *<br>Speed Control Status,<br>    * The current speed control adjustments * |
| Sign-off Message | * see Communication Interface Data Dictionary * |
| Sign-off Prompt | * prompt played when a user signs off a job * |
| Sign-on Message | * see Communication Interface Data Dictionary. * |
| Skip Increment | = integer<br>* the distance, in seconds, by which the *<br>* Skip-forward/-backward command will *<br>* move the voice cursor *<br>* system-wide data item * |
| Speed Control Status | = [Delivery Rate Percent, Pause Percent] |

| | |
|---|---|
| Spoken Name File | = Voice File Pointer |
| Spoken Name File Playback | = Voice File Playback Stream |
| Spoken Name File Prompt | * prompt the user to record his spoken name file * |
| SS Request | * see Communication Interface Data Dictionary * |
| SS Requested Info | * see Communication Interface Data Dictionary * |
| SS Unrequested Info | * see Communication Interface Data Dictionary * |
| State | = [ADDRESS STATE, COMMAND STATE, CUT STATE,<br>FAST BACKWARD STATE, FAST FORWARD STATE,<br>INSERT STATE,<br>INTERCOM PENDING STATE,<br>INTERCOM RECEIVE STATE,<br>MONITOR STATE,<br>PLAY STATE,<br>SERVICE STATE,<br>STOP STATE] |
| Subject | = integer, 0-9 digits,<br>* the subject identifier for the job *<br>* system-wide data item * |
| Subject Maximum Length | = integer, 1 digit<br>* maximum number of digits a subject can be *<br>* system-wide data item * |
| Subject Prompt | = [TRUE, FALSE]<br>* indicates whether the user will be prompted *<br>* for subject when creating a file *<br>* system-wide data item * |
| Supervisor | = [TRUE, FALSE] |
| Supervisor Not Available Prompt | * prompt telling the user the supervisor is *<br>* not on the system when he tries to intercom * |
| Supervisor Port | = Port Identifier |
| Supervisor Service Event | * see Communication Interface Data Dictionary * |
| System Greeting Prompt | * Welcome message played for a user the first *<br>* time he logs on the system * |
| System Operation Event | * see Communication Interface Data Dictionary * |

Data Items

-T-

| | |
|---|---|
| Time | * value read from the system clock *<br>* system-wide data item * |
| Time Period | * measure of time passage *<br>* system-wide data item * |
| Timeout | = Time Period |

| | |
|---|---|
| Timeout Flag | = [TRUE, FALSE] |
| Tone | = [ADDRESS LIST DELIMITER TONE,<br>   * Played between members of an address list *<br>  END ZONE WARNING TONE,<br>   * Played when a transcriptionist nears the *<br>   *   end of a dictation unit             *<br>  ERROR TONE,<br>   * Played when user makes an invalid entry *<br>  FAST-BACKWARD TONE,<br>   * Played while Fast-backward function is *<br>   * executing                                   *<br>  FAST-FORWARD TONE,<br>   * Played while Fast-forward function is *<br>   *   executing                              *<br>  INTERCOM NOTIFICATION TONE,<br>   * Played when user is being intercomed *<br>  INTERCOM RINGBACK TONE,<br>   * Played while user is waiting for other *<br>   *   party to respond to an intercom     *<br>  RECORD ALLOTMENT END WARNING TONE,<br>   * Played when a dictator has nearly *<br>   * filled voice file space allotted    *<br>  TALK-DOWN TONE]<br>   * Played when user creating a voice file *<br>   *   is in Stop state                   * |
| Transcription Pool Assignment | * see Communication Interface Data Dictionary * |

Data Items

-U-

| | |
|---|---|
| User Class | = [DICTATOR, TRANSCRIPTIONIST]<br>* indicates the class of a dictation<br>*  service subscriber who is not a supervisor<br>*  system-wide data item |
| User Disconnect | * see Communication Interface Data Dictionary  * |
| User Identifier | = integer, 7 digits<br>* the unique identifier for the user<br>*  system-wide data item |
| User Identifier Maximum Length | = integer, 1 digit<br>* the maximum number of digits a user<br>*  identifier will contain<br>*  system-wide data item |
| User Identifier Playback | * prompt playing number comprising a User<br>*  Identifier |
| User Indicator | = [Spoken Name File Playback, User Identifier Playback] |
| User Info | = [VS User Profile,<br>   Transcription Pool Assignment, Voice Mail Messages] |

| | |
|---|---|
| User Info Request | * see Communication Interface Data Dictionary * |
| User Info Update | = [Transcription Pool Assignment, Voice Mail, VS User Profile] + User Identifier |
| User Job-pool Info | * see Communication Interface Data Dictionary * |
| User Not Available Prompt | * prompt telling the supervisor that the user *<br>* is trying to intercom is not logged onto *<br>* the system * |
| User Password Maximum Length | = integer, 1 digit<br>* the maximum number of digits a user's logon *<br>* password will contain * |
| User Personal Info Entered | * see Communication Interface Data Dictionary * |
| User Session Event | * see Communication Interface Data Dictionary * |
| User Session Service Performed | = [Voice Mail Deleted, Ok To Delete Job] |
| User Session Service Request | = [Delete Voice Mail, Delete Job Check, Disconnect User] |

Data Items

-V-

| | |
|---|---|
| Voice Deleted Prompt | * prompt telling the user a segment has *<br>* been cut from the voice file he is *<br>* creating * |
| Voice File | = unit of stored, digitized voice |
| Voice File Copied | * see Communication Interface Data Dictionary * |
| Voice File Creation Stream | = voice input |
| Voice File Deleted | * see Communication Interface Data Dictionary * |
| Voice File Playback Stream | = voice output |
| Voice File Pointer | * a pointer to a voice file * |
| Voice File Usage | * see Communication Interface Data Dictionary * |
| Voice Mail | = VS Read Job Record |
| Voice Mail Deleted | = Job Identifier + Port Identifier |
| Voice Mail Messages | * see Communication Interface Data Dictionary * |
| Voice Mail Subscriber | = [TRUE, FALSE]<br>* indicates whether a user is a voice mail *<br>* subscriber *<br>* system-wide data item * |

| | |
|---|---|
| VS Data Store Info | = [Intercom Active, Intercom Initiator Port, Logged-on Users Info, Pending Pools, Port Connections, Supervisor Port, VS System Set Ups] |
| VS Data Store Update | * see Communication Interface Data Dictionary * |
| VS Event | * see Communication Interface Data Dictionary * |
| VS No Reply Request | * see Communication Interface Data Dictionary * |
| VS Read Job Record | * see Communication Interface Data Dictionary * |
| VS Reply Request | * see Communication Interface Data Dictionary * |
| VS System Set Up | = [Department Maximum Length, Inactivity Timeout, Logon Attempts, Logon Timeout, User Password Maximum Length, Port Allocation, Skip Increment, Subject Maximum Length, User Identifier Maximum Length, Work Type Maximum Length] |
| VS System Set Ups | = [Department Maximum Length, Inactivity Timeout, Logon Attempts, Logon Timeout, User Password Maximum Length, Port Allocation, Skip Increment, Subject Maximum Length, User Identifier Maximum Length, Work Type Maximum Length] |
| VS User Profile | * see Communication Interface Data Dictionary * |
| VS Write Job Record | * see Communication Interface Data Dictionary * |

Data Items

-W-

| | |
|---|---|
| Work Type | = integer, 3 digits<br>* system-wide data item |
| Work Type Maximum Length | = integer, 1 digit<br>* the maximum number of digits a work type<br>* will contain<br>* system-wide data item |
| Work Type Prompt | = [TRUE, FALSE]<br>* indicates whether a user will be prompted<br>* for Work Type when creating a file<br>* system-wide data item |

COMMUNICATION INTERFACE DATA DICTIONARY

Information Organization

The information passed in the communication interface between the supervisor session (SS) and the voice session (VS) is collected into messages. The messages are in turn collected into message groups. These groups and the messages in them are:

1. SS Request: a request for service from the SS to the VS

- Copy Voice File
    - Delete Voice File
    - Disconnect
    - Clear Pool

2. SS Requested Info: info from the SS requested by the VS

- Address Reply
    - Job Id Reply
    - User Info Reply (used for Logon and Emulate)
        - VS User Profile Reply
        - User Job-pool Reply 3. SS Unrequested Info: info from the SS not requested by the VS

- Intersession Info Update
        - New Voice Mail
        - Inactivity Timeout Enable Update
        - Transcriptionist Pool Assignment Update
        - VS User Profile Update
    - VS Data Store Update (updates of data global to the entire VS)

- Port Connections Update
        - Schedule Job
        - VS System Set Up Update 4. VS Event: notification to the SS of an event in the VS

- User Session Event
        - Job Event
            - Discard Voice Mail By Recipient
            - New Job Header
            - Quit Assigned Job
            - Sign-off Message
            - Sign-on Message
            - Listen From Pool
        - Port Event
            - Activity
            - Port Status Change
            - Service Selected
            - User Disconnect (logoff or unsuccessful logon)
        - User Personal Info Entered (spoken name file and password)
    - Supervisor Service Event
        - Voice File Copied
        - Voice File Deleted
        - Pool Cleared
    - System Operation Event
        - Voice File Usage Changes 5. VS No Reply Request: VS request for service to the SS that requires no reply

- Complete Job

- Send Voice Mail
- Hardcopy Job
- Listen Request
- Self Assignment request

6. VS Reply Request: VS request for service to the SS that requires a reply

- Address Request
- Job Id Request
- User Info Request (logon or emulate)

The message groups and messages appear as data items in section 3.2. The composition of each message group and each message is found in the dictionary entry for the message group or message.

Each message will contain an enumerated value (i.e. it will appear in all upper case) that serves to identify the message. This is the first item in the message.

Data Items

-A-

| | |
|---|---|
| Activity | = ACTIVITY + Time + Port Identifier |
| Address | = User Identifier |
| Address Reply | = ADDRESS REPLY + Address + Valid Address + (Spoken Name File + <br> * Present if address is valid and Spoken * <br> * Name File exists * <br> Port Identifier <br> * To identify destination of reply * |
| Address Request | = ADDRESS REQUEST + Address + <br> Port Identifier <br> * To identify source of request * |
| Addressees | = Hardcopy Flag + <br> * If true, author wants hard copy * <br> 0 {Address} MAX ADDRESSES |
| Attribute | = [AUTHOR IDENTIFIER, JOB IDENTIFIER, SUBJECT, WORK TYPE] |
| Author Identifier | * see System Data Dictionary * |
| Auto Create | * see System Data Dictionary * |

-C-

| | |
|---|---|
| Clear Pool | = CLEAR POOL + Pool Identifier |
| Complete Job | = COMPLETE JOB + VS Write Job Record |

| | |
|---|---|
| Copy Voice File | = COPY REQUEST + Job Identifier + <br> * Job id will be needed for Voice File * <br> * Copied Message * <br> Voice File Pointer + <br> * File to be copied * <br> Disk Identifier <br> * The target disk for the copy * |
| Create Hang-up Option | * see System Data Dictionary * |
| Cue Location | * see System Data Dictionary * |

-D-

| | |
|---|---|
| Date And Time Completed/Sent | * see System Data Dictionary * |
| Delete Voice File | = DELETE REQUEST + Job Identifier + <br> * Job id will be needed for Voice File * <br> * Delete msg * <br> Disk Identifier + <br> * Needed for Voice File Deleted msg * <br> Voice File Pointer + <br> * File to be deleted * <br> O (Online Basket) NUM PORTS <br> * The job is in the Basket of logged-on * <br> * users * |
| Department | * see System Data Dictionary * |
| Department Maximum Length | * see System Data Dictionary * |
| Department Maximum Length Update | = DEPARTMENT MAXIMUM LENGTH UPDATE + <br> Department Maximum Length |
| Department Prompt | * see System Data Dictionary * |
| Dictation Subscriber | * see System Data Dictionary * |
| Discard Voice Mail By Recipient | = DISCARD MESSAGE + Job Identifier + <br> User Identifier |
| Disconnect | = DISCONNECT + User Identifier + <br> * Needed in case user logged off in meantime * <br> Port Identifier |
| Disconnect Reason | = [LOGOFF, UNSUCCESSFUL LOGON] |
| Disk Identifier | = [LOGICAL DISK 1, LOGICAL DISK 2] |

-F-

| | |
|---|---|
| Function Set | * see System Data Dictionary * |

-H-

| | |
|---|---|
| Hardcopy Flag | = [TRUE, FALSE] |
| Hardcopy Job | = HARDCOPY JOB + VS Write Job Record |

-I-

| | |
|---|---|
| Inactivity Timeout | * see System Data Dictionary * |
| Inactivity Timeout Enable | * see System Data Dictionary * |
| Inactivity Timeout Enable Update | = INACTIVITY TIMEOUT ENABLE UPDATE + Inactivity Timeout Enable + Port Identifier |
| Inactivity Timeout Override | * see System Data Dictionary * |
| Inactivity Timeout Update | = INACTIVITY TIMEOUT UPDATE + Inactivity Timeout |
| Initial Creation Allotment | * see System Data Dictionary * |
| Initial Session Complete | * see System Data Dictionary * |
| Intersession Info Update | = [New Voice Mail, Inactivity Timeout Enable Update, New Specially Assigned Job, Transcription Pool Assignment Update, VS User Profile Update] |

-J-

| | |
|---|---|
| Job Event | = [Discard Voice Mail By Recipient, New Job Header, Quit Assigned Job, Sign-off Message, Sign-on Message, Listen From Pool] |
| Job Header | = Voice File Pointer |
| Job Id Reply | = JOB ID REPLY + Job Identifier + Port Identifier * To identify destination of reply * |
| Job Id Request | = JOB ID REQUEST + Port Identifier * To identify source of request * |
| Job Identifier | * see System Data Dictionary * |
| Job Voice File | = Voice File Pointer |

-L-

| | |
|---|---|
| Length | * see System Data Dictionary * |
| Listen From Pool | = LISTEN FROM POOL + Job Identifier +<br>Pool Identifier + User Identifier +<br>Port Identifier |
| Listen Request | = LISTEN REQUEST + Attribute + Value +<br>Port Identifier ..<br>* To identify source of request * |
| Logon Attempts | * see System Data Dictionary * |
| Logon Attempts Update | = LOGON ATTEMPTS UPDATE + Logon Attempts |
| Logon Auto-select | * see System Data Dictionary *. |
| Logon Timeout | * see System Data Dictionary * |
| Logon Timeout Update | = LOGON TIMEOUT UPDATE + Logon Timeout |

-M-

| | |
|---|---|
| MAX ADDRESSES | = integer constant<br>* Maximum number of addresses for a voice *<br>* mail message |
| MAX MESSAGES | = integer constant<br>* Maximum number of voice mail messages in *<br>* a Basket |

-N-

| | |
|---|---|
| New Header | = [TRUE, FALSE] |
| New Header Count | = integer, 2 digits<br>* Used to allow SS to determine most recent *<br>* header reconstruction for job * |
| New Header Info | = Author Identifier + Spoken Name File +<br>Work Type + Subject +<br>Date And Time Completed/Sent +<br>New Header Count |
| New Job Header | = NEW HEADER MESSAGE + Job Identifier +<br>Job Header + New Header Count |
| New Specially Assigned Job | = NEW SPECIALLY ASSIGNED JOB +<br>Specially Assigned Job +<br>New Header +<br>* True if header needs reconstruction *<br>(New Header Info) +<br>* Present if header needs reconstruction *<br>User Identifier +<br>* Needed in case user logged off *<br>Port Identifier |

| | |
|---|---|
| | * To locate user * |
| New Voice Mail | = NEW VOICE MAIL + VS Read Job Record + User Identifier + <br> * Needed in case user logged off * <br> Port Identifier <br> * To locate user * |
| NUM POOLS | = integer constant <br> * Number of pools in the system * |
| NUM PORTS | = integer constant <br> * Number of ports in the system * |

-O-

| | |
|---|---|
| Online Basket <br> * Identifies a Basket * <br> * of a logged-on user* | = User Identifier + Port Identifier |

-P-

| | |
|---|---|
| Password | * see System Data Dictionary * |
| Play Header | * see System Data Dictionary * |
| Pool Cleared | = POOL CLEARED + Pool Identifier + Job Identifier |
| Pool Identifier | * see System Data Dictionary * |
| Port Allocation | * see System Data Dictionary * |
| Port Allocation Update | = PORT ALLOCATION UPDATE + Port Allocation |
| Port Connection | * see System Data Dictionary * |
| Port Connections | = 0 {Port Connection} NUM PORTS |
| Port Connections Update | = PORT CONNECTIONS UPDATE + Port Connections |
| Port Event | = [Activity, User Disconnect, Port Status Change, Service Selected] |
| Port Identifier | * see System Data Dictionary * |
| Port Status | * see System Data Dictionary * |
| Port Status Change | = PORT STATUS CHANGE + Port Status |

-Q-

| | |
|---|---|
| Quit Assigned Job | = QUIT MESSAGE + Job Identifier + User Identifier + Port Identifier |

-S-

| | |
|---|---|
| Schedule Job | = SCHEDULE JOB + VS Read Job Record + New Header + <br> * True if header needs reconstruction * <br> (New Header Info) + <br> * Present if header needs reconstruction * <br> Pool Identifier |
| Self Assignment Enable | * see System Data Dictionary * |
| Self Assignment Request | = SELF ASSIGNMENT REQUEST + <br> Attribute Value + <br> Port Identifier <br> * To identify source of request * |
| Send Voice Mail | = SEND MESSAGE + VS Write Job Record + Addresses |
| Service | * see System Data Dictionary * |
| Service Selected | = SERVICE SELECTED + Service |
| Sign-off Message | = SIGN-OFF MESSAGE + Job Identifier + User Identifier + Port Identifier |
| Sign-on Message | = SIGN-ON MESSAGE + Job Identifier + Pool Identifier + User Identifier + Port Identifier |
| Skip Increment | * see System Data Dictionary * |
| Skip Increment Update | = SKIP INCREMENT UPDATE + Skip Increment |
| Spoken Name File | = Voice File Pointer |
| SS Request | = [Copy Voice File, Delete Voice File, Disconnect, Clear Pool] |
| SS Requested Info | = [Address Reply, Job Id Reply, Listen Reply, User Info Reply] |
| SS Unrequested Info | = [Intersession Info Update, VS Data Store Update] |
| Subject | * see System Data Dictionary * |
| Subject Maximum Length | * see System Data Dictionary * |
| Subject Maximum Length Update | = SUBJECT MAXIMUM LENGTH UPDATE + Subject Maximum Length |
| Subject Prompt | * see System Data Dictionary * |
| Supervisor | * see System Data Dictionary * |

Supervisor Service Event = [Voice File Copied, Voice File Deleted, Pool Cleared]

System Operation Event = Voice File Usage Change

-T-

Time * see System Data Dictionary *

Transcription Pool Assignment = 0 {Pool Identifier} NUM POOLS

Transcription Pool Assignment Update = TRANSCRIPTION POOL ASSIGNMENT UPDATE +
Transcription Pool Assignment +
User Identifier +
 * Needed in case user logged off *
Port Identifier
 * To locate user *

-U-

User Class * see System Data Dictionary *

User Disconnect = USER DISCONNECT + Disconnect Reason +
(User Identifier) + Port Identifier User Identifier * see System Data Dictionary *

User Identifier Maximum Length * see System Data Dictionary *

User Identifier Maximum Length Update = USER IDENTIFIER MAXIMUM LENGTH UPDATE +
User Identifier Maximum Length User Info Reply = [VS User Profile Reply, User Job-pool Reply]

User Info Request = USER INFO REQUEST + User Info Request Type +
User Identifier +
Port Identifier +
 * To identify source of request *
(Time)
 * Present for logon request *

User Info Request Type = [LOGON REQUEST, EMULATE REQUEST]

User Job-pool Info = (Transcription Pool Assignment) +
 * Present if user is a transcriptionist *
 *   or supervisor *
(Voice Mail Messages)
 * Present if user is a voice mail subscriber *

User Job-pool Reply = USER JOB-POOL REPLY +
User Job-Pool Info +
Port Identifier
 * To identify destination of reply *

| | |
|---|---|
| User Password Maximum Length | * see System Data Dictionary * |
| User Password Maximum Length Update | = USER PASSWORD MAXIMUM LENGTH UPDATE + Password Maximum Length |
| User Personal Info Entered | = USER PERSONAL INFO ENTERED + User Identifier + Spoken Name File + Password |
| User Session Event | = [Job Event, Port Event, User Personal Info Entered] |

-V-

| | |
|---|---|
| Valid Address | = [TRUE, FALSE] |
| Voice File Copied | = VOICE FILE COPIED + Job Identifier + Disk Identifier + Voice File Pointer |
| Voice File Deleted | = VOICE FILE DELETED + Job Identifier + Disk Identifier |
| Voice File Pointer | * see System Data Dictionary * |
| Voice File Usage | = integer, 2 digits * Percentage of voice file storage used * |
| Voice File Usage Change | = VOICE FILE USAGE CHANGE + Voice File Usage |
| Voice Mail Messages | = 0 {VS Read Job Record} MAX MESSAGES |
| Voice Mail Subscriber | * see System Data Dictionary * |
| VS Data Store Update | = [Port Connections Update, Schedule Job, VS System Set Up Update] |
| VS Event | = [Supervisor Service Event, System Operation Event, User Session Event] |
| VS No Reply Request | = [Complete Job, Hardcopy Job, Send Voice Mail, Listen Request, Self Assignment Request] |
| VS Read Job Record | = Job Identifier + Job Voice File + Length + Cue Location + Job Header |
| VS Reply Request | = [Address Request, Job Id Request, User Info Request] |

```
VS System Set Up Update    = [Department Maximum Length Update,
                              Inactivity Timeout Update,
                              Logon Attempts Update, Logon Timeout Update,
                              User Password Maximum Length Update,
                              Port Allocation Update,
                              Skip Increment Update,
                              Subject Maximum Length Update,
                              User Identifier Maximum Length Update,
                              Work Type Maximum Length Update]

VS User Profile            = User Identifier + Password +
                              Dictation Subscriber + Voice Mail Subscriber +
                              Supervisor + User Class + Function Set +
                              Work Type + Subject + Department +
                              Initial Session Complete + Auto Create +
                              Create Hang-up Option + Work Type Prompt +
                              Subject Prompt + Department Prompt +
                              Spoken Name File + Logon Auto-select +
                              Play Header + Initial Creation Allotment +
                              Self Assignment Enable +
                              Inactivity Timeout Override VS User Profile Reply      = VS USER PROFILE REPLY + VS User Profile +
                              Port Identifier
                                * To identify destination of reply *

VS User Profile Update     = VS USER PROFILE UPDATE + VS User Profile +
                              Port Identifier
                                * To locate user *

VS Write Job Record        = Job Identifier + Author Identifier +
                              Job Voice File + Work Type + Subject +
                              Department + Length + Cue Location +
                              Date & Time Created +
                              Date & Time Completed/Sent + Job Header
```

-W-

```
Work Type                  * see System Data Dictionary *

Work Type Maximum          * see System Data Dictionary *
Length

Work Type Maximum          = WORK TYPE MAXIMUM LENGTH UPDATE +
Length Update                Work Type Maximum Length Work Type Prompt           * see System Data Dictionary *
```

DIGITAL DICTATION SYSTEM

APPENDIX A

Figure 89:
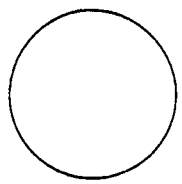
FIG. 89 and 90 illustrate conventions used in a FIG. 5-88.
Figure 89:
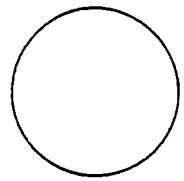
Figure 89:
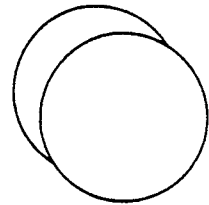
Figure 89:
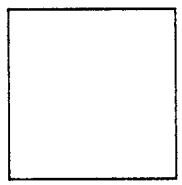
Figure 89:
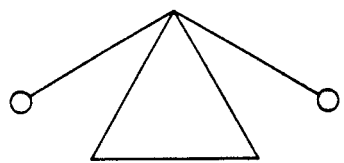
Figure 89:
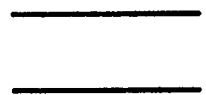
Figure 89:
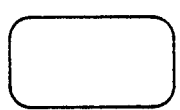
Figure 89:
Figure 89:
Figure 89:
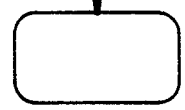

Symbols used in Figs. 5-88 are defined below with respect to Figs. 89 and 90.

A Process is a software module whose output depends upon date of values defined or specified independently of the Process when the process is invoked. (e.g. a square root function Process would return the square root of a number, N, transferred to the process when it is invoked.) A process may have multiple activation. That is multiple images of the Process code may be executing simultaneously to operate on multiple sets of data.

A Procedure is a software module whose output is determined by data values defined or specified internally to the procedure. (e.g. A real time procedure would return the value of a real time clock when invoked.)

A Data Terminator is a source or sink for data external to the system.

A Telephone-like terminal is an acoustic input/output device.

A Data Store is a designated portion of a memory device used to store a particular set of data.

A Data Base is a software module which stores and maintains a designated set of data. Other software modules may have read access, to obtain current values of data, write access to input data (write access includes the capability to read data for purposes of updating), or read and write access.

Where necessary transfer of control between modules is shown by dashed lines.

Figure 90:
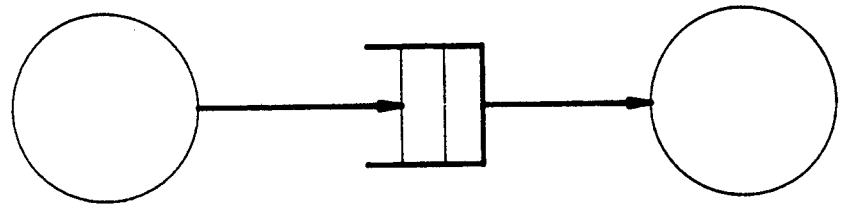
Figure 90:
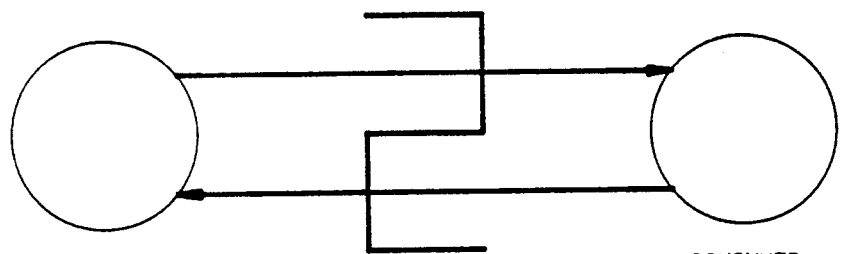
Figure 90:
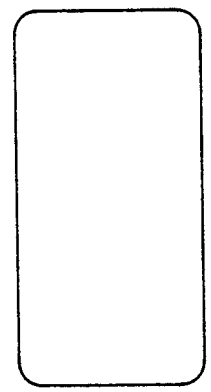

Asynchronous communication, as shown in Fig. 90 is one direction communication with no response expected. (e.g. the Producer Process may on its own initiative update a Data Base in the Consumer Process.)

Synchronous communication is two directional communication with a request and a response. (e.g. the Producer Process may transfer a set of numeric values and the Consumer Process may respond with the mean and variance of the set.)

The Communication Interface symbol shown in Fig. 90 is used to designate the complete set of data flows between software modules.

Symbols used in the Data Dictionary are shown in Table 2 set forth below.

DEFINITION OF TERMS

Dictation Job (DJ) - A Voice File designated to be transcribed.

dictator - A user of the system of the subject invention who has the ability to input Dictation Jobs.

hardcopy - Transcribed text.

Job Record - A data file associated with a particular Voice File which contains the values a selected attributes of the Voice File. The system operates on Voice Files in accordance with their Job Records and the Supervisor may alter the operation by manipulation of the Job Record.

Pools - The method of the system the subject invention for assigning Dictation Jobs to selected transcriptionists. Also, classifications of Dictation Jobs in accordance with a selected attribute in their Job Record.

prompt - An internally stored Voice File which is played back by the system for the guidance of a system user.

| | | |
|---|---|---|
| Supervisor | – | A system user with the capability to access the system to define and alter priorities for system operation and to define and alter the capabilities of other users in order to allocate system resources in response to changing requirements. |
| transcriptionist | – | A system user with the capability to access Dictation Jobs for transcription. |
| User Profile | – | A data file associated with a particular user which contains the values of selected attributes of the user. Users are designated as Supervisors, transcriptionists, dictators, or Voice Mail users in accordance with their User Profile. |
| Voice File | – | A voice signal which is stored, as an entity, in the system of the subject invention as a digital file. |
| Voice Mail | – | voice messages which are stored and forwarded for later delivery to selected addressees. |
| Voice Mail Message (VMM) | – | A Voice File input by a system user together with and address list which may be accessed only by other users designated on the address list. |
| Voice Mail user | – | A system user with the capability to input and access a Voice Mail Message. |

APPENDIX B

MODULE FUNCTIONAL SPECIFICATION STANDARD

Format

Module functional specifications will follow a style similar to UNIX manual pages. The specification for each module will begin on a new page. The module name will appear at the top left corner of the page; the module number will appear at the top right of the page. The specification will have these sections:

- NAME : This section contains the module's name and a brief summary of what it does.

- ASSUMPTIONS : This section describes the (non-obvious) assumptions the module makes about its environment or inputs.

- DESCRIPTION : This section defines in English what the module does.

- PSEUDOCODE : This section presents what the module does using the Program Design Language standard shown below.

The Assumptions section may be omitted if the module makes no assumptions. Either the Description or Pseudocode section may be omitted as appropriate; at least one of the two must be present.

Program Design Language Standard

For input & output —
    get, put

For assignment —
    =

For arithmetic —
    +, -, *, /

For logical conditions —
    =, NOT =, >, <, >=, <=, NOT, AND, OR

For comments —
    * *

Parentheses may be used to clarify order of execution; they must be used where ambiguity would exist otherwise.

Single quotation marks will be used for character or string literal values. To show a single quotation mark contained within a character or string literal, double it.

Language Constructs (1) English statements may be used for clarity or brevity.

(2) Binary selection:

```
IF condition
THEN action(s)
ELSE action(s)
ENDIF
```

The ELSE clause is optional; IF constructs may be nested. Example:

```
IF Gross Pay is numeric AND > 0
THEN IF Deductions < Gross Pay
     THEN Net Pay = Gross Pay - Deductions
     ELSE Error Flag = '1'
     ENDIF
ELSE Error Flag = '2'
ENDIF
```

(3) Multi-way selection:

```
CASE OF expression
     value 1:  action(s)
     value 2:  action(s)
          .
          .
     value n:  action(s)
     OTHERWISE: action(s)
ENDCASE
```

The OTHERWISE clause is optional. Example:

```
CASE OF Marital Status
     MARRIED:  Married Counter = Married Counter + 1
     SINGLE:   Single Counter = Single Counter + 1
     DIVORCED: Divorced Counter = Divorced Counter + 1
     WIDOWED:  Widowed Counter = Widowed Counter + 1
     OTHERWISE: Error Counter = Error Counter + 1
ENDCASE
```

(4) Looping with the test first:

```
LOOP UNTIL condition
     action(s)
ENDLOOP
```

(5) Looping with the test last:

```
LOOP
     action(s)
UNTIL condition
ENDLOOP
```

(6) Module exit:

```
RETURN
```

The RETURN statement is optional at the end of the module.

Note that all key words in the constructs are in all upper case. The constructs may be nested. Example:

```
LOOP UNTIL condition 1
    IF condition 2
        THEN IF condition 3
            THEN action 1
                 action 2
            ELSE action 3
            ENDIF
    ENDIF
    LOOP UNTIL condition 4
        action 4
        action 5
    ENDLOOP
ENDLOOP
```

Groups of actions within a construct will be indented. Indentation of 2-8 spaces will be used.

BEGIN and END statements are unnecessary since each structured construct has its own delimiting key words.

The above descriptions of preferred embodiments have been given by way of illustration only and numerous other embodiments of the subject invention may become apparent to those skilled in the art upon consideration of the above description and the attached drawings Accordingly, limitations on the scope of the subject invention are to be found only in the claims set forth below.

What is claimed is:

1. A system for storage and retrieval of Voice Files, comprising:
   a) input-output means for input and output of said Voice files;
   b) input means for input of log-on signals and control signals by users;
   c) storage and retrieval means for storing said input Voice Files and for retrieving said stored Voice Files for output;
   d) control means for:
      d1) responding to said log-on signals to identify users as dictators or as particular transcriptionists;
      d2) controlling said storage and retrieval means to store at least some of said Voice Files input by said dictators designated as Dictation Jobs;
      d3) responding to said log-on signals and control signals input by said transcriptionists to output said Dictation Jobs to selected ones of said transcriptionists in accordance with a predetermined scheduling algorithm, said algorithm determining output of said Dictation Jobs solely as a function of attributes and input sequences of said Dictation Jobs.

2. A System as described in claim 1 further comprising supervisory input-output means for providing access to said system to a supervisor, said supervisor monitoring the operation of said system and controlling the allocation of said system's resources through said supervisory input-output means.

3. A system as described in claim 2 wherein said control means further comprises processor means for execution of software modules, and wherein further said software modules comprise a supervisor session module for facilitating said access by said supervisor and a voice session module for facilitating said input output of said Voice Files.

4. A system as described in claim 3 wherein said Supervisor session and said voice session are executed concurrently.

5. A system as described in claim 3 wherein said voice session module further comprises a user session submodule for managing the interface presented to a user through said input-output means, and wherein further said user session submodule is a process capable of multiple activations, whereby a multiplicity of users may input and receive said Voice Files.

6. A system as described in claim 1 wherein said control means is further for:
   a) maintaining Job Records associated with at least some of said Dictation Jobs, said Job Records each comprising values of attributes for one of said associated Dictation Jobs;
   b) maintaining job pool definitions defining job pools of said associated Dictation Jobs;
   c) assigning said associated Dictation Jobs to said job pools when values of selected attributes maintained in said Job Records of said associated Dictation Jobs conform to at least one of said job pool definitions;
   d) assigning at least one of said identified, particular transcriptionists to at least one of said job pools; and,
   e) outputting said Dictation Jobs assigned to said at least one job pool to said assigned transcriptionists, first in order of any priorities associated with said assigned Dictation Jobs in said Job Records, and, within a given priority, on a first-in-first out basis.

7. A system as described in claim 6 wherein said Job Records are maintained in accordance with control signals specifying said values of said attributes for said associated Dictation Jobs.

8. A system as described in claim 6 wherein said system maintains said job pool definitions and assigns said identified particular transcriptionists in accordance with information input by said supervisor.

9. A system as described in claim 8 wherein said Job Records are maintained in accordance with control signals specifying said values of said attributes for said associated Dictation Jobs.

10. A system as described in claim 9 wherein as said associated Dictation Jobs are input they are first assigned to a ready job pool and then assigned an appropriate one of said job pools, first in order of said any priorities associated with said Dictation Jobs in said Job Records, and within said given priority on a first-in-first out basis, only when the last of said assigned Dictation Jobs in said appropriate pool is output to a corresponding one of said assigned transcriptionists.

11. A system as described in claim 9 wherein as said associated Dictation Jobs are input they are first assigned to a ready job pool and then entered into an appropriate one of said job pools, first in order of said any priorities associated with said Dictation Jobs in said Job Records, and within said given priority on a first-in-first out basis, only when the last of said assigned Dictation Jobs in said appropriate pool is output to a corresponding one of said assigned transcriptionists.

12. A system as described in claim 10 wherein said control means for assigning assigns said associated Dictation Jobs, for which said values of said selected attributes conform to a plurality of said job pool definitions, into the first of said plurality of jobs pools in which the last of said assigned Dictation Jobs is output.

13. A system as described in claim 11 wherein said control means for assigning assigns said associated Dictation Jobs, for which said values of said selected attributes conform to a plurality of said job pool definitions, into the first of said plurality of jobs pools in which the last of said assigned Dictation Jobs is output.

14. A system as described in claim 1 wherein said storage and retrieval means store said Dictation Jobs as Voice Files and further comprises means for allowing said users to access said Voice Files.

15. A system as described in claim 14 further comprising:
   a) means for responding to said log-on signals input by said dictators to allow said dictators to input Voice Files for digital storage; and,
   b) second means for responding to said control signals input by said dictators to allow said dictators to access a said Voice Files at selected access points in said Voice Files.

16. A system as described in claim 15 wherein said second means for responding further comprises means for responding to a move-to-beginning command signals to move said access points to the beginning of said Voice Files.

17. A system as described in claim 15 wherein said second means for responding further comprises means for responding to a move-to-end command signals to move said access point to the end of said Voice Files.

18. A system as described in claim 15 wherein said second means for responding further comprises means for responding to a fast forward command or fast backward signals to output sequences of tones, each tone to representing a predetermined increment of time in said Voice Files, then further responding to stop command signals to stop said sequences and move said access point corresponding forward or backward the number of said predetermined increments equal to the number of tones in said sequences.

19. A system as described in claim 15 wherein said second means for responding further comprises means for responding to a move-half-beginning command signal or a move-half-end command signal to correspondingly move said access points halfway from their previous locations to the beginning or end of said Voice Files.

20. A system as described in claim 15 further including means for allowing said dictators to insert additional materials into said Voice Files at said access points.

* * * * *